US012717213B2

(12) United States Patent
Lee

(10) Patent No.: US 12,717,213 B2
(45) Date of Patent: Aug. 25, 2026

(54) CAMERA ACTUATOR AND CAMERA MODULE COMPRISING SAME

(71) Applicant: LG INNOTEK CO., LTD., Seoul (KR)

(72) Inventor: Sung Guk Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 401 days.

(21) Appl. No.: 18/017,304

(22) PCT Filed: Jul. 21, 2021

(86) PCT No.: PCT/KR2021/009376
§ 371 (c)(1),
(2) Date: Jan. 20, 2023

(87) PCT Pub. No.: WO2022/019632
PCT Pub. Date: Jan. 27, 2022

(65) Prior Publication Data

US 2023/0296962 A1 Sep. 21, 2023

(30) Foreign Application Priority Data

Jul. 21, 2020 (KR) ........................ 10-2020-0090548
Sep. 15, 2020 (KR) ........................ 10-2020-0118089
(Continued)

(51) Int. Cl.
*G03B 5/00* (2021.01)
*H04N 23/51* (2023.01)
*H04N 23/55* (2023.01)

(52) U.S. Cl.
CPC ............... *G03B 5/00* (2013.01); *H04N 23/51* (2023.01); *H04N 23/55* (2023.01);
(Continued)

(58) Field of Classification Search
CPC ......... G02F 1/133524; G02F 1/133607; G02F 1/1323; G02B 7/09; G02B 7/005;
(Continued)

(56) References Cited

U.S. PATENT DOCUMENTS 9,285,566 B2 3/2016 Chan et al.
2019/0004328 A1 1/2019 Lee et al.
(Continued)

FOREIGN PATENT DOCUMENTS

CN 110460777 A 11/2019
CN 111142308 A 5/2020
(Continued)

*Primary Examiner* — Marin Pichler
(74) *Attorney, Agent, or Firm* — Birch, Stewart, Kolasch & Birch, LLP

(57) ABSTRACT

Disclosed, in one embodiment of the present invention, is a camera actuator comprising: a housing; a mover disposed in the housing and comprising an optical member and a holder having the optical member disposed therein; a tilting guide unit for guiding the tilting of the mover, and a drive unit disposed in the housing so as to drive the mover, wherein the holder comprises a receiving groove in which the optical member is disposed, and a groove is formed in the bottom surface of the receiving groove.

20 Claims, 98 Drawing Sheets

(30) Foreign Application Priority Data

Sep. 28, 2020 (KR) ........................ 10-2020-0125656
Jan. 6, 2021 (KR) ........................ 10-2021-0001527

(52) U.S. Cl.
CPC ................ *G03B 2205/0023* (2013.01); *G03B 2205/003* (2013.01); *G03B 2205/0061* (2013.01)

(58) Field of Classification Search
CPC . G02B 7/04; G02B 7/10; G02B 27/64; G02B 27/646; G02B 13/001; G02B 7/023; G02B 7/08; G03B 5/00; G03B 13/34; G03B 13/36; G03B 13/32; G03B 2205/0069; G03B 2205/0015; G03B 2205/0007; G03B 2205/0046; G03B 19/22; G03B 3/10; G03B 17/02; H04N 5/2328; H04N 5/2253; H04N 5/2254; H05K 1/18; H02K 41/0354; H02K 41/0356
See application file for complete search history.

(56) References Cited

U.S. PATENT DOCUMENTS

2019/0049687 A1 2/2019 Bachar et al.
2019/0230255 A1* 7/2019 Fu ...................... G02B 13/0075
2019/0230262 A1* 7/2019 Wang ...................... G02B 3/12
2020/0174270 A1 6/2020 Enta et al.
2021/0199983 A1 7/2021 Kazuo
2021/0397017 A1 12/2021 Jeong

FOREIGN PATENT DOCUMENTS

EP 3 518 520 A2 7/2019
JP 4-329502 A 11/1992
JP 2009-93203 A 4/2009
JP 2018-205683 A 12/2018
JP 2019-139223 A 8/2019
JP 2020-190658 A 11/2020
KR 10-2018-0095420 A 8/2018
KR 10-2019-0004121 A 1/2019
KR 10-2019-0136083 A 12/2019
KR 10-2020-0041067 A 4/2020
KR 10-2021-0000069 A 1/2021
WO 2019/207484 A2 10/2019

* cited by examiner

[FIG. 1]
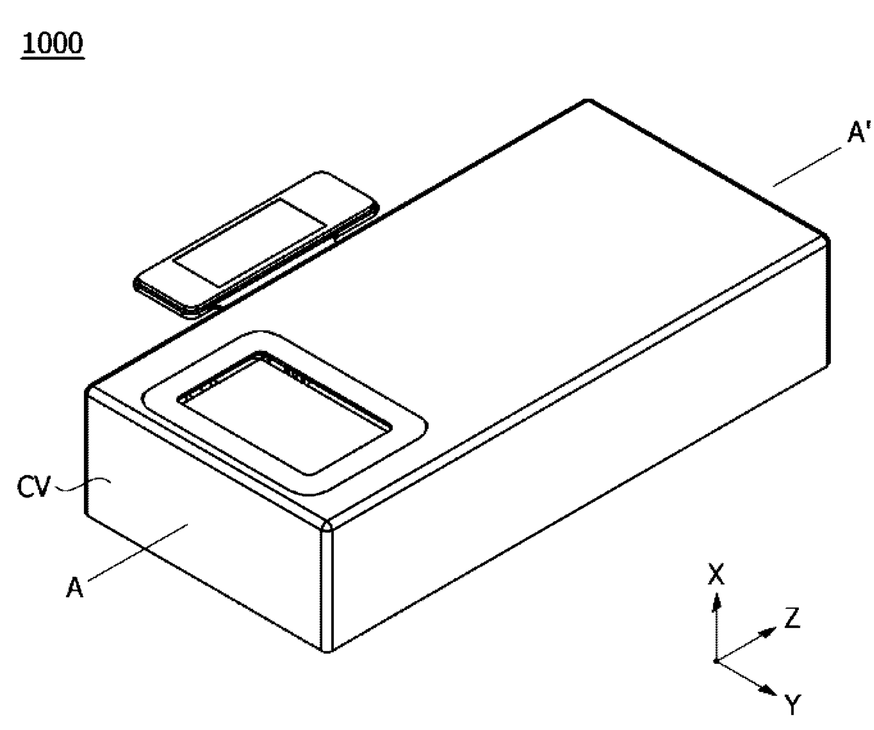
[FIG. 2]
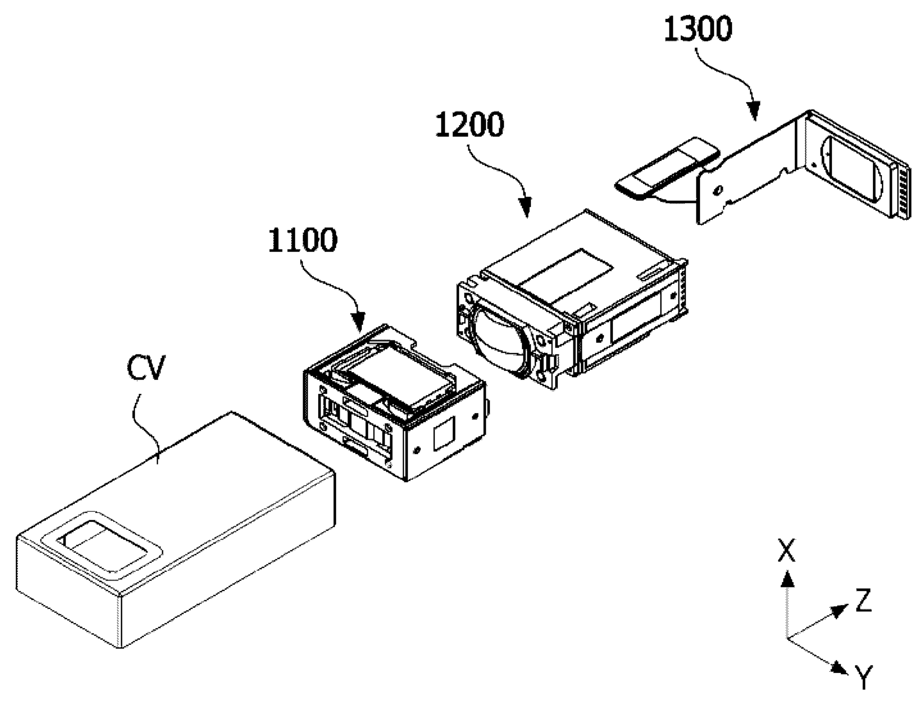

[FIG. 3]
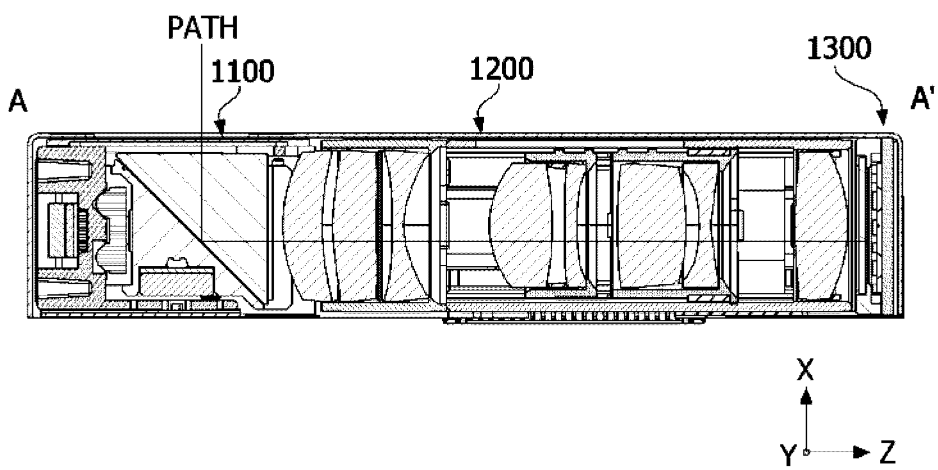
[FIG. 4]
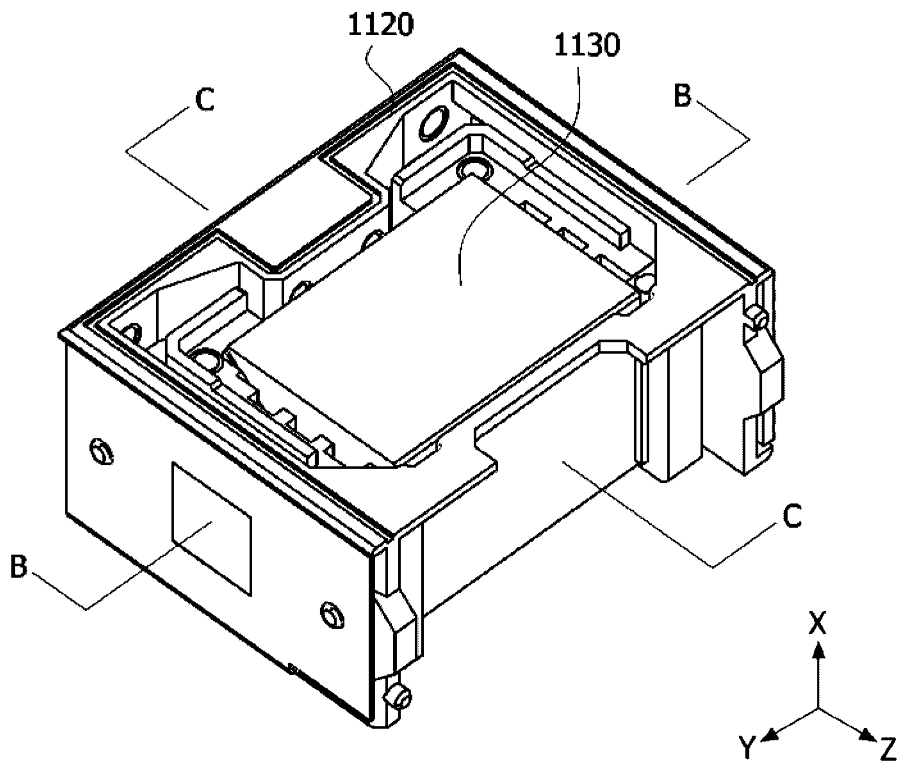

[FIG. 5]
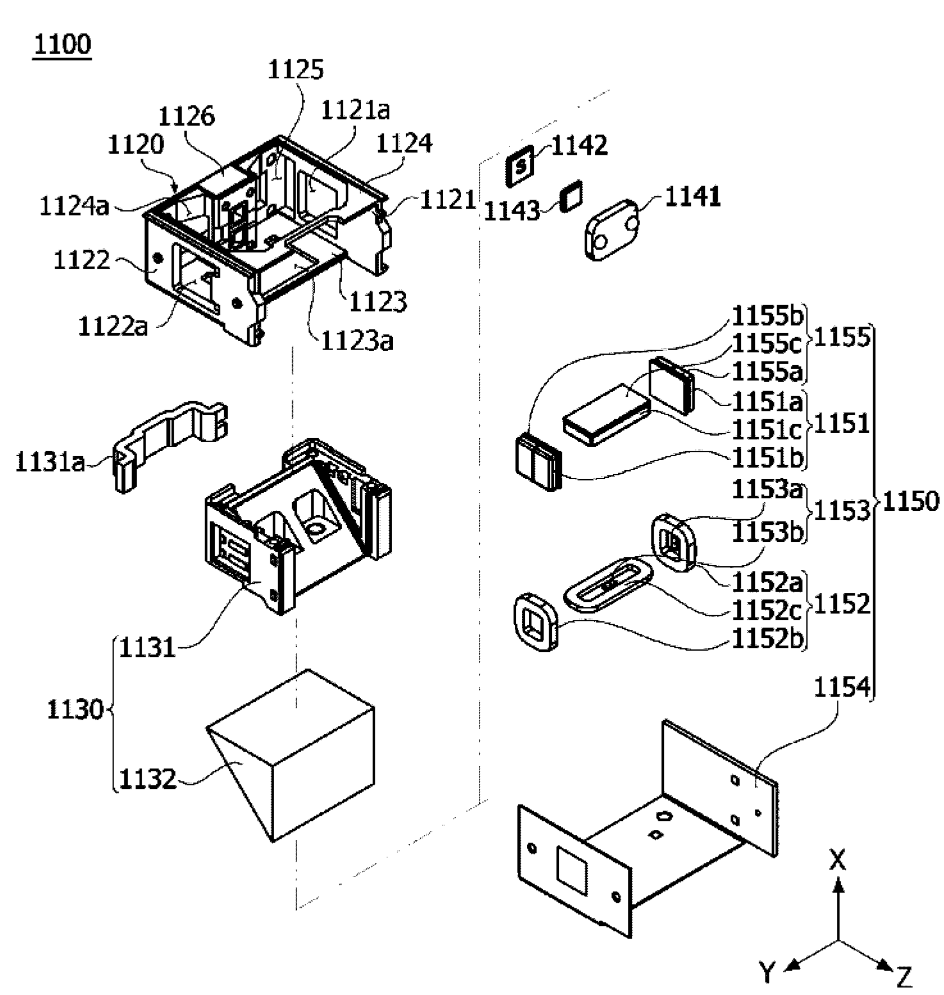

[FIG. 6A]
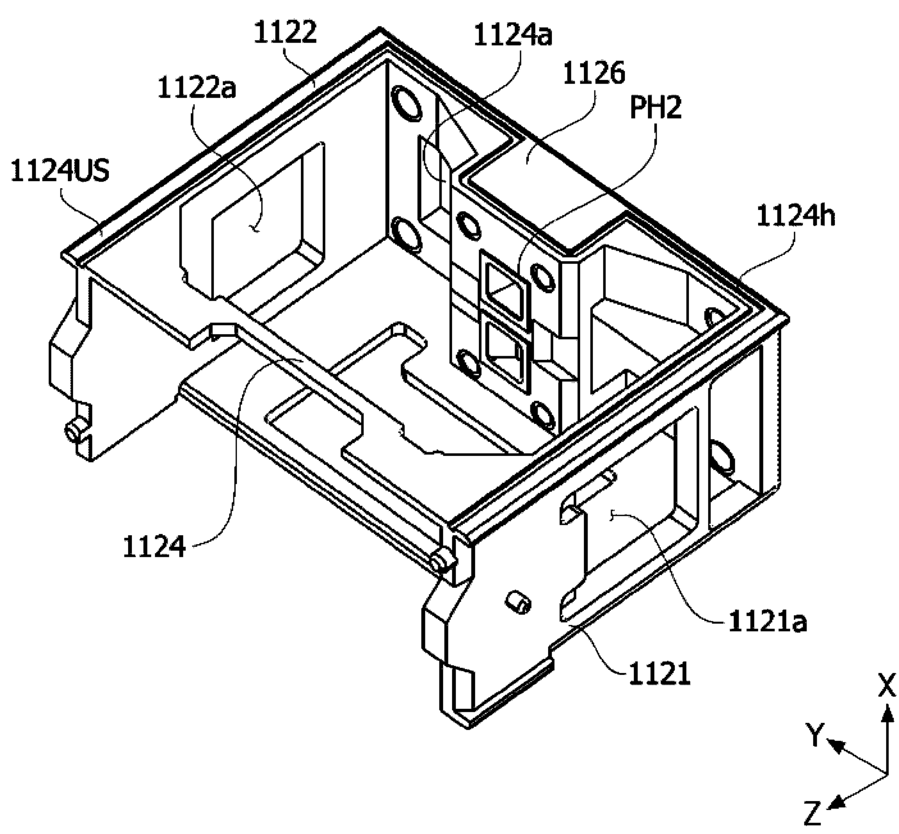

[FIG. 6B]
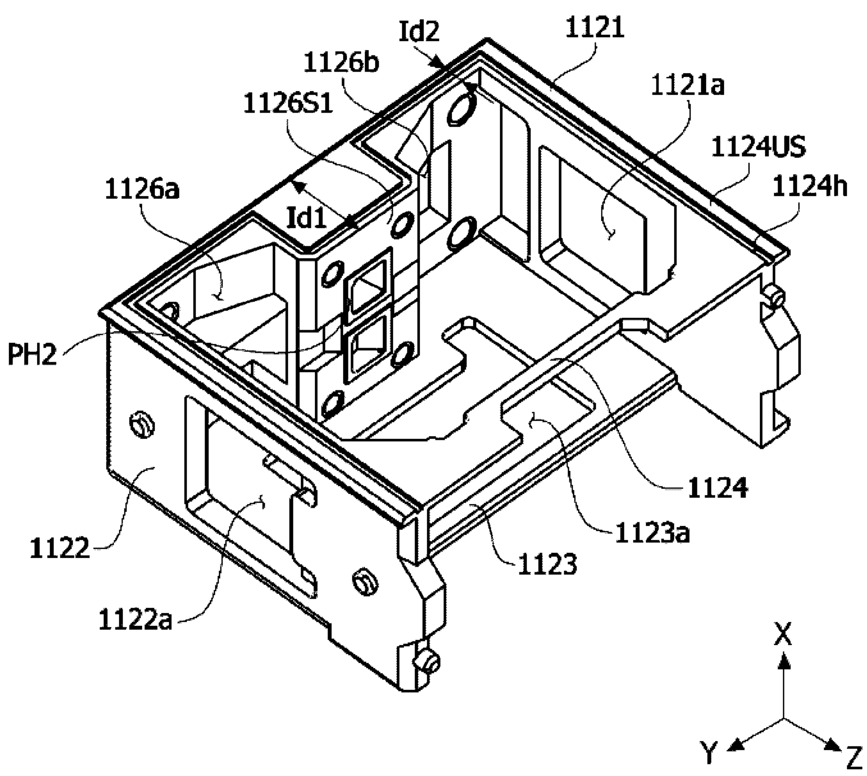
[FIG. 6C]
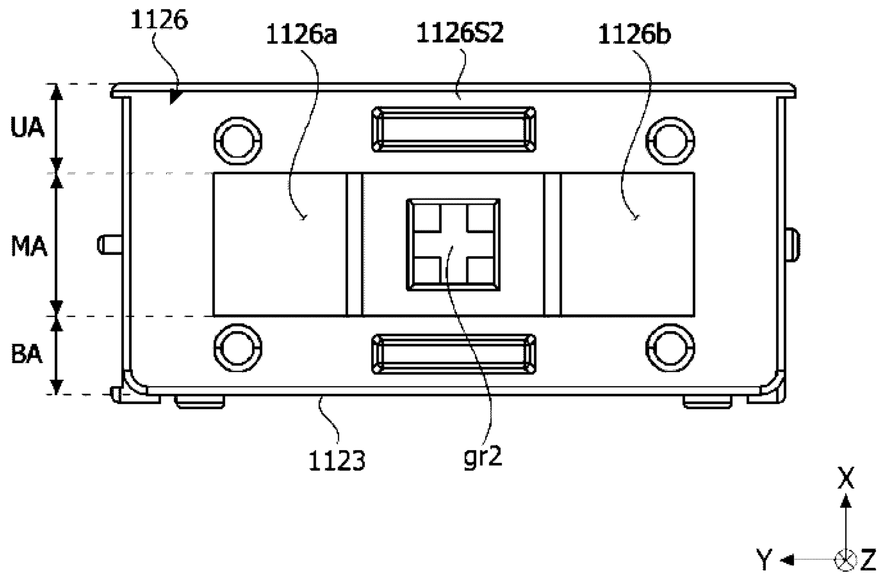

[FIG. 7]
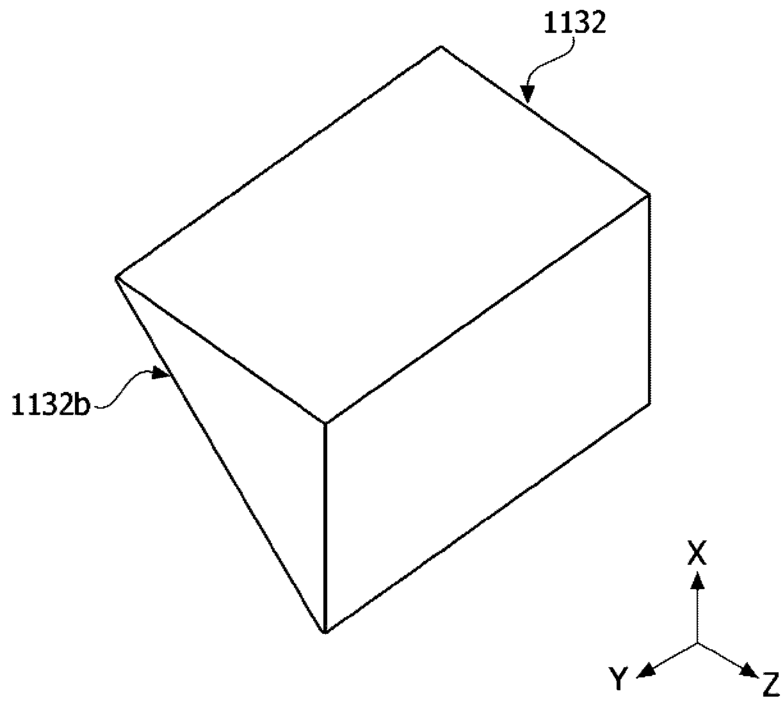

[FIG. 8A]
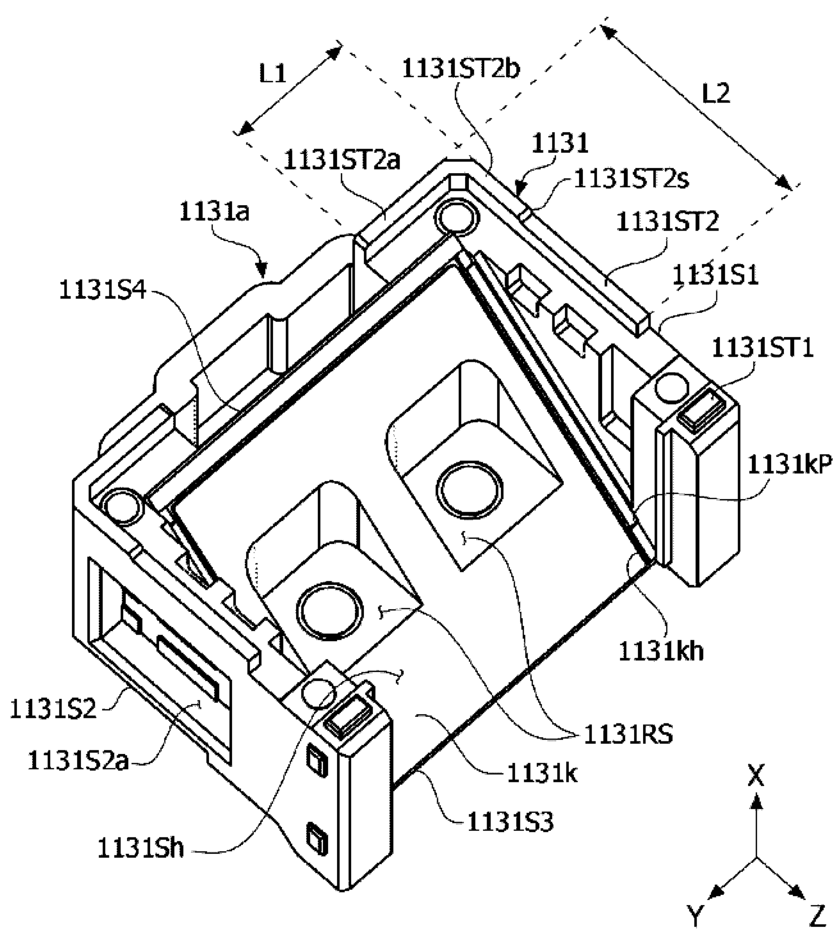
[FIG. 8B]
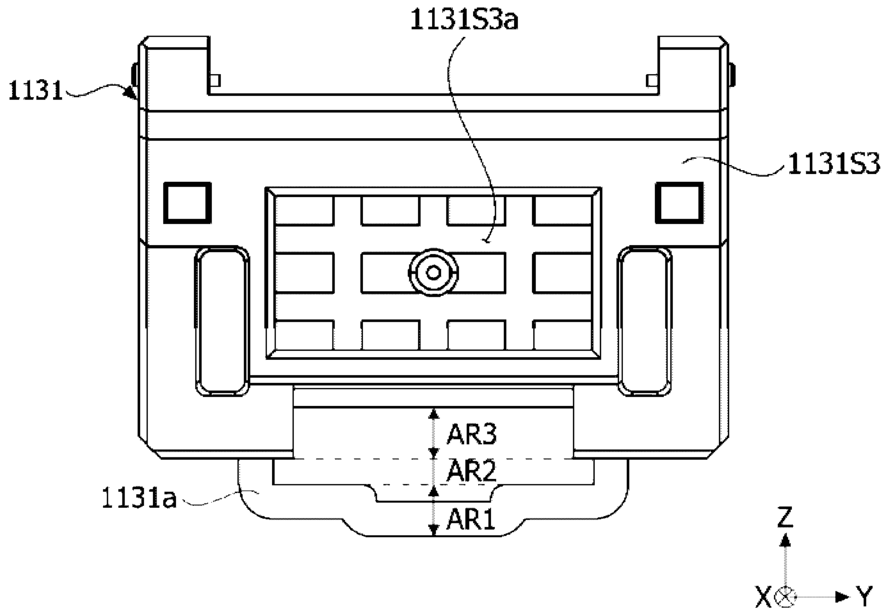

[FIG. 8C]
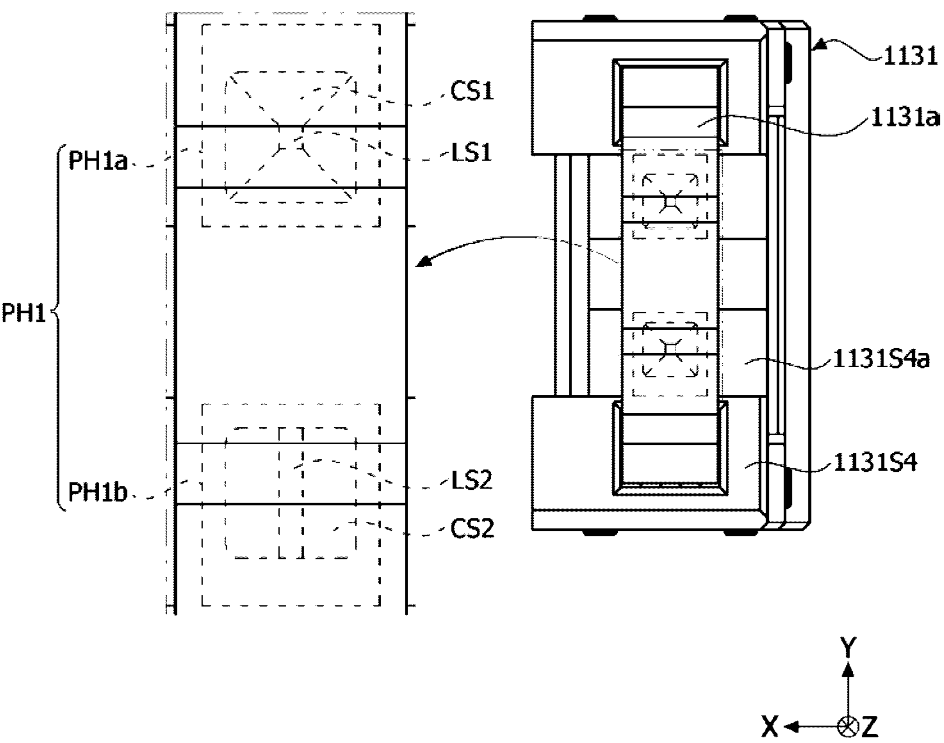
[FIG. 8D]
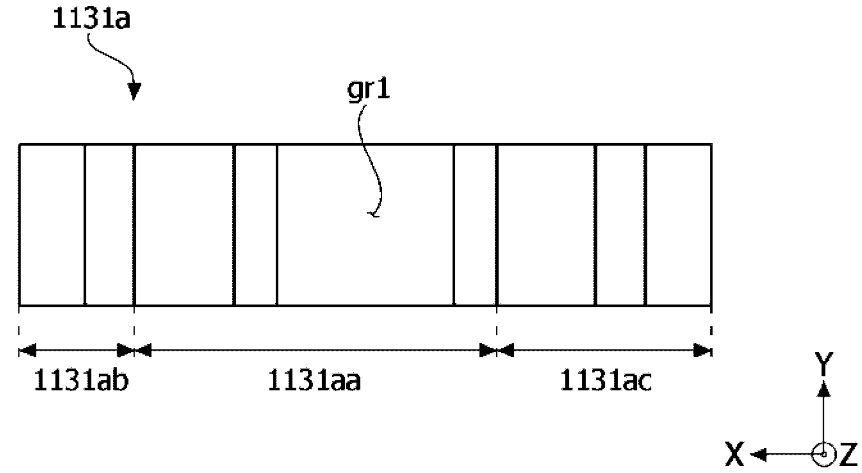

[FIG. 8E]
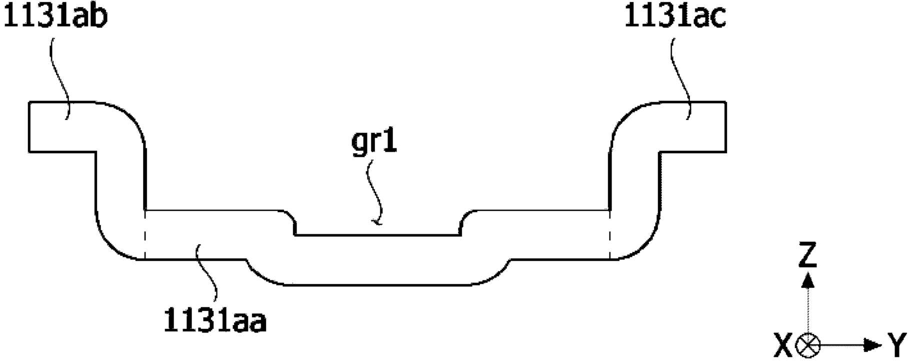
[FIG. 8F]
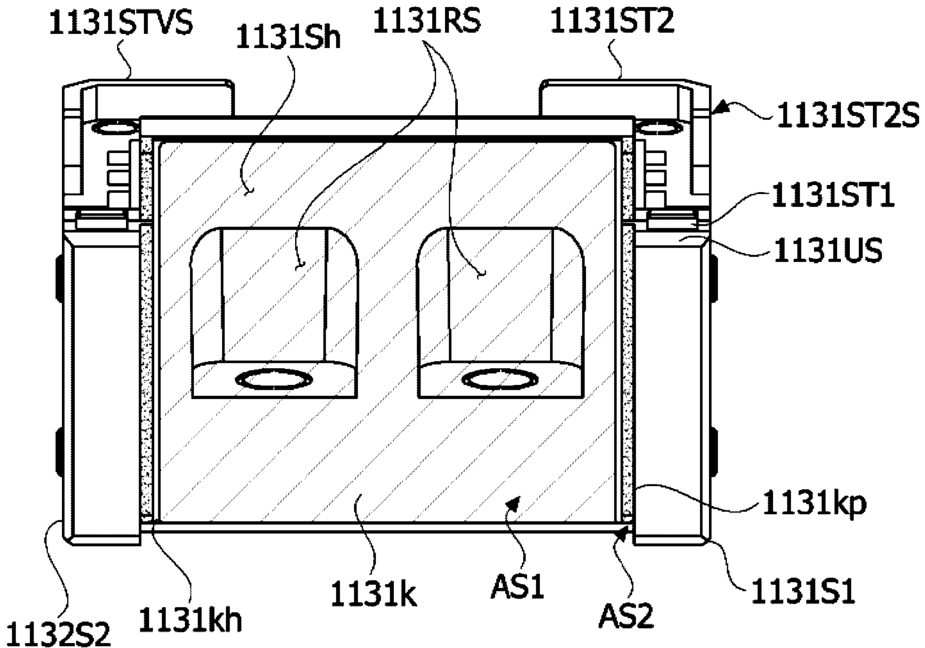
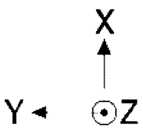

[FIG. 8G]
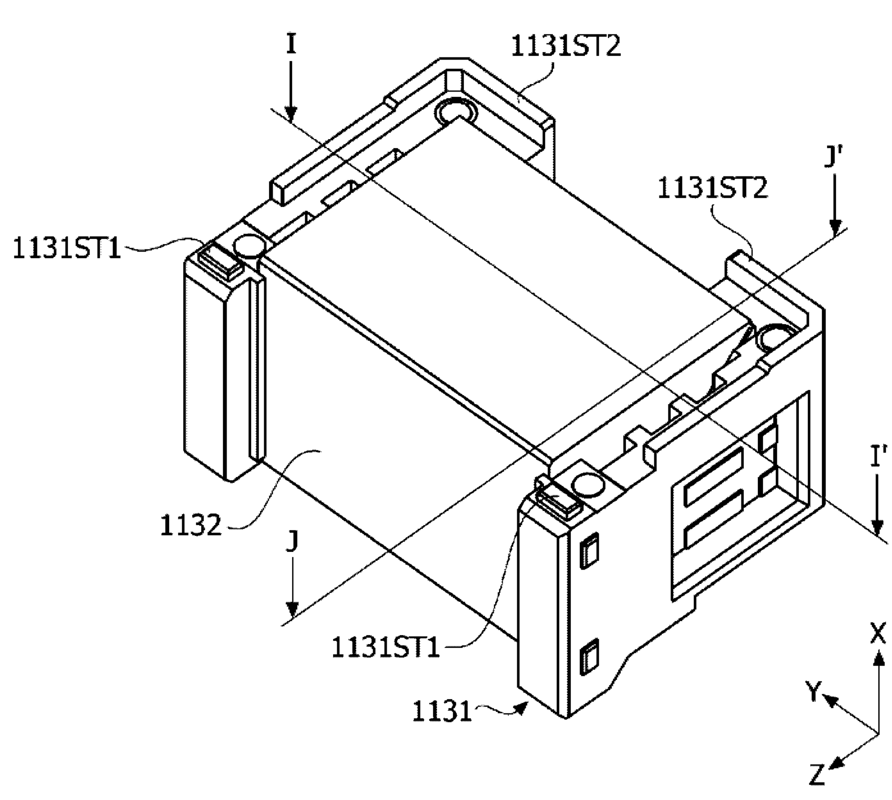

[FIG. 8H]
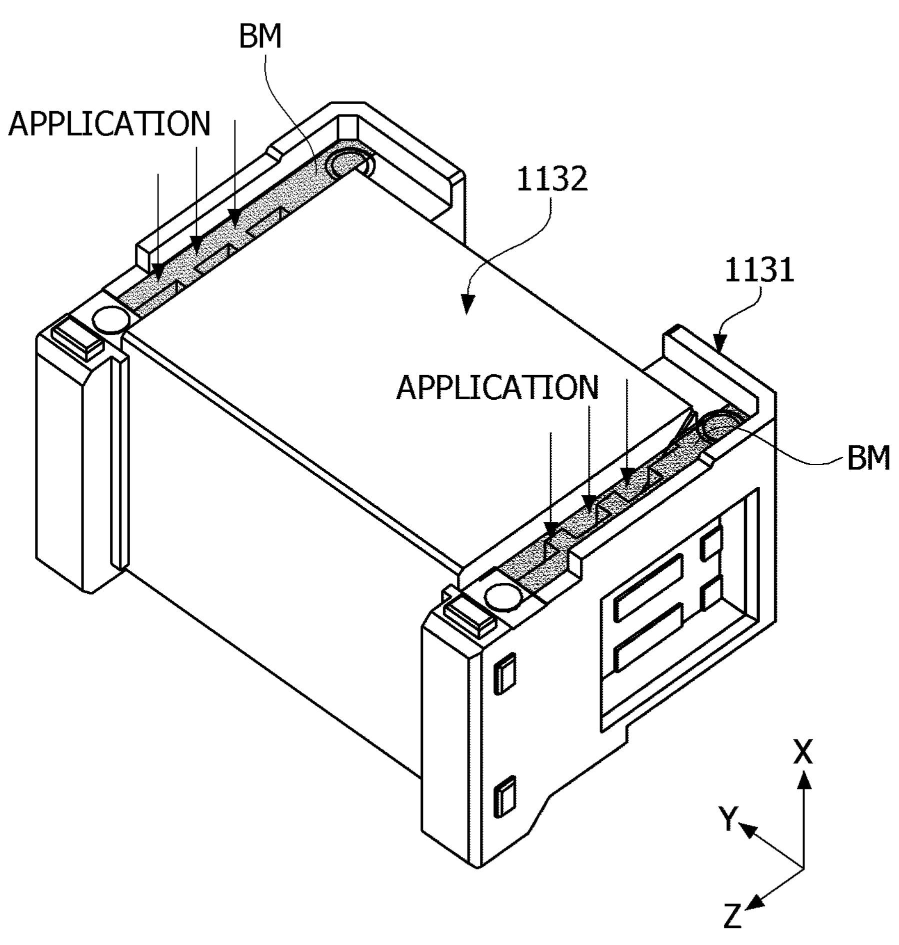

[FIG. 8I]
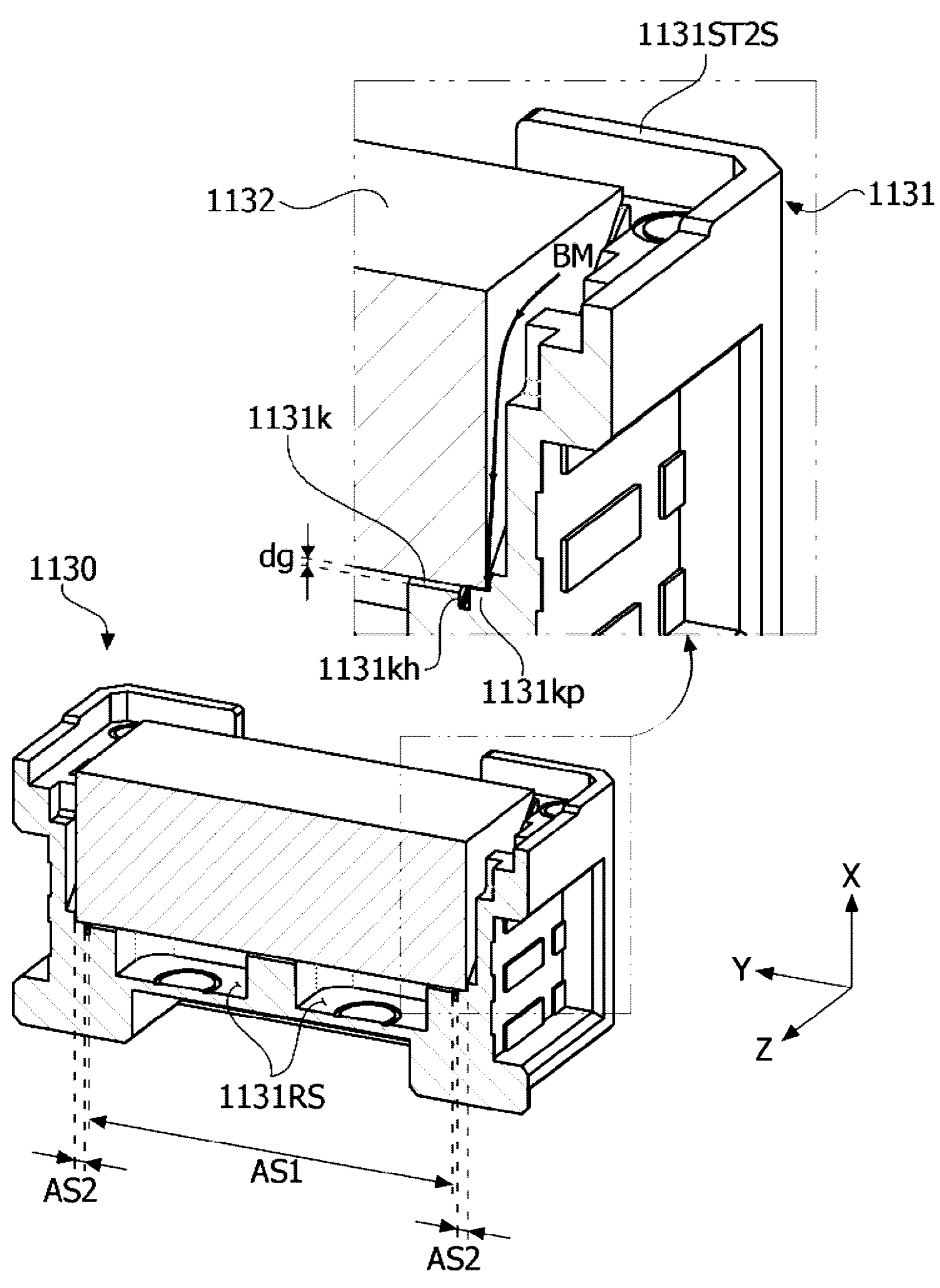

[FIG. 8J]
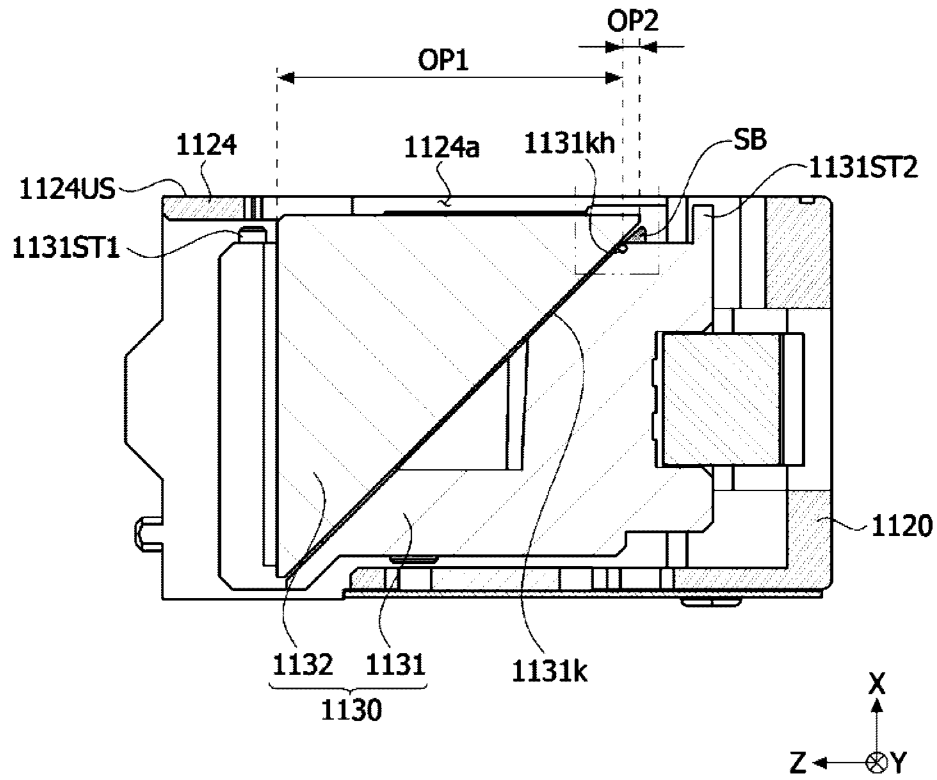
[FIG. 8K]
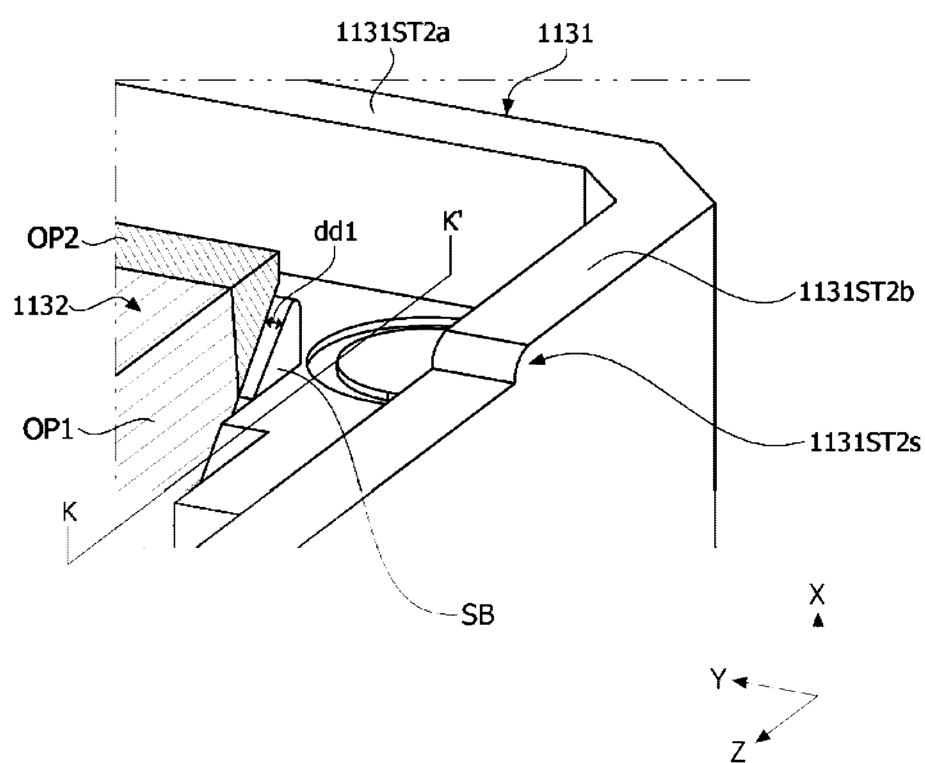

[FIG. 8L]
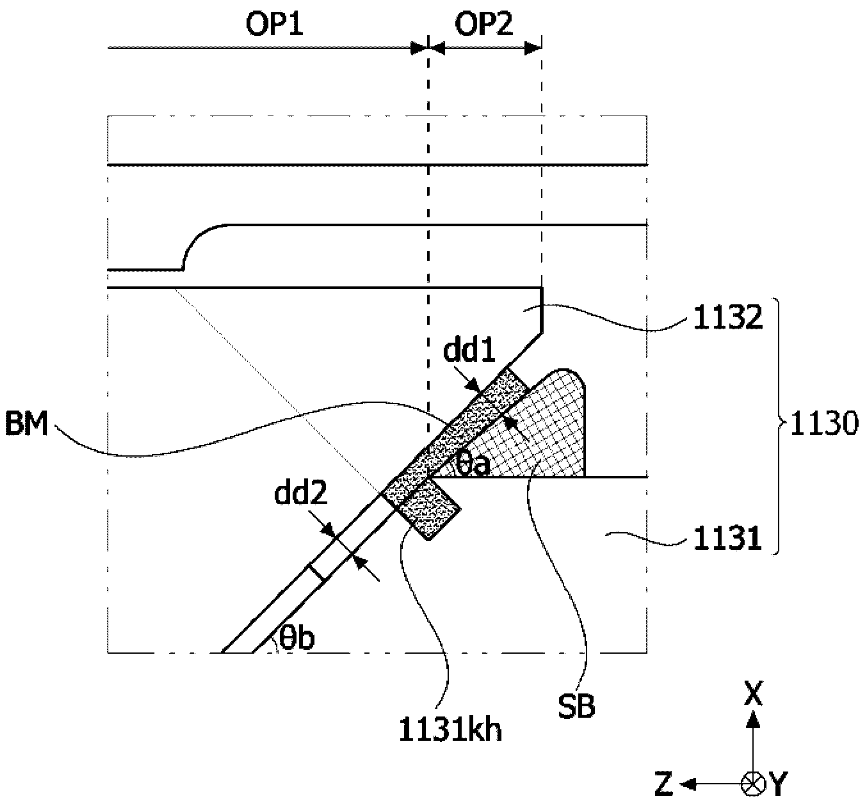
[FIG.9A]
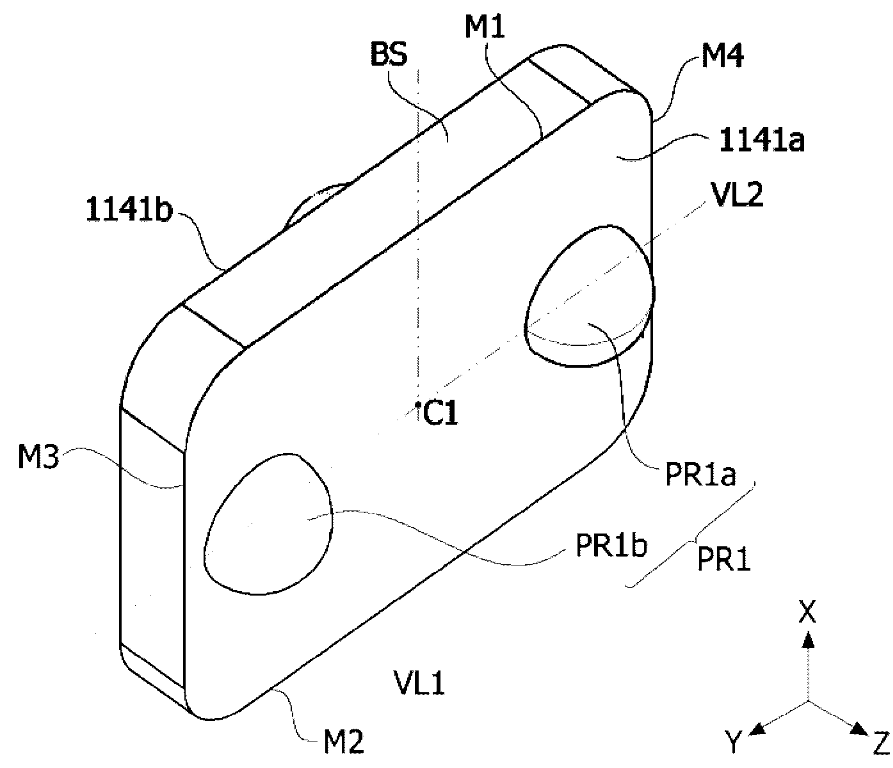

[FIG. 9B]
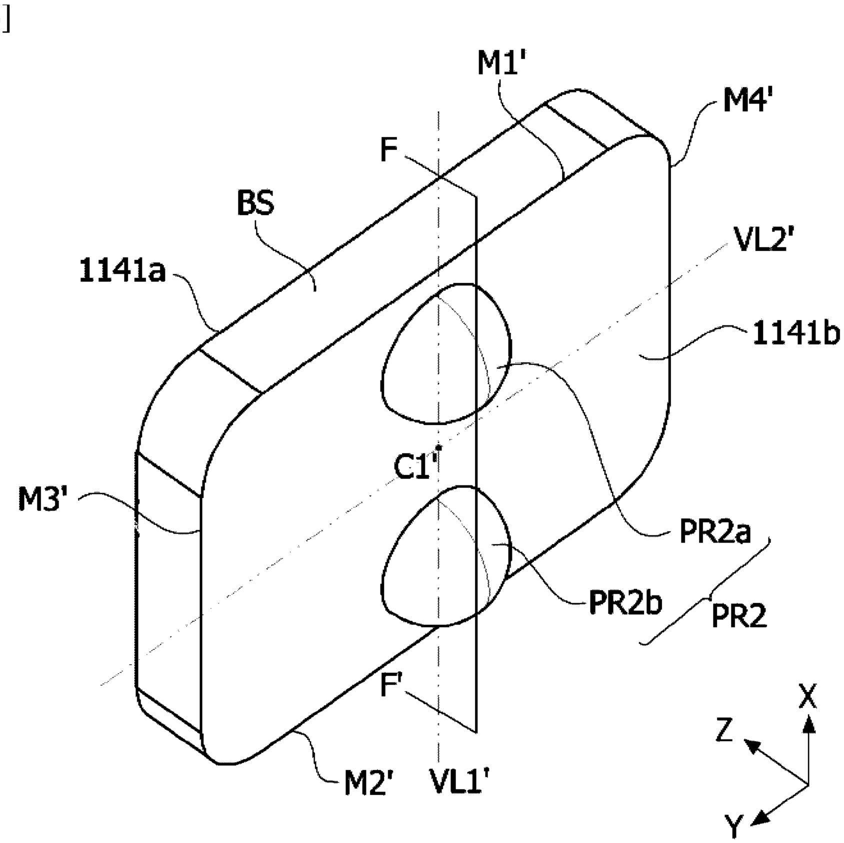

[FIG. 9C]
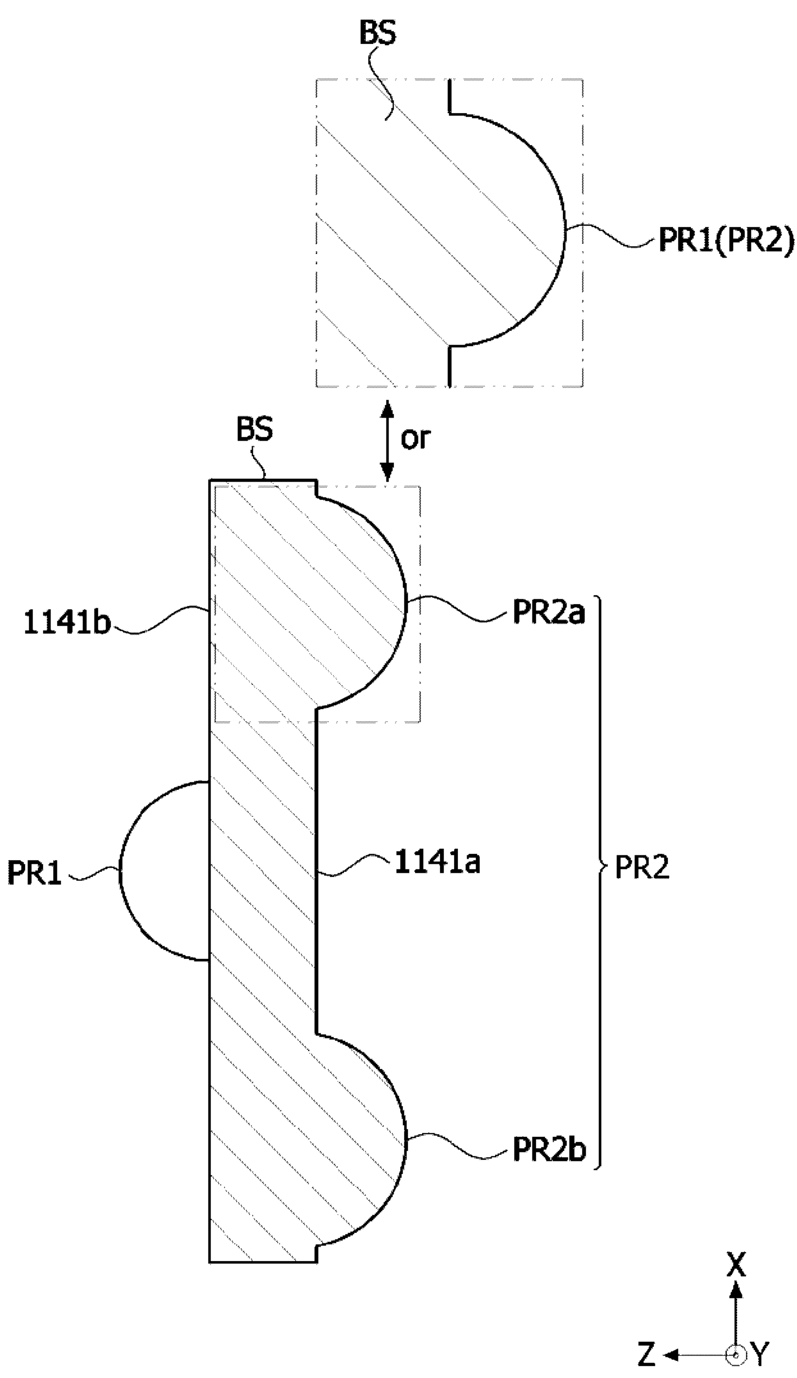

[FIG. 10]
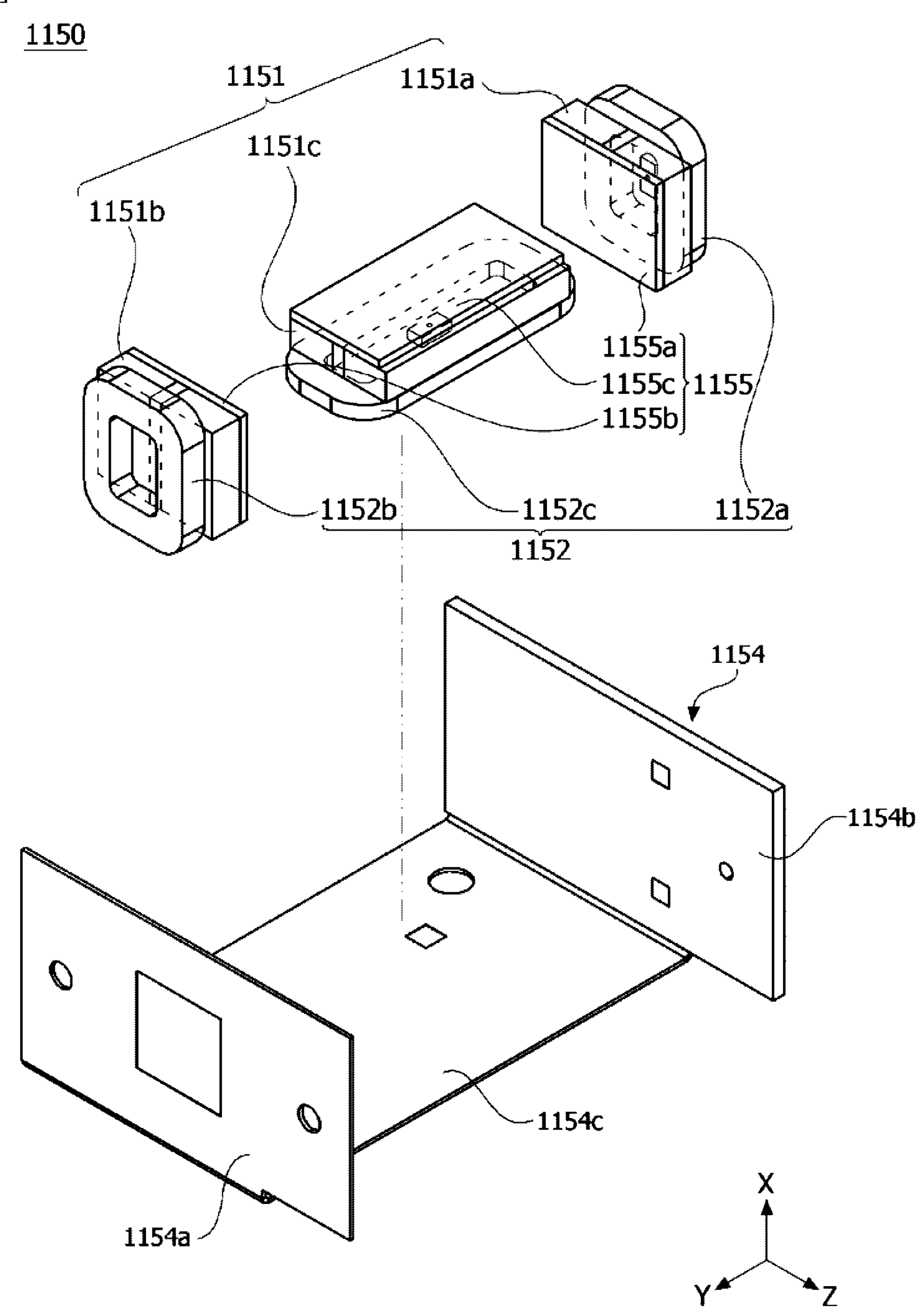

[FIG. 11A]
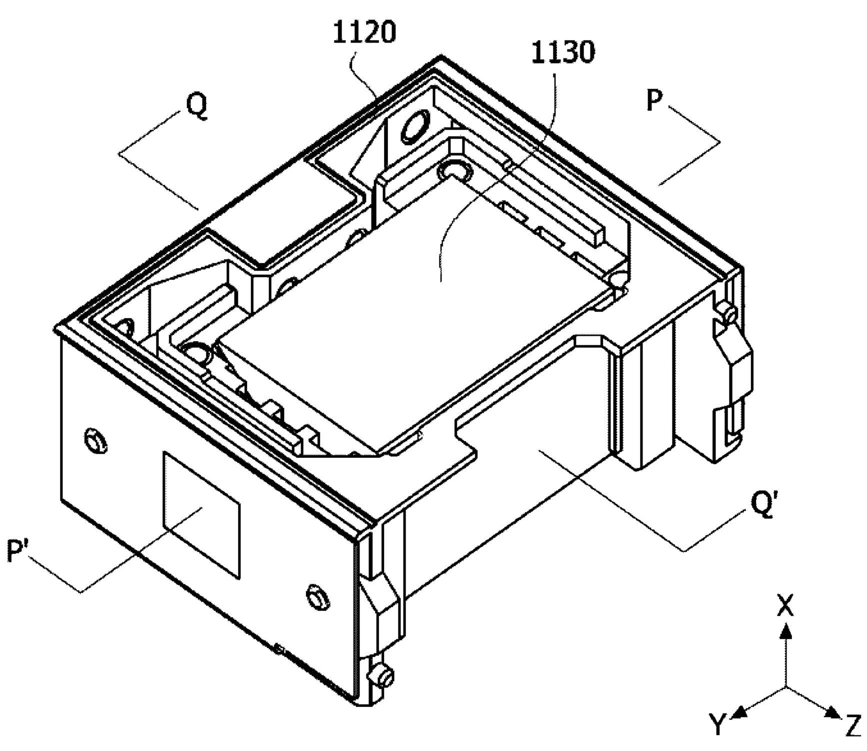

[FIG. 11B]
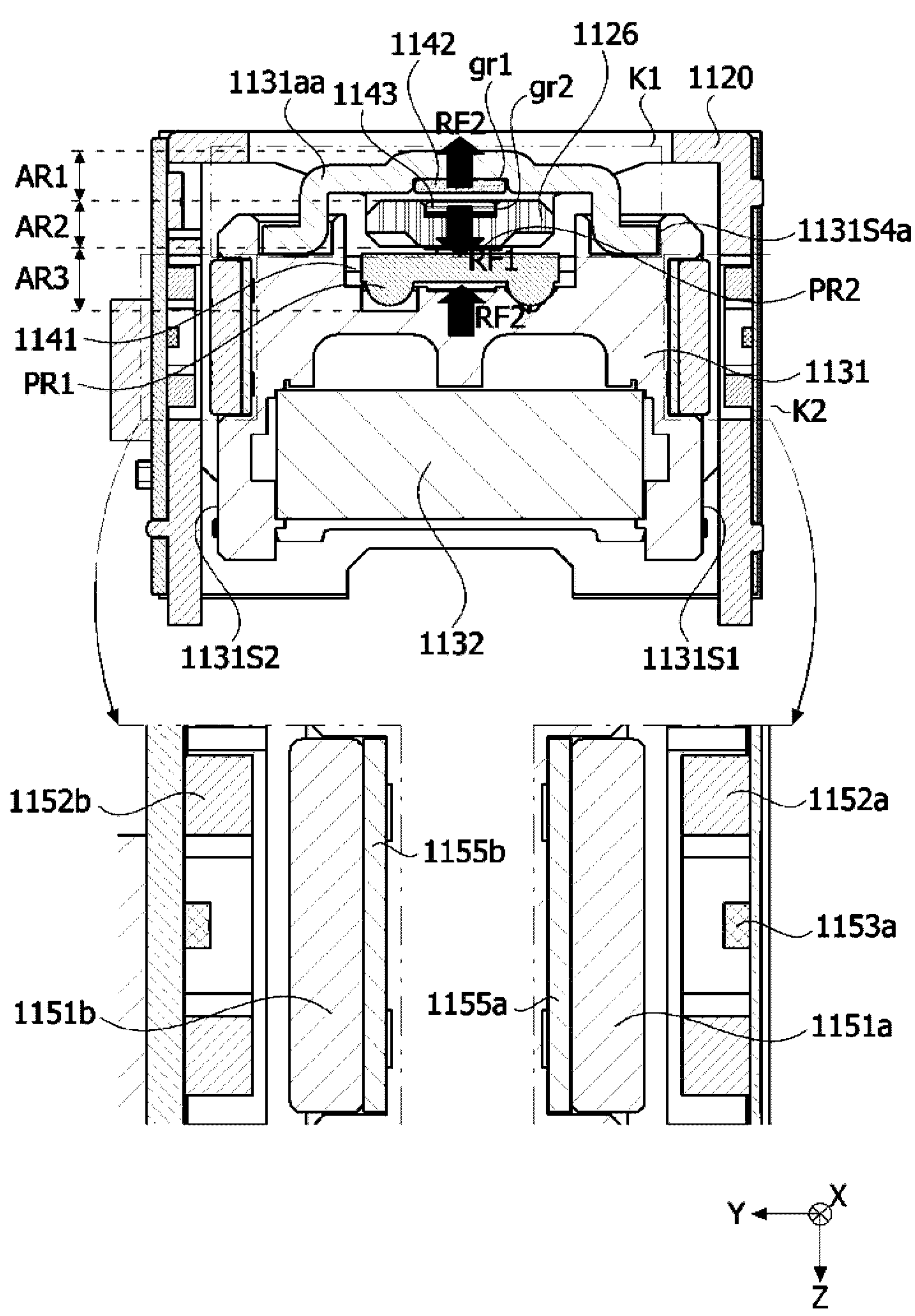

[FIG. 11C]
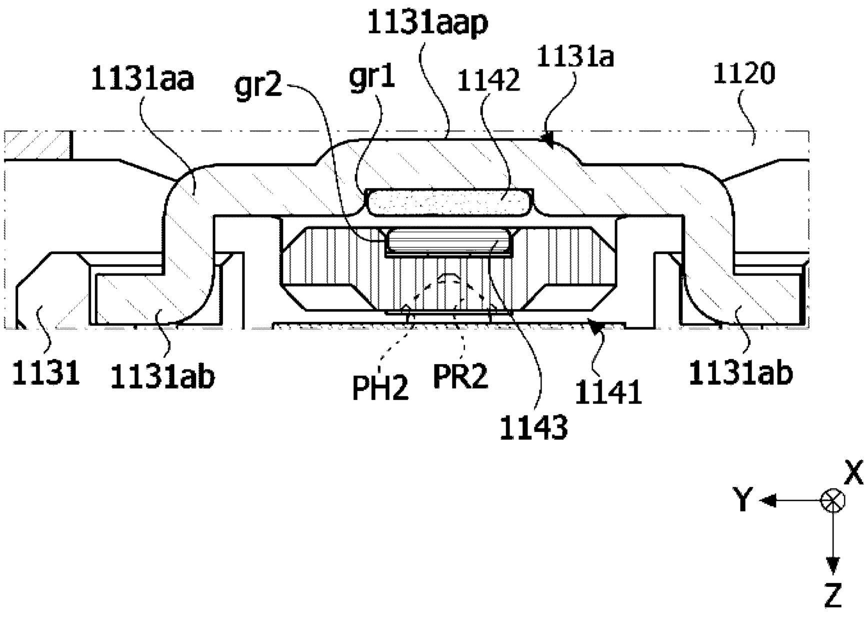
[FIG. 11D]
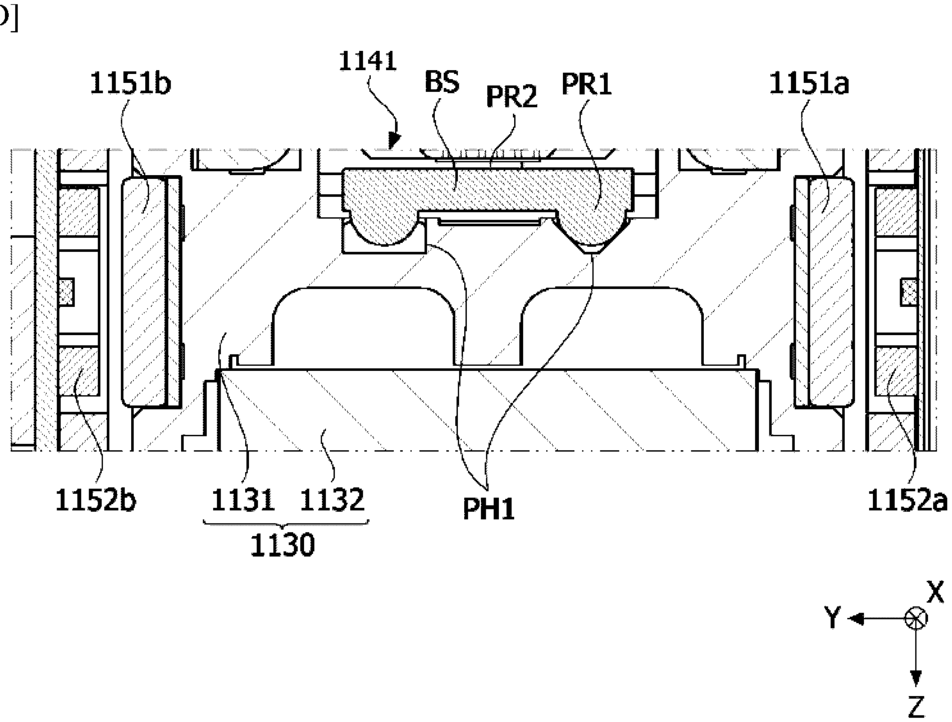

[FIG. 11E]
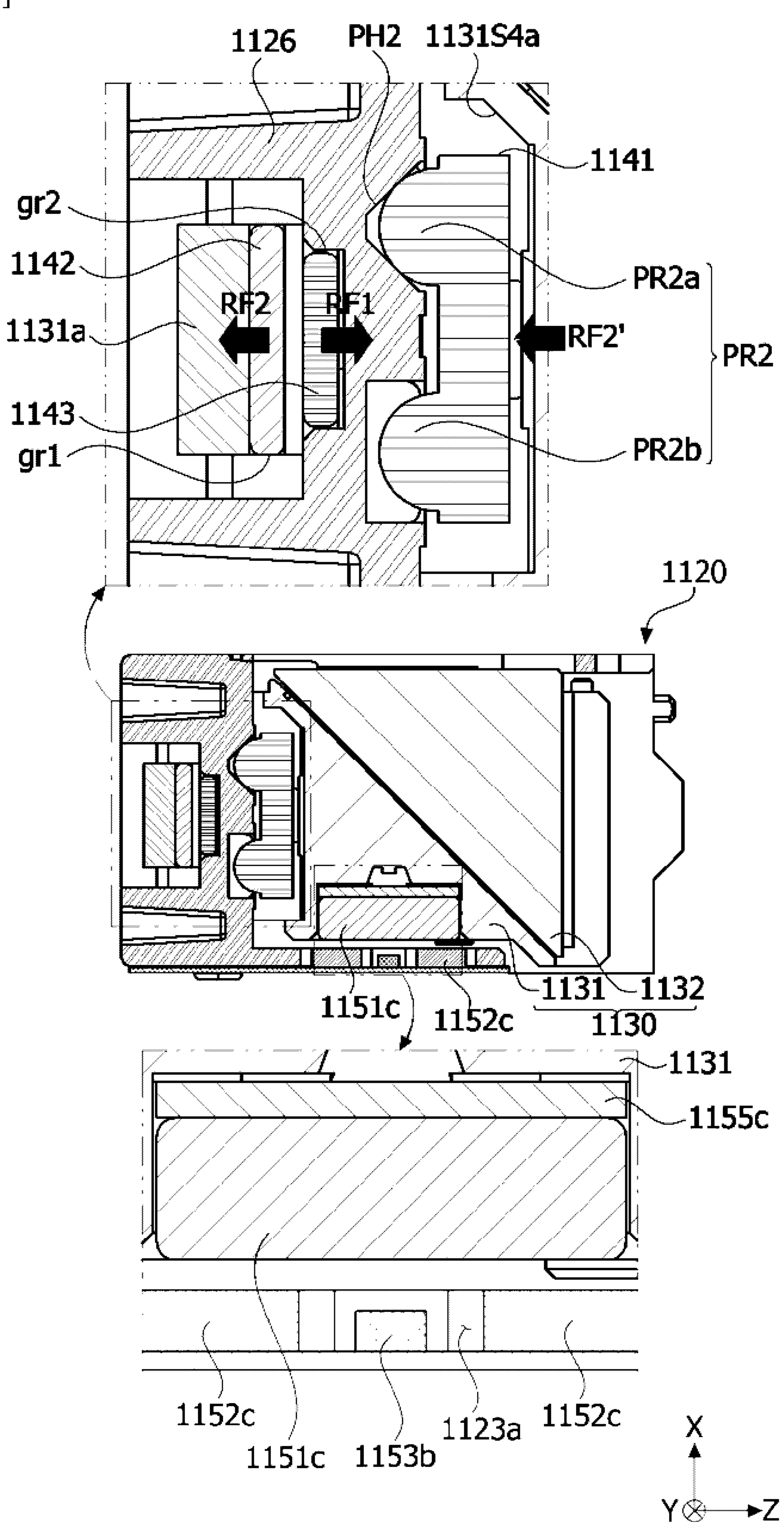

[FIG. 11F]
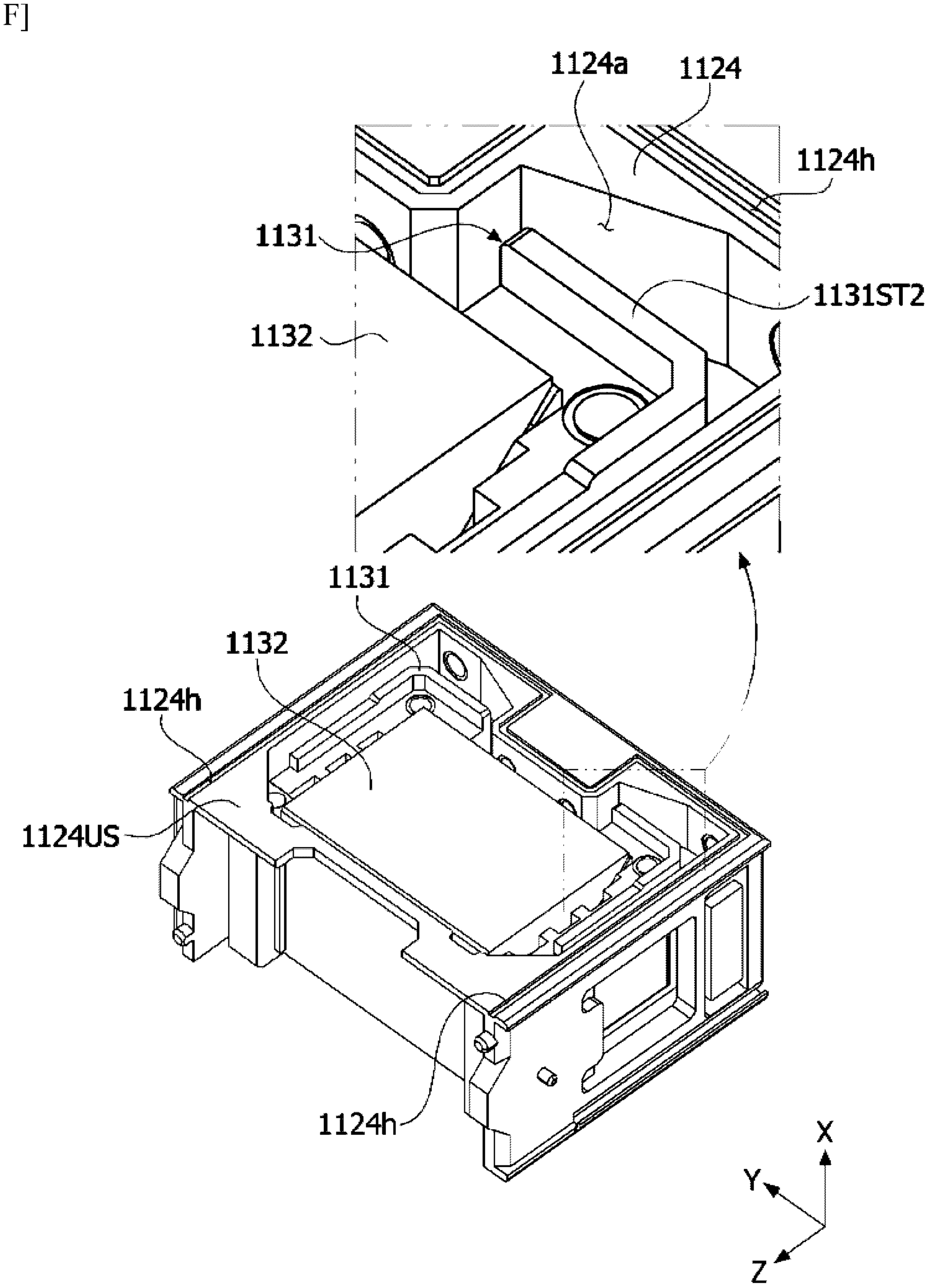

[FIG. 11G]
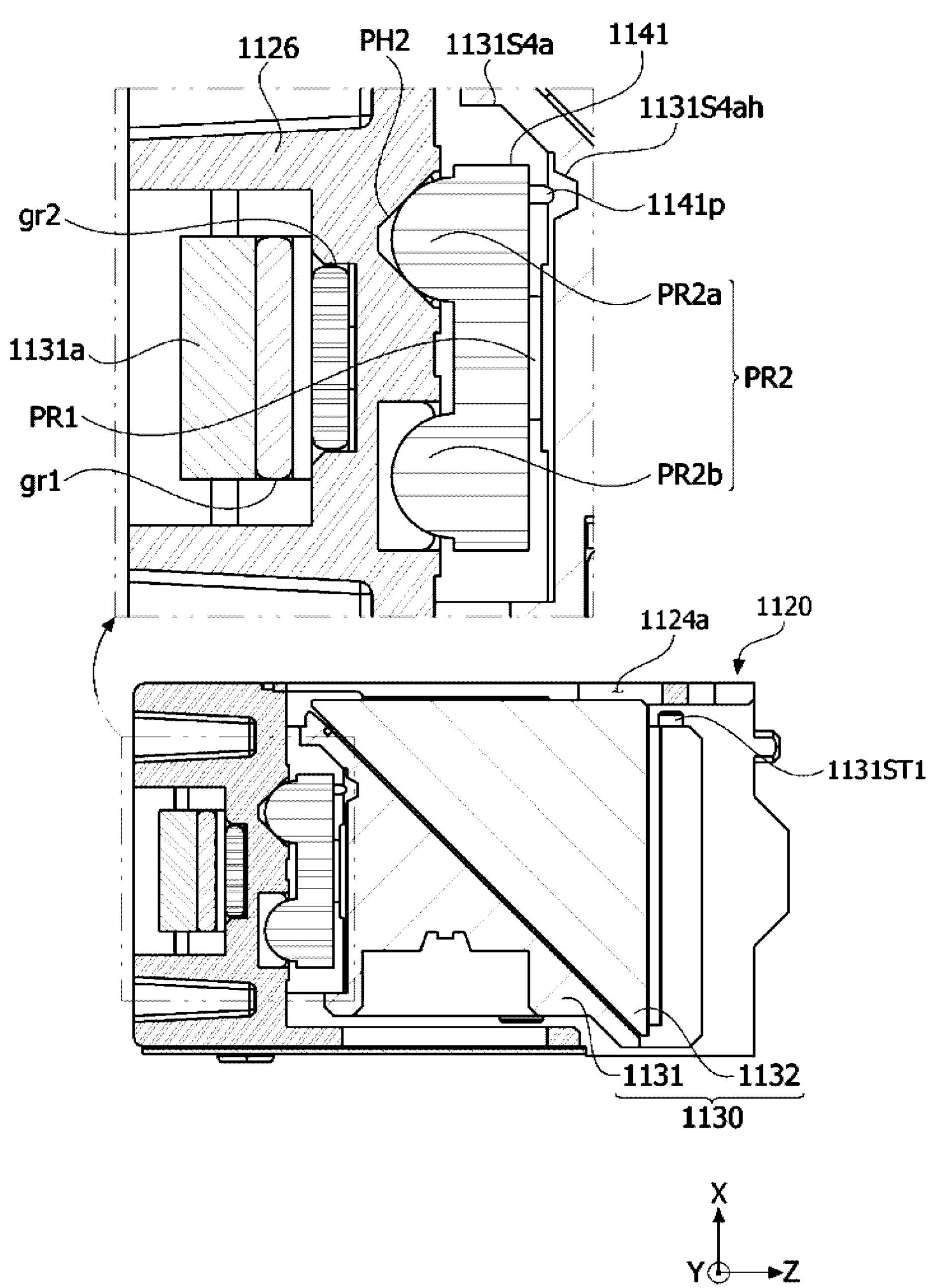

[FIG.11H]
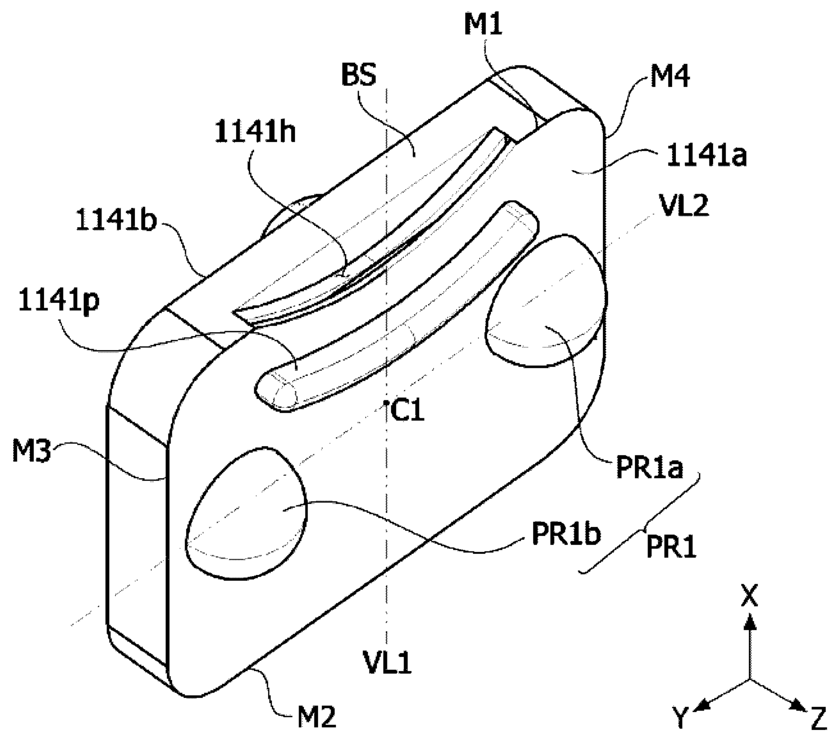
[FIG.12A]
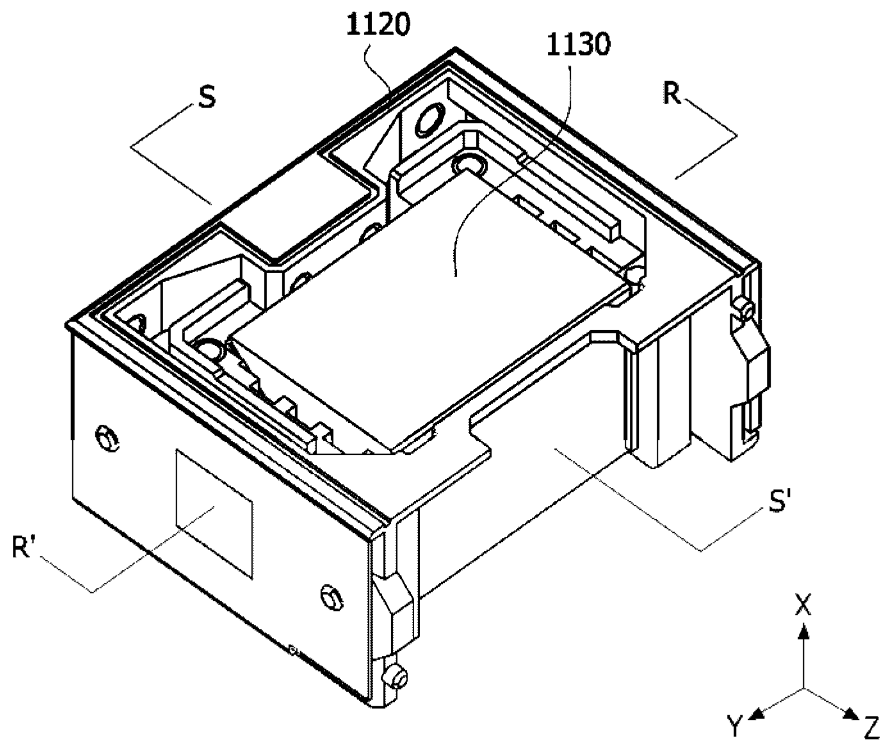

[FIG.12B]
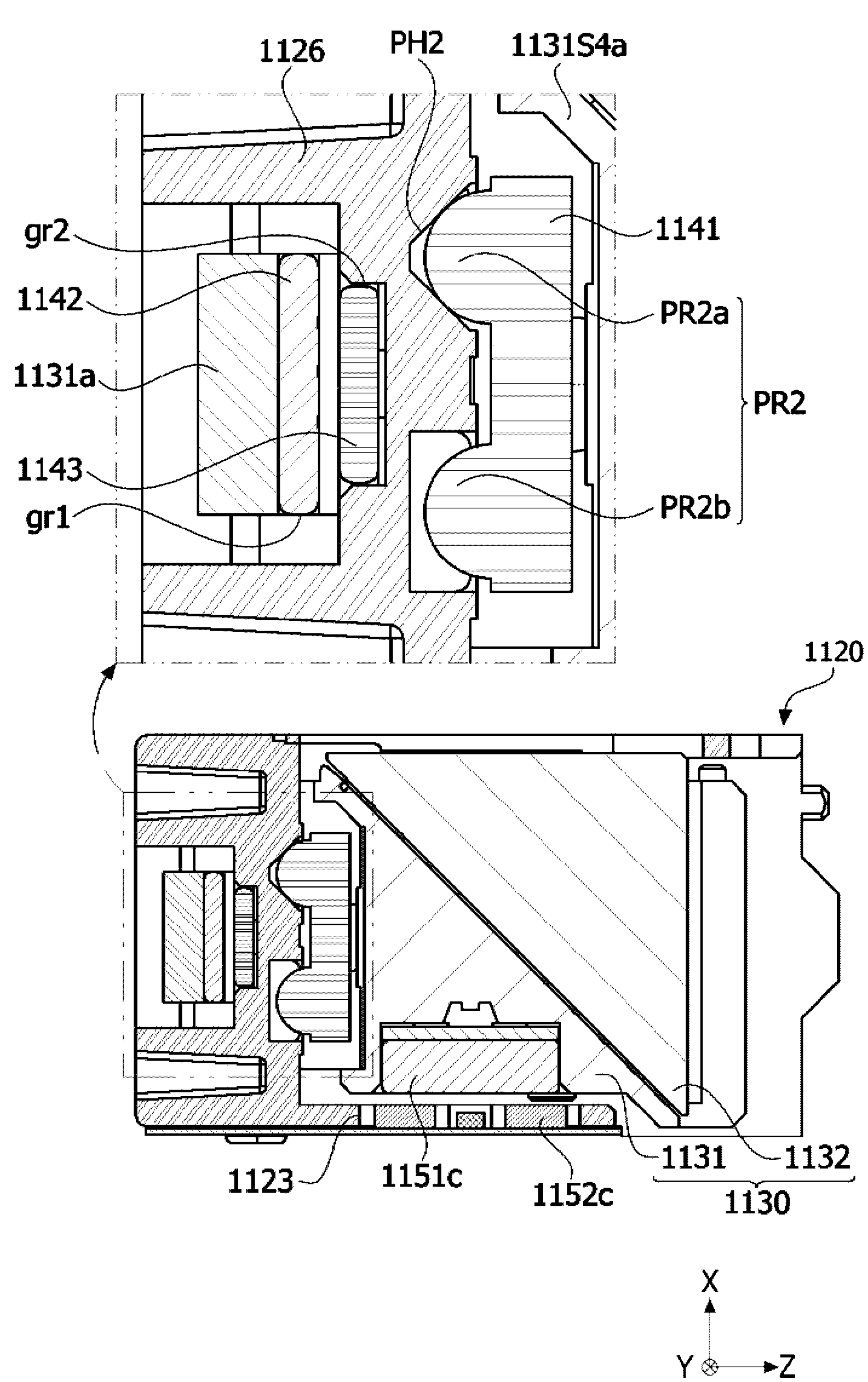

[FIG. 12C]
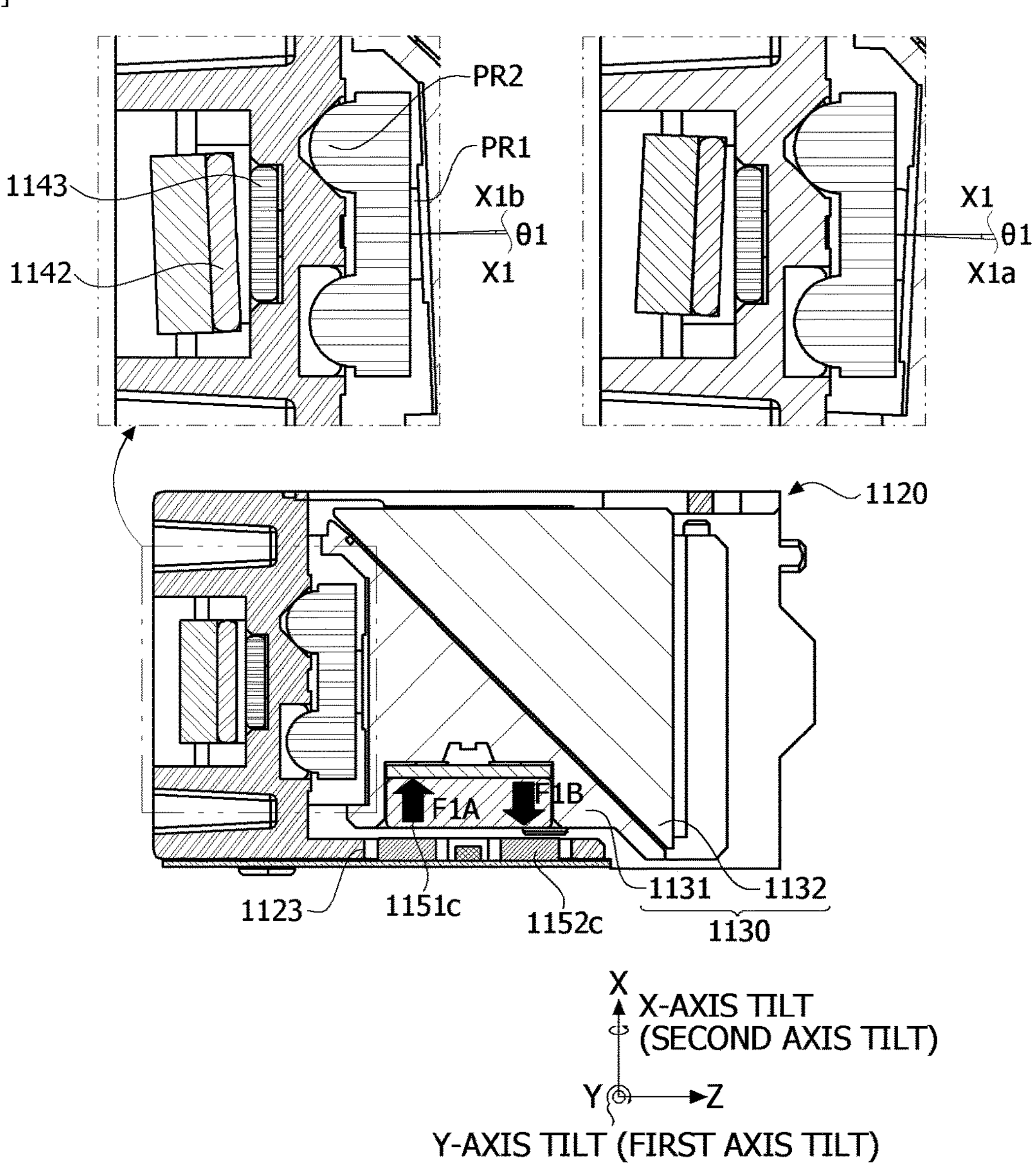

[FIG. 13A]
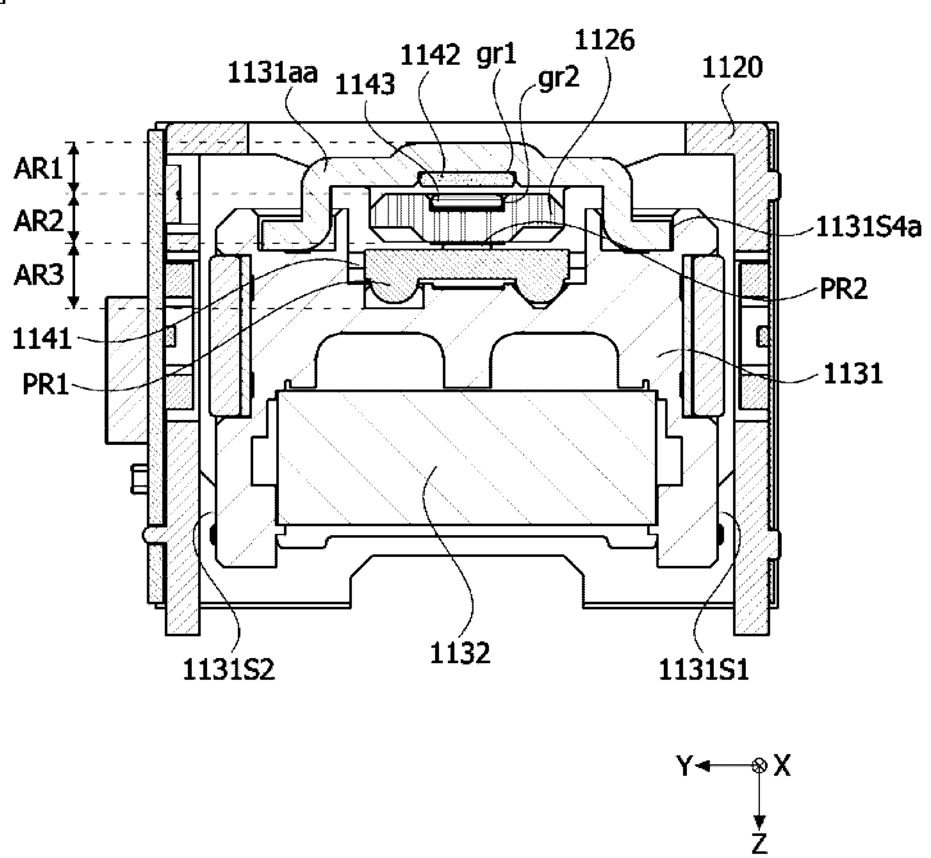

[FIG. 13B]
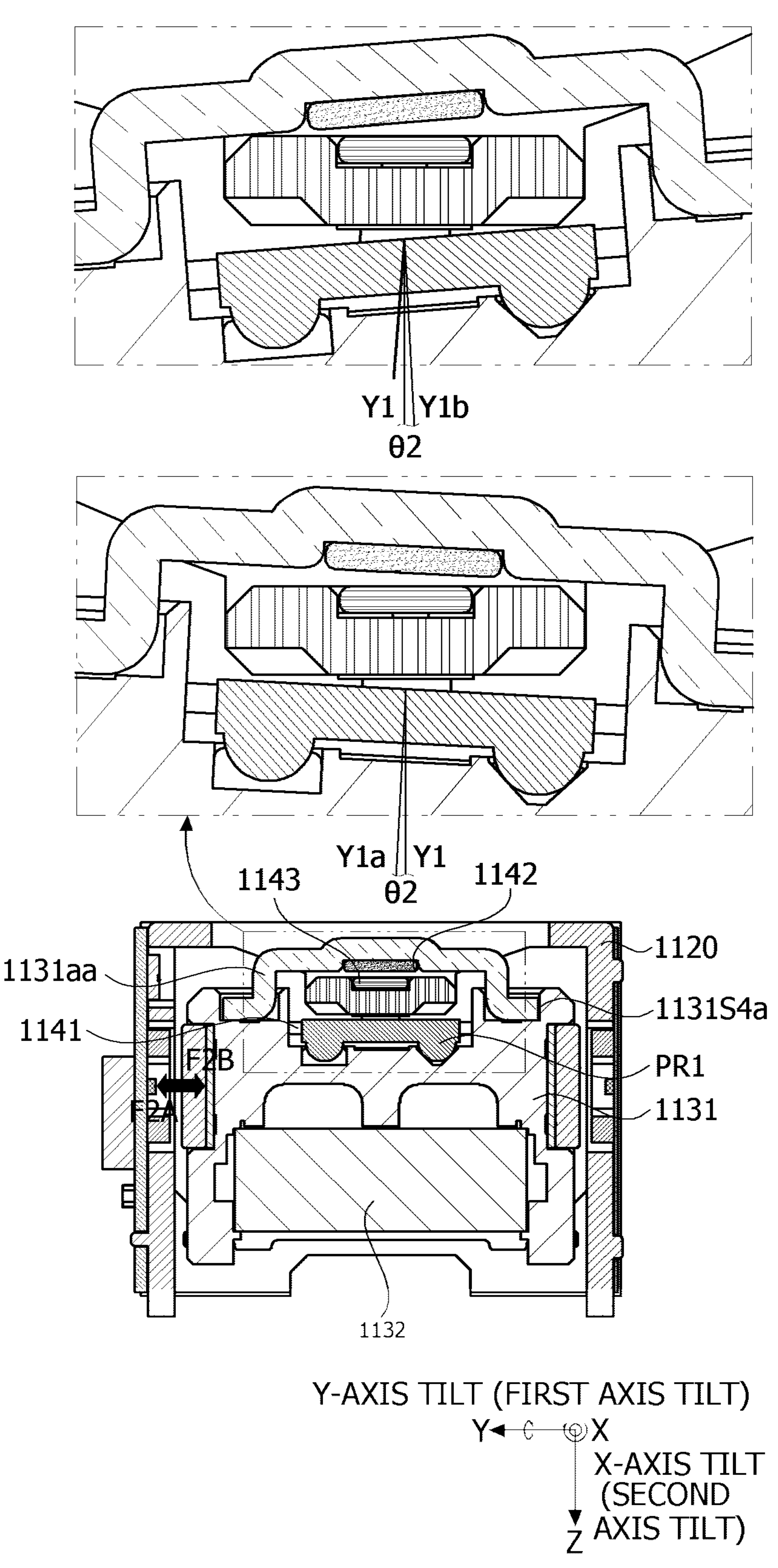

[FIG. 14]
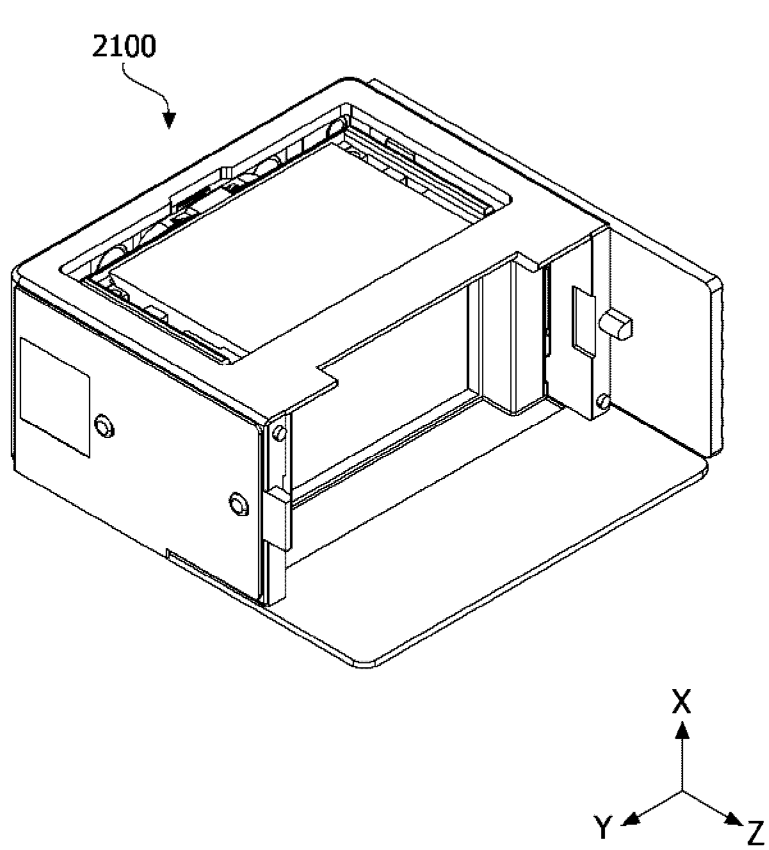

[FIG. 15]
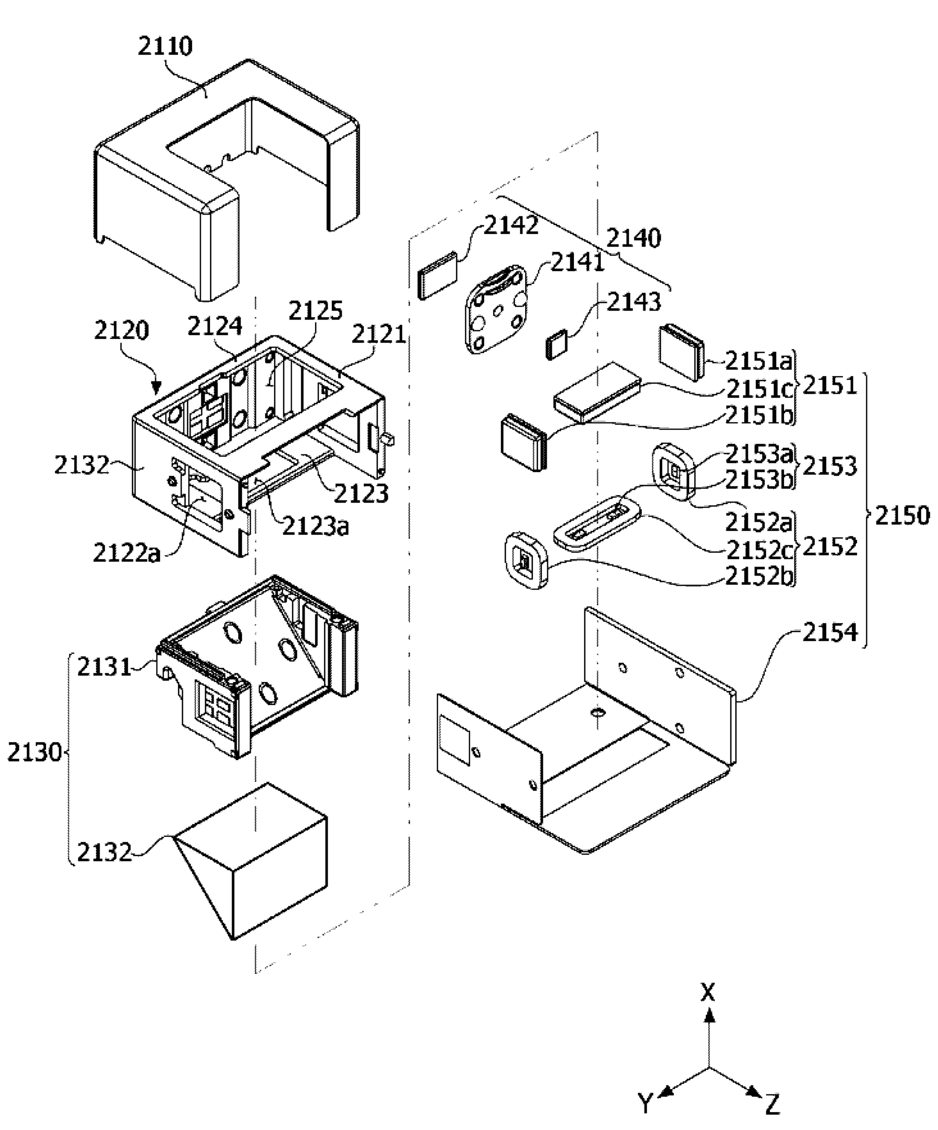

[FIG. 16]
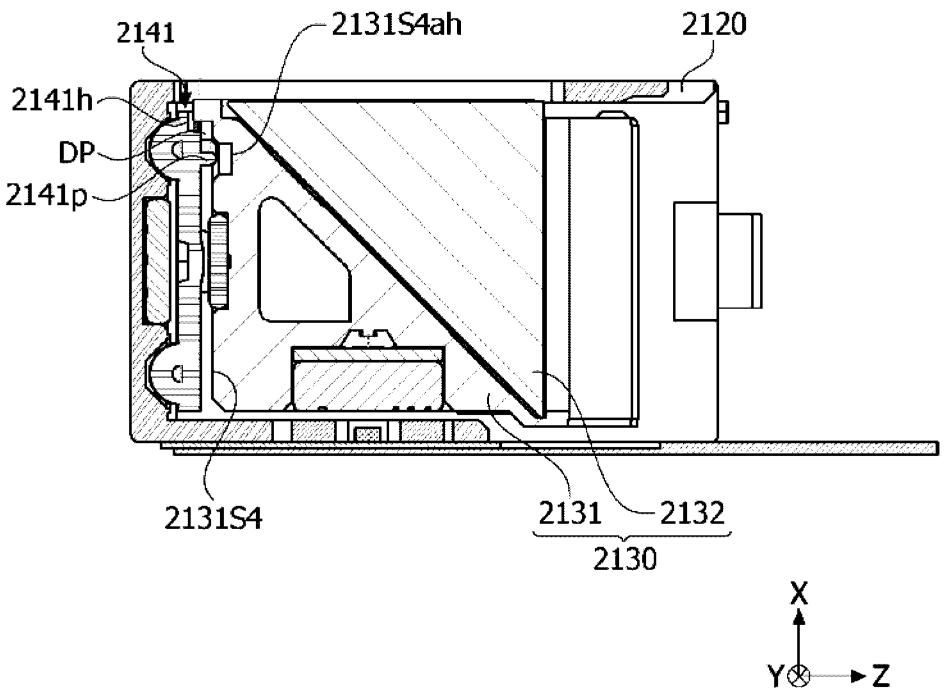
[FIG. 17]
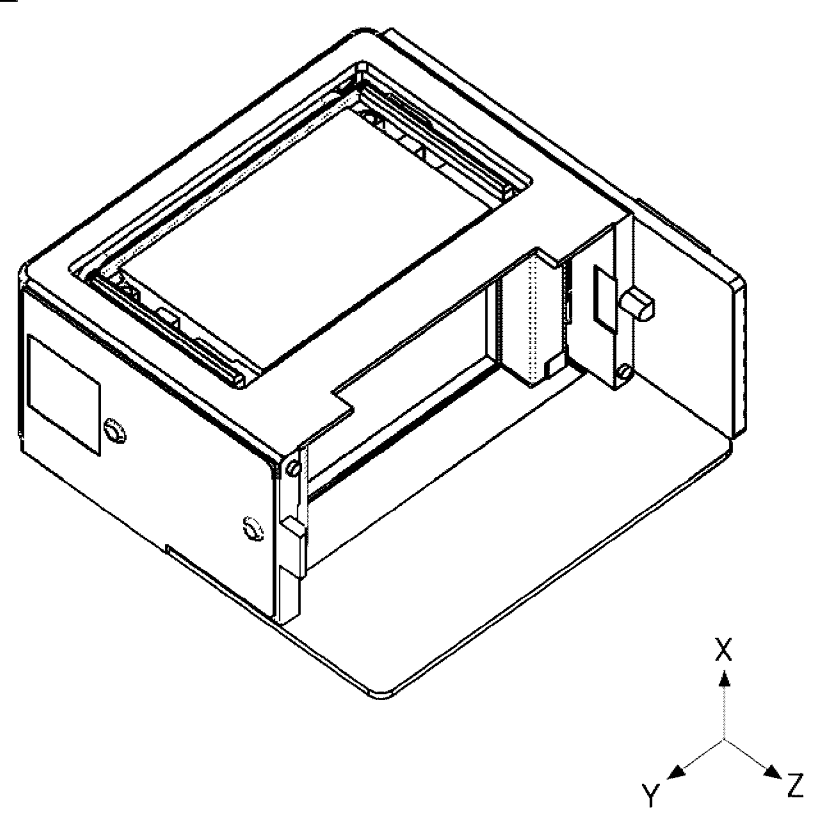

[FIG. 18]
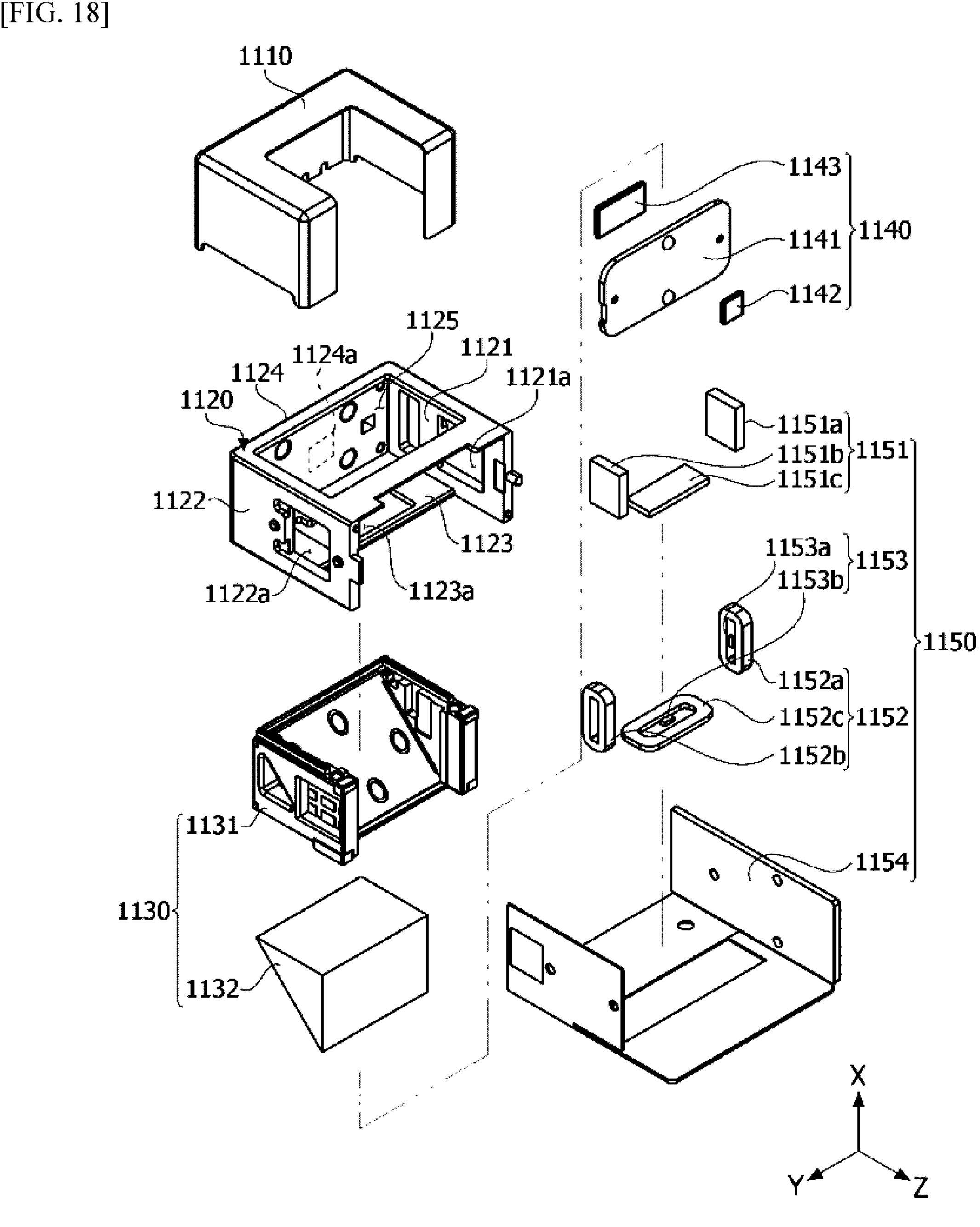

[FIG. 19]
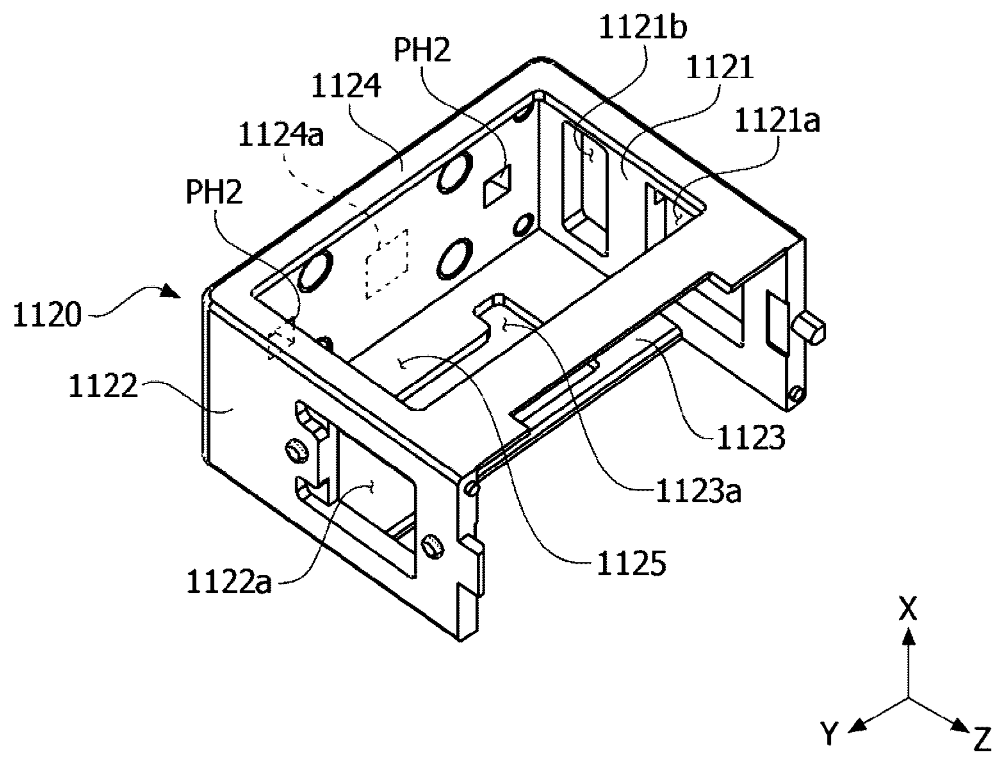
[FIG. 20]
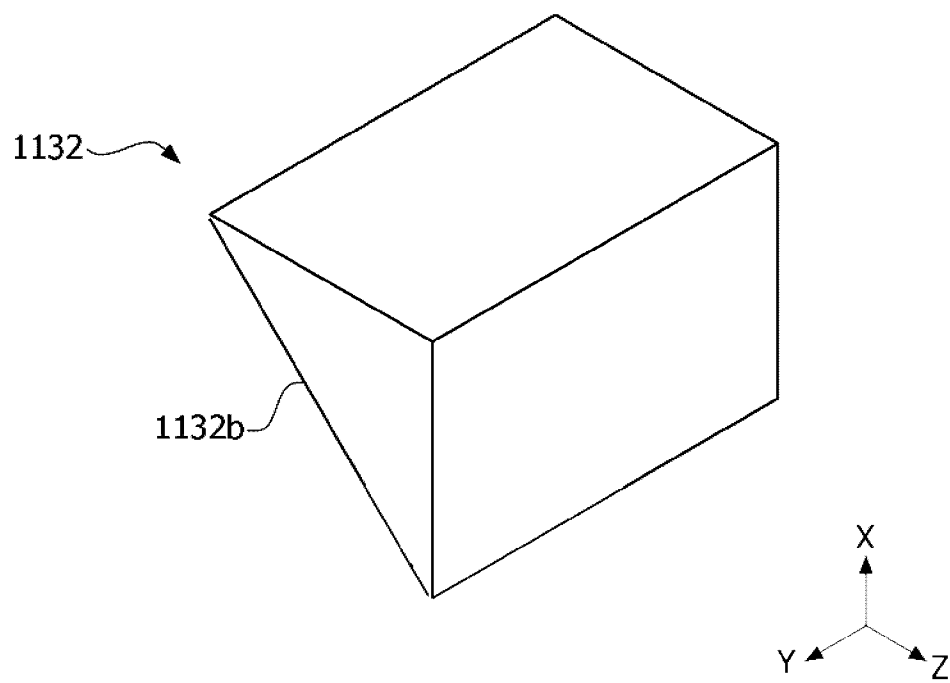

[FIG. 21]
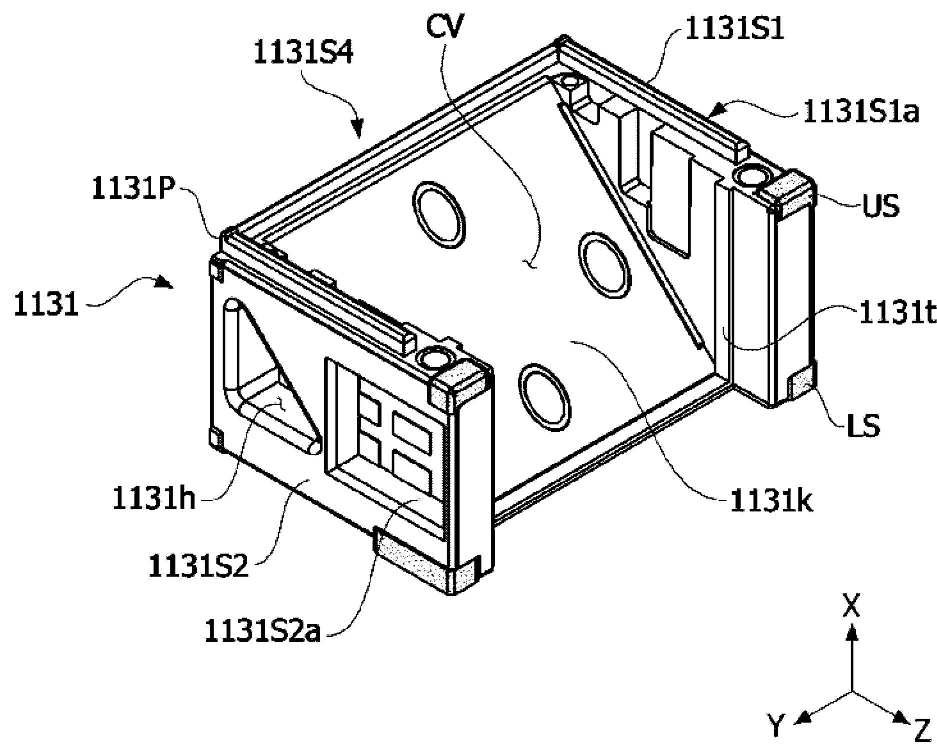
[FIG. 22]
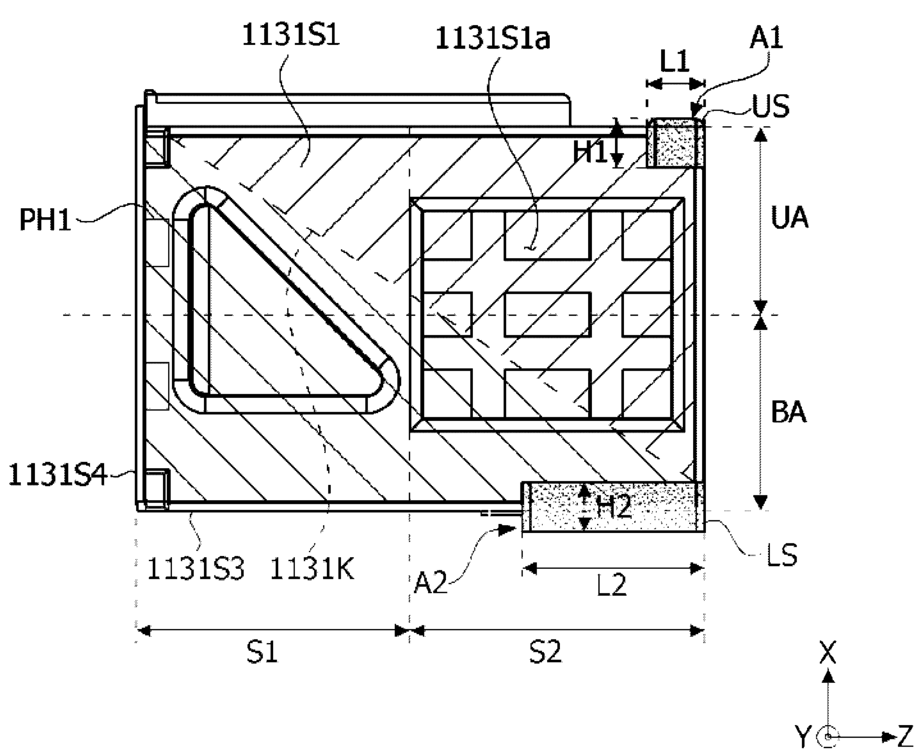

[FIG. 23]
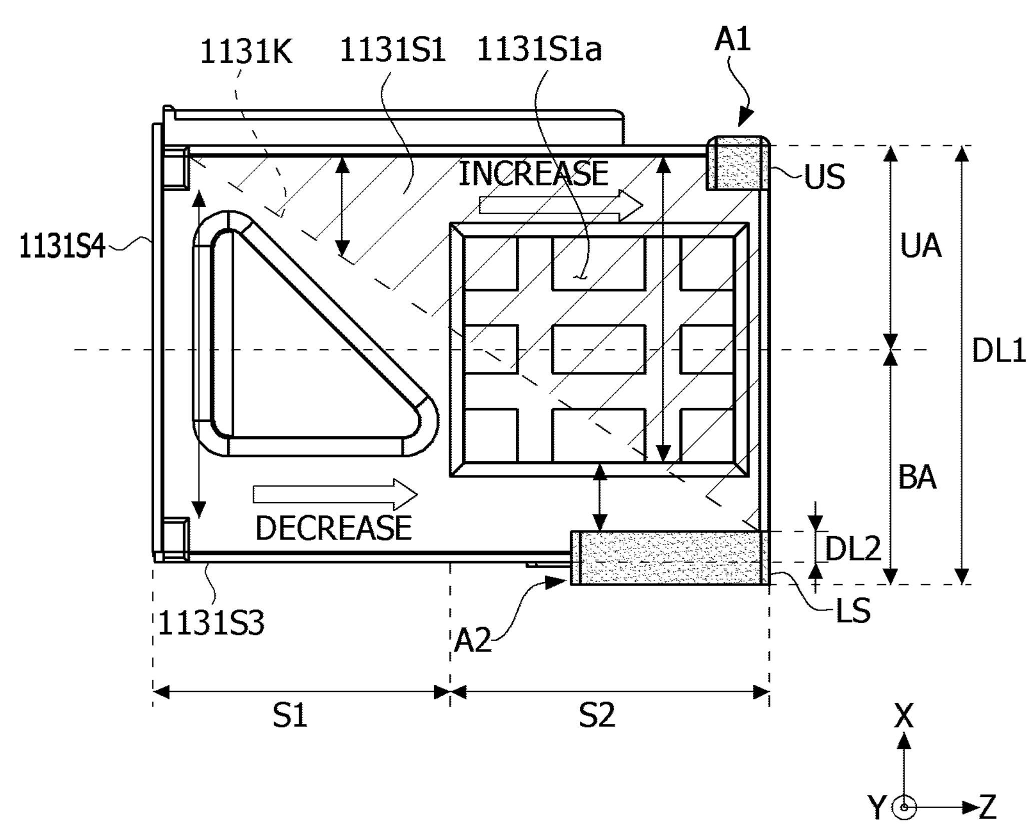

[FIG. 24]
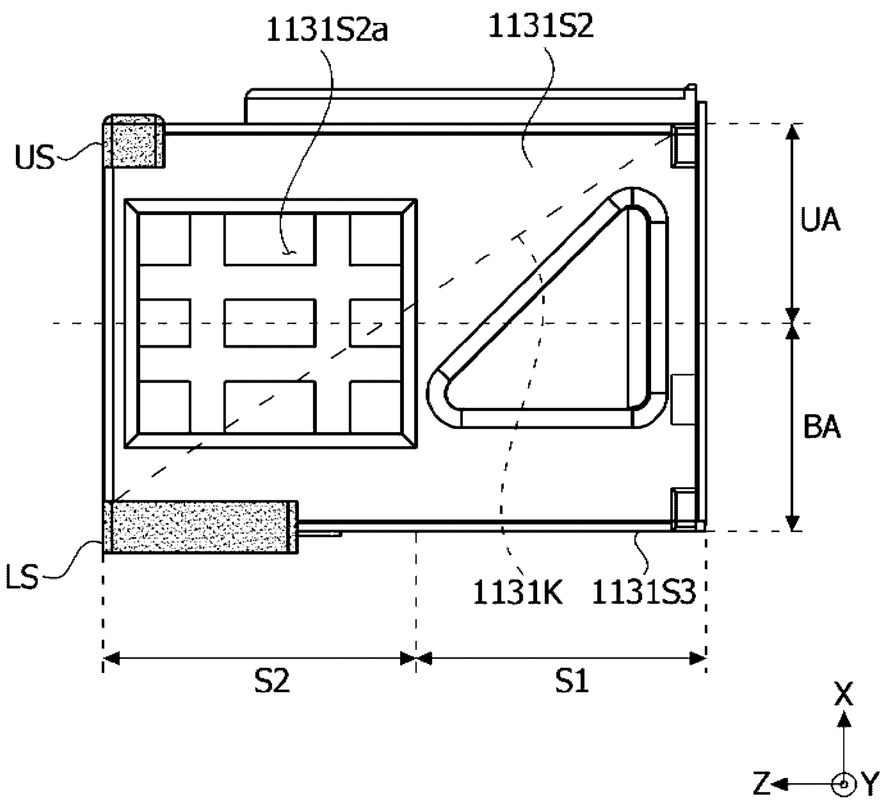
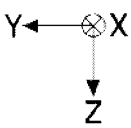
[FIG. 25]
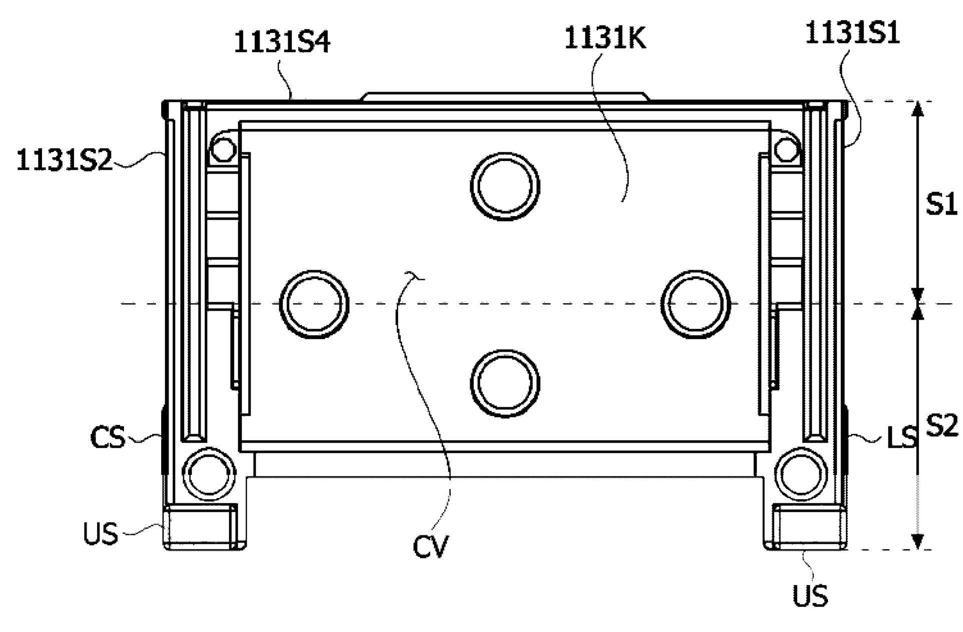

[FIG. 26]
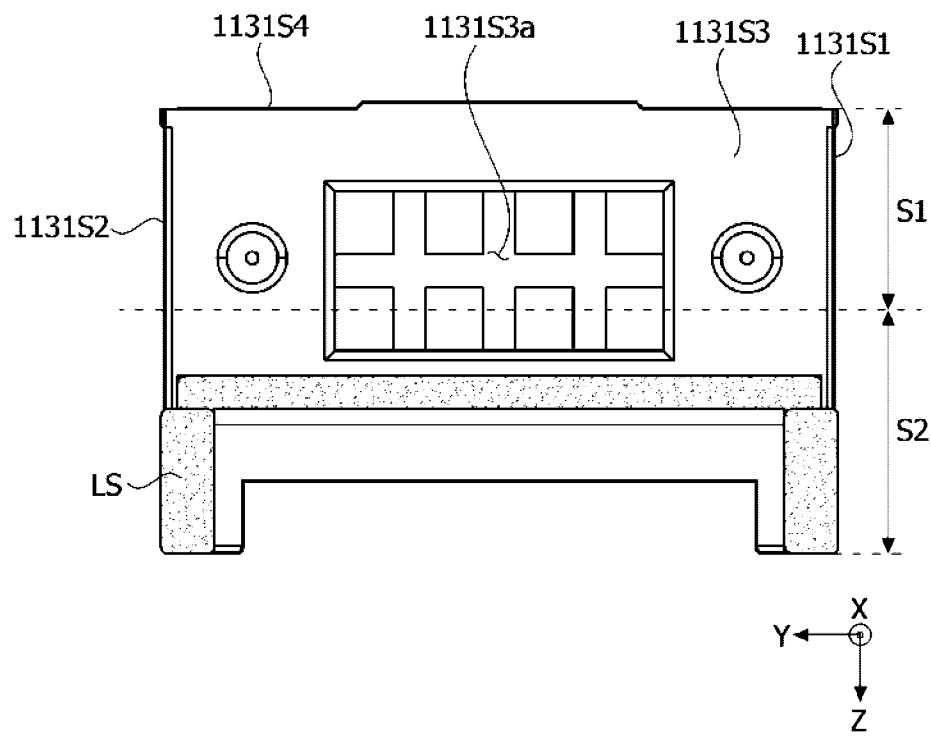
[FIG. 27]
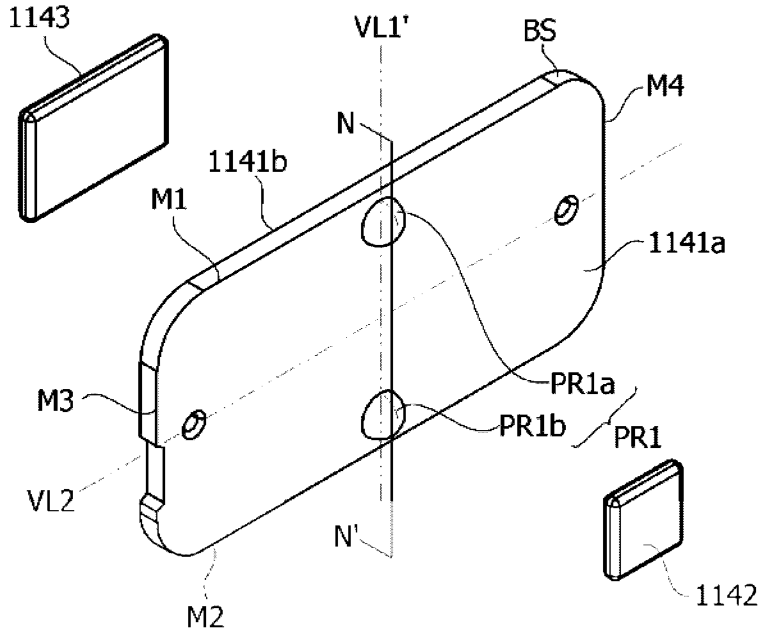
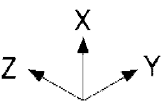

[FIG. 28]
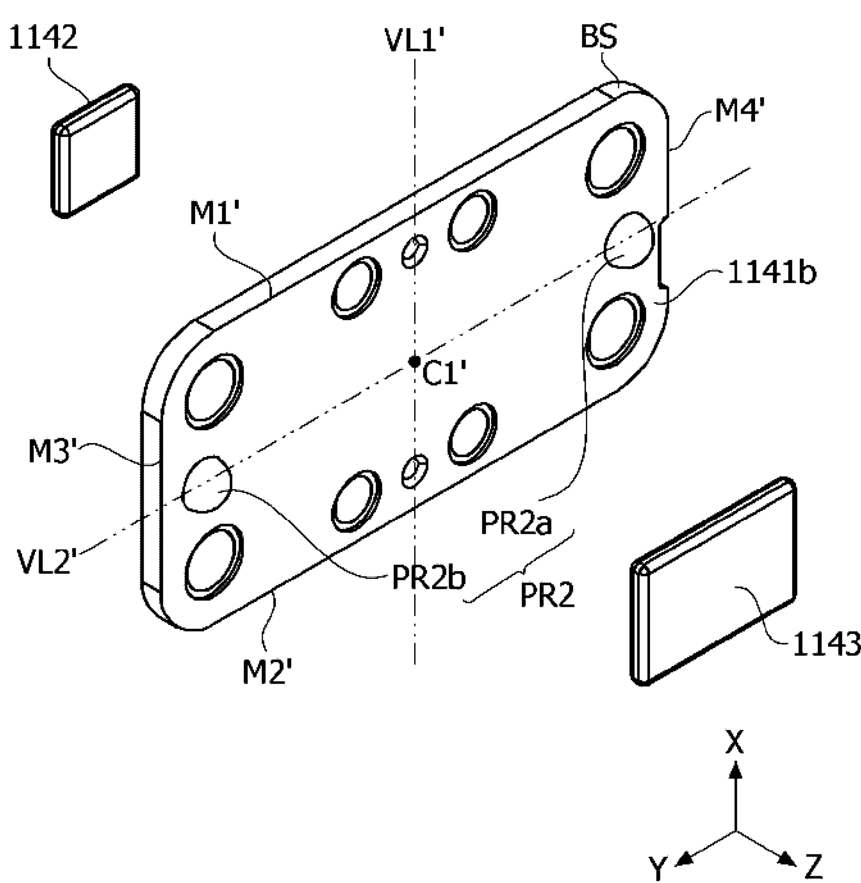

[FIG. 29]
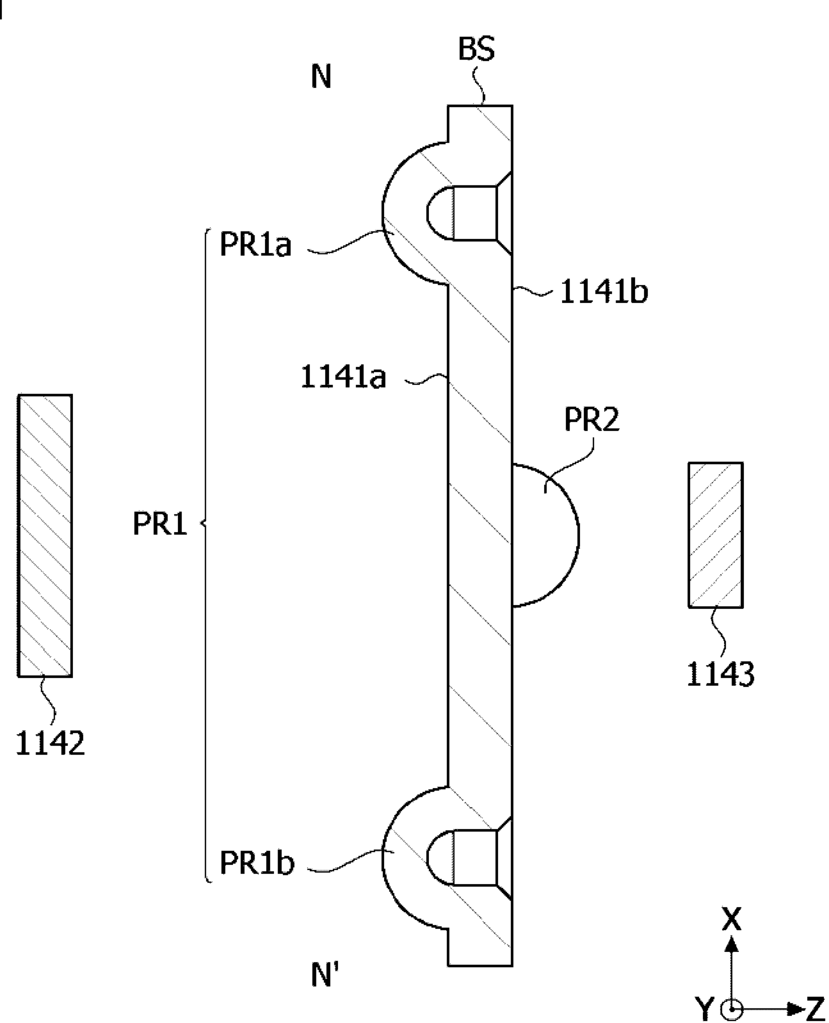

[FIG. 30]
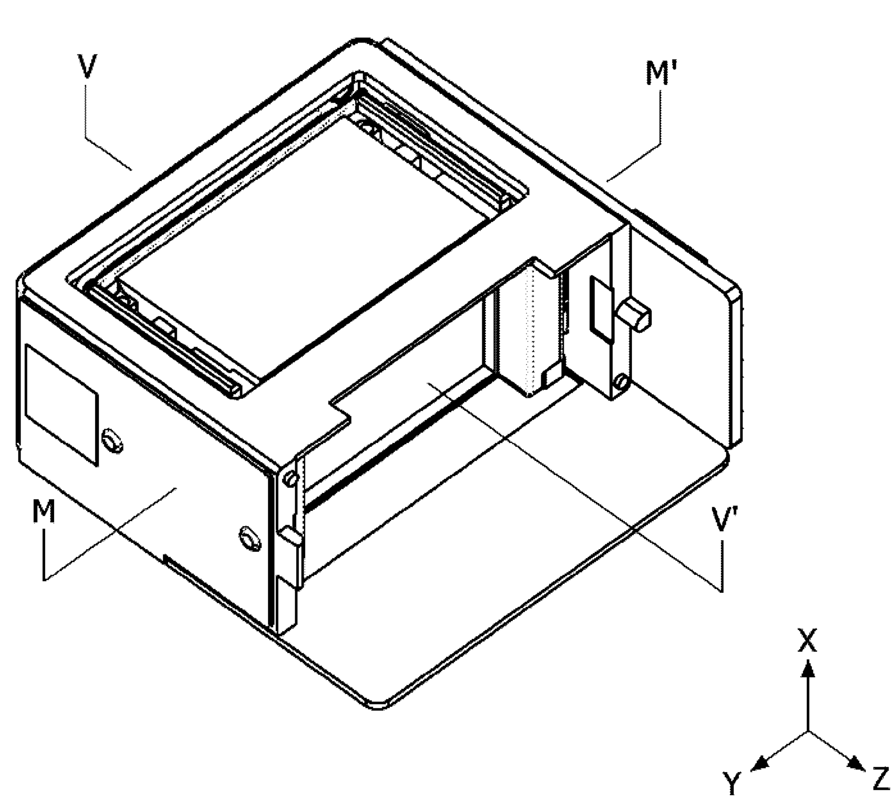

[FIG. 31]
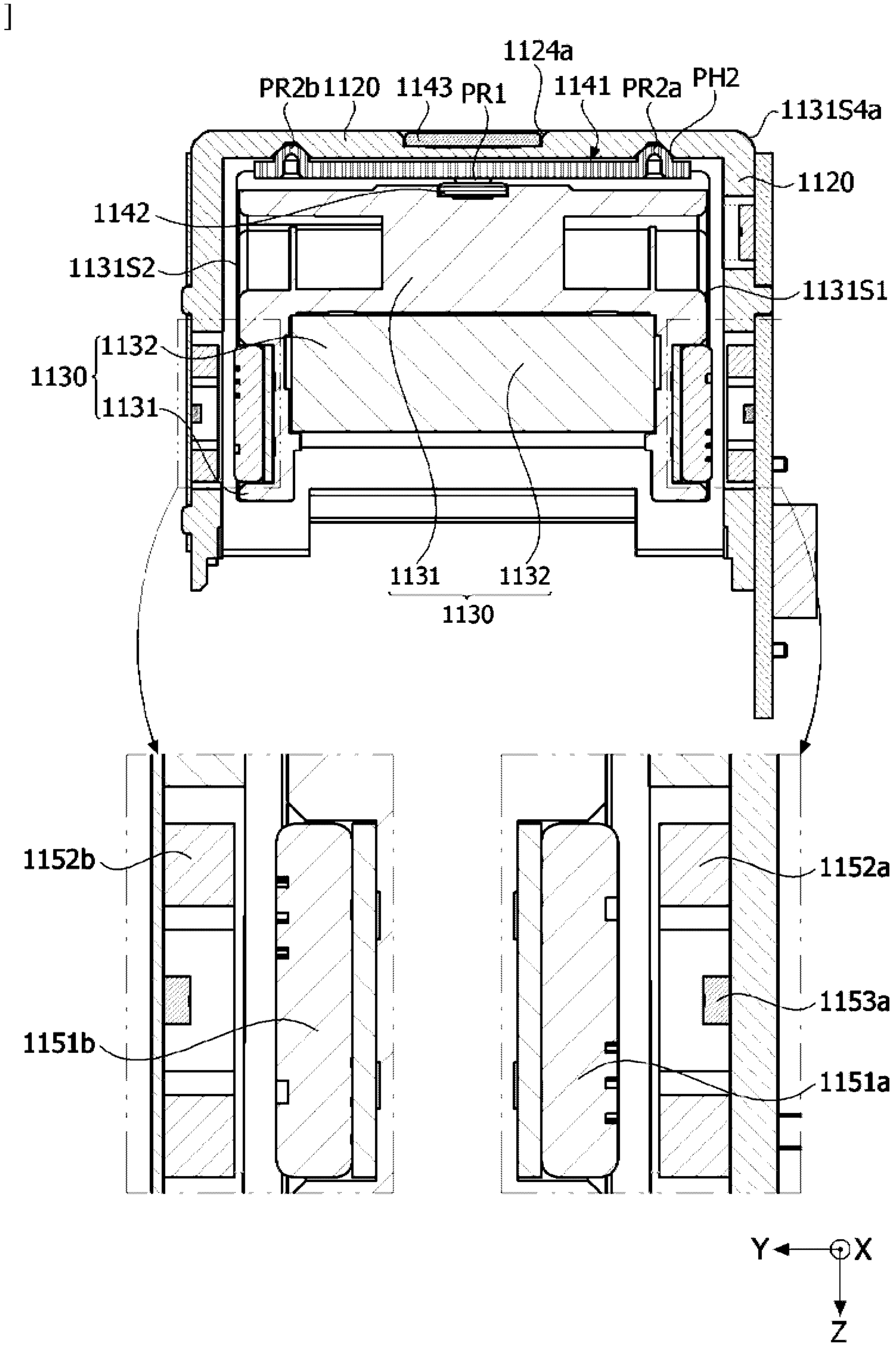

[FIG. 32]
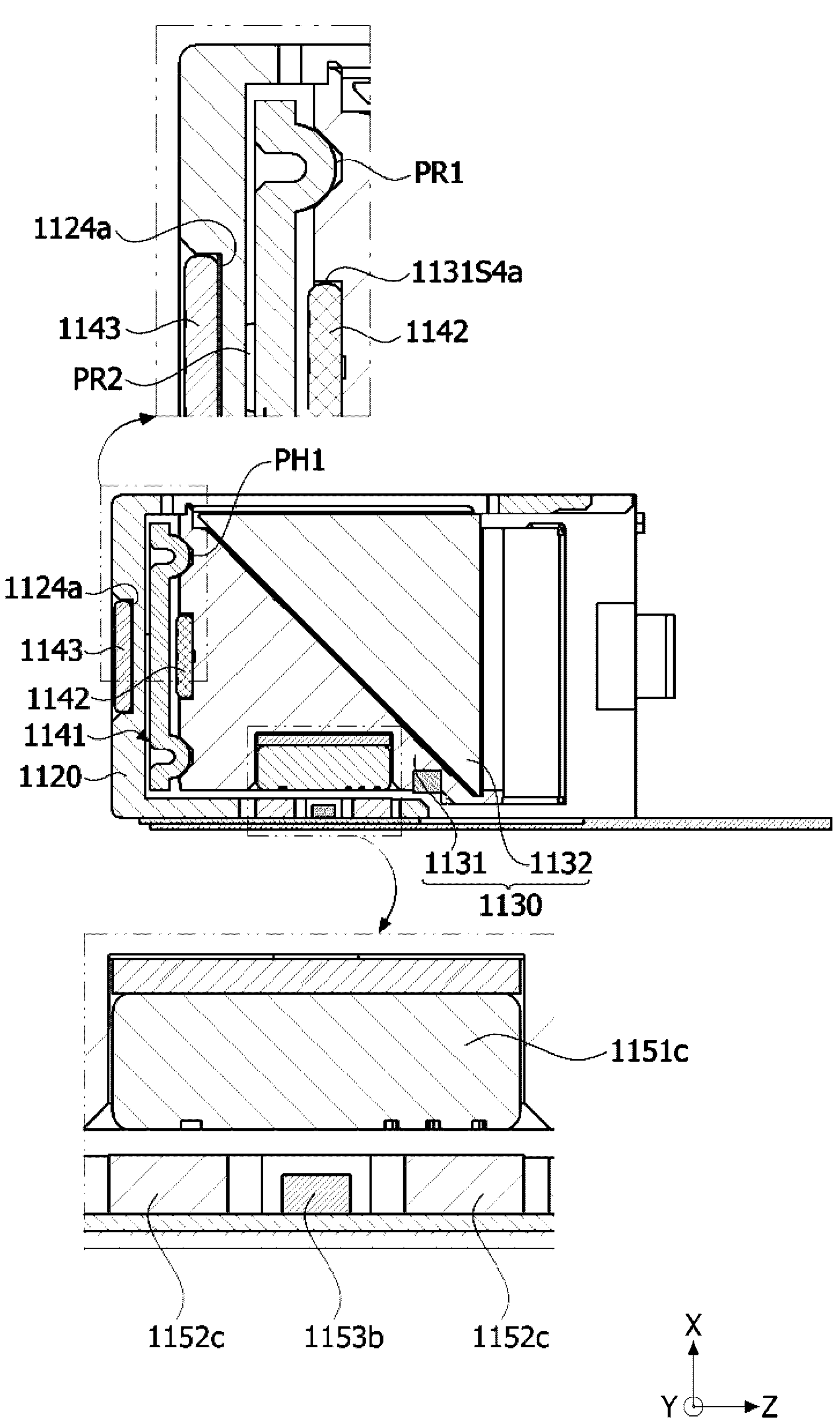

[FIG. 33]
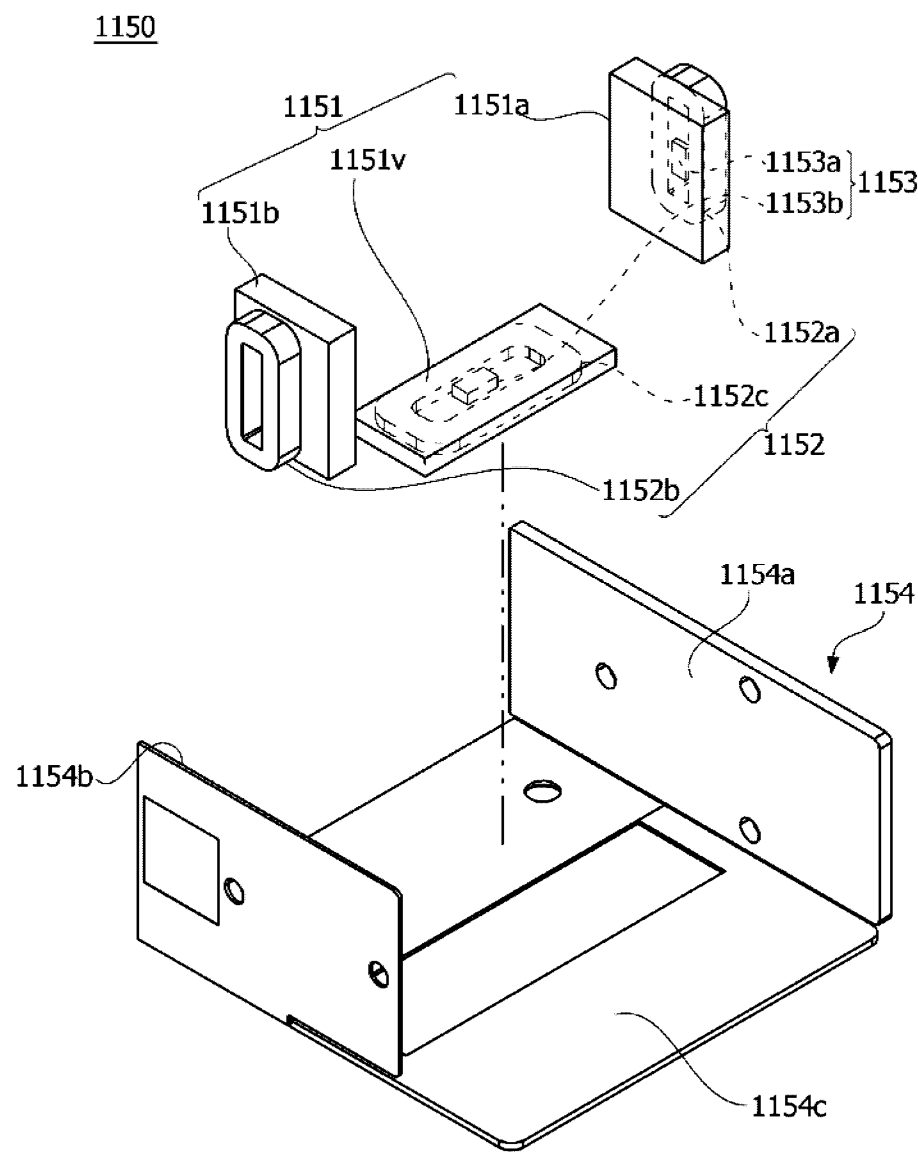

[FIG. 34]
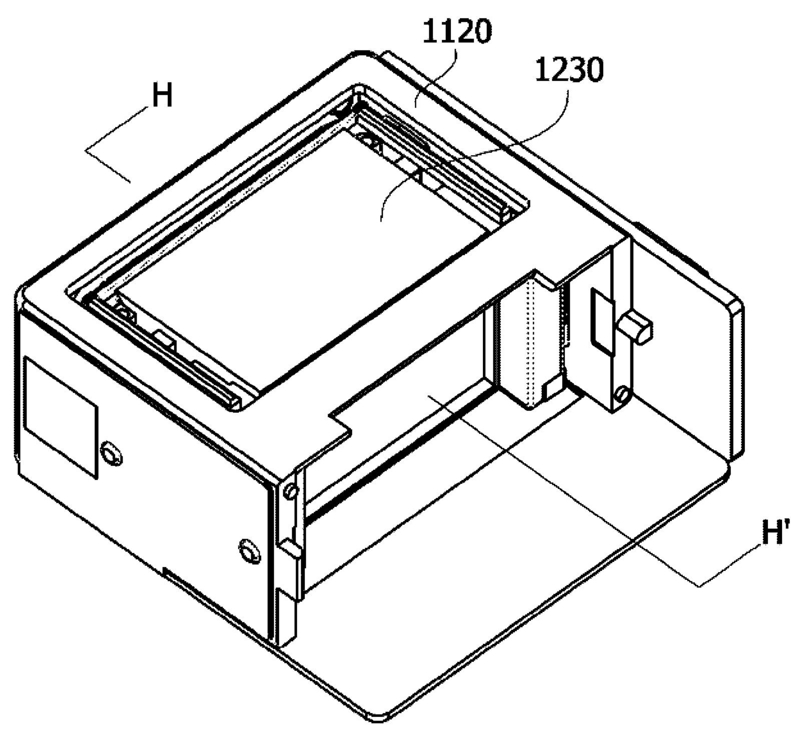
[FIG. 35]
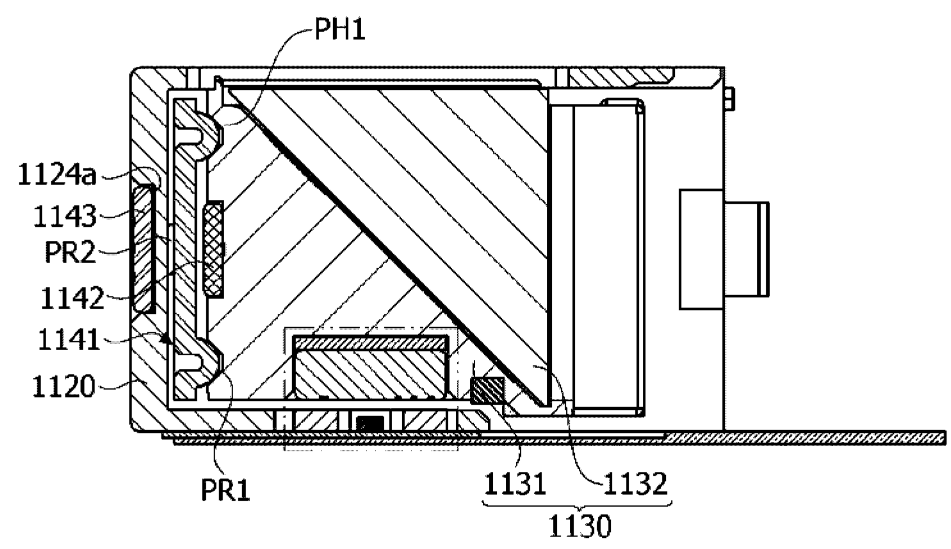

[FIG. 36]
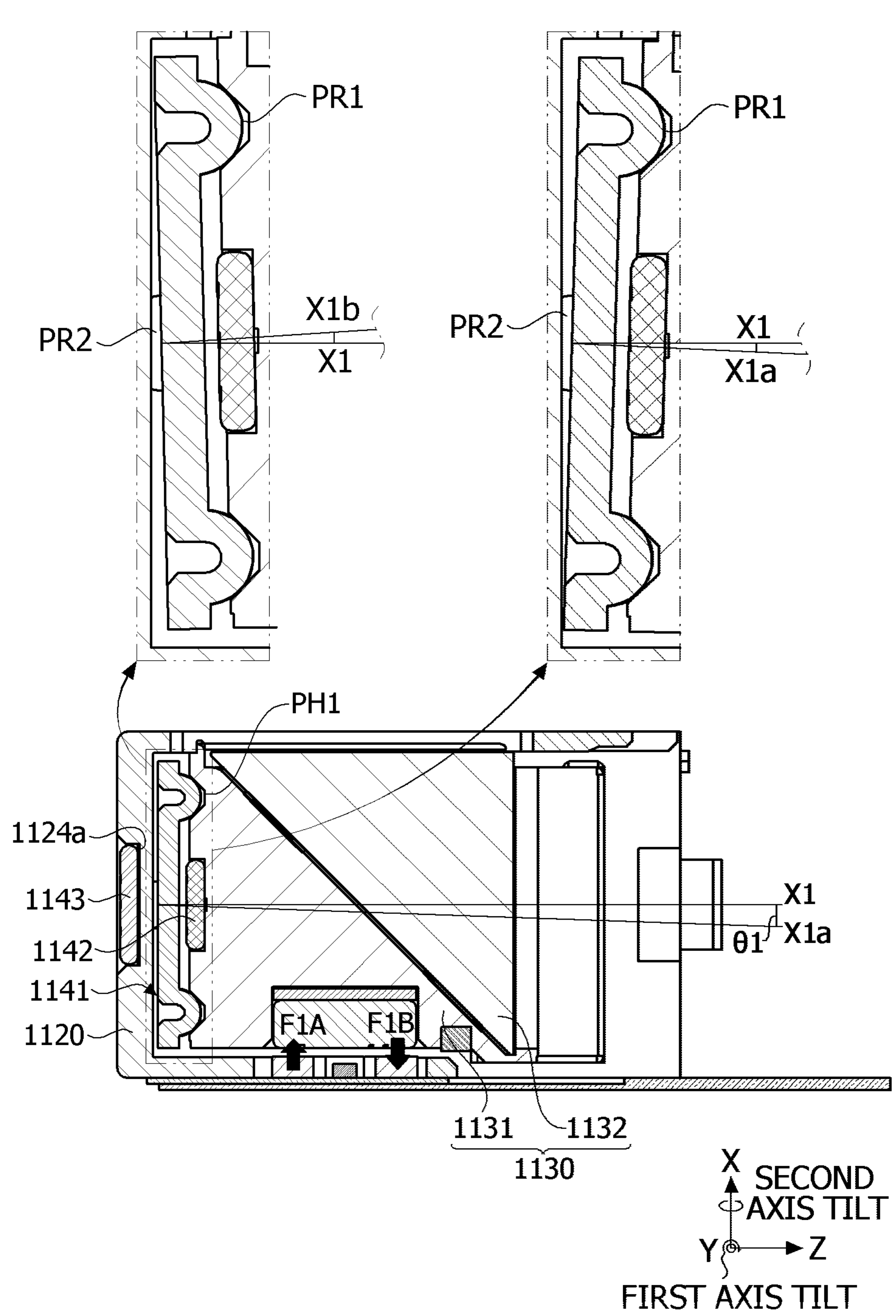

[FIG. 37]
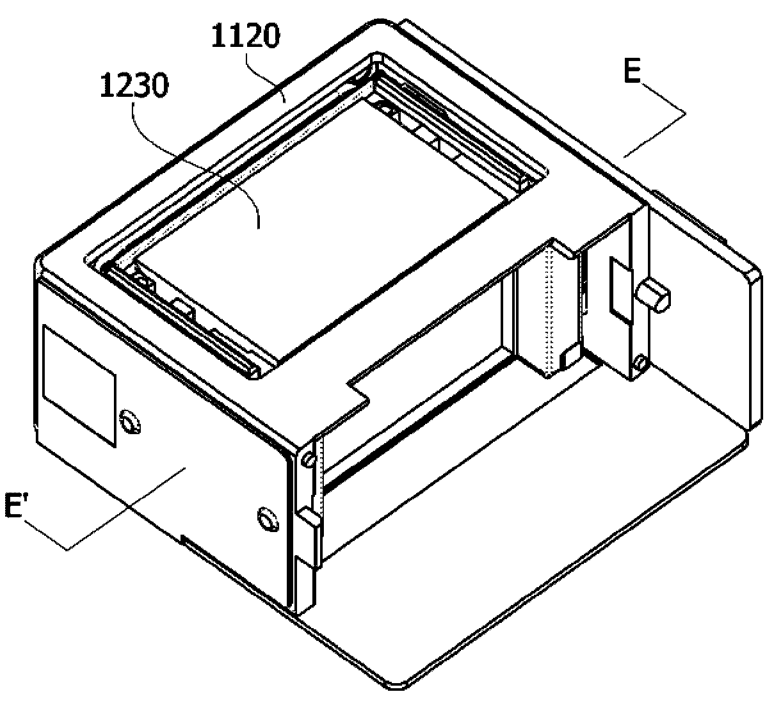
[FIG. 38]
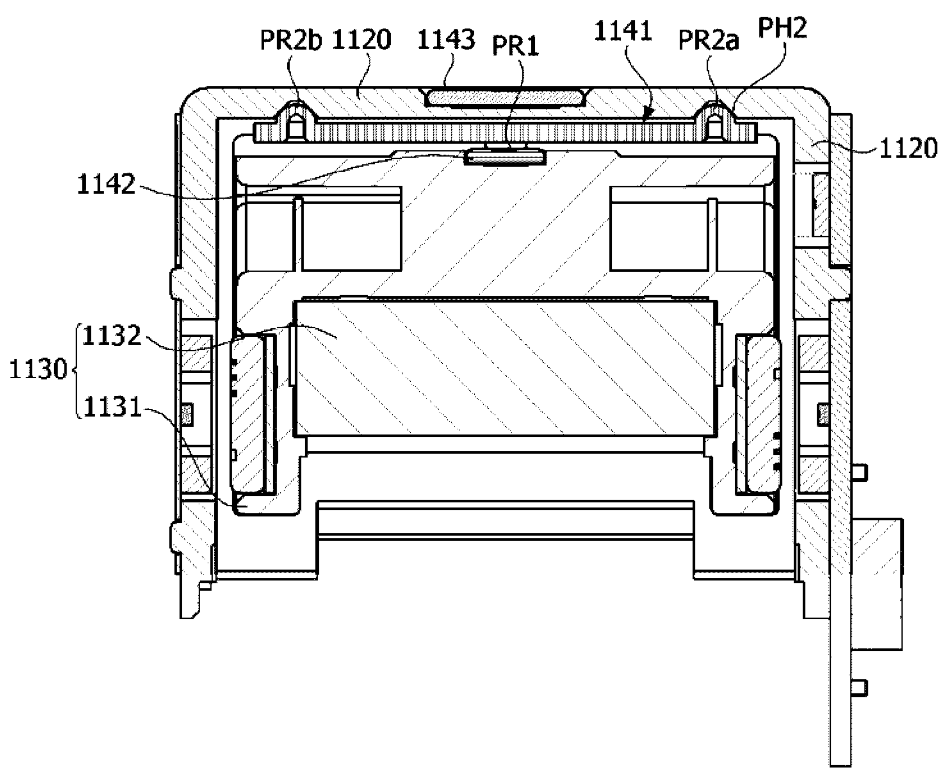

[FIG. 39]
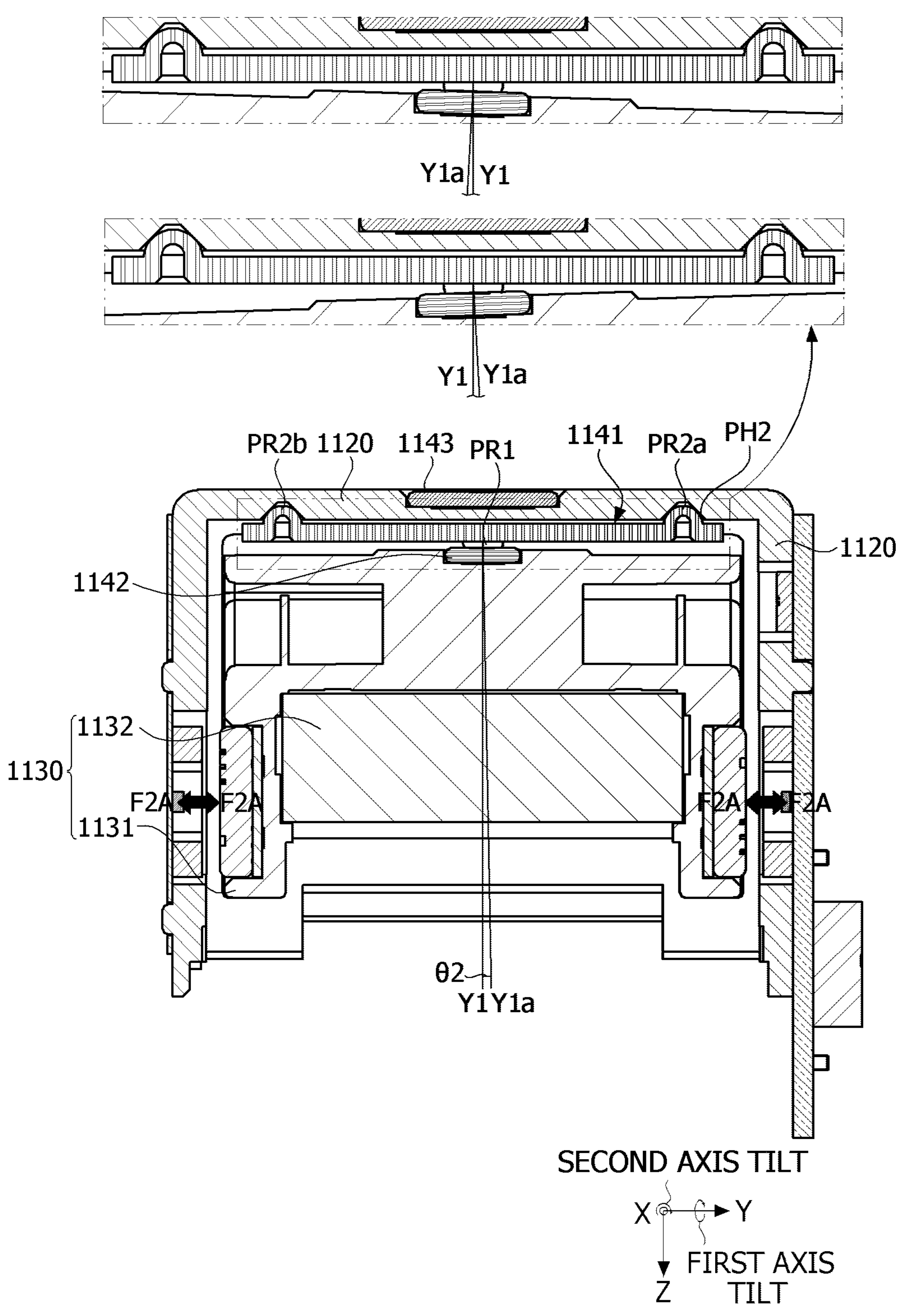

[FIG. 40]
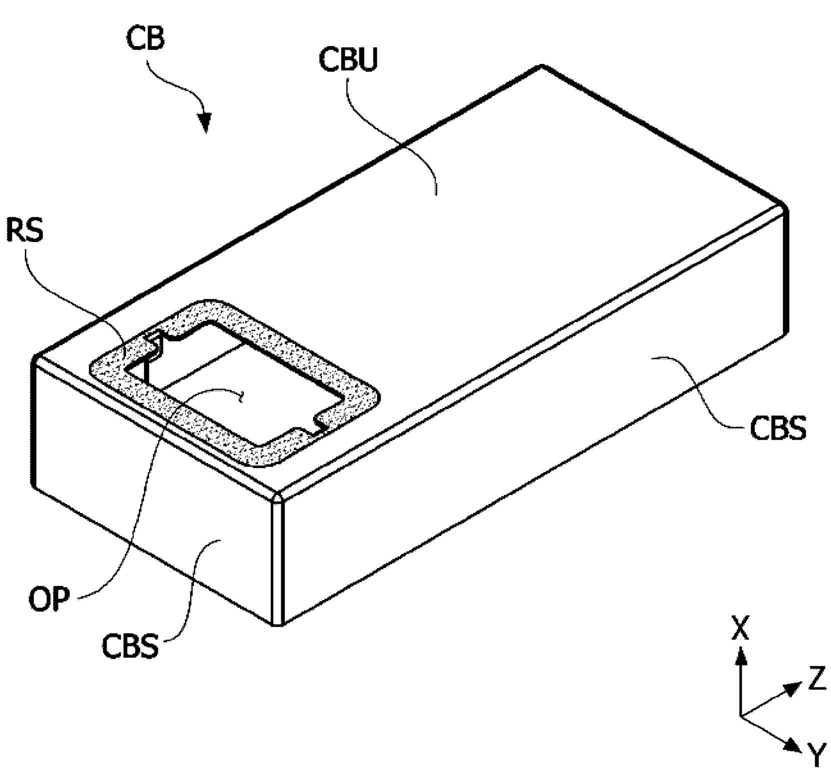
[FIG. 41]
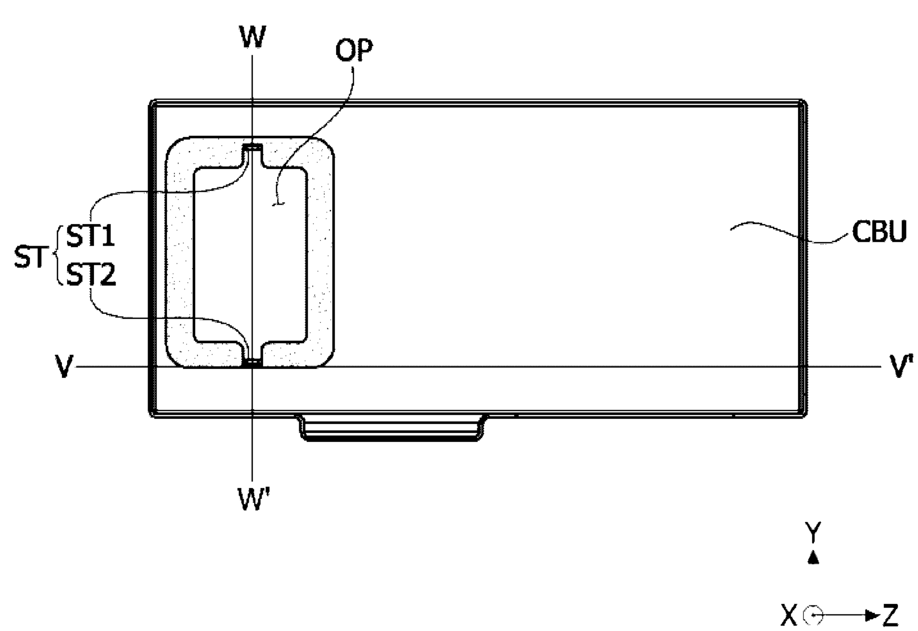

[FIG. 42]
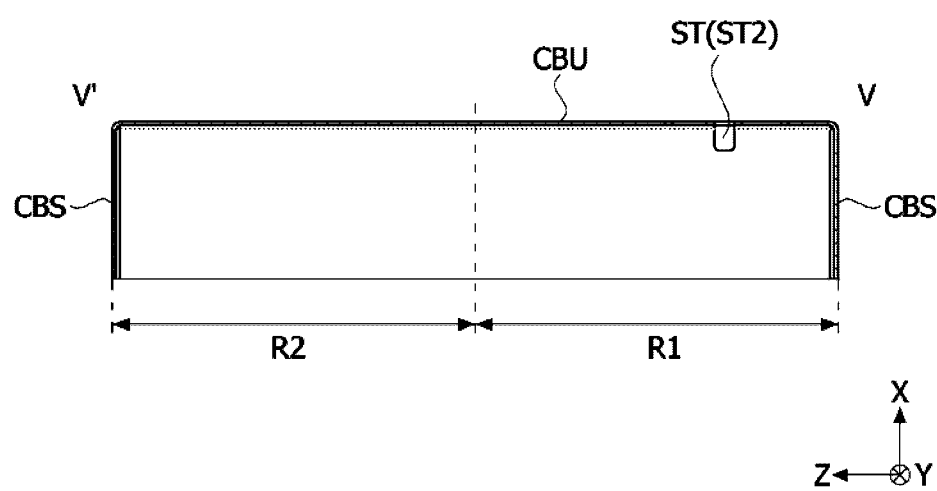
[FIG. 43]
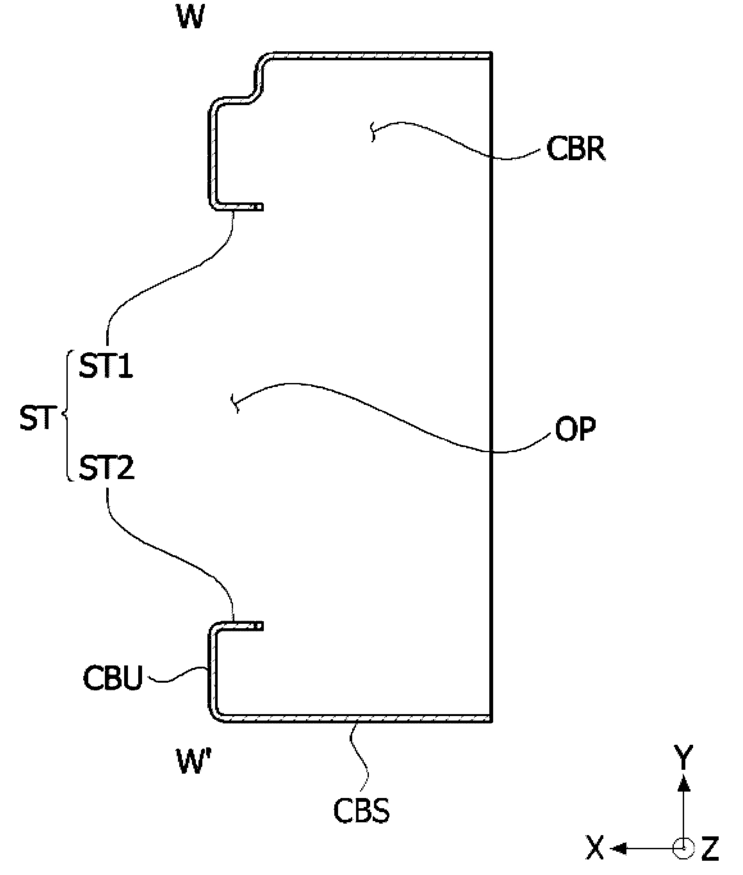

[FIG. 44]
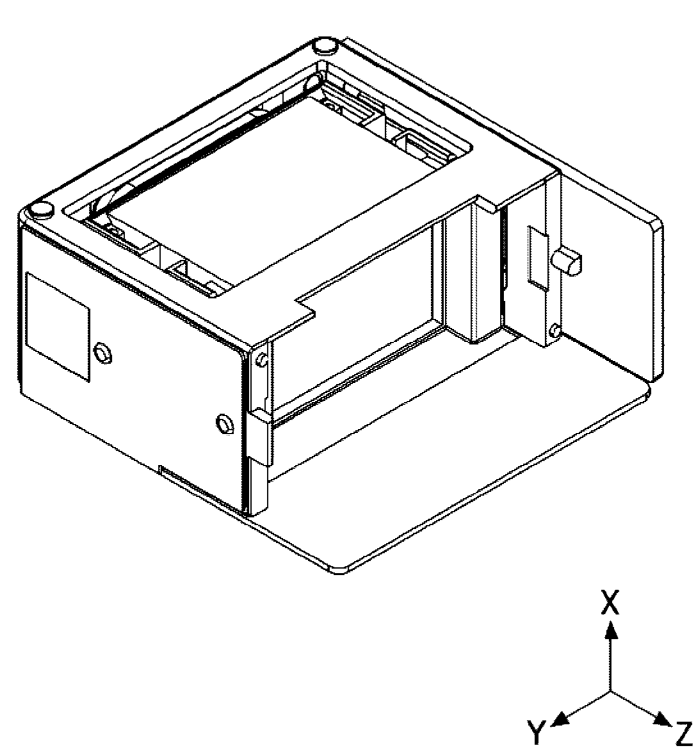

[FIG. 45]
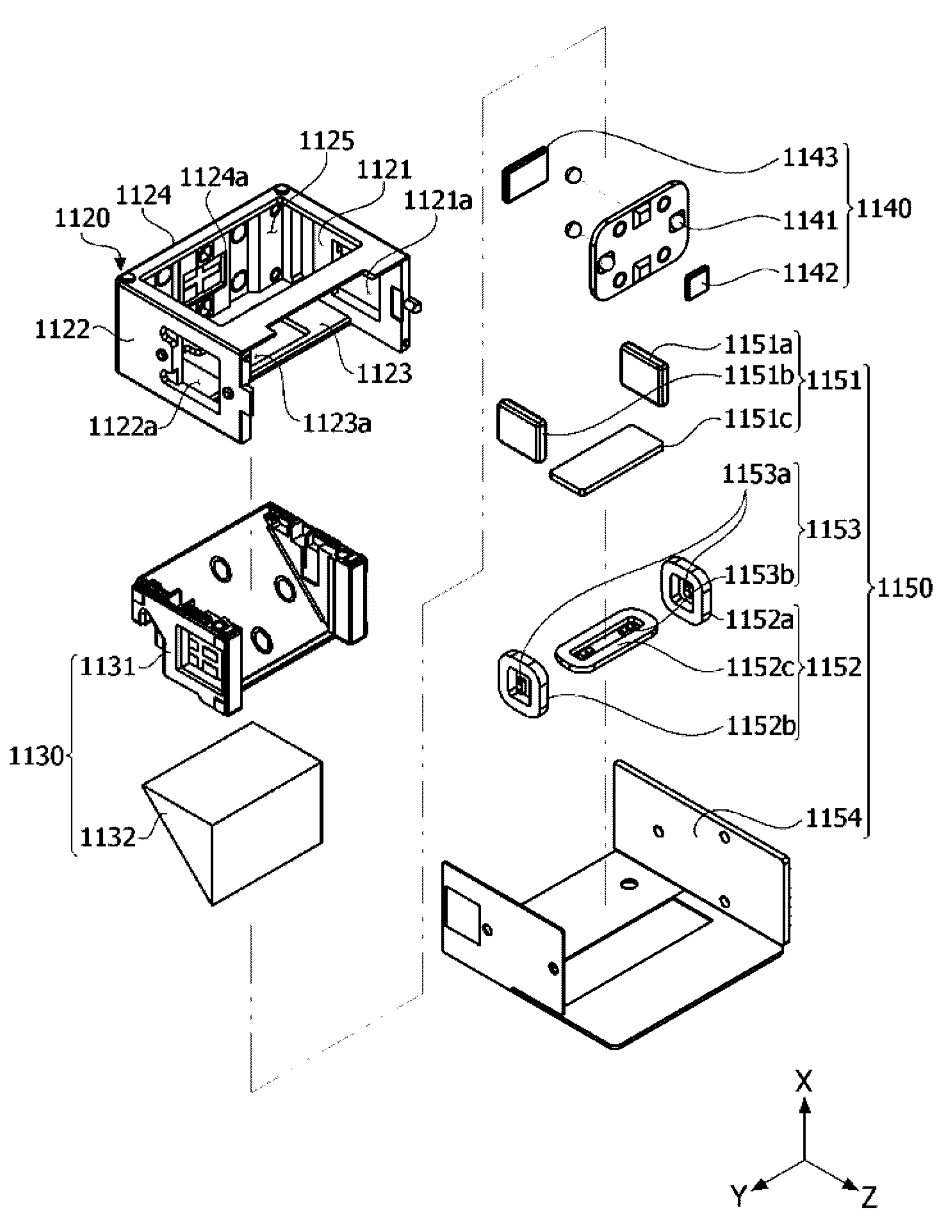

[FIG. 46]
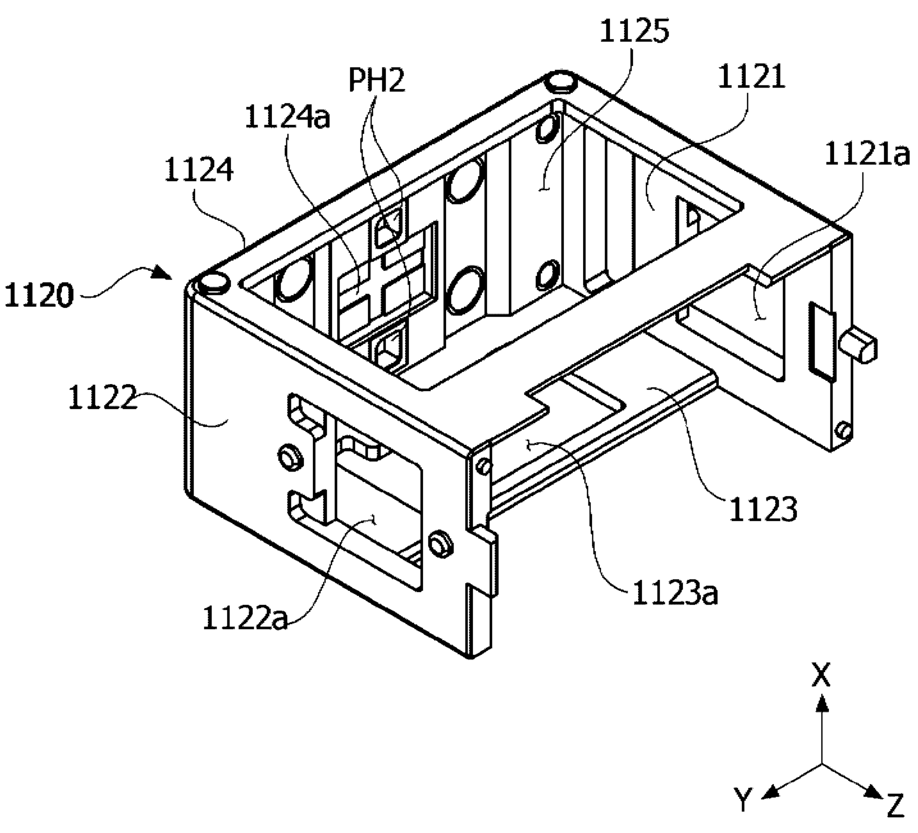
[FIG. 47]
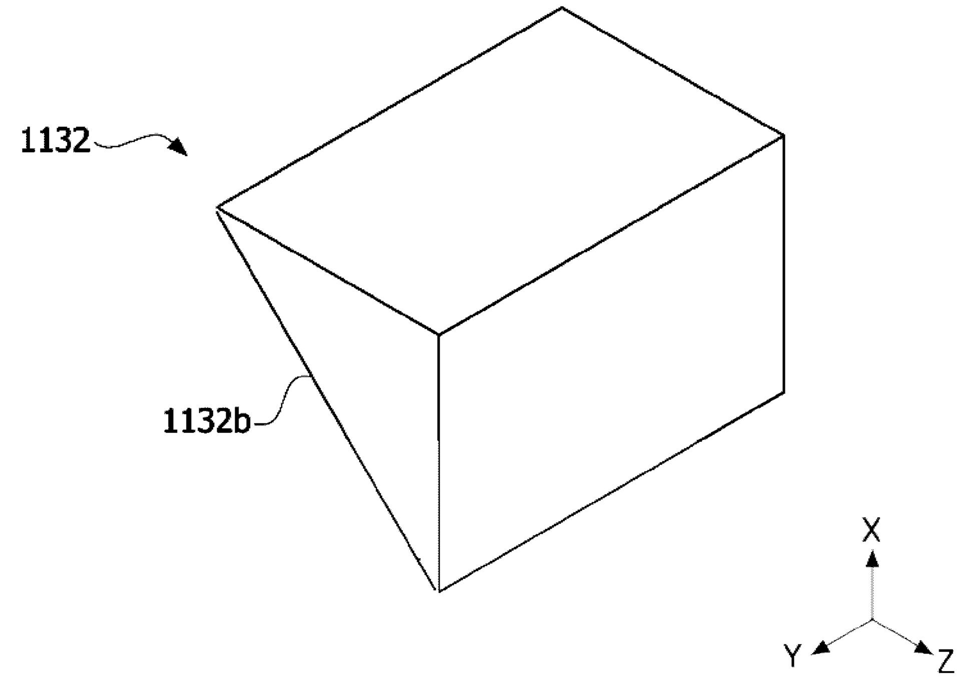

[FIG. 48]
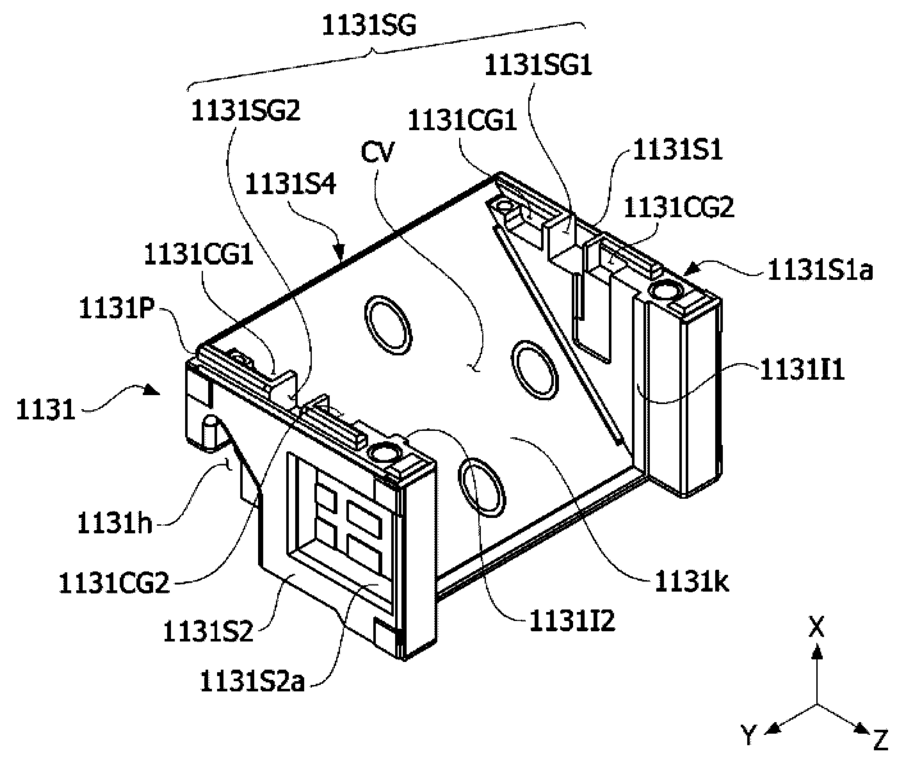
[FIG. 49]
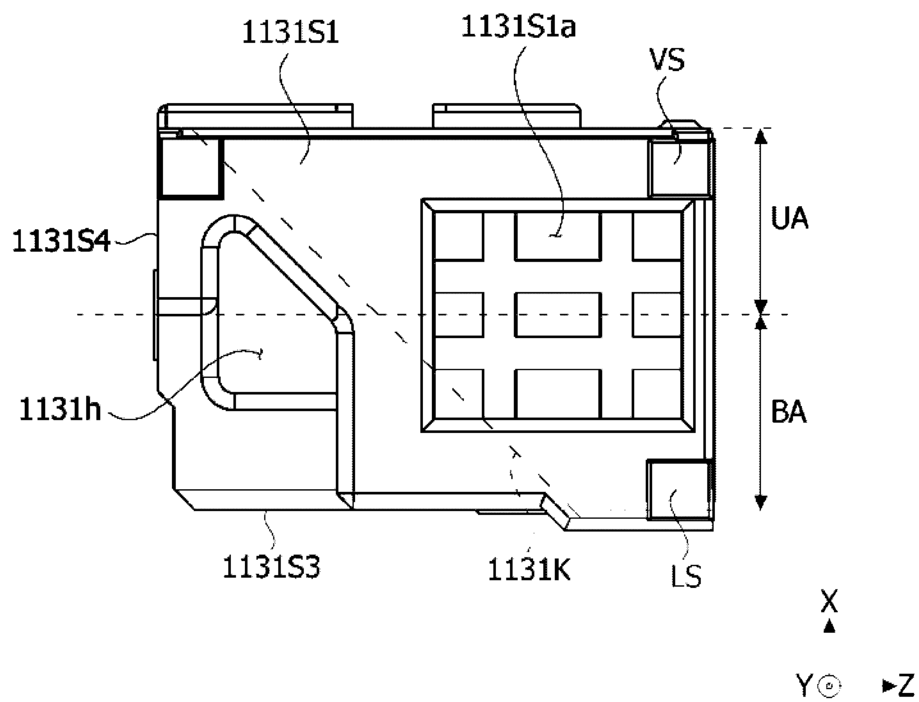

[FIG. 50]
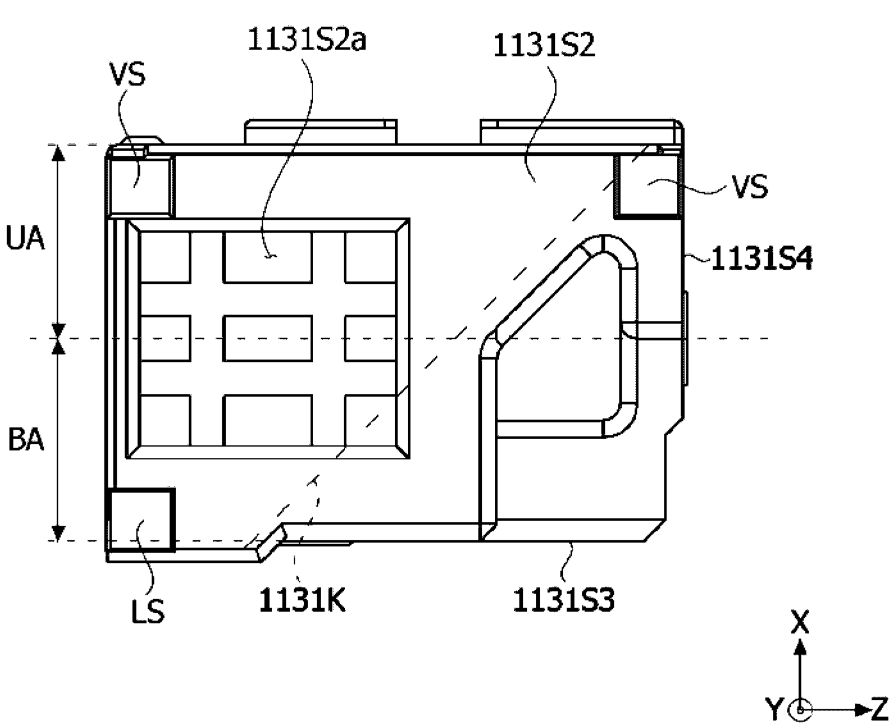

[FIG. 51]
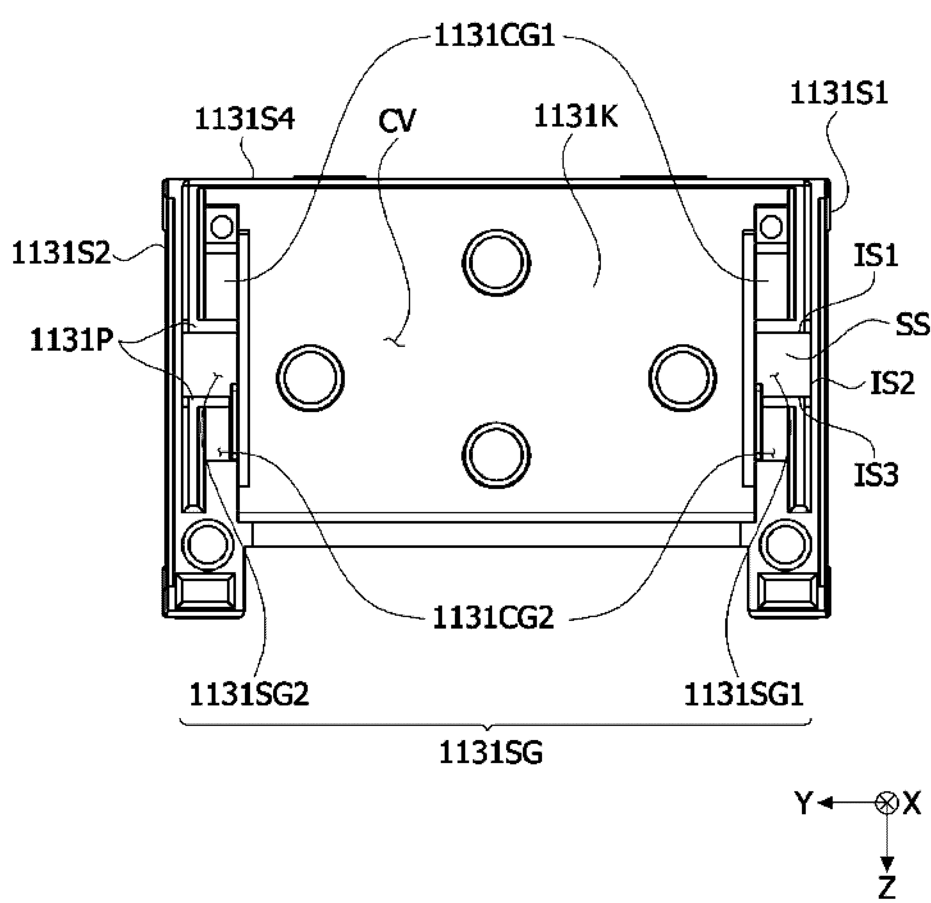

[FIG. 52]
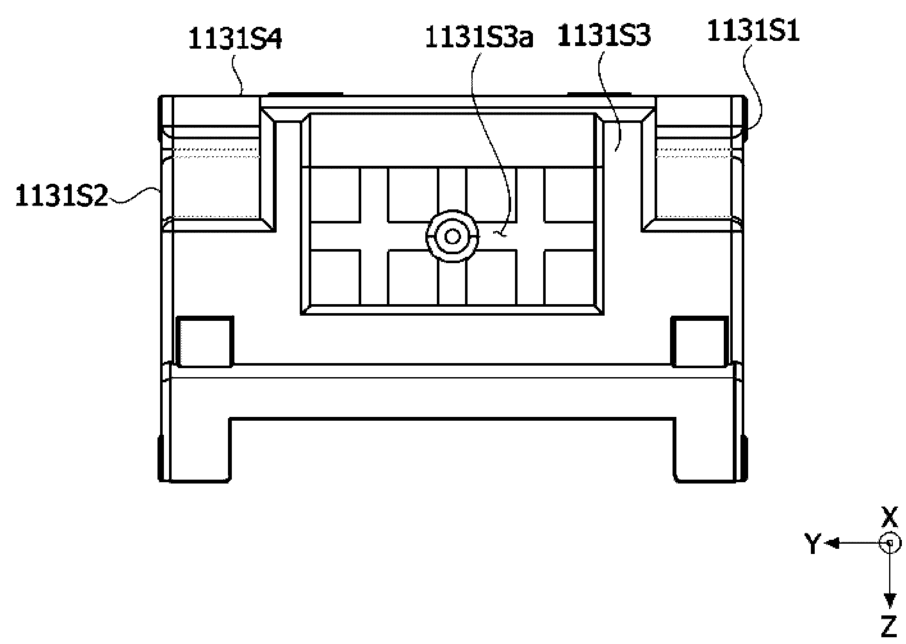
[FIG. 53]
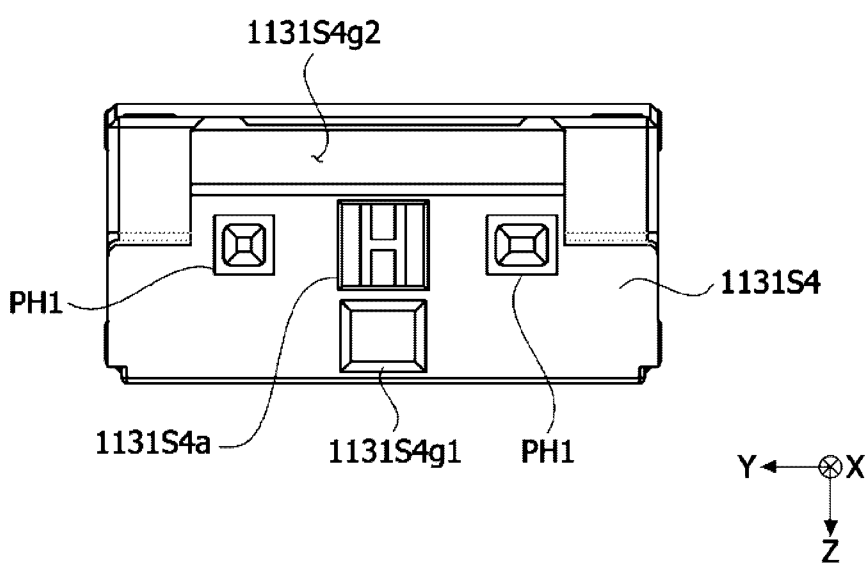

[FIG. 54]
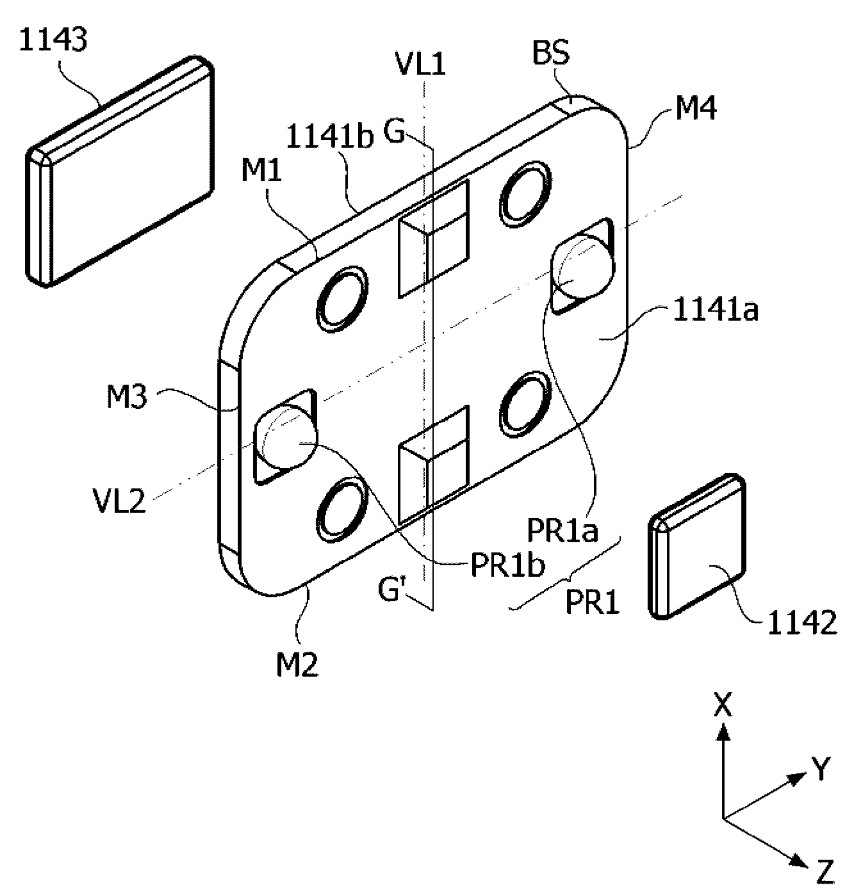

[FIG. 55]
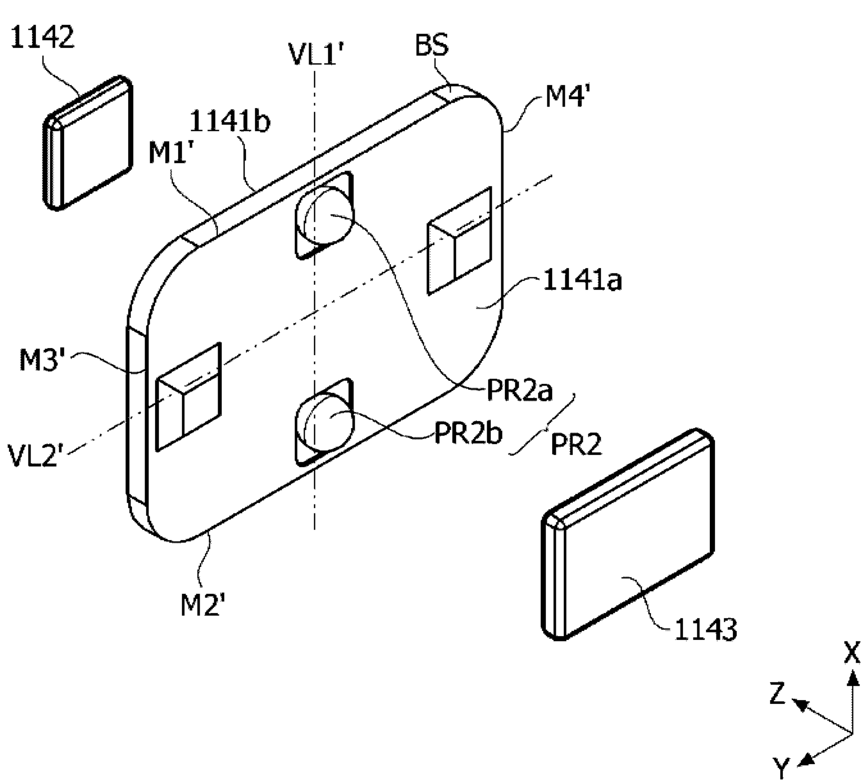

[FIG. 56]
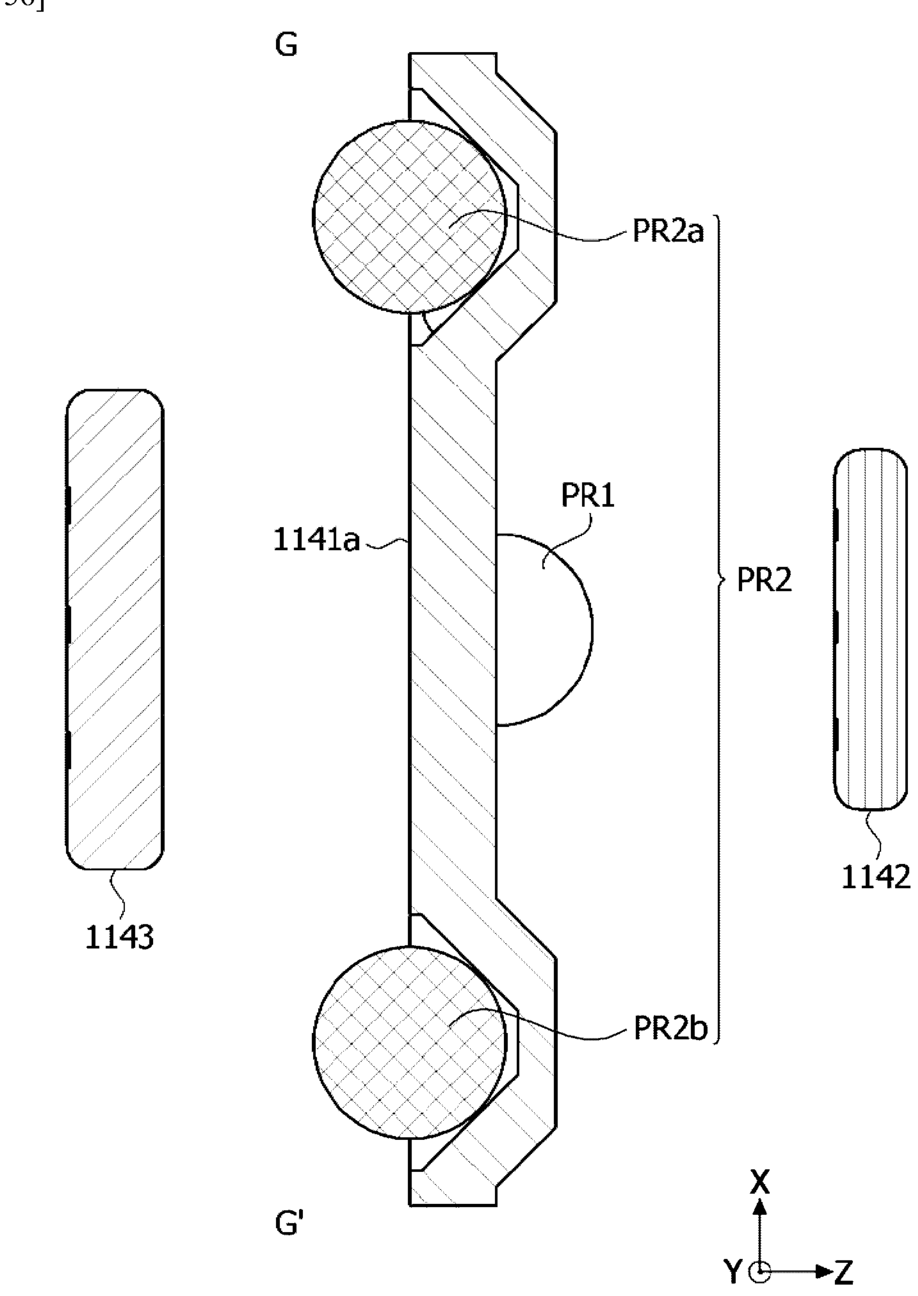

[FIG. 57]
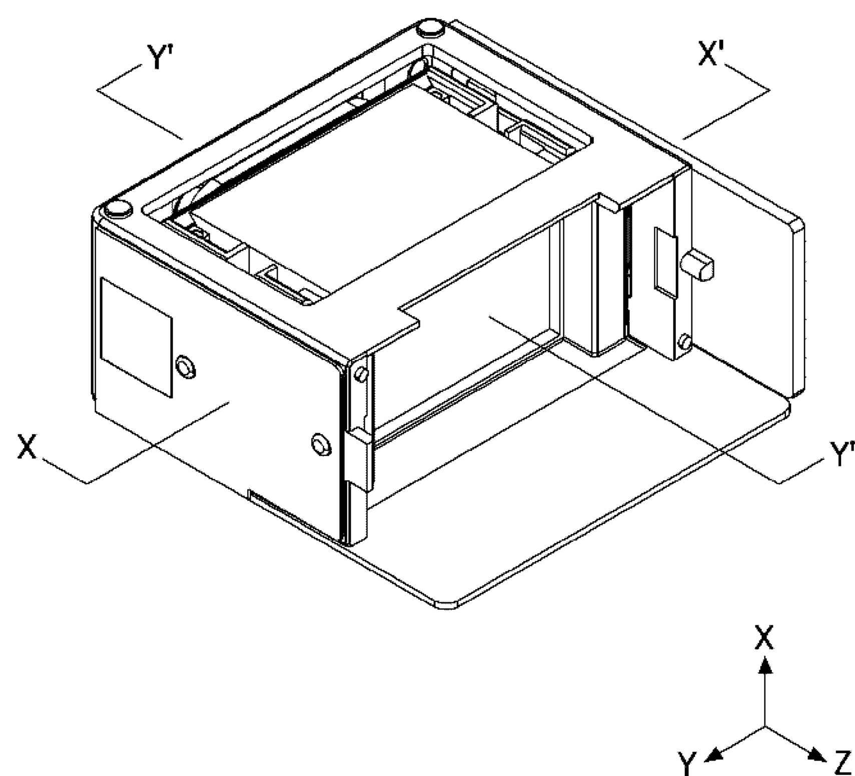

[FIG. 58]
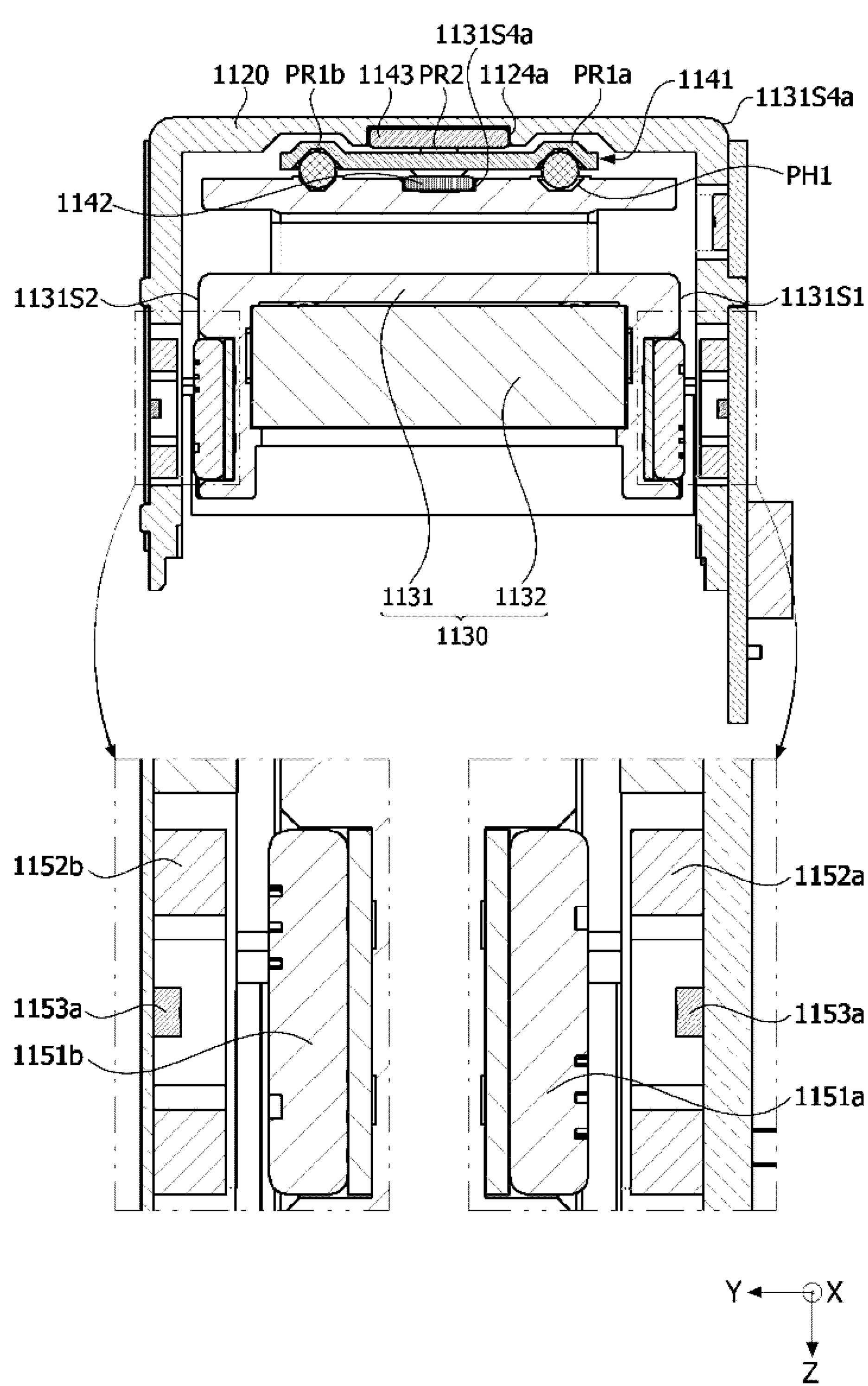

[FIG. 59]
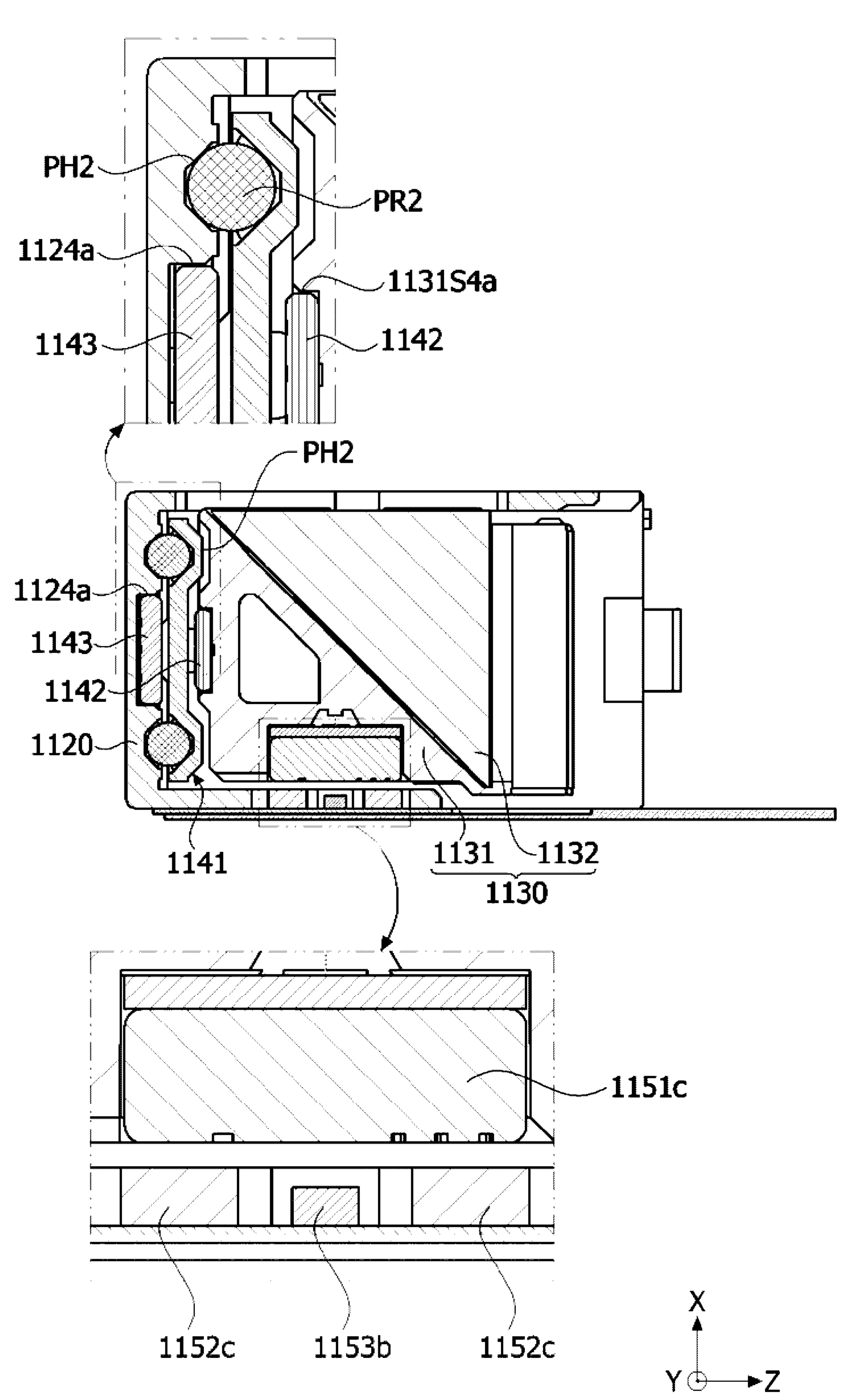

[FIG. 60]
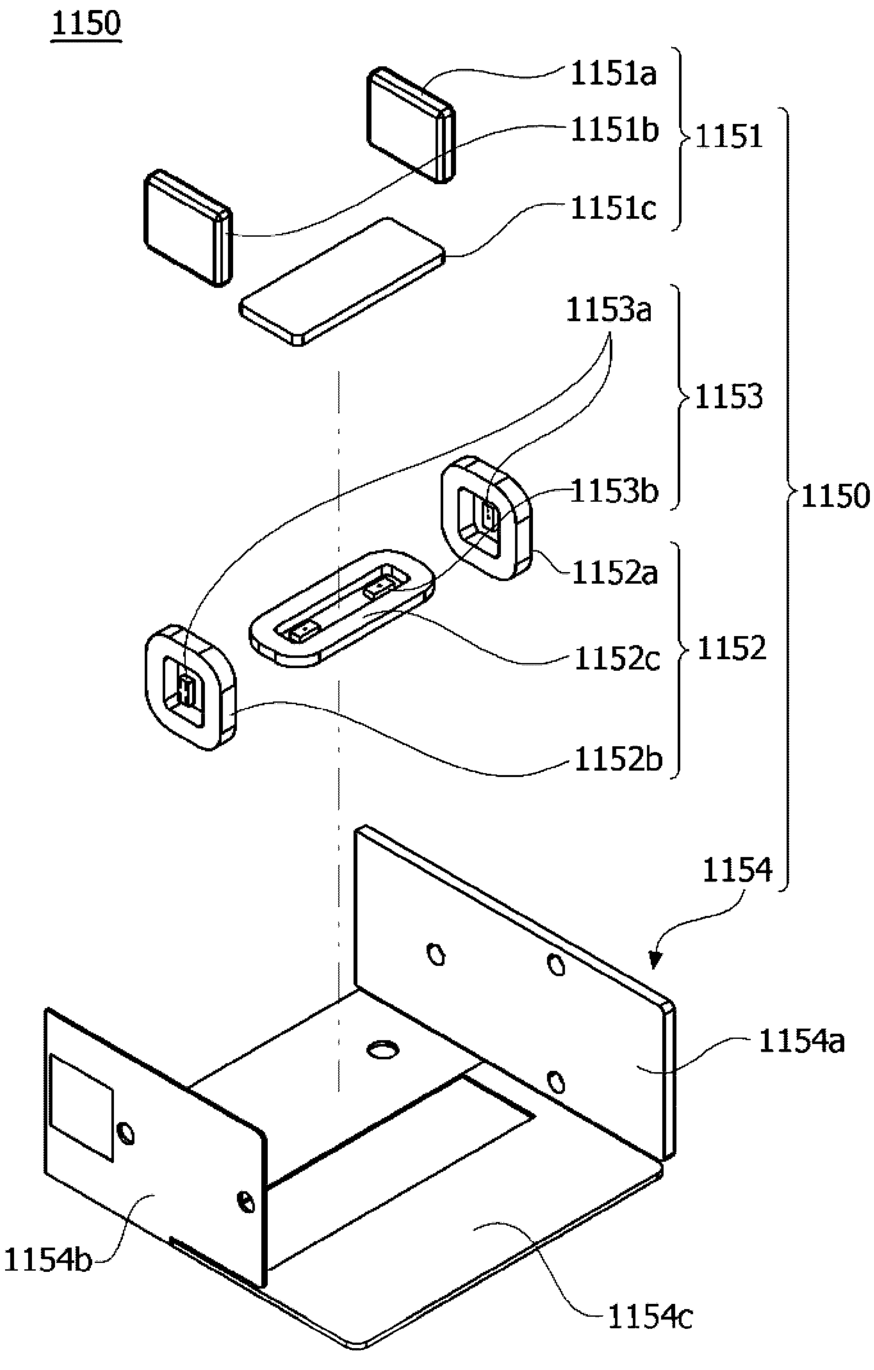

[FIG. 61]

[FIG. 62]
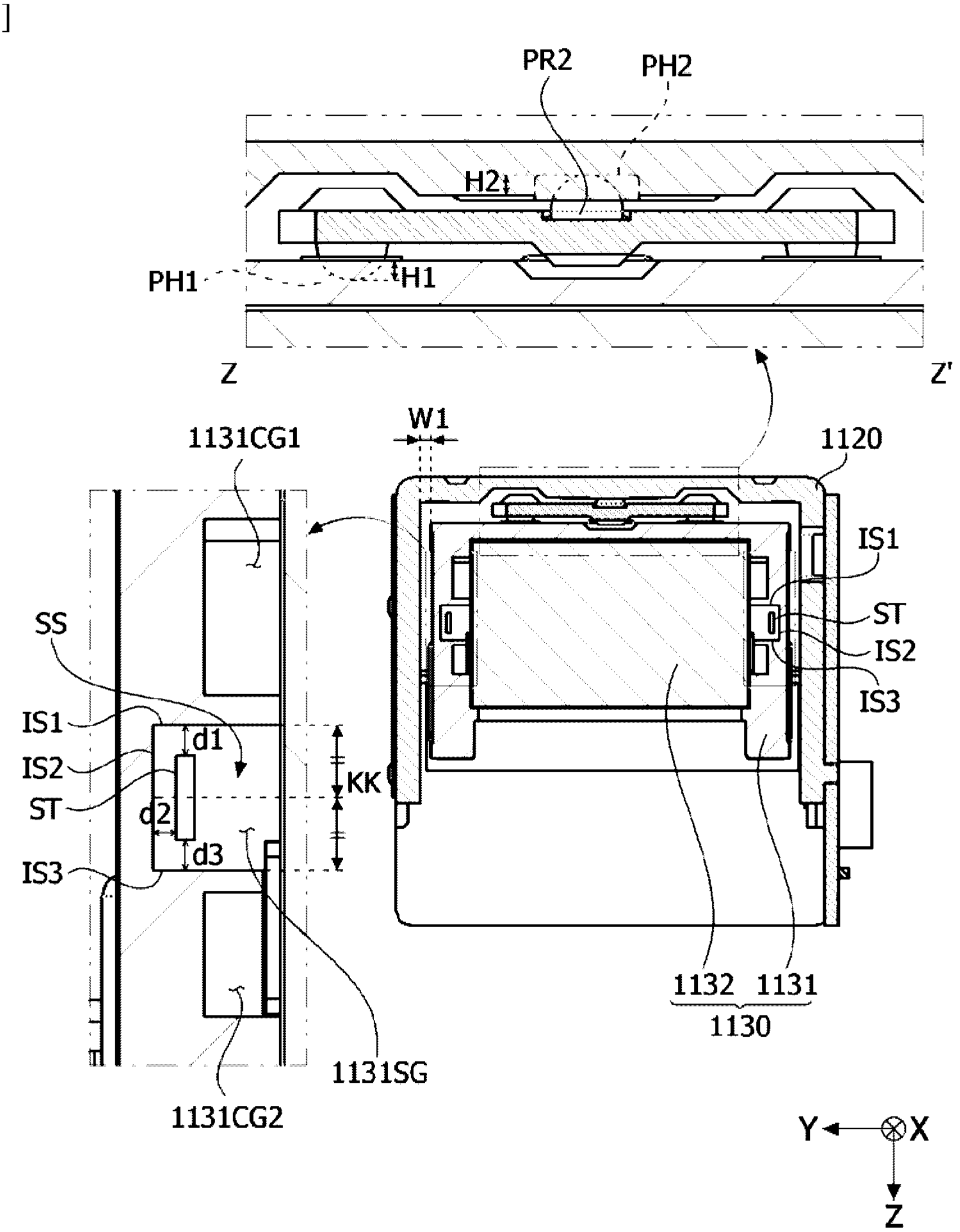

[FIG. 63]
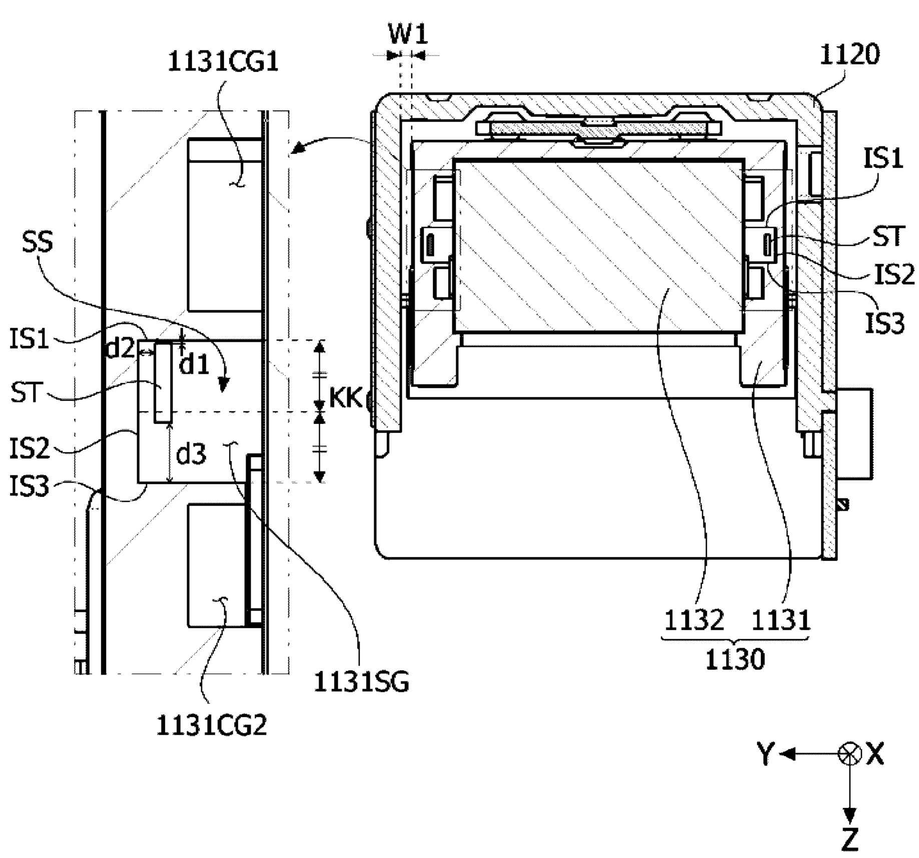

[FIG. 64]
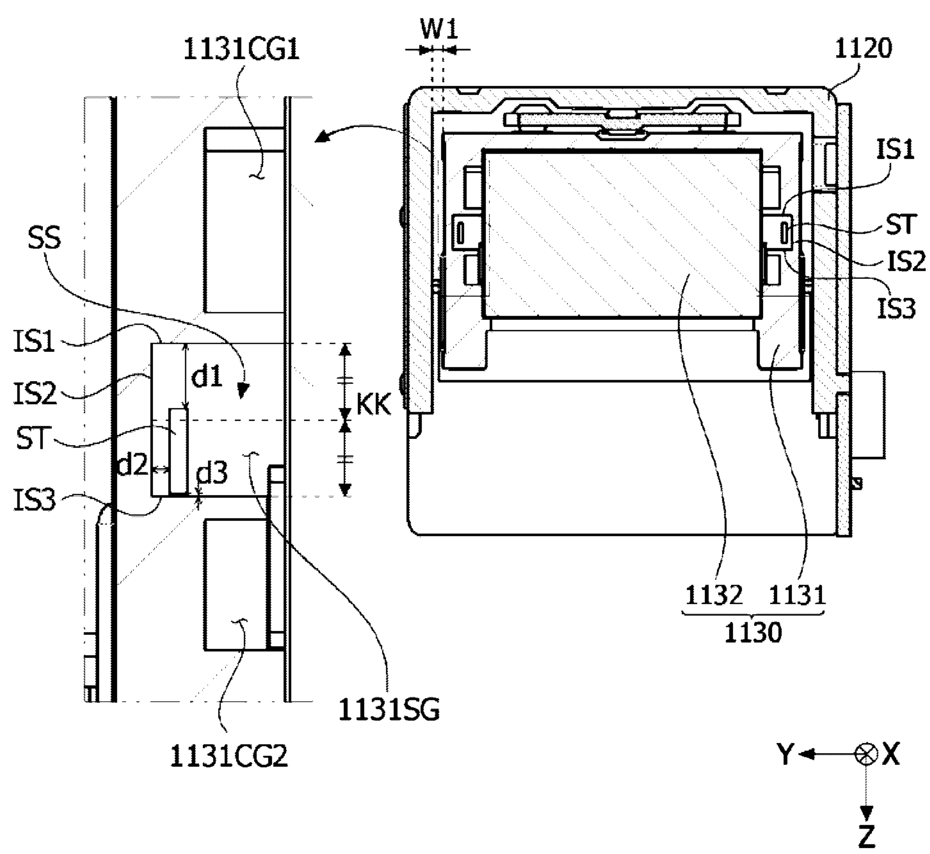

[FIG. 65]
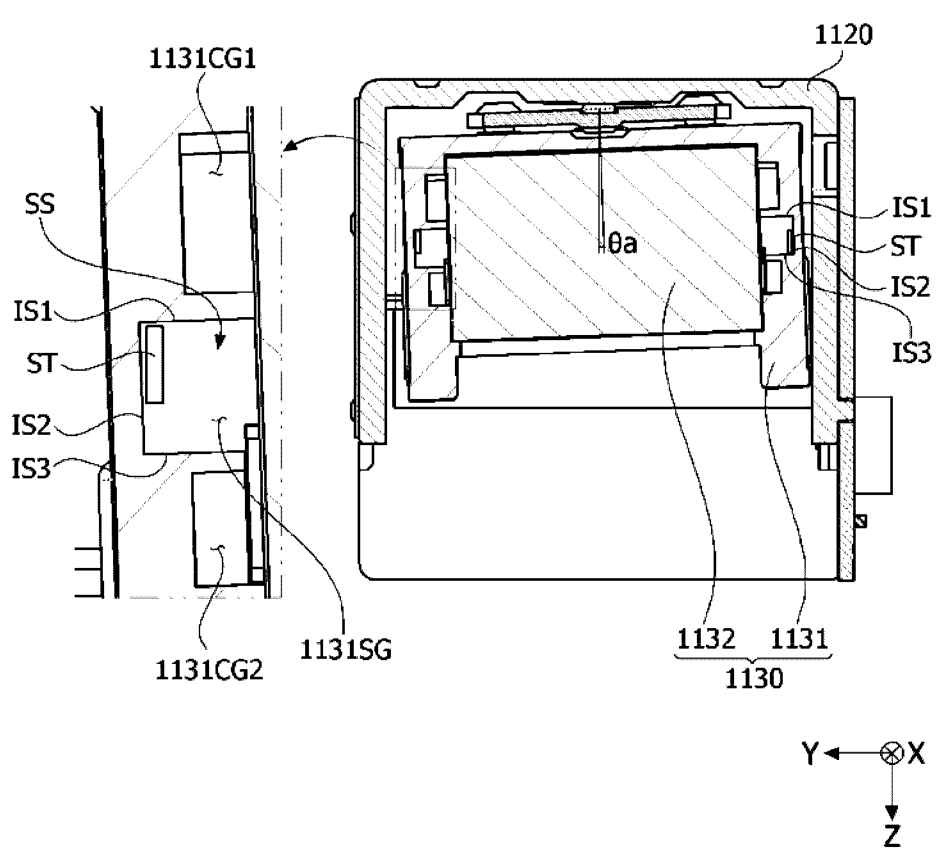

[FIG. 66]
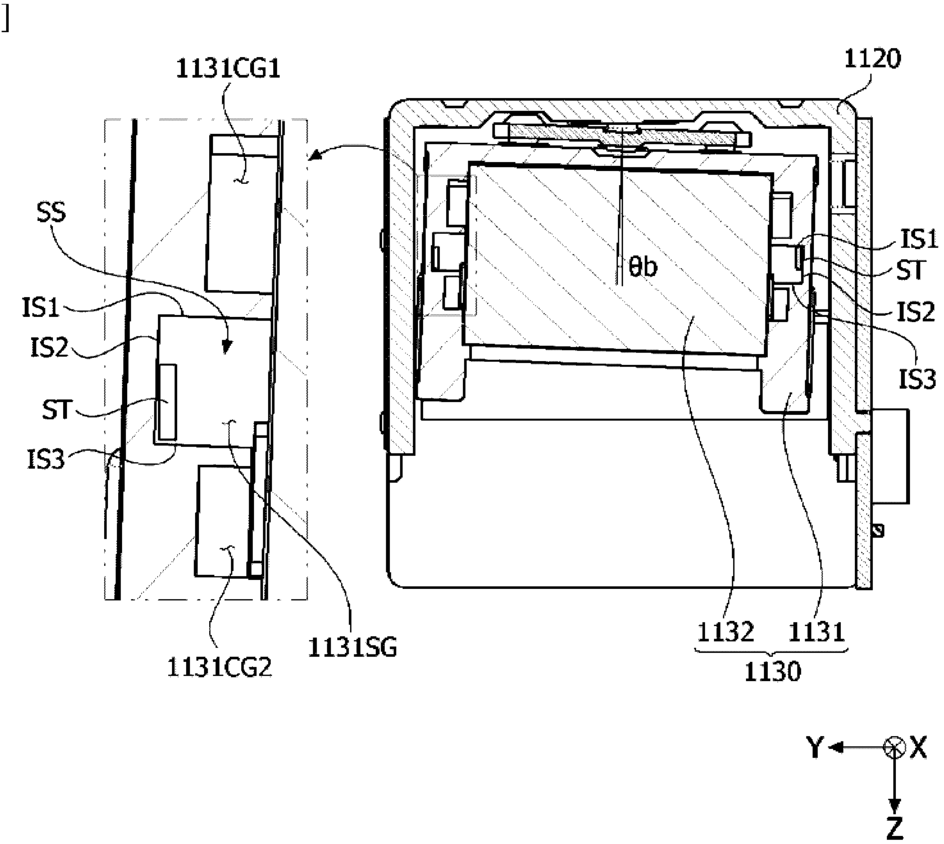
[FIG. 67]
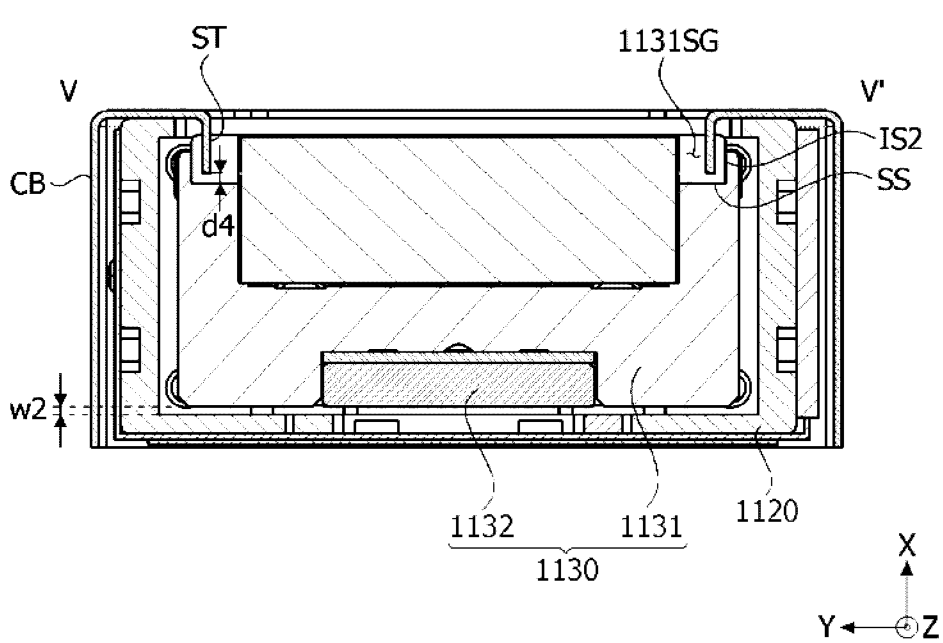

[FIG. 68]
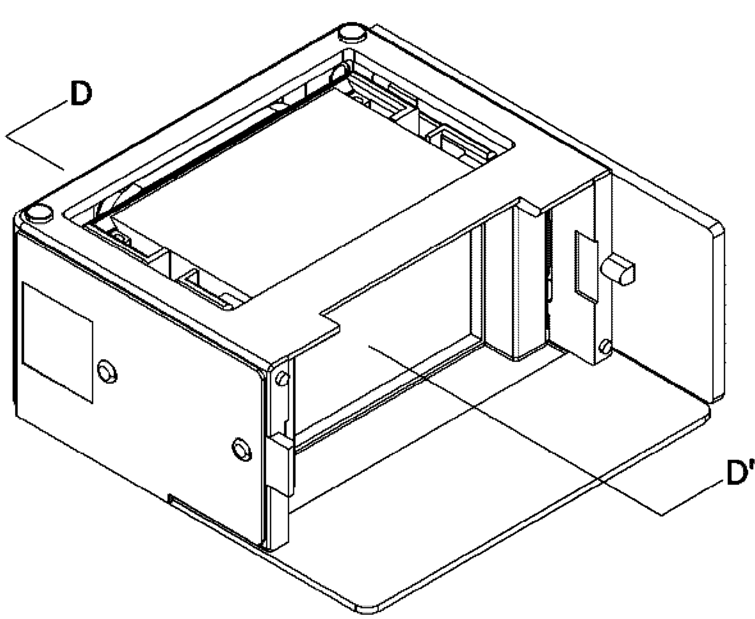

[FIG. 69]
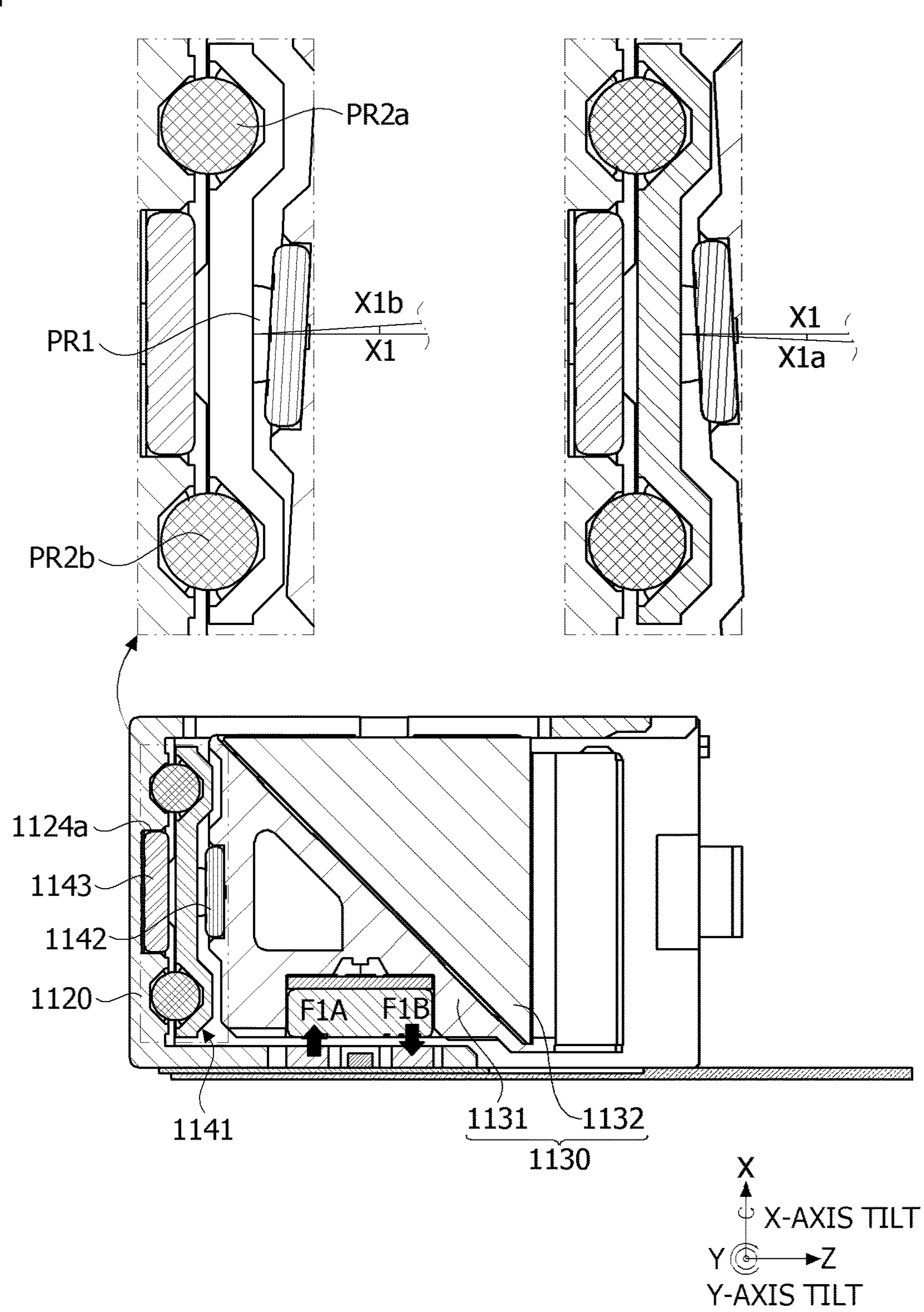

[FIG. 70]
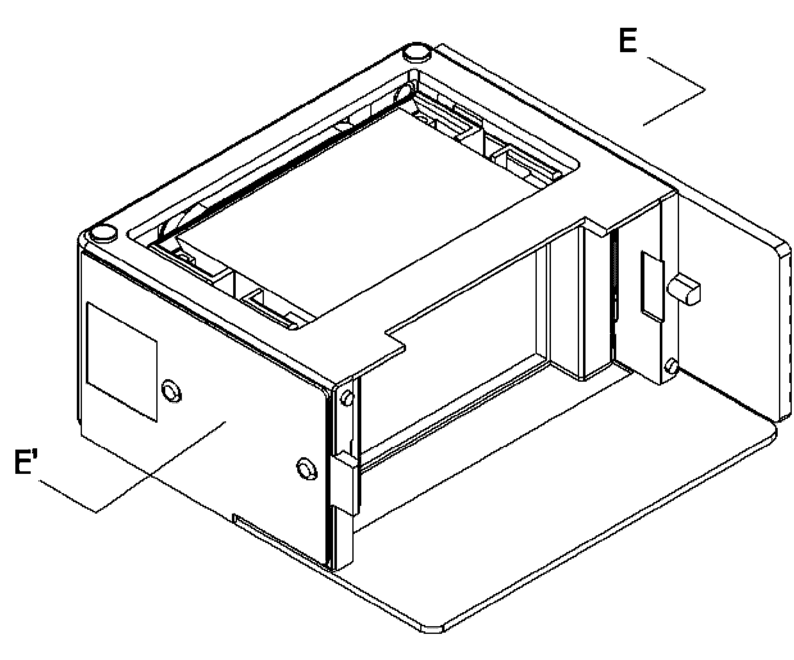
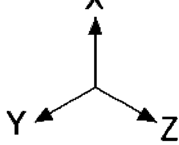

[FIG. 71]
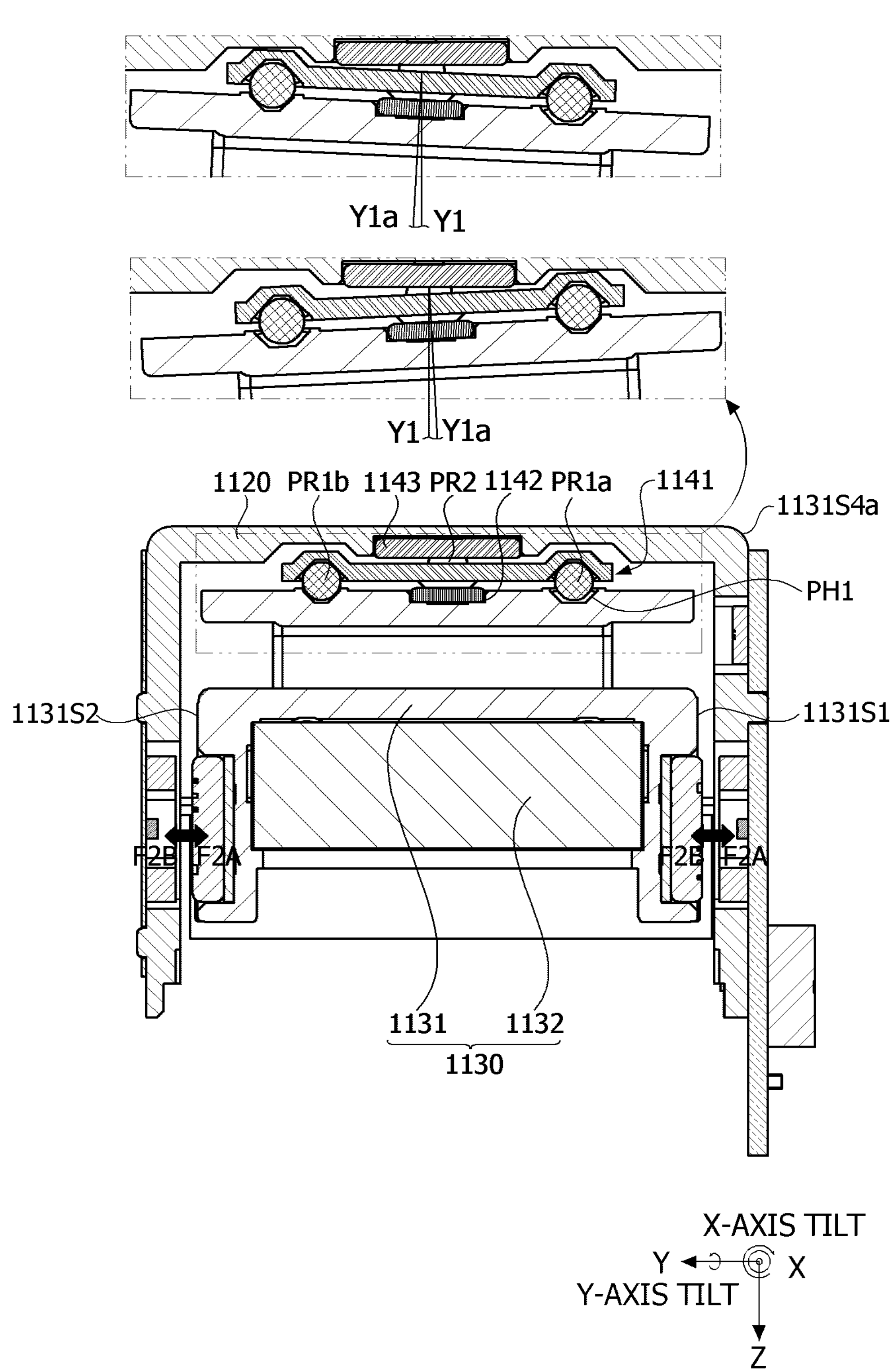

[FIG. 72]
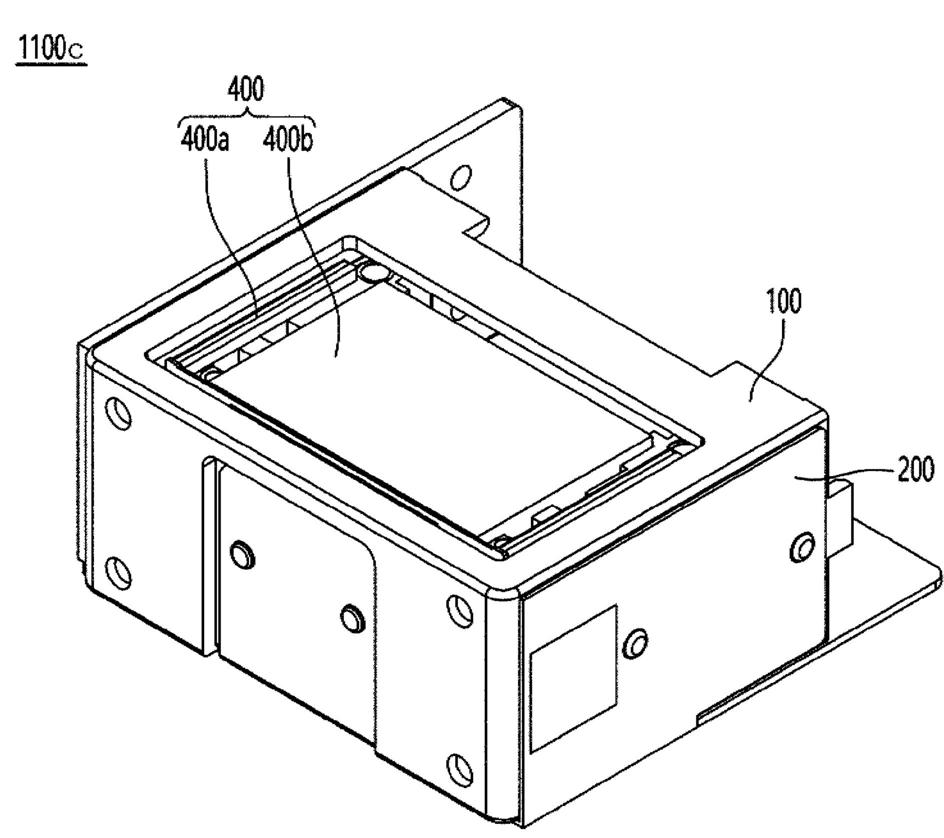

[FIG. 73]
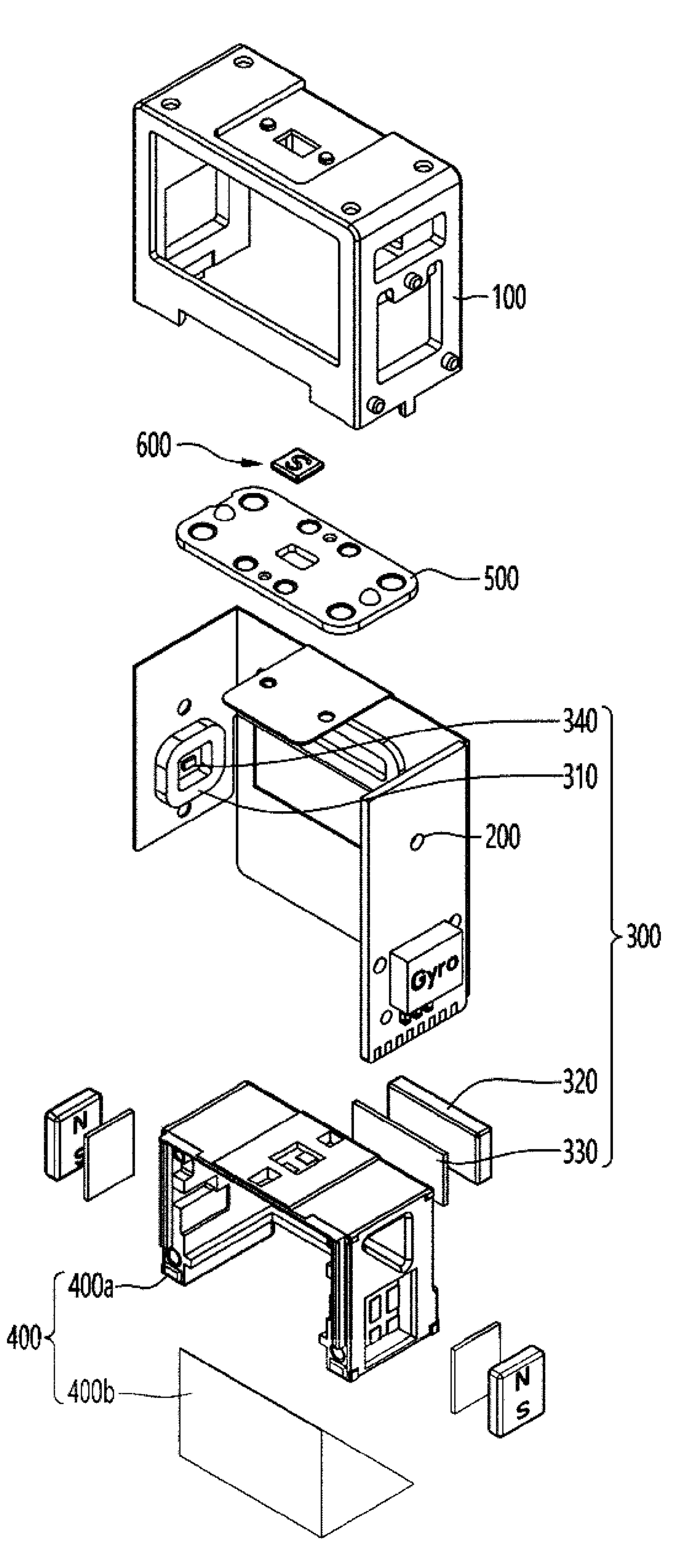

[FIG. 74]
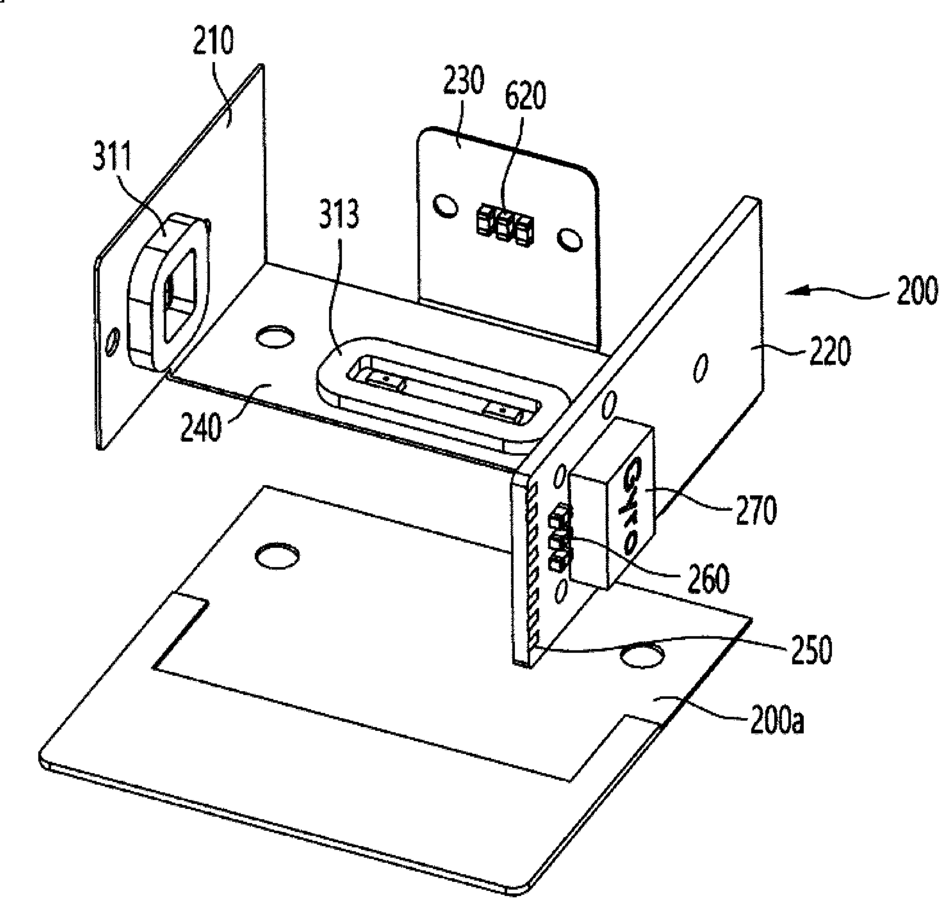

[FIG. 75]
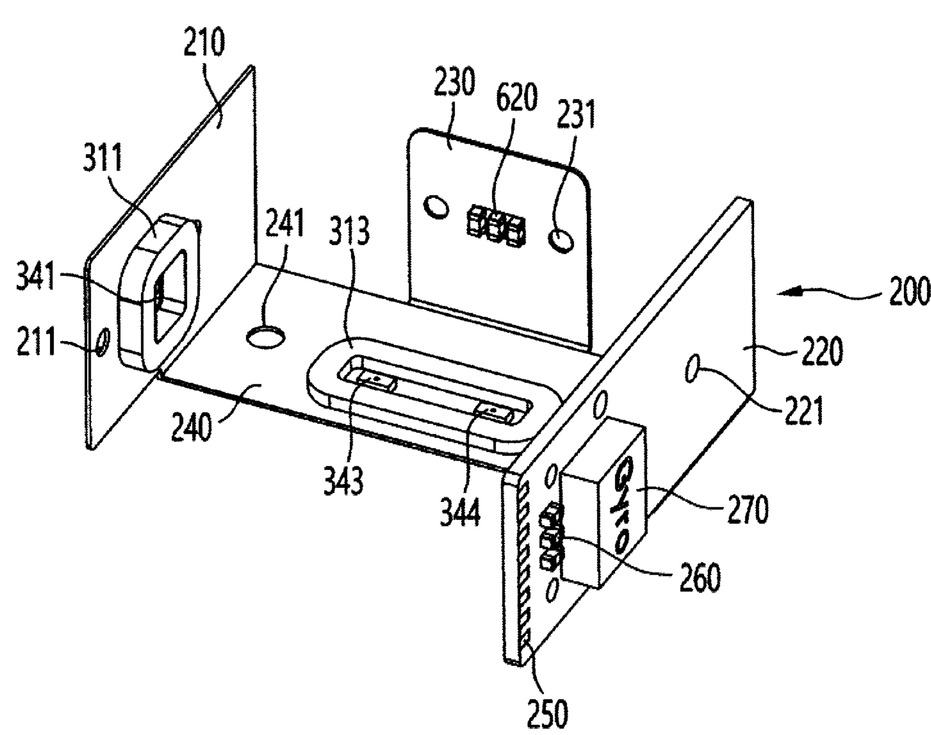
[FIG. 76]
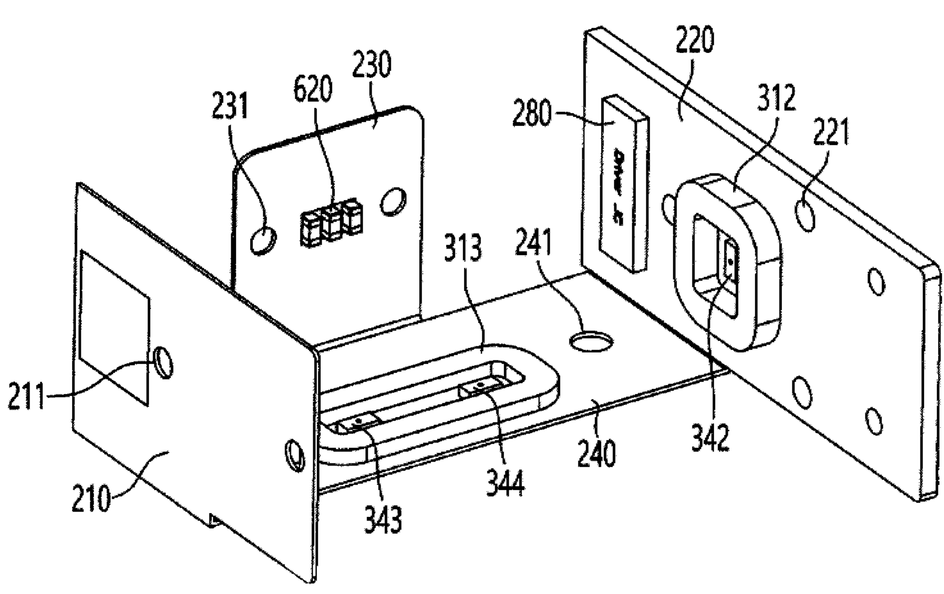

[FIG. 77]
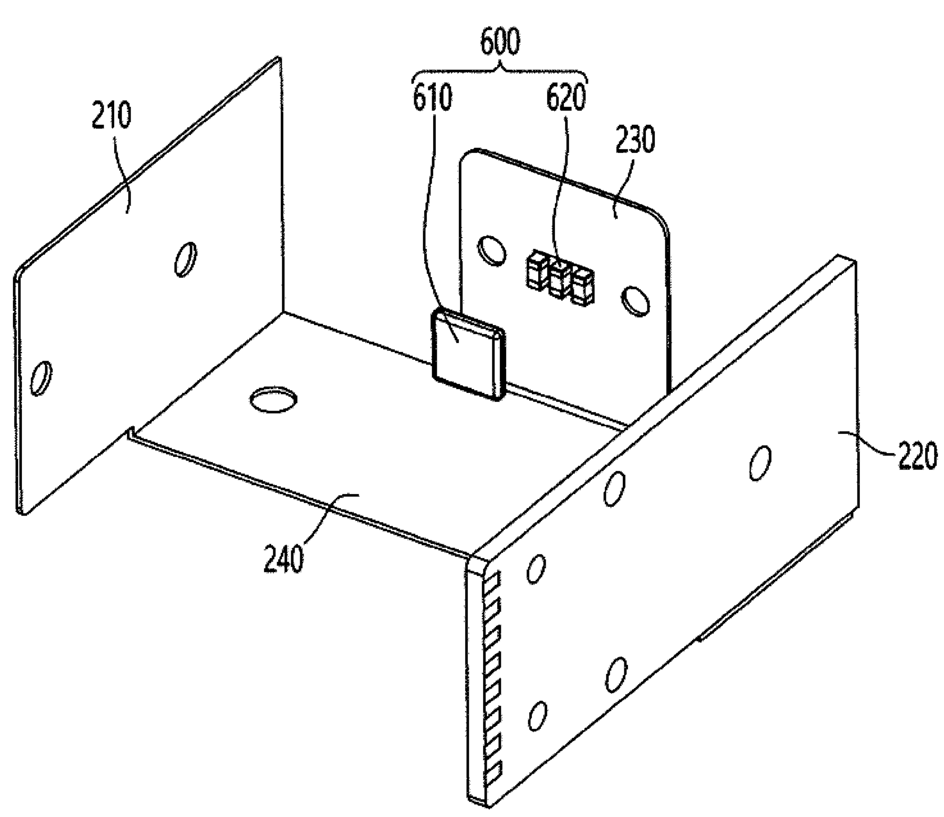
[FIG. 78]
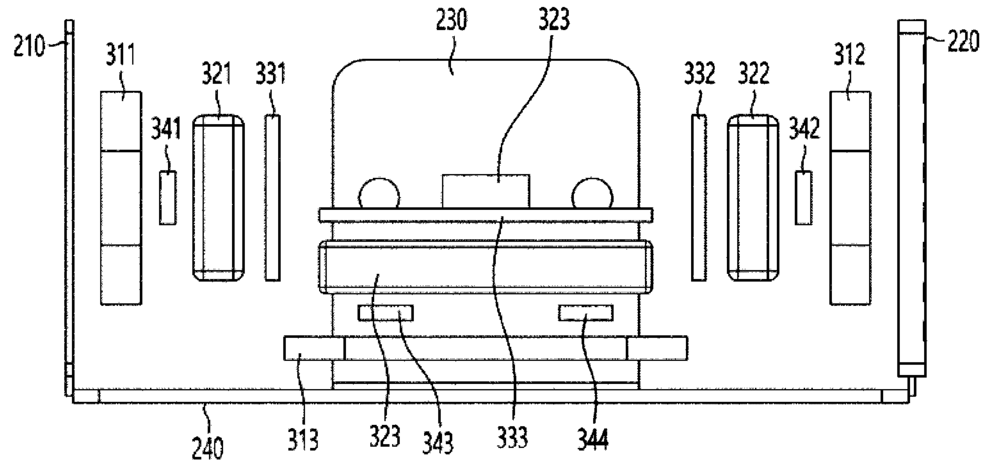

[FIG. 79]
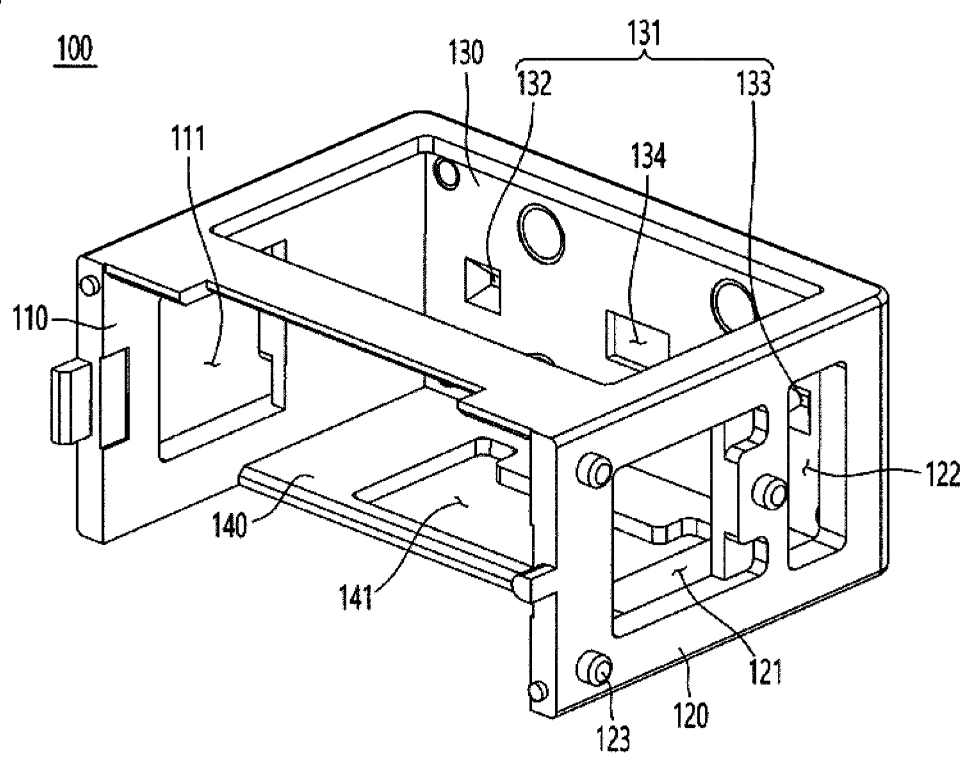
[FIG. 80]
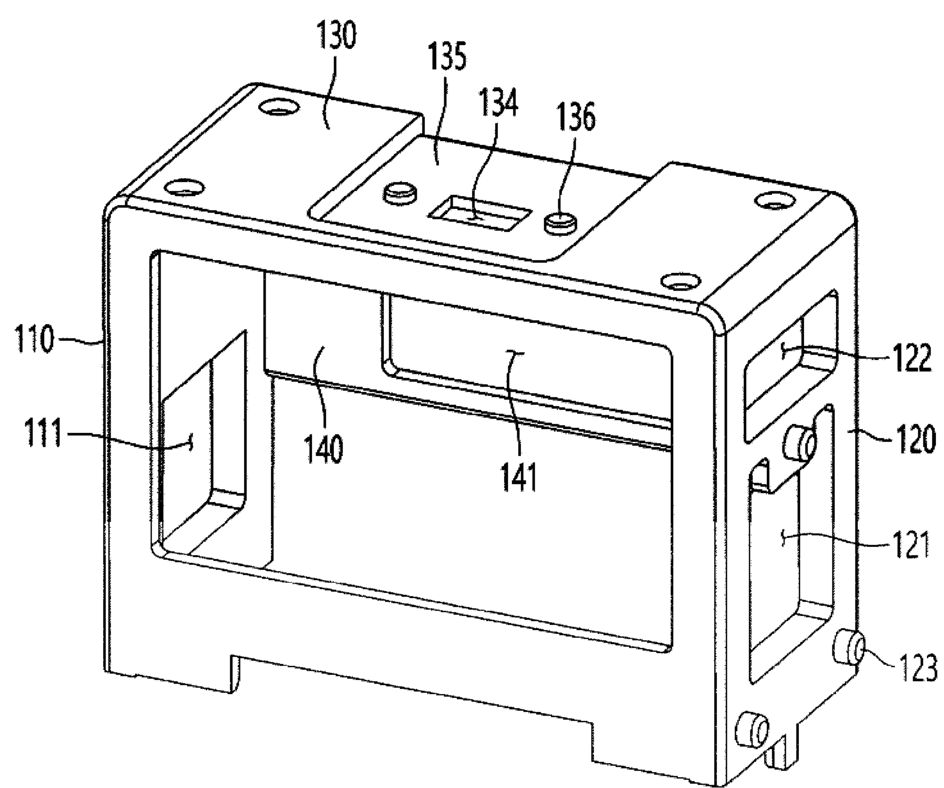

[FIG. 81]
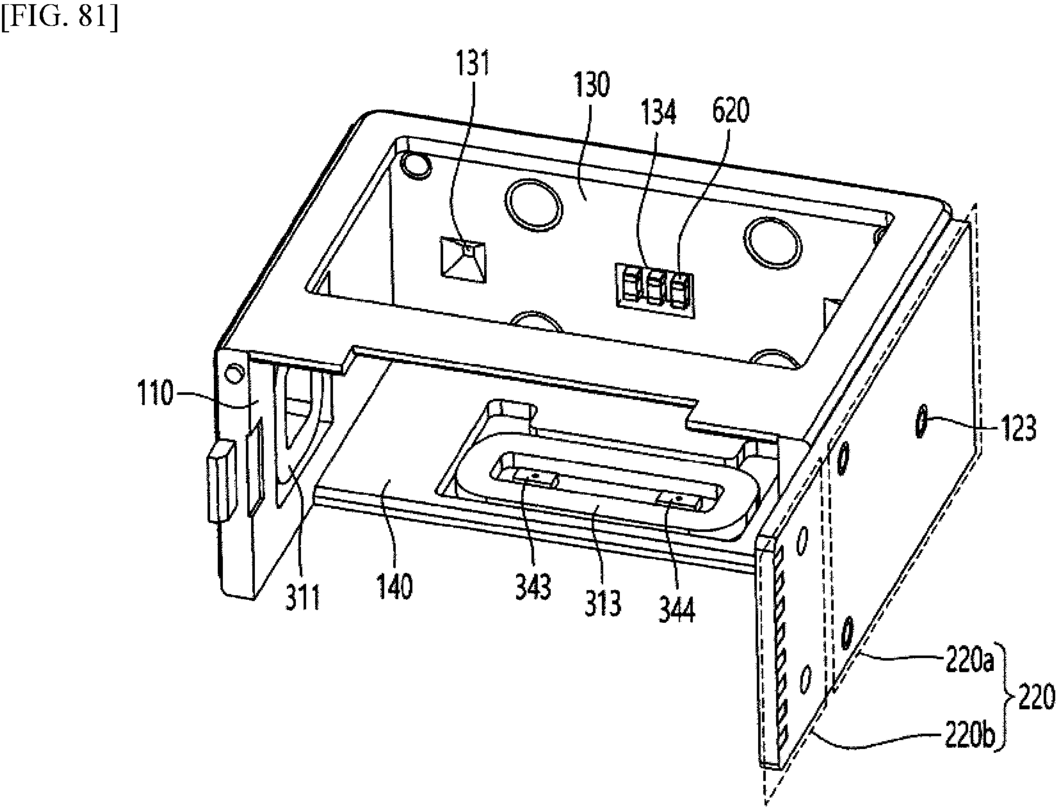

[FIG. 82]
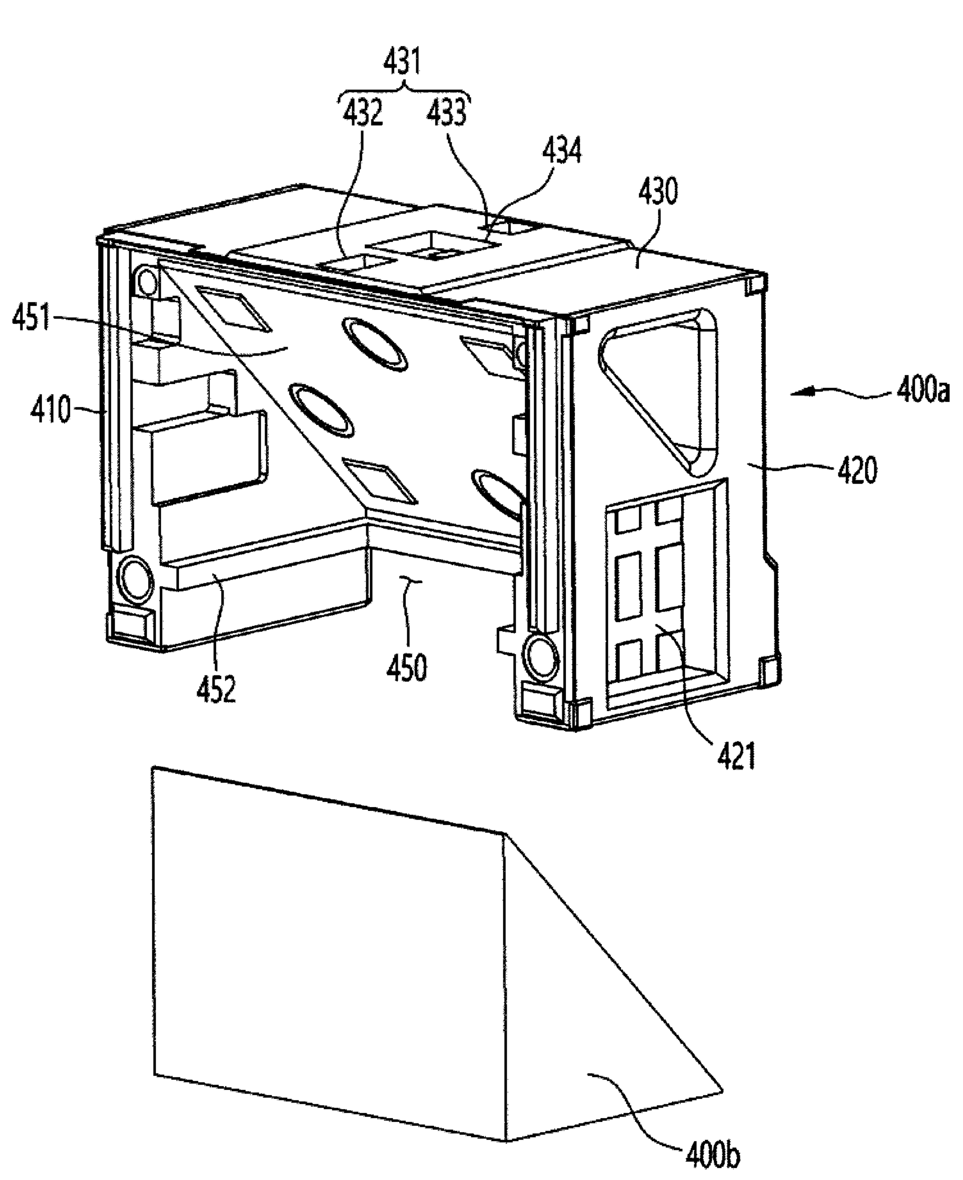

[FIG. 83]
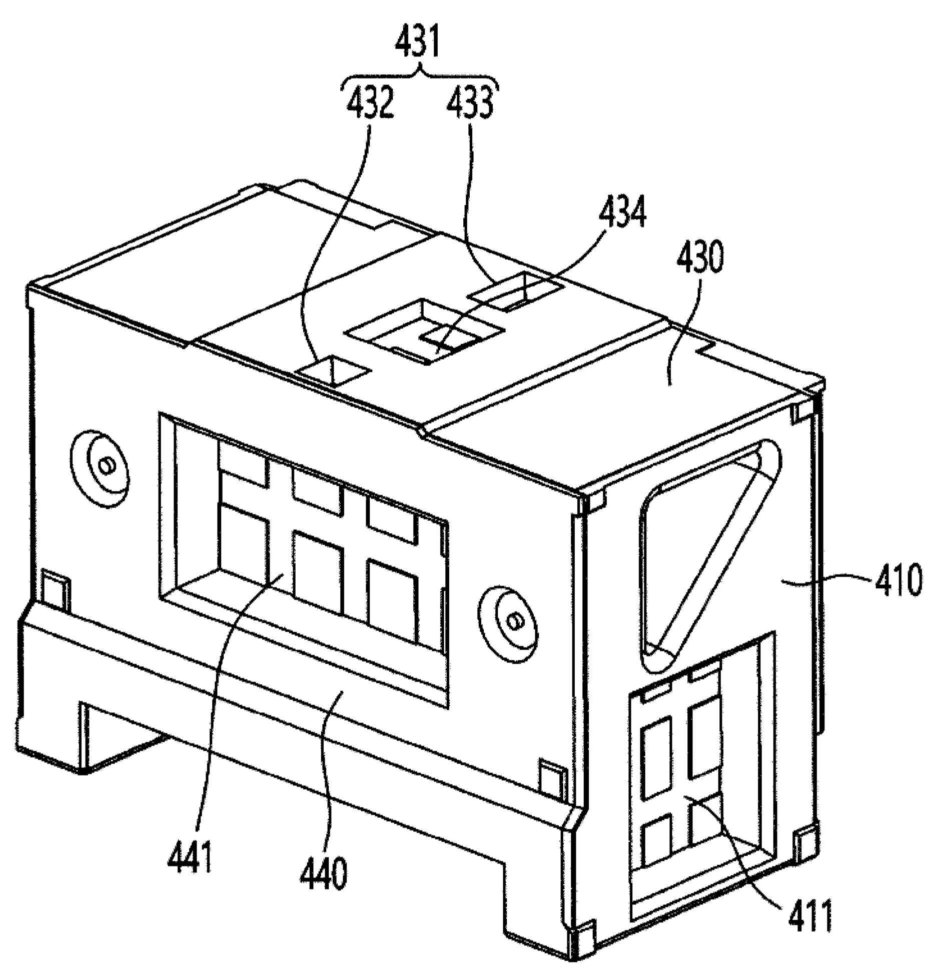

[FIG. 84]
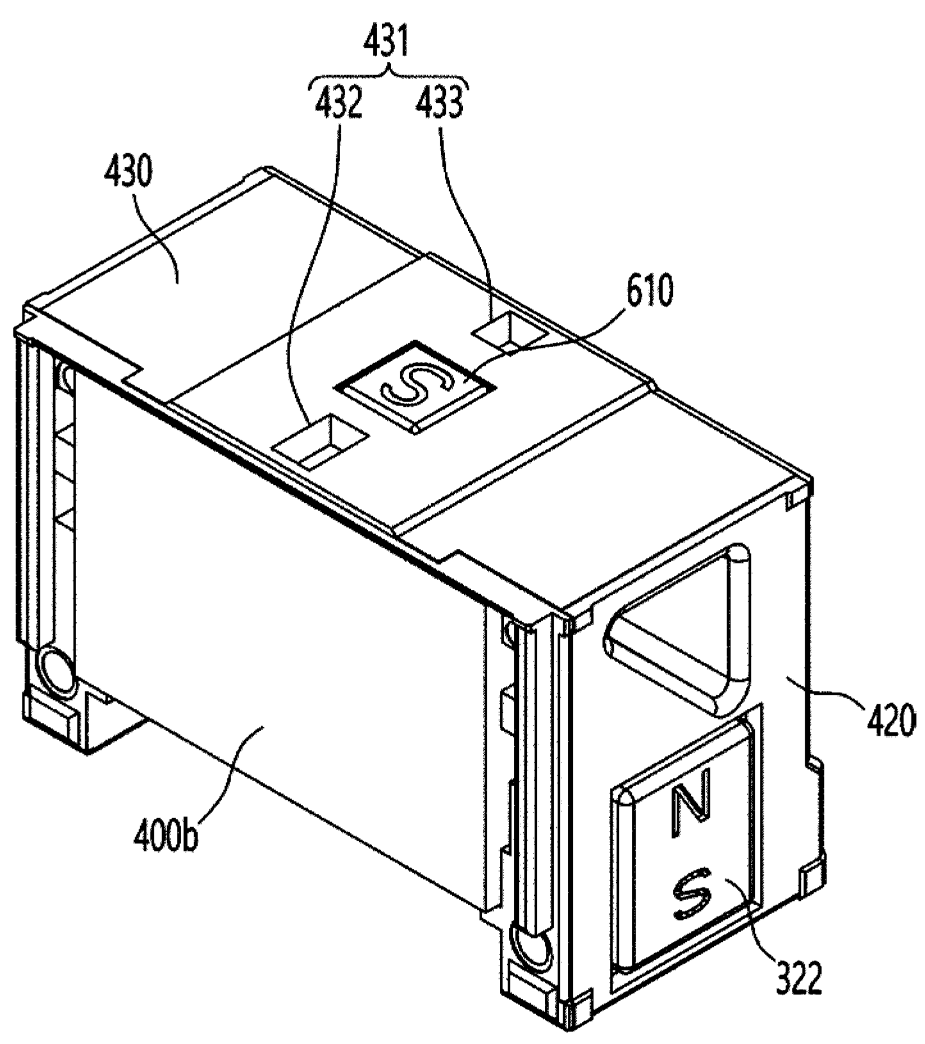

[FIG. 85]
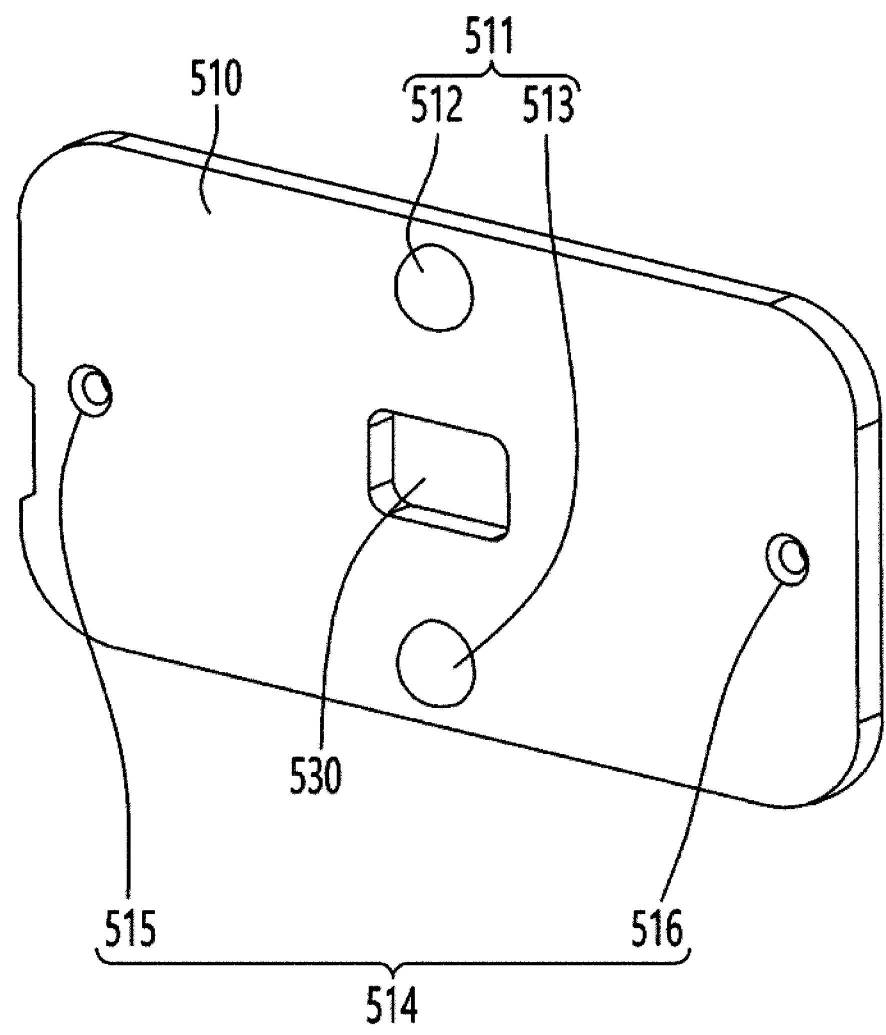

[FIG. 86]
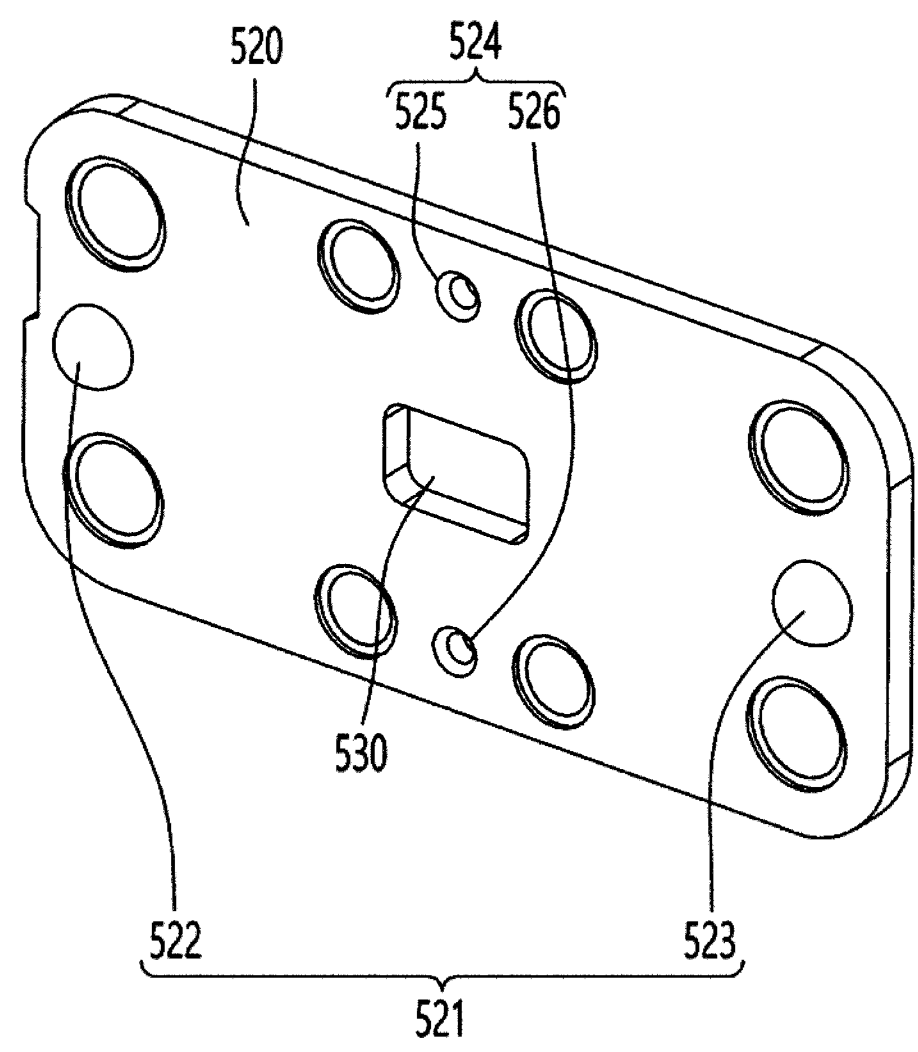

[FIG. 87]
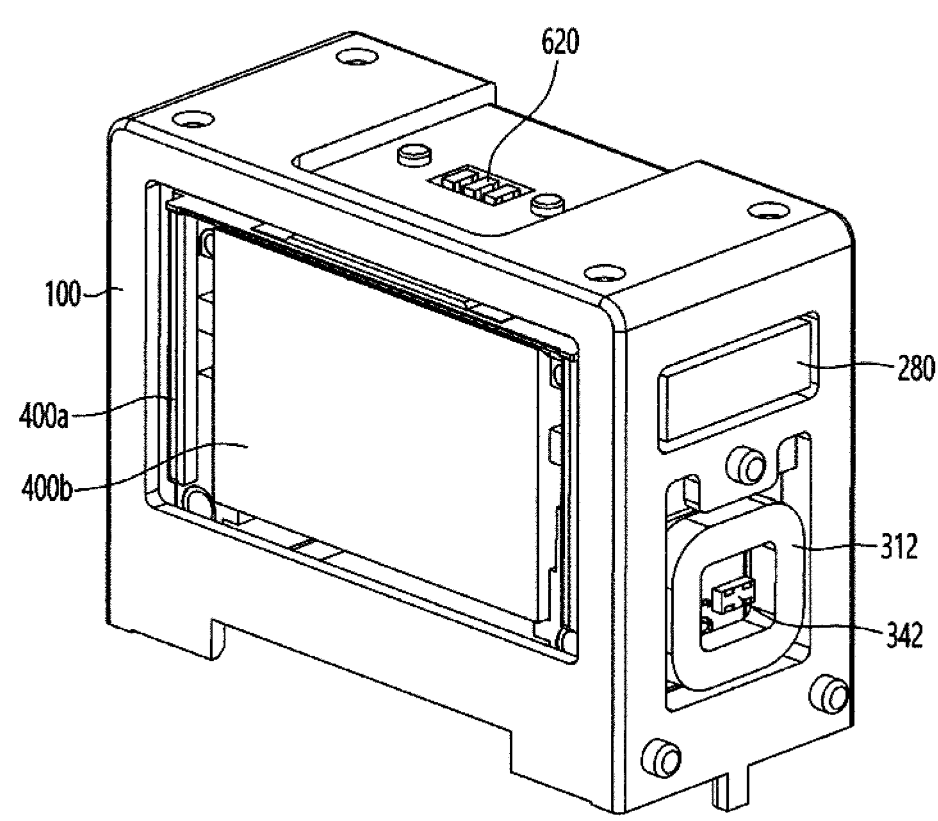
[FIG. 88]
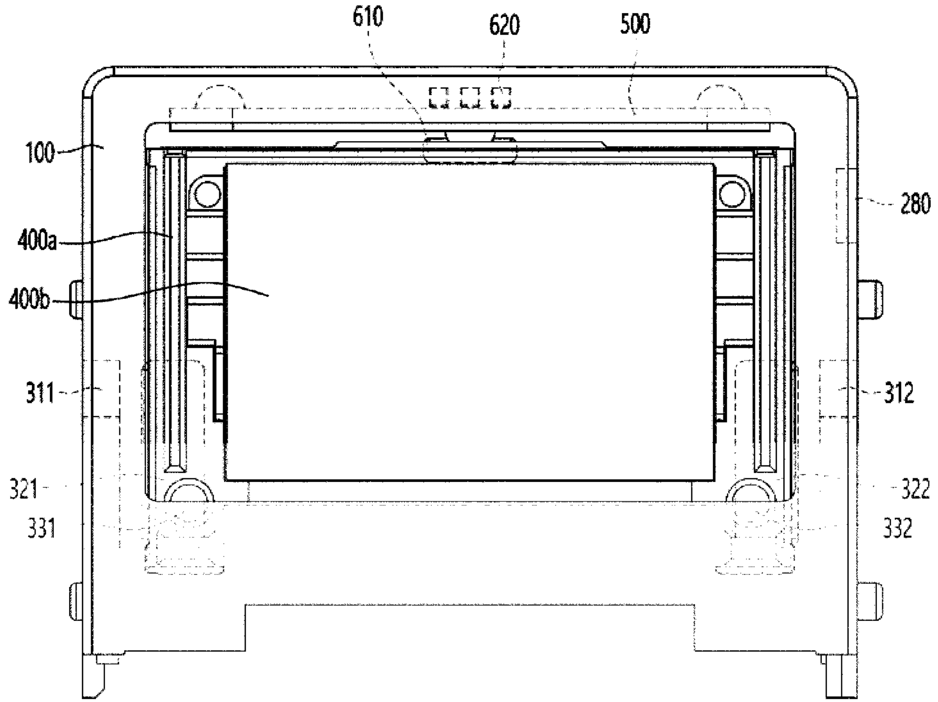

[FIG. 89]
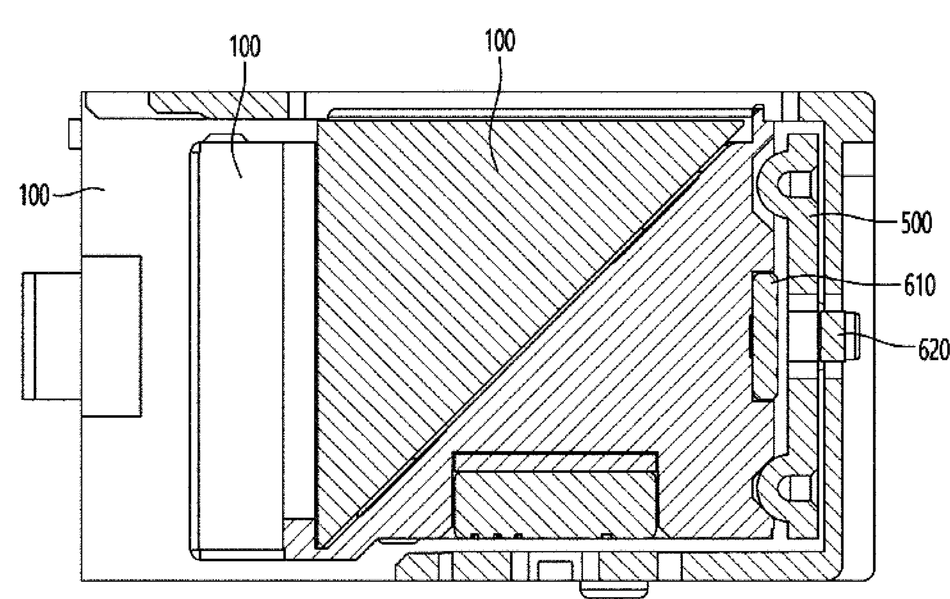
[FIG. 90]
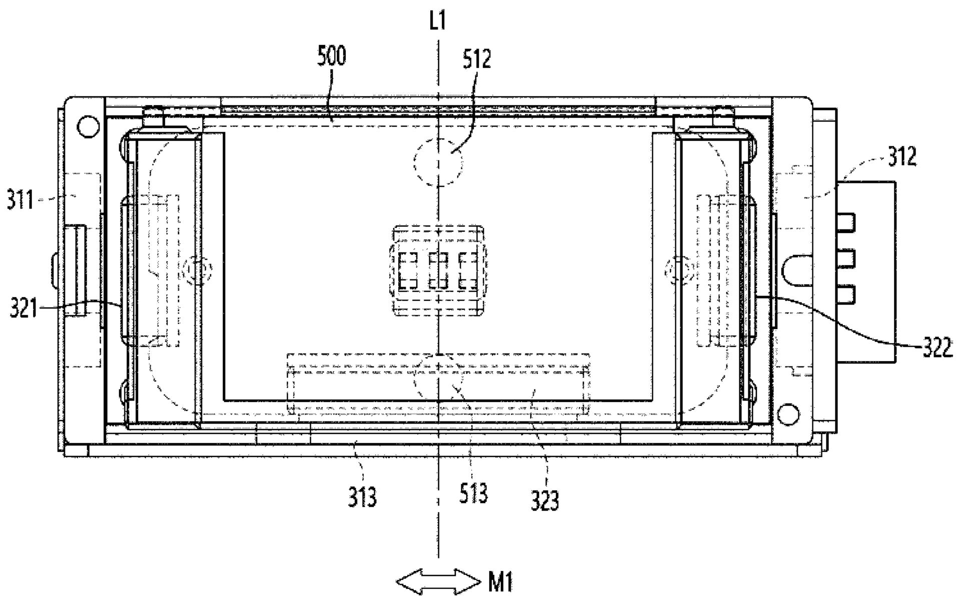

[FIG. 91]
522
500
512
523
311
312
M2
L2
321
322
313
513
323
[FIG. 92]
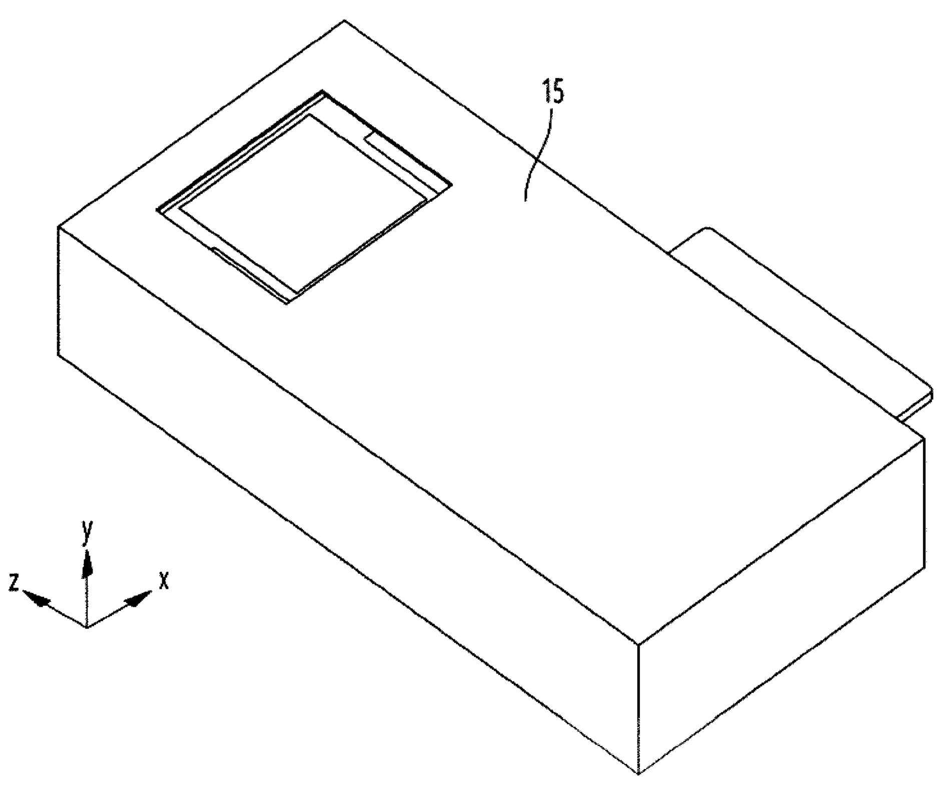

[FIG. 93]
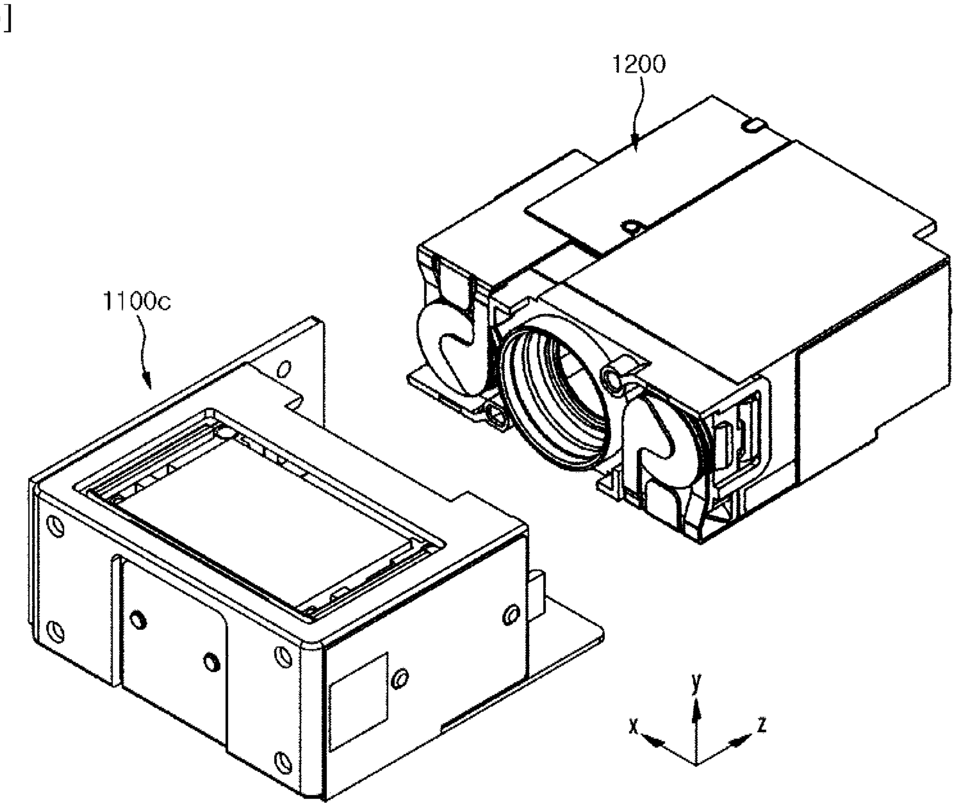

[FIG. 94]
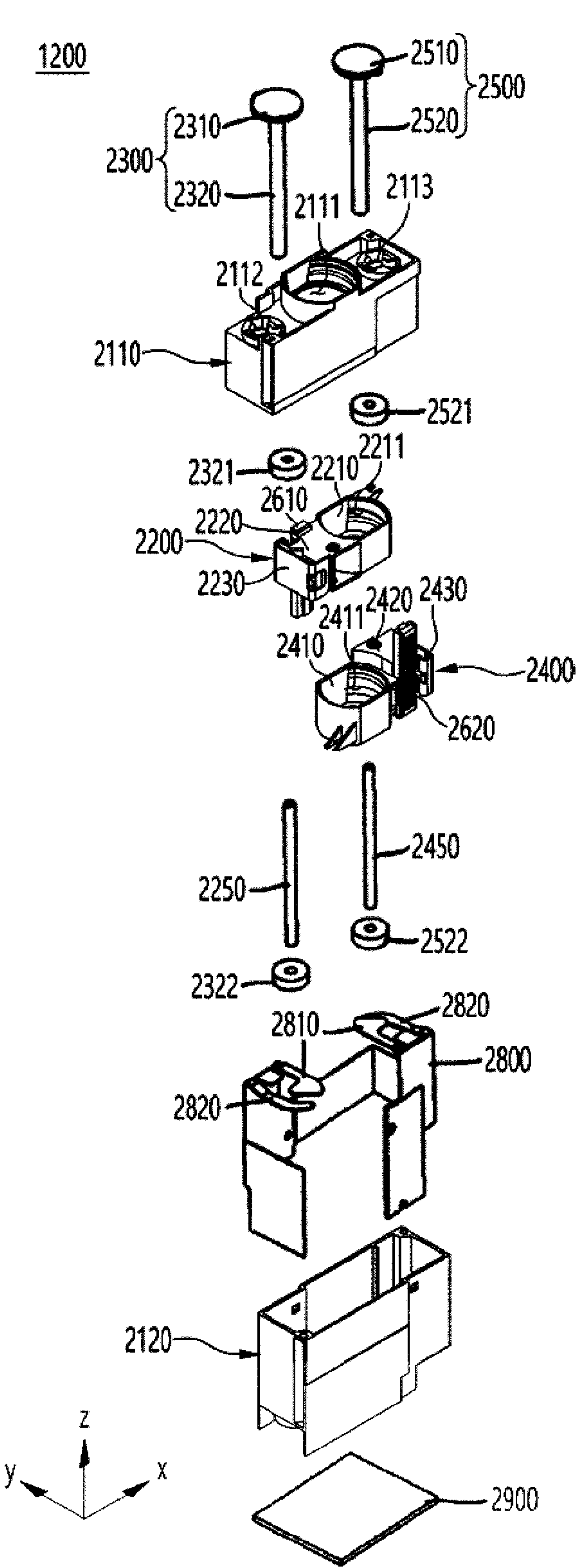

[FIG. 95]
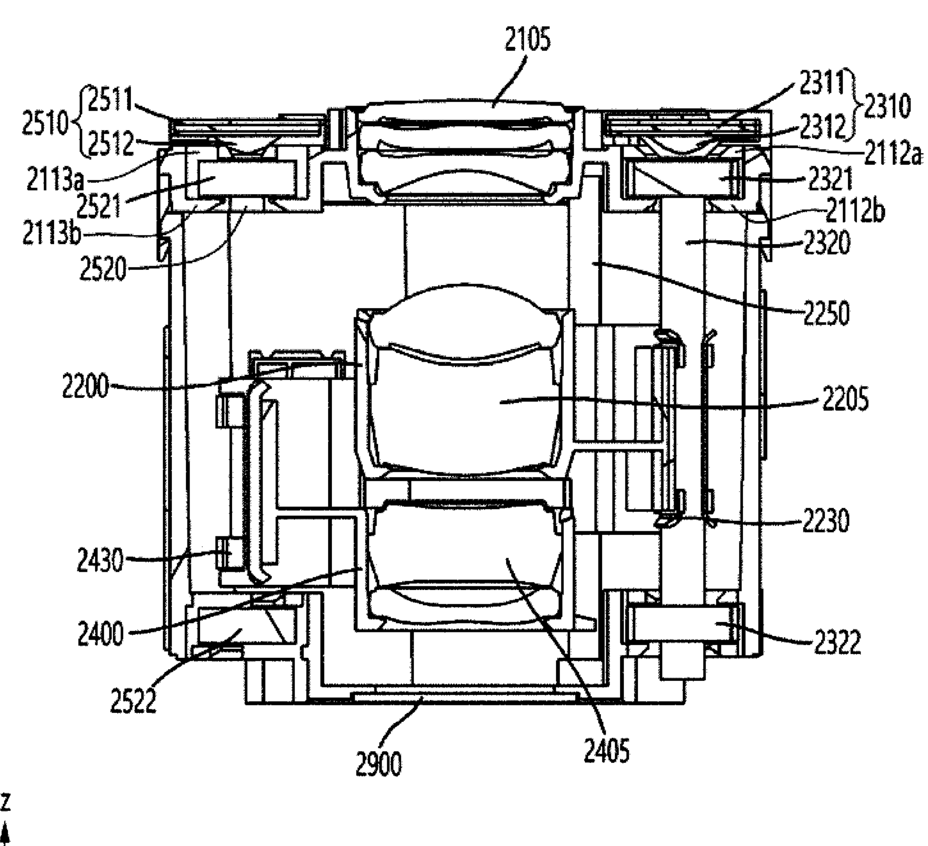
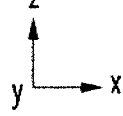
[FIG. 96]
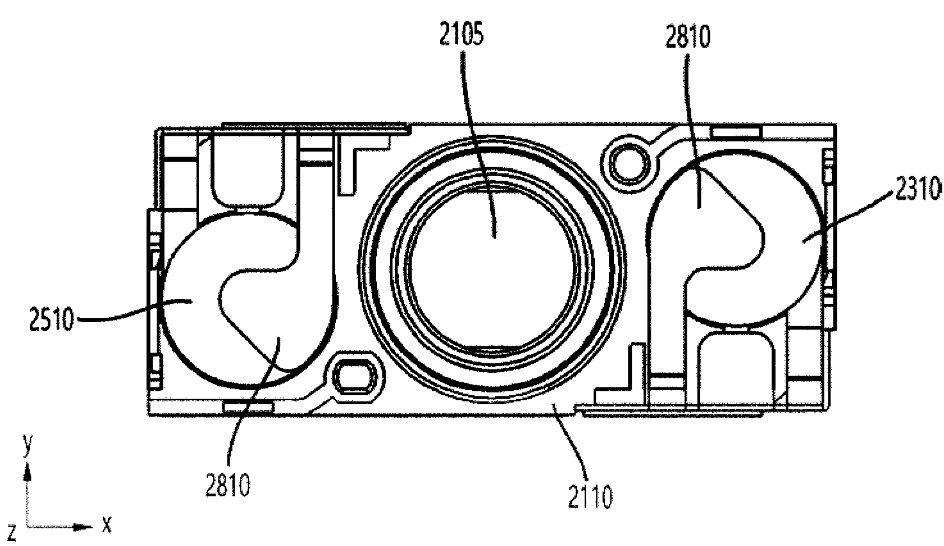

[FIG. 97]
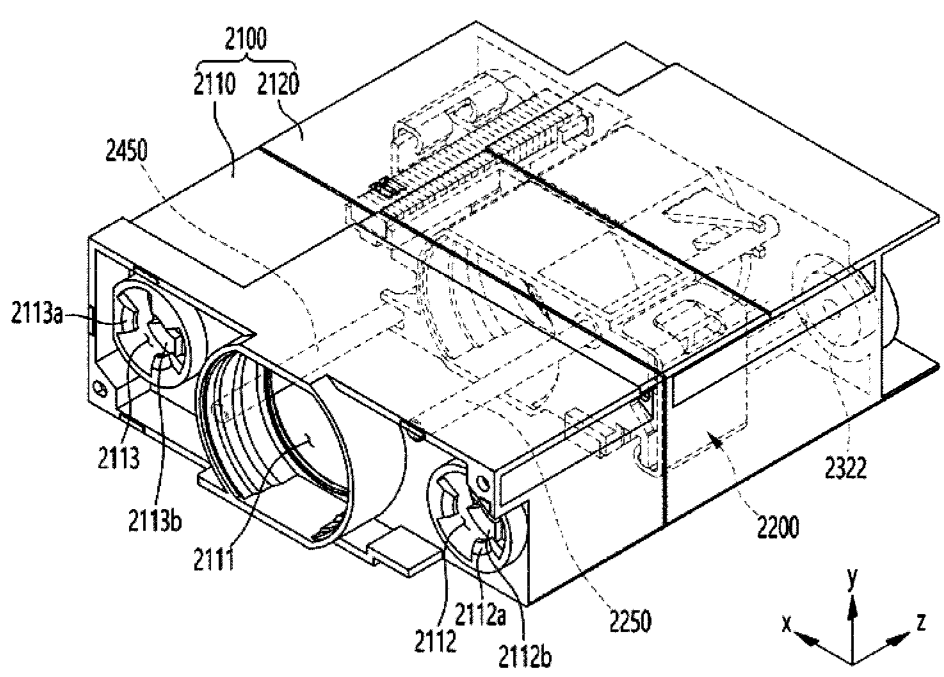
[FIG. 98]
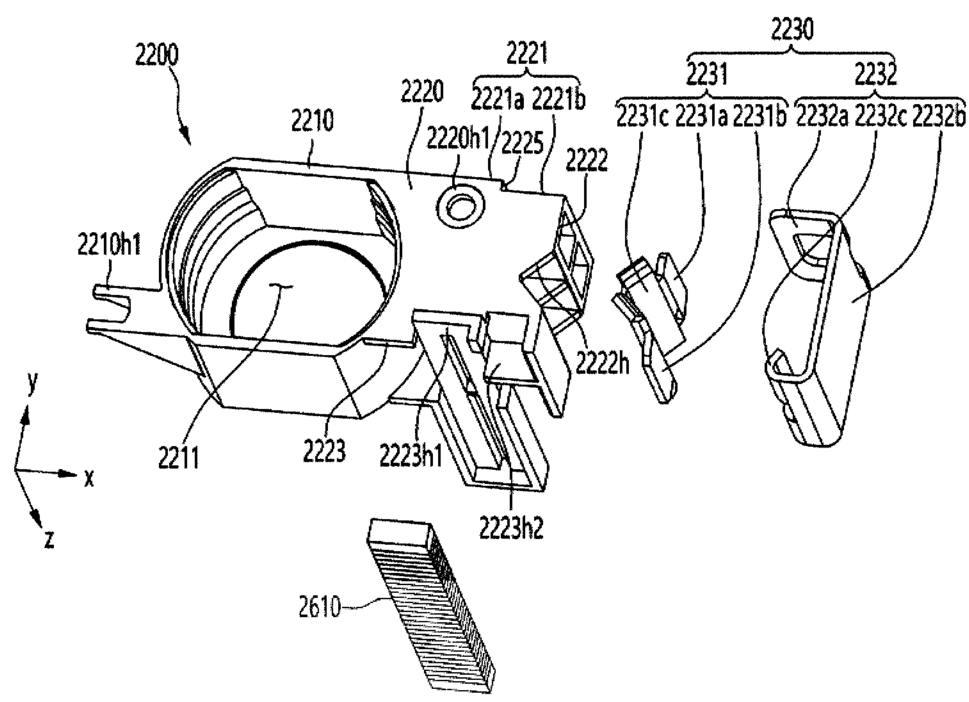

[FIG. 99]
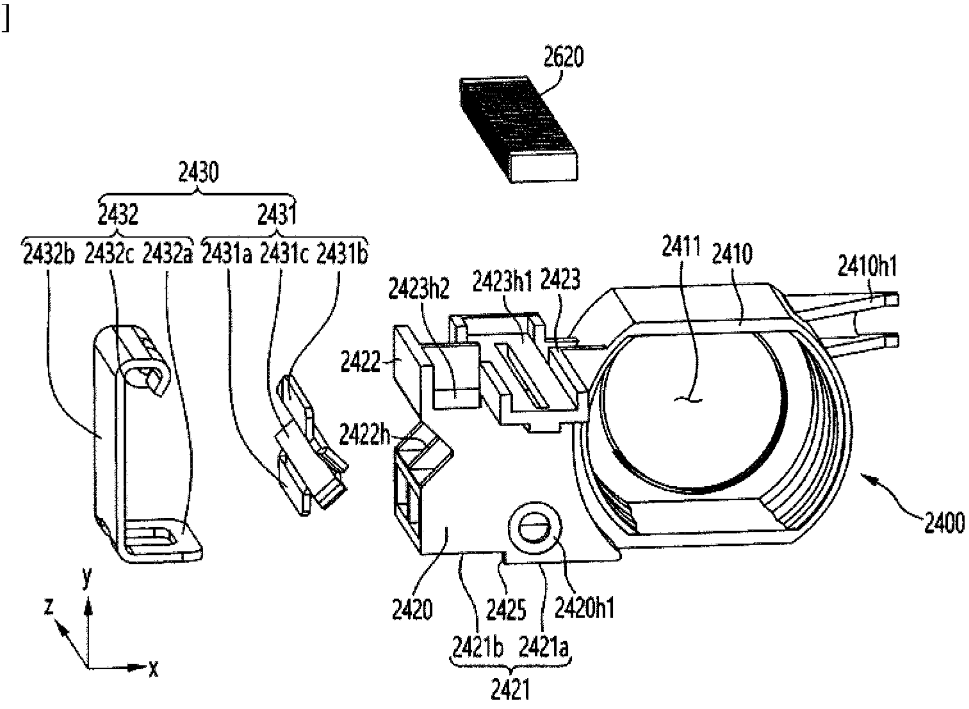
[FIG. 100]
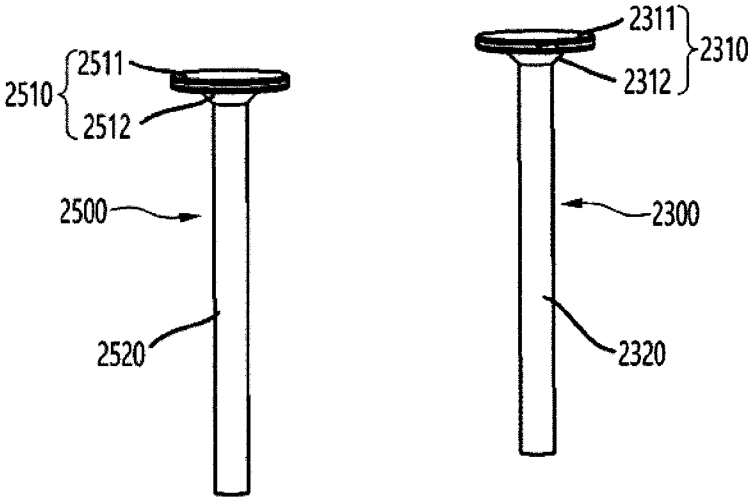

III

II'

III'

X

Z

Y

[FIG. 102]
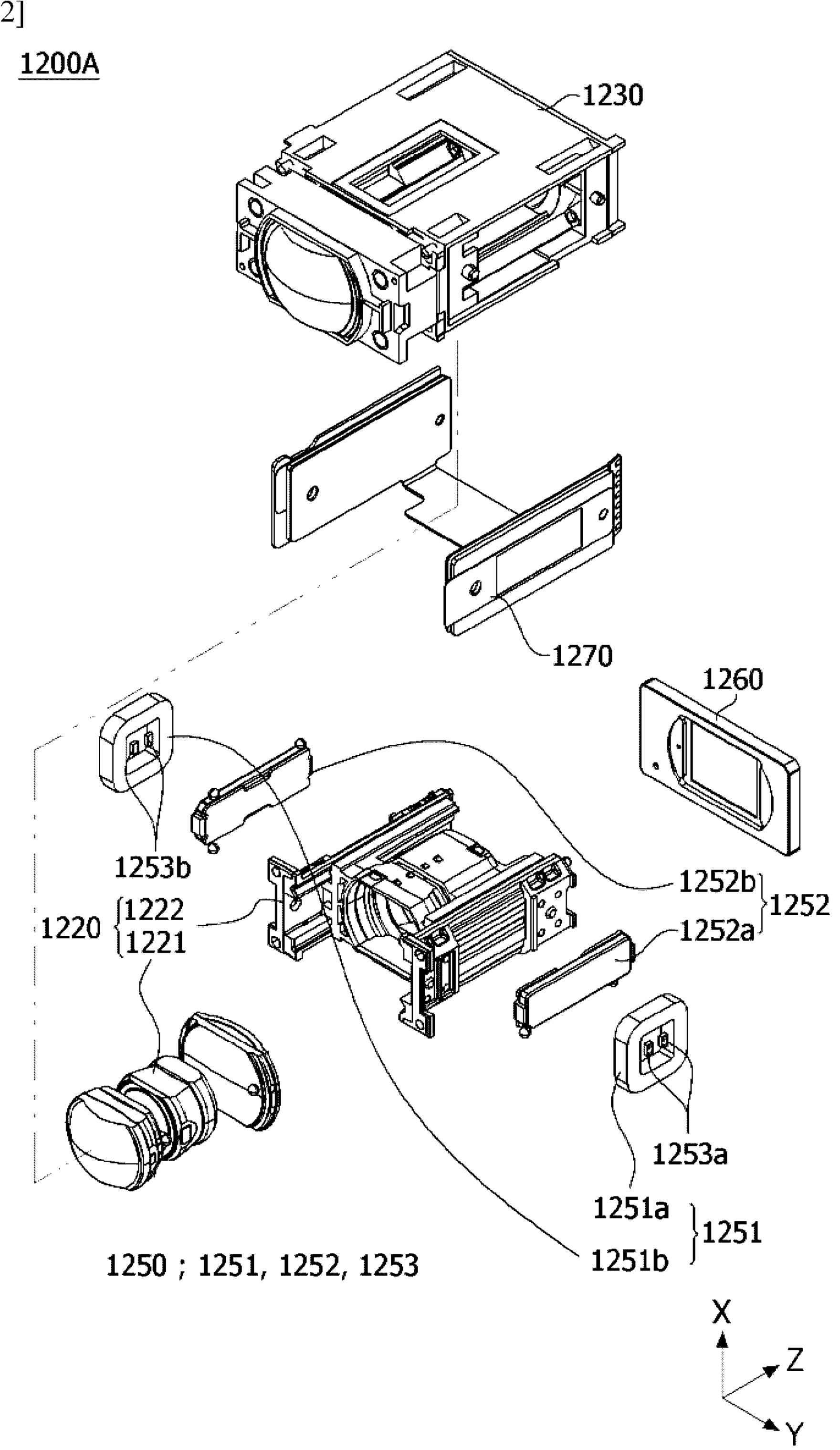

[FIG. 103]
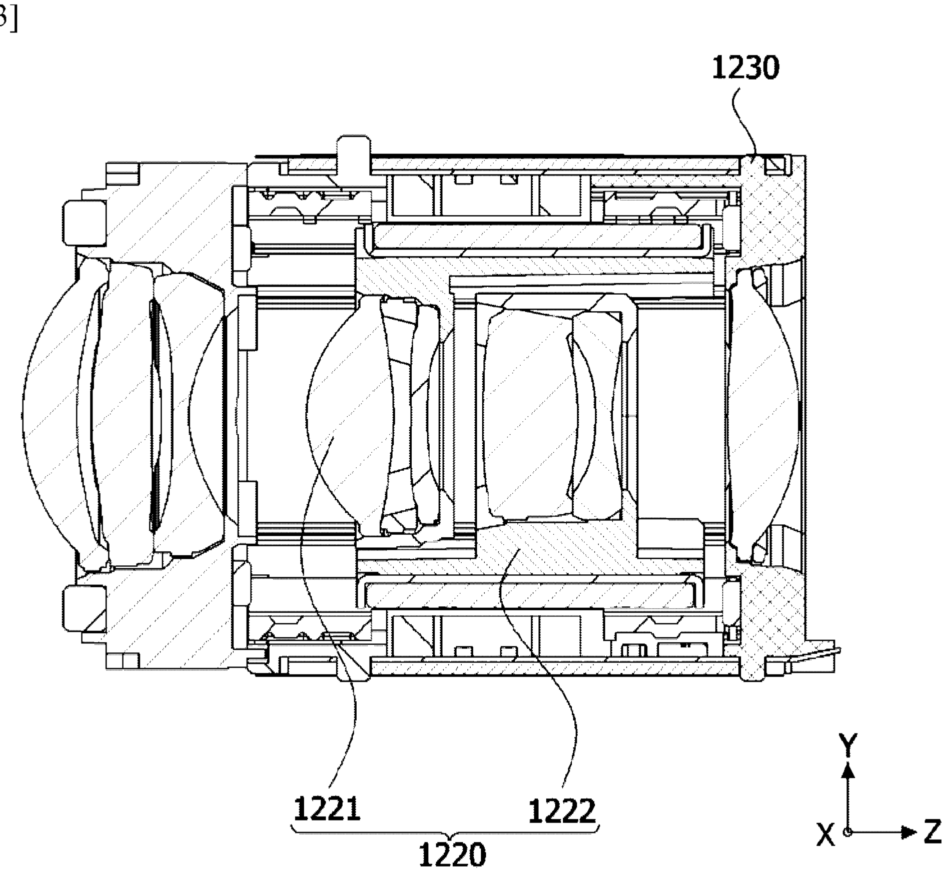

[FIG. 104]
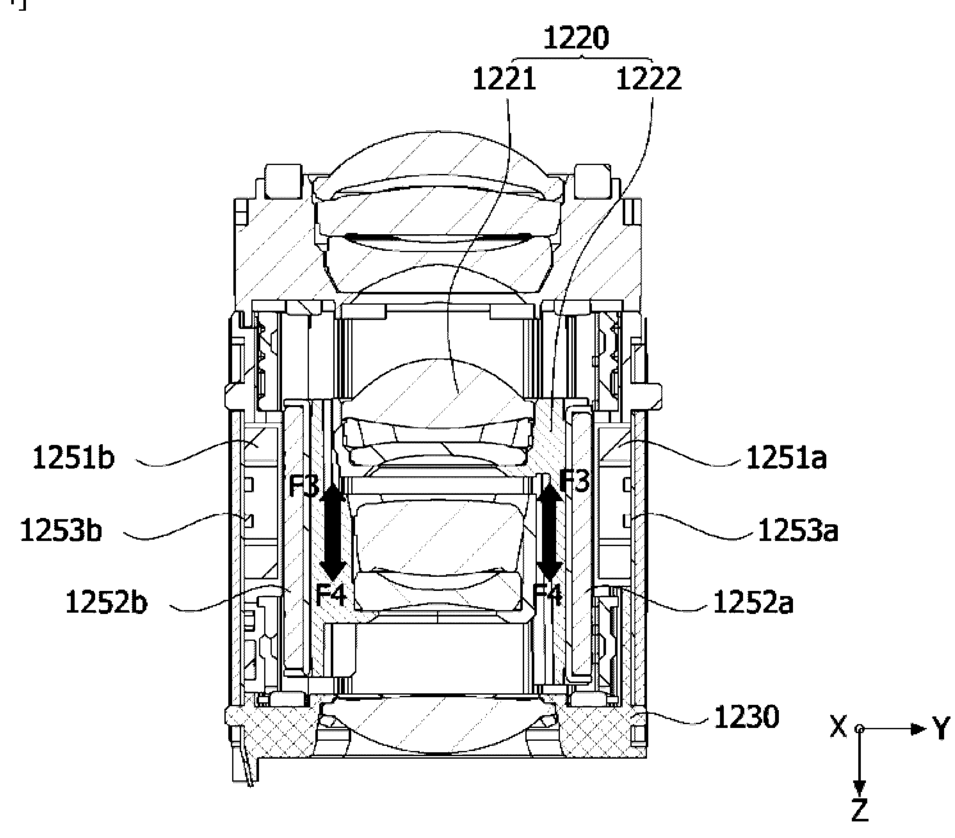
[FIG. 105]
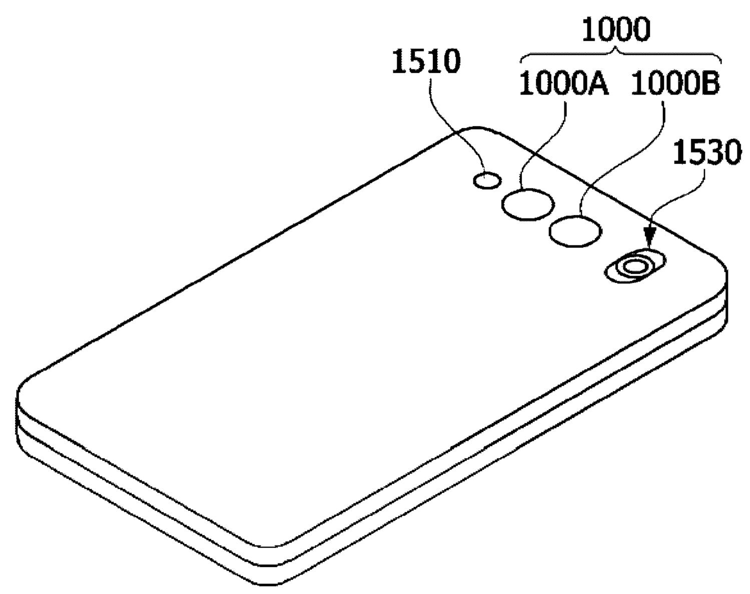

[FIG. 106]
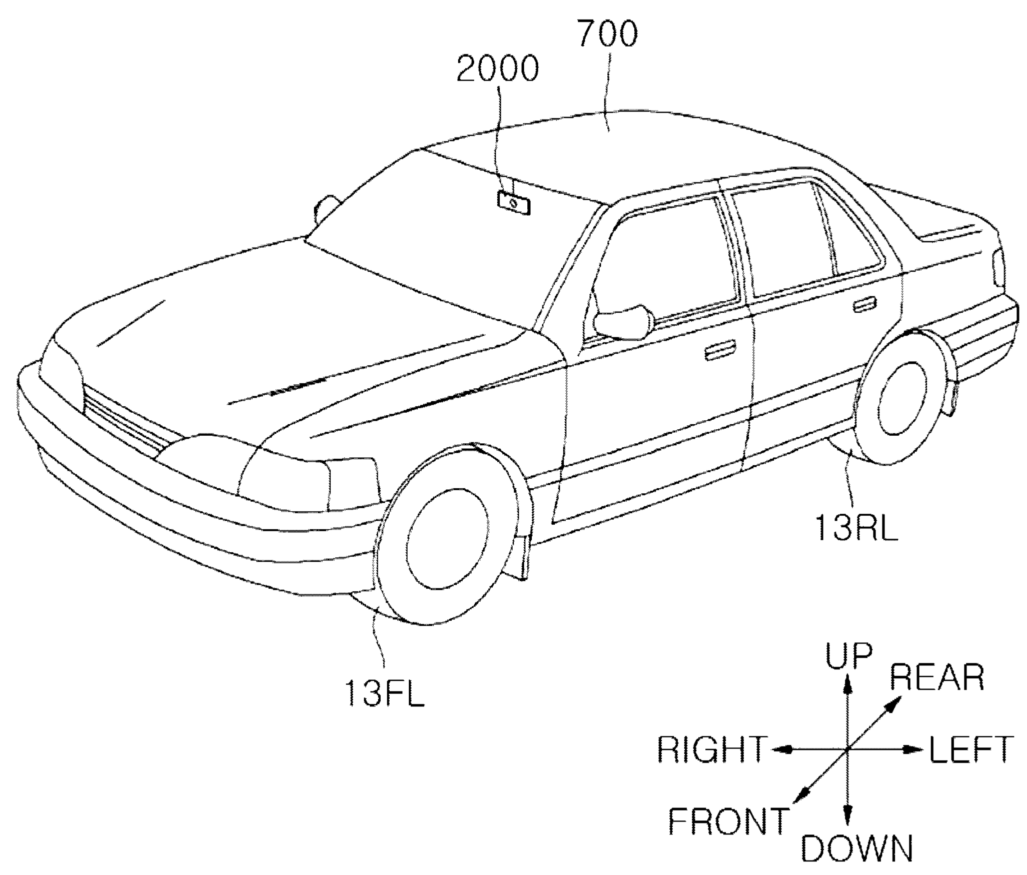

CAMERA ACTUATOR AND CAMERA MODULE COMPRISING SAME

CROSS REFERENCE TO RELATED APPLICATIONS

This application is the National Phase of PCT International Application No. PCT/KR2021/009376, filed on Jul. 21, 2021, which claims priority under 35 U.S.C. 119(a) to Patent Application Nos. 10-2020-0090548, filed in the Republic of Korea on Jul. 21, 2020; 10-2020-0118089, filed in the Republic of Korea on Sep. 15, 2020; 10-2020-0125656, filed in the Republic of Korea on Sep. 28, 2020; and 10-2021-0001527, filed in the Republic of Korea on Jan. 6, 2021, all of which are hereby expressly incorporated by reference into the present application.

TECHNICAL FIELD

The present invention relates to a camera actuator and a camera module including the same.

BACKGROUND ART

Cameras are devices for taking pictures or videos of subjects and are mounted on portable devices, drones, vehicles, or the like. A camera module may have an image stabilization (IS) function of correcting or preventing the image shake caused by the movement of a user in order to improve the quality of an image, an auto focusing function of aligning a focal length of a lens by automatically adjusting an distance between an image sensor and the lens, and a zoom function of capturing a remote subject by increasing or decreasing the magnification of the remote subject through a zoom lens.

Meanwhile, the greater the number of pixels in the image sensor, the higher the resolution and the smaller the size of each pixel, but the smaller the pixels, the less the amount of light received in the same period of time. Therefore, as the number of pixels of the camera increases, the image shake caused by hand shaking occurring when a shutter speed is decreased in a dark environment may more severely occur. As a representative image stabilization (IS) technique, there is an optical image stabilizer (OIS) technique of correcting motion by changing a path of light.

According to the general OIS technique, the motion of the camera may be detected through a gyro sensor or the like, and a lens may be tilted or moved based on the detected motion, or a camera module including a lens and an image sensor may be tilted or moved. When the lens or the camera module including the lens and the image sensor is tilted or moved for OIS, it is necessary to additionally secure a space for tilting or moving around the lens or the camera module.

Meanwhile, an actuator for OIS may be disposed around the lens. In this case, the actuator for OIS may include actuators responsible for tilting about two axes perpendicular to a Z-axis, which is an optical axis, i.e., an actuator responsible for X-axis tilting and an actuator responsible for Y-axis tilting.

However, according to the needs of ultra-slim and ultra-small camera modules, there is a large space constraint for arranging the actuator for OIS, and it may be difficult to secure a sufficient space where the lens or the camera module itself including the lens and the image sensor may be tilted or moved for OIS. In addition, as the number of pixels in the camera increases, it is preferable that a size of the lens be increased to increase the amount of received light, but there may be a limit to increasing the size of the lens due to a space occupied by the actuator for OIS.

In addition, when a zoom function, an AF function, and an OIS function are all included in the camera module, there is also a problem that an OIS magnet and an AF or zoom magnet are disposed close to each other to cause magnetic field interference.

In addition, reliability problems exist, such as damage to internal components due to impact according to a tilt.

Meanwhile, in the related art, a magnet and a yoke are used as a pulling member. However, in the case of the pulling member composed of the magnet and the yoke, when center positions of the magnet and the yoke are misaligned from each other, this causes an external force, and thus there is a problem in that a mover on which a reflective member is disposed may not accurately move to a desired position.

In addition, in the camera module, various electronic components for OIS control are mounted on a board. In this case, among the electronic components, there are also electronic components formed of a magnetic substance. Therefore, conventionally, in addition to an attractive force between the magnet and the yoke, an additional attractive force is generated between the magnet and the electronic component formed of the magnetic substance, and there is a problem in that the mover may not be accurately controlled to the desired position due to the additional attractive force generated.

Therefore, there is a need for a new camera module capable of solving the above problems.

Technical Problem

The present invention is directed to providing a camera actuator having improved reliability by suppressing the separation of an optical member through a groove in a mover.

In addition, the present invention is directed to providing a camera actuator having an improved coupling force and improved impact reliability.

In addition, the present invention is directed to providing a camera actuator applicable to ultra-slim, ultra-small, and high-resolution cameras.

In addition, the present invention is directed to providing a camera actuator, which secures a phase margin for a tilt and minimizes a change in moment due to a posture difference by positioning a center of gravity to be adjacent to a rotational axis or a rotational surface.

In addition, the present invention is directed to providing a camera actuator having improved energy efficiency for rotation driving.

In particular, the present invention is directed to providing a camera actuator, which suppresses damage to a prism by specifying a position of a mover to prevent the separation of a tilting guide unit.

Embodiments provide a camera actuator and a camera module including the same, which may use an electronic component included in a camera module as a pulling member.

In addition, embodiments provide a camera actuator and a camera module including the same, which can minimize interference between an electronic component formed of a magnetic substance and a magnet used as a pulling member.

In addition, embodiments are directed to providing a camera actuator and a camera module, which may have improved optical characteristics.

In addition, embodiments are directed to providing a camera actuator and a camera module, which may effectively control vibrations caused by hand shaking.

In addition, embodiments are directed to providing a camera actuator and a camera module, which may be implemented in a small size due to a small volume.

In addition, embodiments are directed to providing a camera actuator and camera module having improved auto focus and high magnification zoom functions.

In addition, embodiments are directed to providing a camera actuator and a camera module, which can prevent problems such as de-center, tilt, and friction occurring when a lens group moves.

The objects of the embodiments are not limited to the above-described objects, and other objects that are not mentioned will be clearly understood by those skilled in the art to which the present invention pertains from the following description.

Technical Solution

A camera actuator according to an embodiment of the present invention includes a housing, a mover disposed in the housing and including an optical member and a holder in which the optical member is disposed, a tilting guide unit configured to guide the tilting of the mover, and a drive unit disposed in the housing and configured to drive the mover, wherein the holder includes an accommodating groove in which the optical member is disposed, and a groove is formed in a bottom surface of the accommodating groove.

The bottom surface may include a first face region vertically overlapping the optical member inside the groove and a second face region vertically overlapping the optical member outside the groove, and an area of the first face region may be greater than an area of the second face region.

The holder may further include a seating protrusion disposed on the bottom surface outside the groove.

The first face region may be spaced apart by a predetermined distance from the optical member.

The holder may include a first holder stopper and a second holder stopper extending upward from an upper surface of the holder.

The first holder stopper may be disposed to be spaced apart from the second holder stopper along an optical axis.

The second holder stopper may be disposed closer to the tilting guide unit than the first holder stopper.

The housing may include a housing side portion disposed on an upper portion of the holder and including a housing hole.

The first holder stopper may at least partially overlap an upper surface of the housing in a vertical direction.

The second holder stopper may vertically overlap the housing hole.

The camera actuator may further include a bonding member disposed between the first holder stopper and the groove.

An upper surface of the second holder stopper may be positioned above the optical member.

At least a portion of the optical member may be disposed above the bottom surface.

The optical member may include a first overlapping region vertically overlapping the bottom surface and a second overlapping region overlapping the upper surface of the holder.

The camera actuator may further include a support member disposed between the second overlapping region and the holder.

The support member may be disposed above the bottom surface.

The groove may vertically overlap the first overlapping region.

The second holder stopper may include a first stopper region extending in a direction perpendicular to the optical axis and a second stopper region extending along the optical axis, and the second stopper region may include a step portion, and a height of a front end thereof may be greater than a height of a rear end thereof.

The groove may be disposed along an edge of the bottom surface.

The groove may vertically overlap the optical member.

A camera actuator according to an embodiment of the present invention includes a housing, a mover including a holder disposed in the housing and an optical member disposed on the holder, and a drive unit disposed in the housing and configured to move the mover, wherein the holder includes a first holder outer surface and a second holder outer surface facing each other, a cavity disposed between the first holder outer surface and the second holder outer surface, and a stopper in contact with the first holder outer surface and the second holder outer surface, the stopper includes an upper stopper disposed on a bottom surface of the cavity and a lower stopper disposed under the bottom surface of the cavity, and the upper stopper and the lower stopper are positioned on ends of the first holder outer surface and the second holder outer surface in an optical axis direction.

The holder may include a first region and a second region that are bisected in the optical axis direction and sequentially disposed.

The upper stopper and the lower stopper may be positioned in the second region.

The upper stopper and the lower stopper may be disposed to be spaced apart from each other in a first direction.

In the optical member, an area overlapping the first region in a second direction may be smaller than an area overlapping the second region in the second direction, and the second direction may be perpendicular to the first direction and the optical axis direction.

An area of the upper stopper may be greater than an area of the lower stopper.

The upper stopper may overlap the optical member in the second direction.

The first holder outer surface and the second holder outer surface may include an upper region and a lower region bisected in the first direction.

The upper stopper may be disposed in the upper region, and the lower stopper may be disposed in the lower region.

The holder may include a third holder outer surface disposed under the first holder outer surface and the second holder outer surface and a fourth holder outer surface disposed on the third holder outer surface between the first holder outer surface and the second holder outer surface, and the lower stopper may be disposed closer to the third holder outer surface than the upper stopper.

The upper stopper and the lower stopper may be made of an elastic material.

A cross-sectional area of the cavity may increase in the optical axis direction.

A maximum cross-sectional area of the cavity in the first region may be smaller than a maximum cross-sectional area of the cavity in the second region.

The upper stopper and the lower stopper may extend inward.

The camera actuator may further include a tilting guide unit disposed between the housing and the mover, the drive unit may include a drive magnet and a drive coil, the drive magnet may include a first magnet, a second magnet, and a third magnet, the drive coil may include a first coil, a second coil, and a third coil, the first magnet and the second magnet may be disposed symmetrically with respect to the first axis on the mover, the first coil and the second coil may be disposed symmetrically with respect to the first axis between the housing and the mover, the third magnet may be disposed on a bottom surface of the mover, and the third coil may be disposed on a bottom surface of the housing.

A camera actuator according to an embodiment of the present invention includes a housing, a mover including a holder disposed in the housing and an optical member disposed on the holder, a drive unit disposed in the housing and configured to move the mover, and a tilting guide unit disposed between the housing and the mover in an optical axis direction, wherein the holder includes a holder groove, a groove inner surface of the holder groove includes a first groove inner surface spaced apart in a direction opposite to the optical axis direction, and the camera actuator further includes a prevention unit seated in the holder groove and having a separation distance from the first groove inner surface in the optical axis direction greater than a length of a vertically overlapping portion between the tilting guide unit and the holder in the optical axis direction.

The groove inner surface of the holder groove may include a second groove inner surface adjacent to the prevention unit in a horizontal direction and a third groove inner surface spaced apart from the prevention unit in the optical axis direction.

The tilting guide unit may include first protrusions spaced apart in the vertical direction and second protrusions spaced apart in the horizontal direction, and each of the housing and the holder may include a different one of a first protrusion groove in which the first protrusion is seated and a second protrusion groove in which the second protrusion is seated.

The first groove inner surface may be spaced apart by a first distance from the prevention unit, and heights of the first protrusion groove and the second protrusion groove may be greater than the first distance.

The second groove inner surface may be spaced apart by a second distance from the prevention unit, and the second distance may be greater than a separation distance between the holder and the housing in the horizontal direction.

The third groove inner surface may be spaced apart by a third distance from the prevention unit.

The holder groove may further include a groove bottom surface spaced apart from the prevention unit in the vertical direction.

The groove bottom surface may be spaced apart by a fourth distance from the prevention unit, and the fourth distance may be greater than a separation distance between the mover and the housing in the vertical direction.

The camera actuator may further include a cover surrounding the housing, wherein the cover may include an opening overlapping the optical member in the vertical direction, and the prevention unit may be disposed adjacent to the opening and connected to the cover.

The prevention unit may overlap the mover in the vertical direction.

At least a portion of the prevention unit may overlap the mover in the horizontal direction.

The holder may include a first holder inner surface and a second holder inner surface facing each other and a cavity disposed between the first holder inner surface and the second holder inner surface, wherein the first holder inner surface and the second holder inner surface may be opposite to each other in the horizontal direction, and the holder groove may be disposed in at least one of the first holder inner surface and the second holder inner surface.

The holder may further include a bonding groove adjacent to the holder groove in the optical axis direction.

The bonding groove may include a first bonding groove and a second bonding groove disposed to be spaced apart from each other in the optical axis direction with the holder groove interposed therebetween.

The camera actuator may further include a bonding member disposed in the first bonding groove and the second bonding groove.

A camera actuator according to an embodiment includes a housing, a prism unit disposed in the housing, a pressing unit disposed between the housing and the prism unit, a drive unit configured to tilt the prism unit, and a board connected to the drive unit, wherein the pressing unit includes a first pulling member disposed on the prism unit and a second pulling member disposed to face the first pulling member on the board and electrically connected to the board.

In addition, the first pulling member may include a magnet, and the second pulling member may include a first electronic component disposed on the board.

In addition, the first electronic component may include a magnetic capacitor.

In addition, the board may be disposed on an outer side of the housing, the housing may include a housing hole formed in a region corresponding to the second pulling member, and at least a portion of the second pulling member may be disposed in the housing hole.

In addition, the board may include a board region where the second pulling member is disposed, and the housing may include a seating groove formed in a region corresponding to the board region.

In addition, the camera actuator may include a moving plate disposed between the prism unit and the housing and pressed to the housing together with the prism unit by the pressing unit.

In addition, the prism unit may include a prism mover having an accommodating unit and a prism disposed in the accommodating unit of the prism mover, and the moving plate may be disposed between facing surfaces of the prism mover and the housing.

In addition, the moving plate may include a hole formed in regions corresponding to the first pulling member and the second pulling member, and the first pulling member and the second pulling member may be disposed to directly face each other with the hole interposed therebetween.

In addition, the moving plate may include a plurality of first moving protrusions disposed on a first face facing the prism mover and a plurality of second moving protrusions disposed on a second face facing the housing, and a center of the hole of the moving plate may be included in a region connecting centers of the first and second moving protrusions.

In addition, a first virtual straight line connecting the plurality of first moving protrusions may be orthogonal to a second virtual straight line connecting the plurality of second moving protrusions.

In addition, the center of the hole of the moving plate may be positioned at an intersection of the first virtual straight line and the second virtual straight line.

In addition, the housing may include a plurality of first recesses corresponding to the plurality of second moving protrusions of the moving plate, and the center of the hole of the housing may be positioned on a virtual straight line connecting centers of the plurality of first recesses.

In addition, the prism mover may include a second recess corresponding to the first pulling member and a plurality of third recesses corresponding to the plurality of first moving protrusions of the moving plate, and a center of the second recess may be positioned on a virtual straight line connecting centers of the plurality of third recesses.

In addition, the board may include a first sub-region facing the side portion of the housing and a second sub-region other than the first sub-region, and the drive unit may include a second electronic component disposed in the second sub-region.

In addition, the second electronic component may include a capacitor.

Advantageous Effects

According to embodiments of the present invention, it is possible to implement a camera actuator having improved reliability by suppressing the separation of an optical member.

In addition, it is possible to provide a camera actuator applicable to ultra-slim, ultra-small, and high-resolution cameras, having an improved coupling force, and having improved impact reliability.

In particular, it is possible to efficiently arrange an OIS actuator even without increasing the overall size of a camera module.

According to the embodiments of the present invention, tilting in an X-axis direction does not magnetically interfere with tilting in a Y-axis direction, the tilting in the X-axis direction and the tilting in the Y-axis direction can be implemented in a stable structure, and for an actuator for auto-focusing or zooming, it does not generate magnetic field interference, thereby implementing a precise OIS function.

According to the embodiments of the present invention, it is possible to secure a sufficient amount of light by eliminating the size limitation of a lens and implement OIS having low power consumption.

In addition, it is possible to implement an accurate rotation driving, such as suppression of errors due to a posture difference.

The camera actuator and the camera module according to the embodiments can reduce the number of components, thereby reducing a manufacturing cost. In other words, in the embodiments, an electronic component disposed on a board is used as one component of a pressing unit for pressing a prism unit to a housing. Specifically, in the embodiments, a magnetic electronic component disposed on the board is used as a second pulling member constituting the pressing unit. Specifically, in the embodiments, a magnetic capacitor disposed on the board 200 is used as the second pulling member constituting the pressing unit. Therefore, in the embodiments, it is possible to remove a separate magnet, yoke, or the like constituting the second pulling member, thereby reducing the manufacturing cost.

In addition, the camera actuator and the camera module according to the embodiments can improve OIS operational reliability. In other words, in the embodiments, when a capacitor disposed on the board is not used as the pressing unit, an external force may be generated by an attractive force generated between a magnet constituting the pressing unit and the capacitor, resulting in problems in the OIS operational reliability. Unlike this, in the embodiments, as the capacitor is used as the pulling member, it is possible to remove the external force generated by the capacitor, thereby improving the OIS operational reliability.

In addition, the camera actuator and the camera module according to the embodiments can have improved optical characteristics. In other words, a first actuator in the embodiments may include a plurality of capacitors for an OIS operation. In this case, some of the capacitors are used as the second pulling member constituting the pressing unit according to the embodiments. In other words, the capacitor among the electronic components in the embodiments may be classified into a first electronic component used as a second pulling member 620 and a second electronic component other than the first electronic component. In addition, the second electronic component may be disposed in a region not overlapping the first pulling member or a magnet unit of a drive unit on the board. In other words, when the second electronic component is a capacitor, an external force may be generated between the magnet unit and the first pulling member of the pressing unit due to the magnetic capacitor. Therefore, in the embodiments, the second electronic component can be disposed in the region not overlapping the first pulling member or the magnet unit of the drive unit, thereby removing the external force generated by the second electronic component and having improved optical characteristics accordingly.

DESCRIPTION OF DRAWINGS

FIG. 1 is a perspective view of a camera module according to an embodiment.

FIG. 2 is an exploded perspective view of the camera module according to the embodiment.

FIG. 3 is a cross-sectional view along line A-A' in FIG. 1.

FIG. 4 is a perspective view of a first camera actuator according to a first embodiment.

FIG. 5 is an exploded perspective view of the first camera actuator according to the first embodiment.

FIG. 6A is a perspective view of a first housing of the first camera actuator according to the first embodiment.

FIG. 6B is a perspective view in a direction different from that of FIG. 6A.

FIG. 6C is a front view of the first housing of the first camera actuator according to the first embodiment.

FIG. 7 is a perspective view of an optical member of the first camera actuator according to the first embodiment.

FIG. 8A is a perspective view of a holder of the first camera actuator according to the first embodiment.

FIG. 8B is a bottom view of the holder of the first camera actuator according to the first embodiment.

FIG. 8C is a front view of the holder of the first camera actuator according to the first embodiment.

FIG. 8D is a rear view of a fastening member of the first camera actuator according to the first embodiment.

FIG. 8E is a bottom view of the fastening member of the first camera actuator according to the first embodiment.

FIG. 8F is another side view of the holder of the first camera actuator according to the embodiment.

FIG. 8G is another perspective view of the holder of the first camera actuator according to the first embodiment.

FIG. 8H is a view for describing the application of a bonding member to the holder of the first camera actuator according to the first embodiment.

FIG. 8I is a cross-sectional view along line I-I' in FIG. 8G.

FIG. 8J is a cross-sectional view along line J-J' in FIG. 8G.

FIG. 8K is a partial enlarged view of FIG. 8G.

FIG. 8L is a cross-sectional view along line K-K' in FIG. 8K.

FIG. 9A is a perspective view of a tilting guide unit of the first camera actuator according to the first embodiment.

FIG. 9B is a perspective view in a direction different from that of FIG. 9A.

FIG. 9C is a cross-sectional view along line F-F' in FIG. 9A.

FIG. 10 is a view showing a first drive unit of the first camera actuator according to the first embodiment.

FIG. 11A is a perspective view of the first camera actuator according to the first embodiment.

FIG. 11B is a cross-sectional view along line P-P' in FIG. 11A.

FIG. 11C is an enlarged view of portion K1 in FIG. 11B.

FIG. 11D is an enlarged view of portion K2 in FIG. 11B.

FIG. 11E is a cross-sectional view along line Q-Q' in FIG. 11A.

FIG. 11F is a perspective view of the housing, the tilting guide unit, the holder, the optical member, and the housing in the first camera actuator.

FIG. 11G is a cross-sectional view of FIG. 11F.

FIG. 11H is a perspective view of a tilting guide unit according to another embodiment.

FIG. 12A is a perspective view of the first camera actuator according to the first embodiment.

FIG. 12B is a cross-sectional view along line S-S' in FIG. 12A.

FIG. 12C is an exemplary view of the movement of the first camera actuator shown in FIG. 12B.

FIG. 13A is a cross-sectional view along line R-R' in FIG. 12A.

FIG. 13B is an exemplary view of the movement of the first camera actuator shown in FIG. 13A.

FIG. 14 is a perspective view of a first camera actuator according to a second embodiment.

FIG. 15 is an exploded perspective view of the first camera actuator according to the second embodiment.

FIG. 16 is a cross-sectional view of FIG. 14.

FIG. 17 is a perspective view of a first camera actuator according to a third embodiment.

FIG. 18 is an exploded perspective view of the first camera actuator according to the third embodiment.

FIG. 19 is a perspective view of a first housing in the first camera actuator according to the third embodiment.

FIG. 20 is a perspective view of an optical member of the first camera actuator according to the third embodiment.

FIG. 21 is a perspective view of the holder according to the embodiment.

FIGS. 22 and 23 are side views of the holder according to the embodiment.

FIG. 24 is another side view of the holder according to the embodiment.

FIG. 25 is a top view of the holder according to the embodiment.

FIG. 26 is a bottom view of the holder according to the embodiment.

FIG. 27 is a perspective view of a tilting guide unit of the first camera actuator according to the third embodiment.

FIG. 28 is a perspective view in a direction different from that of FIG. 27.

FIG. 29 is a cross-sectional view along line N-N' in FIG. 27.

FIG. 30 is a perspective view of the first camera actuator according to the third embodiment.

FIG. 31 is a cross-sectional view along line M-M' in FIG. 30.

FIG. 32 is a cross-sectional view along line V-V' in FIG. 30.

FIG. 33 is a view showing a first drive unit of the first camera actuator according to the third embodiment.

FIG. 34 is a perspective view of the first camera actuator according to the third embodiment.

FIG. 35 is a cross-sectional view along line H-H' in FIG. 34.

FIG. 36 is an exemplary view of the movement of the first camera actuator shown in FIG. 35.

FIG. 37 is a perspective view of the first camera actuator according to the third embodiment.

FIG. 38 is a cross-sectional view along line E-E' in FIG. 37.

FIG. 39 is an exemplary view of the movement of the first camera actuator shown in FIG. 38.

FIG. 40 is a perspective view of a cover according to the embodiment.

FIG. 41 is a top view of the cover according to the embodiment.

FIG. 42 is a cross-sectional view along line V-V' in FIG. 41.

FIG. 43 is a cross-sectional view along line W-W' in FIG. 41.

FIG. 44 is a perspective view of the first camera actuator according to the third embodiment.

FIG. 45 is an exploded perspective view of the first camera actuator according to the third embodiment.

FIG. 46 is a perspective view of a first housing in the first camera actuator according to the third embodiment.

FIG. 47 is a perspective view of an optical member of the first camera actuator according to the third embodiment.

FIG. 48 is a perspective view of the holder according to the embodiment.

FIG. 49 is one side view of the holder according to the embodiment.

FIG. 50 is another side view of the holder according to the embodiment.

FIG. 51 is a top view of the holder according to the embodiment.

FIG. 52 is a bottom view of the holder according to the embodiment.

FIG. 53 is still another side view of the holder according to the embodiment.

FIG. 54 is a perspective view of the tilting guide unit of the first camera actuator according to the third embodiment.

FIG. 55 is a perspective view in a direction different from that of FIG. 54.

FIG. 56 is a cross-sectional view along line G-G' in FIG. 54.

FIG. 57 is a perspective view of the first camera actuator according to the embodiment.

FIG. 58 is a cross-sectional view along line X-X' in FIG. 57.

FIG. 59 is a cross-sectional view along line Y-Y' in FIG. 57.

FIG. 60 is a view showing a first drive unit of the first camera actuator according to the third embodiment.

FIG. 61 is a perspective view of the first camera actuator according to the third embodiment.

FIG. 62 is a cross-sectional view along line Z-Z' in FIG. 61.

FIG. 63 is a view of a first camera actuator according to another embodiment.

FIG. 64 is a view of a first camera actuator according to still another embodiment.

FIGS. 65 and 66 are views for describing a function of a prevention unit when a mover tilts with respect to a first direction.

FIG. 67 is a cross-sectional view along line O-O' in FIG. 61.

FIG. 68 is a perspective view of the first camera actuator according to the third embodiment.

FIG. 69 is a cross-sectional view along line D-D' in FIG. 68.

FIG. 70 is a perspective view of the first camera actuator according to the third embodiment.

FIG. 71 is a cross-sectional view along line E-E' in FIG. 70.

FIG. 72 is a perspective view of a first camera actuator according to a fourth embodiment.

FIG. 73 is an exploded perspective view of the first camera actuator shown in FIG. 72.

FIG. 74 is a perspective view of some components of an image shake control unit of the first camera actuator.

FIG. 75 is a perspective view of a board unit of the first camera actuator viewed from the first direction.

FIG. 76 is a perspective view of the board unit of the first camera actuator viewed from a second direction.

FIG. 77 is a view for describing a pressing unit disposed on the board unit of the first camera actuator.

FIG. 78 is an exploded perspective view of the board unit and the drive unit of the first camera actuator.

FIGS. 79 to 81 are perspective views of a housing of the camera actuator according to the fourth embodiment.

FIGS. 82 to 84 are views of a prism unit of the first camera actuator.

FIG. 85 is a front perspective view of a moving plate constituting the first camera actuator.

FIG. 86 is a rear perspective view of the moving plate constituting the first camera actuator.

FIGS. 87 to 89 are views of a coupling relationship of the housing, the prism unit, the pressing unit, and the moving plate in the first camera actuator.

FIGS. 90 and 91 are exemplary views showing an operation of the first camera actuator according to the embodiment.

FIG. 92 is a perspective view of a camera module according to an embodiment.

FIG. 93 is a perspective view in which some components of the camera module according to the embodiment are omitted.

FIG. 94 is an exploded perspective view of a second camera actuator according to the embodiment.

FIG. 95 is a cross-sectional view of the second camera actuator according to the embodiment.

FIG. 96 is a front view of the second camera actuator according to the embodiment.

FIG. 97 is a perspective view showing third and fourth drive units disposed in a housing of the second camera actuator according to the embodiment.

FIGS. 98 and 99 are exploded perspective views of first and second drive units of the second camera actuator according to the embodiment.

FIG. 100 is a perspective view of some components of the second camera actuator according to the embodiment.

FIG. 101 is a perspective view of a second camera actuator according to another embodiment.

FIG. 102 is an exploded perspective view of the second camera actuator according to another embodiment.

FIG. 103 is a cross-sectional view along line II-II' in FIG. 101.

FIG. 104 is a cross-sectional view along line III-III' in FIG. 101.

FIG. 105 is a perspective view of a mobile terminal to which the camera module according to the embodiment is applied.

FIG. 106 is a perspective view of a vehicle to which the camera module according to the embodiment is applied.

MODES OF THE INVENTION

Since the present disclosure may have various changes and various embodiments, specific embodiments are illustrated and described in the accompanying drawings. However, it should be understood that it is not intended to limit specific embodiments, and it should be understood to include all modifications, equivalents, and substitutes included in the spirit and scope of the present disclosure. Terms including ordinal numbers such as second or first may be used to describe various components, but the components are not limited by the terms. The terms are used only for the purpose of distinguishing one component from another. For example, a second component may be referred to as a first component, and similarly, the first component may also be referred to as the second component without departing from the scope of the present disclosure. The term "and/or" includes a combination of a plurality of related listed items or any of the plurality of related listed items.

When a certain component is described as being "connected" or "coupled" to another component, it is understood that it may be directly connected or coupled to another component or other components may also be present therebetween. On the other hand, when a certain component is described as being "directly connected" or "directly coupled" to another component, it should be understood that other components are not present therebetween.

The terms used in the application are only used to describe specific embodiments and are not intended to limit the present disclosure. The singular expression includes the plural expression unless the context clearly dictates otherwise. In the application, it should be understood that terms such as "comprise" or "have" are intended to specify that a feature, number, step, operation, component, part, or combination thereof described in the specification is present, but do not preclude the possibility of the presence or addition of one or more other features, numbers, steps, operations, components, parts, or combinations thereof.

Unless defined otherwise, all terms used herein, including technical or scientific terms, have the same meaning as commonly understood by those of ordinary skill in the art to which the present disclosure pertains. Terms such as those defined in a commonly used dictionary should be construed as having a meaning consistent with the meaning in the context of the related art and should not be construed in an ideal or excessively formal meaning unless explicitly defined in the application.

Hereinafter, embodiments will be described in detail with reference to the accompanying drawings, and the same or corresponding components are given the same reference numerals regardless of the reference numerals, and overlapping descriptions thereof will be omitted.

FIG. 1 is a perspective view of a camera module according to an embodiment, FIG. 2 is an exploded perspective view of the camera module according to the embodiment, and FIG. 3 is a cross-sectional view along line A-A' in FIG. 1.

Referring to FIGS. 1 and 2, a camera module 1000 according to the embodiment may include a cover CV, a first camera actuator 1100, a second camera actuator 1200, and a circuit board 1300. Here, the first camera actuator 1100 may be used interchangeably with a first actuator, and the second camera actuator 1200 may be used interchangeably with a second actuator.

The cover CV may cover the first camera actuator 1100 and the second camera actuator 1200. It is possible to increase a coupling force between the first camera actuator 1100 and the second camera actuator 1200 by the cover CV.

Furthermore, the cover CV may be made of a material which blocks electromagnetic waves. Therefore, it is possible to easily protect the first camera actuator 1100 and the second camera actuator 1200 in the cover CV.

In addition, the first camera actuator 1100 may be an optical image stabilizer (OIS) actuator. For example, the first camera actuator 1100 may move the optical member in a direction perpendicular to an optical axis.

The first camera actuator 1100 may include a fixed focal length lens disposed in a predetermined lens barrel (not shown). The fixed focal length lens may also be referred to as a "single focal length lens" or a "single lens."

The first camera actuator 1100 may change an optical path. In an embodiment, the first camera actuator 1100 may vertically change the optical path through an internal optical member (e.g., a prism or a mirror). With this configuration, a configuration of a lens having a greater thickness than the mobile terminal is disposed by changing the optical path even when a thickness of the mobile terminal is reduced, and thus magnification and auto focusing (AF) and OIS functions may be performed.

However, the present invention is not limited thereto, and the first camera actuator 1100 may change the optical path vertically or at a predetermined angle multiple times.

The second camera actuator 1200 may be disposed on a rear end of the first camera actuator 1100. The second camera actuator 1200 may be coupled to the first camera actuator 1100. In addition, mutual coupling may be performed by various methods.

In addition, the second camera actuator 1200 may be a zoom actuator or an AF actuator. For example, the second camera actuator 1200 may support one lens or a plurality of lenses and perform the AF function or the zoom function by moving the lenses according to a predetermined control signal of a control unit.

In addition, one lens or a plurality of lenses move independently or individually in an optical axis direction.

The circuit board 1300 may be disposed on a rear end of the second camera actuator 1200. The circuit board 1300 may be electrically connected to the second camera actuator 1200 and the first camera actuator 1100. In addition, a plurality of circuit boards 1300 may be present. The circuit board 1300 may include an image sensor and the like, and include a connector electrically connected to another external camera module or a processor of the terminal.

A camera module according to an embodiment may be formed as a single camera module or a plurality of camera modules. For example, the plurality of camera modules may include a first camera module and a second camera module.

In addition, the first camera module may include a single actuator or a plurality of actuators. For example, the first camera module may include the first camera actuator 1100 and the second camera actuator 1200.

In addition, the second camera module may include an actuator (not shown) disposed in a predetermined housing (not shown) and capable of driving a lens unit. The actuator may be a voice coil motor, a micro actuator, a silicon actuator, and the like, and may be applied in various methods such as an electrostatic method, a thermal method, a bi-morph method, and an electrostatic force method but the present invention is not limited thereto. In addition, in the specification, the camera actuator may be referred to as an actuator or the like. In addition, a camera module composed of a plurality of camera modules may be mounted in various electronic devices such as a mobile terminal.

Referring to FIG. 3, the camera module according to the embodiment may include the first camera actuator 1100 for performing an OIS function and the second camera actuator 1200 for performing a zoom function and an AF function.

Light may be incident into the camera module or the first camera actuator through an opening region position in an upper surface of the first camera actuator 1100. In other words, light may be incident into the first camera actuator 1100 in a vertical direction (e.g., an X-axis direction), and an optical path may be changed in an optical axis direction (e.g., a Z-axis direction) through an optical member. Here, the vertical direction is used interchangeably with "vertically" and "along the verticality." In addition, light may pass through the second camera actuator 1200 and may be incident on an image sensor IS positioned on one end of the second camera actuator 1200 (PATH).

In the specification, a bottom surface refers to one side in a first direction. In addition, the first direction is the X-axis direction in the drawing and may be used interchangeably with a second axis direction or the like. The second direction is a Y-axis direction in the drawing and may be used interchangeably with a first axis direction. The second direction is a direction perpendicular to the first direction. In addition, a third direction is the Z-axis direction in the drawing and may be used interchangeably with a third axis direction. In addition, the third direction is a direction perpendicular to both of the first direction and the second direction. Here, the third direction (Z-axis direction) corresponds to the optical axis direction, and the first direction (X-axis direction) and the second direction (Y-axis direction) are directions perpendicular to the optical axis and may be tilted by the second camera actuator. In addition, hereinafter, in the description of the first camera actuator 1100, the optical axis direction is the third direction (Z-axis direction), and the following description will be given on the basis of this.

In addition, in the specification, an inner side may be a direction from the cover CV toward the first camera actuator, and an outer side may be a direction opposite to the inner side. In other words, the first camera actuator and the second camera actuator may be positioned inside the cover CV, and the cover CV may be positioned outside the first camera actuator or the second camera actuator.

In addition, with this configuration, the camera module according to the embodiment can overcome the spatial limitations of the first camera actuator and the second camera actuator by changing the optical path. In other words, the camera module according to the embodiment may extend the optical path while minimizing the thickness of the camera module in response to the change in the optical path.

Furthermore, it should be understood that the second camera actuator may also provide a high range of magnification by controlling a focus or the like in the extended optical path.

In addition, the camera module according to the embodiment may implement OIS through the control of the optical path through the first camera actuator, thereby minimizing the occurrence of a de-center or tilt phenomenon and providing the best optical characteristics.

Furthermore, the second camera actuator 1200 may include an optical system and a lens drive unit. For example, the second camera actuator 1200 may include one or more of a first lens assembly, a second lens assembly, a third lens assembly, and a guide pin.

In addition, the second camera actuator 1200 may include a coil and a magnet and perform a high-magnification zoom function.

For example, the first lens assembly and the second lens assembly may be moving lenses for moving through the coil, the magnet, and the guide pin, and the third lens assembly may be a fixed lens but the present invention is not limited thereto. For example, the third lens assembly may perform a function of a focator by which light forms an image at a specific position, and the first lens assembly may perform a function of a variator for re-forming an image formed by the third lens assembly, which is the focator, at another position. Meanwhile, the first lens assembly may be in a state in which a magnification change is large because a distance to a subject or an image distance is greatly changed, and the first lens assembly, which is the variator, may play an important role in a focal length or magnification change of the optical system. Meanwhile, imaging points of an image formed by the first lens assembly, which is the variator, may be slightly different depending on a position. Therefore, the second lens assembly may perform a position compensation function for the image formed by the variator. For example, the second lens assembly may perform a function of a compensator for accurately forming an image at an actual position of the image sensor using the imaging points of the image formed by the first lens assembly which is the variator. For example, the first lens assembly and the second lens assembly may be driven by an electromagnetic force generated by the interaction between the coil and the magnet. The above description may be applied to a lens assembly to be described below. In addition, the first lens assembly to the third lens assembly may move in the optical axis direction, that is, in the third direction. In addition, the first lens assembly to the third lens assembly may move in the third direction independently of or depending on each other.

Meanwhile, when an OIS actuator and an AF or zoom actuator are disposed according to the embodiment of the present invention, it is possible to prevent magnetic field interference with an AF magnet or a zoom magnet upon OIS operation. Since a first drive magnet of the first camera actuator 1100 is disposed separately from the second camera actuator 1200, it is possible to prevent the magnetic field interference between the first camera actuator 1100 and the second camera actuator 1200. In the specification, OIS may be used interchangeably with terms such as hand shaking correction, optical image stabilization, optical image correction, and shake correction.

FIG. 4 is a perspective view of the first camera actuator according to the first embodiment, and FIG. 5 is an exploded perspective view of the first camera actuator according to the embodiment.

Referring to FIGS. 4 and 5, the first camera actuator 1100 according to the embodiment includes a first housing 1120, a mover 1130, a rotational unit 1140, a first drive unit 1150, and a fastening member 1131*a*.

The mover 1130 may include a holder 1131 and an optical member 1132 seated on the holder 1131. Furthermore, the mover 1130 may also include the fastening member 1131*a* described above and may be coupled to the fastening member 1131*a* to rotate integrally.

In addition, the rotational unit 1140 may include a tilting guide unit 1141 and a first magnetic substance 1142 and a second magnetic substance 1143 having different polarities to press the tilting guide unit 1141.

In addition, the first drive unit 1150 includes a first drive magnet 1151, a first drive coil 1152, a hall sensor unit 1153, a first board unit 1154, and a yoke unit 1155.

First, the first camera actuator 1100 may include a shield can (not shown). The shield can (not shown) may be positioned on an outermost side of the first camera actuator 1100 and positioned to surround the rotational unit 1140 and the first drive unit 1150, which will be described below.

The shield can (not shown) may block or reduce electromagnetic waves generated from the outside. In other words, the shield can (not shown) may reduce the occurrence of a malfunction of the rotational unit 1140 or the first drive unit 1150. The first housing 1120 may be positioned inside the shield can (not shown).

When there is no shield can, the first housing 1120 may be positioned on the outermost side of the first camera actuator.

In addition, the first housing 1120 may be positioned inside the first board unit 1154 to be described below. The first housing 1120 may be fastened by being fitted into or matched with the shield can (not shown).

The first housing 1120 may include a first housing side portion 1121, a second housing side portion 1122, a third housing side portion 1123, a fourth housing side portion 1124, and a fifth housing side portion 1126. A detailed description thereof will be given below.

In particular, the fifth housing side portion 1126 may be formed integrally with or separately from the first housing 1120. In the specification, the following description will be given on the basis of the fifth housing side portion 1126 and the first housing 1120 formed integrally. In addition, the fastening member 1131*a* may pass through the fifth housing side portion 1126. A description thereof will be given below.

The mover 1130 includes the holder 1131 and the optical member 1132 seated on the holder 1131.

The holder 1131 may be seated in an accommodating unit 1125 of the first housing 1120. The holder 1131 may include a first holder outer surface to a fourth holder outer surface respectively corresponding to the first housing side portion 1121, the second housing side portion 1122, the third housing side portion 1123, and the fifth housing side portion 1126. For example, the first holder outer surface to the fourth holder outer surface may correspond to or facing inner surfaces of each of the first housing side portion 1121, the second housing side portion 1122, the third housing side portion 1123, and the fifth housing side portion 1126.

In addition, the holder 1131 may include the fastening member 1131*a* disposed in a fourth outer seating groove. A detailed description thereof will be given below.

The optical member 1132 may be seated on the holder 1131. To this end, the holder 1131 may have a seating surface, a bottom surface, or a face in an accommodating groove, and the seating surface may be formed by the accommodating groove. In an embodiment, the optical member 1132 may be formed as a mirror or a prism. Hereinafter, although a description thereof will be given on the basis of the prism, the optical member 1132 may also be composed of a plurality of lenses as in the above-described embodiment. Alternatively, the optical member 1132 may be composed of a plurality of lenses and prisms or mirrors. In addition, the optical member 1132 may include a reflector disposed therein. However, the present invention is not limited thereto.

In addition, the optical member 1132 may reflect light reflected from the outside (e.g., an object) into the camera module. In other words, the optical member 1132 can overcome the spatial limitations of the first camera actuator and the second camera actuator by changing the path of the reflected light. As described above, it should be understood that the camera module may also provide a high range of magnification by extending the optical path while minimizing a thickness.

The fastening member 1131*a* may be coupled to the holder 1131. The fastening member 1131*a* may be disposed outside the holder 1131, and at least a portion thereof may be disposed inside the housing. In addition, the fastening member 1131*a* may be seated in an additional groove positioned in a region of the fourth holder outer surface of the holder 1131 other than the fourth outer seating groove. In this case, the fastening member 1131*a* and the holder 1131 may be coupled through a bonding member. For example, the bonding member may be made of a material such as epoxy. Therefore, the fastening member 1131*a* may be coupled to the holder 1131, and at least a portion of the fifth housing side portion 1126 may be positioned between the fastening member 1131*a* and the holder 1131. For example, at least a portion of the fifth housing side portion 1126 may pass through a space formed between the fastening member 1131*a* and the holder 1131.

In addition, the fastening member 1131*a* may be formed in a structure separated from the holder 1131. With this configuration, it is possible to easily assemble the first camera actuator as will be described below. Alternatively, the fastening member 1131*a* may be formed integrally with the holder 1131, but will be described below as having the separated structure.

The rotational unit 1140 includes the tilting guide unit 1141 and the first magnetic substance 1142 and the second magnetic substance 1143 having different polarities to press the tilting guide unit 1141.

The tilting guide unit 1141 may be coupled to the mover 1130 and the first housing 1120 described above. Specifically, the tilting guide unit 1141 may be disposed between the holder 1131 and the fifth housing side portion 1126. Therefore, the tilting guide unit 1141 may be coupled to the mover 1130 of the holder 1131 and the first housing 1120. However, unlike the above description, in the embodiment, the tilting guide unit 1141 may be disposed between the fifth housing side portion 1126 and the holder 1131. Specifically, the tilting guide unit 1141 may be positioned between the fifth housing side portion 1126 and the fourth outer seating groove of the holder 1131.

The fastening member 1131*a*, the fifth housing side portion 1126, the tilting guide unit 1141, and the holder 1131 may be sequentially disposed in the third direction (Z-axis direction) (with respect to the outermost side). In addition, the first magnetic substance 1142 and the second magnetic substance 1143 are respectively seated in a first fastening groove gr1 formed in the fastening member 1131*a* and a second fastening groove gr2 formed in the fifth housing side portion 1126. In the embodiment, the first fastening groove gr1 and the second fastening groove gr2 may have different positions from the first and second grooves described in another embodiment described above. However, the first fastening groove gr1 is positioned in the fastening member 1131*a* and moves integrally with the holder, and the second fastening groove gr2 is positioned in the fifth housing side portion 1126 corresponding to the first fastening groove gr1 and coupled to the first housing 1120. Therefore, these terms will be used interchangeably. In addition, the second fastening groove gr2 may be positioned between the first fastening groove gr1 and the tilting guide unit 1141.

In addition, the tilting guide unit 1141 may be disposed adjacent to the optical axis. Therefore, the actuator according to the embodiment may easily change the optical path according to a first axis tilt and a second axis tilt, which will be described below.

The tilting guide unit 1141 may include first protrusions disposed to be spaced apart from each other in the first direction (X-axis direction) and second protrusions disposed to be spaced apart from each other in the second direction (Y-axis direction). In addition, the first protrusion and the second protrusion may protrude in opposite directions. A detailed description thereof will be given below.

In addition, as described above, the first magnetic substance 1142 may be positioned in the fastening member 1131*a*. In addition, the second magnetic substance 1143 may be positioned in the fifth housing side portion 1126.

The first magnetic substance 1142 and the second magnetic substance 1143 may have the same polarity. For example, the first magnetic substance 1142 may be a magnet having an N pole, and the second magnetic substance 1143 may be the magnet having the N pole. Alternatively, conversely, the first magnetic substance 1142 may be a magnet having an S pole, and the second magnetic substance 1143 may be the magnet having the S pole.

For example, a second pole face of the second magnetic substance 1143 and a first pole face of the first magnetic substance 1142 facing the second pole face may have the same polarity. In other words, the first magnetic substance 1142 and the second magnetic substance 1143 may generate forces pushing each other and to this end, may have various materials, functions, and the like.

For example, the first magnetic substance 1142 and the second magnetic substance 1143 may generate a repulsive force therebetween due to the polarities described above. With this configuration, the repulsive force described above may be applied to the fastening member 1131*a* or the holder 1131 coupled to the first magnetic substance 1142 and the fifth housing side portion 1126 or the first housing 1120 coupled to the second magnetic substance 1143. At this time, the repulsive force applied to the fastening member 1131*a* may be transmitted to the holder 1131 coupled to the fastening member 1131*a*. Therefore, the tilting guide unit 1141 disposed between the fastening member 1131*a* and the fifth housing side portion 1126 may be pressed tightly by the repulsive force. In other words, the repulsive force may maintain a position of the tilting guide unit 1141 between the holder 1131 and the first housing 1120 (or the fifth housing side portion 1126). With this configuration, the position between the mover 1130 and the first housing 1120 may be maintained even upon X-axis tilt or Y-axis tilt. In addition, the tilting guide unit may be in close contact with the fifth housing side portion 1126 and the holder 1131 by the repulsive force between the second magnetic substance 1143 and the first magnetic substance 1142.

The first drive unit 1150 includes the first drive magnet 1151, the first drive coil 1152, the hall sensor unit 1153, the first board unit 1154, and the yoke unit 1155. A description thereof will be given below.

FIG. 6A is a perspective view of the first housing of the first camera actuator according to the first embodiment, FIG. 6B is a perspective view in a direction different from that of FIG. 6A, and FIG. 6C is a front view of the first housing of the first camera actuator according to the embodiment.

Referring to FIGS. 6A to 6C, the first housing 1120 according to the embodiment may include the first housing side portion 1121 to the fifth housing side portion 1126. The first housing side portion 1121 and the second housing side portion 1122 may be disposed to face each other. In addition, the third housing side portion 1123 and the fourth housing side portion 1124 may be disposed to face each other.

In addition, the third housing side portion 1123 and the fourth housing side portion 1124 may be disposed between the first housing side portion 1121 and the second housing side portion 1122.

The third housing side portion 1123 and the fourth housing side portion 1124 may be in contact with the first housing side portion 1121, the second housing side portion 1122, and the fourth housing side portion 1124. In addition, the third housing side portion 1123 may be a bottom surface of the first housing 1120. In addition, the fourth housing side portion 1124 may be an upper surface of the first housing 1120. In addition, the above description may also be applied to a description of the direction in the same manner.

In addition, the first housing side portion 1121 may include a first housing hole 1121*a*. A first coil to be described below may be positioned in the first housing hole 1121*a*.

In addition, the second housing side portion 1122 may include a second housing hole 1122*a*. In addition, a second coil to be described below may be positioned in the second housing hole 1122*a*.

In addition, the first housing side portion 1121 and the second housing side portion 1122 may be side surfaces of the first housing 1120.

The first coil and the second coil may be coupled to the first board unit. In an embodiment, the first coil and the second coil may be electrically connected to the first board unit so that a current may flow. The current is an element of an electromagnetic force by which the second camera actuator may tilt with respect to the X axis.

In addition, the third housing side portion 1123 may include a third housing hole 1123*a*.

A third coil to be described below may be positioned in the third housing hole 1123*a*. In addition, the third coil may be electrically connected to the first board unit in contact with the first housing 1120, and the third coil and the first board unit may be coupled to each other. Therefore, the third coil may be electrically connected to the first board unit to receive a current from the first board unit. The current is an element of the electromagnetic force by which the second camera actuator may tilt with respect to the Y-axis.

The fifth housing side portion 1126 may be seated between the first housing side portion 1121 to the fourth housing side portion 1124. Therefore, the fifth housing side portion 1126 may be positioned above the third housing side portion 1123. For example, the fifth housing side portion 1126 may be positioned on one side. The fifth housing side portion 1126 and the holder may be sequentially positioned with respect to the third direction.

The fourth housing side portion 1124 may be disposed between the first housing side portion 1121 and the second housing side portion 1122 and may be in contact with the first housing side portion 1121, the second housing side portion 1122, and the third housing side portion 1123.

In addition, the fourth housing side portion 1124 may include a fourth housing hole 1124*a*. The fourth housing hole 1124*a* may be positioned above the optical member. Therefore, light may pass through the fourth housing hole 1124*a* and may be incident on the optical member.

In addition, the fourth housing side portion 1124 may include a housing upper surface 1124US. In addition, a housing groove 1124*h* may be positioned in the housing upper surface 1124US. The housing groove 1124*h* may be disposed along an inner surface of the fourth housing hole 1124*a*.

In addition, the first housing 1120 may include the accommodating unit 1125 formed by the first housing side portion 1121 to the fifth housing side portion 1126. The fastening member, the tilting guide unit, the mover, and the like may be positioned in the accommodating unit 1125 as components.

In an embodiment, the fifth housing side portion 1126 may be positioned between the first housing side portion 1121 and the second housing side portion 1122. In addition, the fifth housing side portion 1126 may be positioned between the third housing side portion 1123 and the fourth housing side portion 1124.

In addition, the fifth housing side portion 1126 may be positioned above the third housing side portion 1123 and may be in contact with the first housing side portion to the third housing side portion.

In addition, the fifth housing side portion 1126 includes a second protrusion groove in which the second protrusion of the tilting guide unit is seated. A second protrusion groove PH2 may be positioned in an inner surface 1126*s*1 of the fifth housing side portion 1126. The inner surface 1126*s*1 of the fifth housing side portion 1126 may protrude inward between the through holes 1126*a* and 1126*b* of the fifth housing side portion 1126. Therefore, in the fifth housing side portion 1126, the protrusion (e.g., the second protrusion) of the tilting guide unit is disposed adjacent to a prism in the fourth outer seating groove so that the protrusion, which is a reference axis of tilt, is disposed close to the center of gravity of the mover 1130. Therefore, when the holder tilts, it is possible to minimize the moment for moving the mover 1130 for tilt. Therefore, current consumption for driving the coil can also be minimized, thereby reducing the power consumption of the camera actuator.

In addition, the fifth housing side portion 1126 may include the through holes 1126*a* and 1126*b*. A plurality of through holes may be present, and composed of the first through hole 1126*a* and the second through hole 1126*b*.

First and second extensions of the fastening member to be described below may respectively pass through the first through hole 1126*a* and the second through hole 1126*b*. Therefore, the fastening member and the fifth housing side portion may be coupled. In other words, the first housing and the mover may be coupled to each other.

The second protrusion groove PH2 may be positioned between the first through hole 1126*a* and the second through hole 1126*b*. With this configuration, it is possible to improve the coupling force between the tilting guide unit 1141 and the fifth housing side portion 1126, thereby blocking a reduction in the accuracy of the tilt caused by the movement of the tilting guide unit 1141 in the first housing.

In addition, the second fastening groove gr2 may be positioned in an outer surface 1126*s*2 of the fifth housing side portion 1126. The second magnetic substance may be seated in the second fastening groove gr2. In addition, the outer surface 1126*s*2 of the fifth housing side portion 1126 may face the inner surface of the fastening member or a member base unit. Furthermore, the first magnetic substance seated on the fastening member and the second magnetic substance of the fifth housing side portion 1126 may face each other and generate the repulsive force described above. Therefore, since the fifth housing side portion 1126 presses the tilting guide unit inward or the holder by the repulsive force, the mover may be spaced apart by a predetermined distance from the third housing side portion in the first housing even when a current is injected into the coil. In other words, the coupling force between the mover, the housing, and the tilting guide unit may be maintained.

In addition, a plurality of other grooves may be present in the outer surface 1126*s*2 of the fifth housing side portion 1126. This is to easily manufacture the first housing in a process.

In addition, when the fifth housing side portion 1126 is formed integrally with the first housing 1120, it is possible to improve the coupling force between the fifth housing side portion 1126 and the first housing 1120, thereby improving the reliability of the camera actuator. In addition, when the fifth housing side portion 1126 and the first housing 1120 are formed separately, it is possible to improve the ease of the assembling and manufacturing of the fifth housing side portion 1126 and the first housing 1120.

In addition, in an embodiment, the fifth housing side portion 1126 may include the first through hole 1126*a* and the second through hole 1126*b*. In addition, the first through hole 1126*a* and the second through hole 1126*b* may be disposed side by side in the second direction (Y-axis direction) to overlap each other.

In addition, the fifth housing side portion 1126 may include an upper member UA positioned above the first through hole 1126*a* and the second through hole 1126*b* and a lower member BA positioned under the first through hole 1126*a* and the second through hole 1126*b*. Therefore, the first through hole 1126*a* and the second through hole 1126*b* may be positioned in the middle of the fifth housing side portion 1126. In other words, the fifth housing side portion 1126 may include a connecting member MA positioned in side portions of the first through hole 1126*a* and the second through hole 1126*b*. In other words, the upper member UA and the lower member BA may be connected to each other through the connecting member MA. In addition, a plurality of lower members BA may be present to form the first and second through holes and disposed to be spaced apart from each other in the second direction (Y-axis direction).

Therefore, the fifth housing side portion 1126 may have the upper member UA, thereby improving stiffness. For example, the stiffness of the fifth housing side portion 1126 may increase as compared to a case in which the upper member UA is not present. For example, in the embodiment, the unit of stiffness may be N/μm. Therefore, it is possible to improve the reliability of the first camera actuator according to the embodiment.

In addition, the fifth housing side portion 1126 may further include the first protrusion and the second protrusion. The first protrusion may be in contact with the first housing side portion, and the second protrusion may be in contact with the second housing side portion. The first protrusion may extend from one end of the outer surface 1126*s*2 of the fifth housing side portion in the third direction (Z-axis direction). The second protrusion may extend from the other end of the outer surface 1126*s*2 of the fifth housing side portion in the third direction (Z-axis direction). In other words, the first protrusion and the second protrusion may extend toward the holder.

Furthermore, the fifth housing side portion 1126 may have an inner thickness Id1 greater than an outer thickness Id2. The thickness may be a length in the third direction (Z-axis direction). With this configuration, even when the second protrusion of the tilting guide unit is seated in the second protrusion groove PH2 formed in the inner surface 1126*s*1 of the fifth housing side portion 1126, it is possible to suppress damage to the fifth housing side portion 1126. In other words, it is possible to improve the reliability of the camera actuator.

FIG. 7 is a perspective view of an optical member of the first camera actuator according to the embodiment.

The optical member 1132 may be seated on the holder. The optical member 1132 may be a right angle prism as a reflector, but the present invention is not limited thereto.

In an embodiment, the optical member 1132 may have a protrusion (not shown) on a portion of an outer surface thereof. The optical member 1132 may be easily coupled to the holder through the protrusion (not shown). In addition, the holder may have a groove or a protrusion and thus may also be coupled to the optical member 1132.

In addition, a bottom surface 1132*b* of the optical member 1132 may be seated on a face of the holder. Therefore, the bottom surface 1132*b* of the optical member 1132 may correspond to the face of the holder. In an embodiment, the bottom surface 1132*b* may be formed to have an inclined surface like the seating of the holder. Therefore, the prism moves according to the movement of the holder and at the same time, can prevent the optical member 1132 from being separated from the holder due to the movement.

In addition, a groove may be formed in the bottom surface 1132*b* of the optical member 1132 and a bonding member may be applied, and thus the optical member 1132 may be coupled to the holder. Alternatively, the bonding member may be applied to the groove or protrusion of the holder, and thus the holder may also be coupled to the optical member 1132.

In addition, as described above, the optical member 1132 may be formed in a structure capable of reflecting light reflected from the outside (e.g., an object) into the camera module. As in the embodiment, the optical member 1132 may also be formed as a single mirror. In addition, the optical member 1132 can overcome the spatial limitations of the first camera actuator and the second camera actuator by changing the path of the reflected light. As described above, it should be understood that the camera module may also provide a high range of magnification by extending the optical path while minimizing a thickness. In addition, it should be understood that the camera module including the camera actuator according to the embodiment may also provide the high range of magnification by extending the optical path while minimizing the thickness.

FIG. 8A is a perspective view of a holder of the first camera actuator according to the first embodiment, FIG. 8B is a bottom view of the holder of the first camera actuator according to the first embodiment, FIG. 8C is a front view of the holder of the first camera actuator according to the first embodiment, FIG. 8D is a rear view of a fastening member of the first camera actuator according to the first embodiment, FIG. 8E is a bottom view of the fastening member of the first camera actuator according to the first embodiment, FIG. 8F is another side view of the holder of the first camera actuator according to the embodiment, FIG. 8G is another perspective view of the holder of the first camera actuator according to the first embodiment, FIG. 8H is a view for describing the application of a bonding member to the holder of the first camera actuator according to the first embodiment, FIG. 8I is a cross-sectional view along line I-I' in FIG. 8G, FIG. 8J is a cross-sectional view along line J-J' in FIG. 8G, FIG. 8K is a partial enlarged view of FIG. 8G, and FIG. 8L is a cross-sectional view along line K-K' in FIG. 8K.

Referring to FIGS. 8A to 8E, the holder 1131 includes an accommodating groove 1131*sh* in which the optical member 1132 is seated. In other words, the holder 1131 may be seated in the accommodating groove 1131*sh*. In addition, a groove 1131*kh* may be formed in a bottom surface 1131*k* of the accommodating groove 1131*sh*. Hereinafter, it will be described that the bottom surface 1131*k* of the accommodating groove 1131*kh* of the holder 1131 is used interchangeably with a face. In other words, the holder 1131 may include a bottom surface or the face 1131*k* that is a bottom surface. The face 1131*k* may be an inclined surface. Therefore, the face 1131*k* may be positioned under the optical member. Furthermore, the face 1131*k* may include the groove 1131*kh* disposed along an edge. For example, the groove 1131*kh* may be continuously or discontinuously connected in the face 1131*k*. In an embodiment, the groove 1131*kh* may be disposed along an edge other than an edge in the third direction (Z-axis direction) among the edges of the face 1131*k*. In other words, the groove 1131*kh* may be formed to be inclined parallel to the inclination of the face 1131*k* and formed parallel in the second direction above the face 1131*k*. For example, the groove 1131*kh* may include a first groove adjacent to the first housing side portion and inclined, a second groove adjacent to the second housing side portion and inclined, and a third groove adjacent to the fourth housing side portion, parallel in the second direction, and positioned above the face. Furthermore, the first groove and the second groove may be parallel to each other and may also be perpendicular to the third groove. Therefore, the groove 1131*kh* may have a structure coupled to the optical member in a balanced manner.

In addition, the groove 1131*kh* may be disposed under the accommodating groove 1131*sh* and may vertically overlap the optical member in the vertical direction or the first direction (X-axis direction). For example, all of the first groove, the second groove, and the third groove described above may overlap the optical member in the vertical direction. Alternatively, the groove 1131*kh* may be positioned inside an edge of the optical member under the optical member.

In addition, the holder 1131 may include a jaw portion above the surface 1131*k*. In addition, the jaw portion of the holder 1131 may be coupled to the protrusion (not shown) of the optical member 1132.

In addition, the holder 1131 may include a first holder stopper 1131ST1 and a second holder stopper 1131ST2 disposed on a holder upper surface 1131US.

The first holder stopper 1131ST1 and the second holder stopper 1131ST2 may extend upward. In other words, the first holder stopper 1131ST1 and the second holder stopper 1131ST2 may extend in the vertical direction.

The first holder stopper 1131ST1 and the second holder stopper 1131ST2 may be disposed outside the optical member. For example, the first holder stopper 1131ST1 and the second holder stopper 1131ST2 may be disposed to be spaced apart from the optical member.

In addition, the first holder stopper 1131ST1 may be disposed to be spaced apart from the second holder stopper 1131ST2 in the optical axis direction. In addition, the first holder stopper 1131ST1 may at least partially overlap the second holder stopper 1131ST2 in the optical axis direction.

The second holder stopper 1131ST2 may be disposed closer to the tilting guide unit than the first holder stopper 1131ST1. For example, a distance between the second holder stopper 1131ST2 and the tilting guide unit in the optical axis direction may be smaller than a distance between the first holder stopper 1131ST1 and the tilting guide unit in the optical axis direction.

In addition, the second holder stopper 1131ST2 may include a first stopper region 1131ST2*a* and a second stopper region 1131ST2*b*.

The first stopper region 1131ST2*a* may be a region extending from the second holder stopper 1131ST2 in the second direction (Y-axis direction), and the second stopper region 1131ST2*b* may be a region extending from the second holder stopper 1131ST2 in the third direction (Z-axis direction).

In an embodiment, a length L1 of the first stopper region 1131ST2*a* in the second direction (Y-axis direction) may be smaller than a length L2 of the second stopper region 1131ST2*b* in the third direction (Z-axis direction). The bonding member may be injected along the side portion of the holder 1131 instead of a region where the tilting guide unit is disposed, thereby suppressing the coupling between the tilting guide unit and the holder or between the housing and the holder. In other words, it is possible to improve driving accuracy according to tilt.

In addition, the second stopper region 1131ST2*b* may include a step portion 1131ST2*s* extending in the third direction (Z-axis direction) and positioned in one region. The step portion 1131ST2*s* may have a flat or round shape like a chamfer. In other words, the step portion 1131ST2*s* may be present in a partial region of the second holder stopper 1131ST2 positioned on the side portion of the holder 1131.

In an embodiment, the step portion 1131ST2*s* of the second holder stopper 1131ST2 may be positioned to overlap the optical member in the second direction.

In an embodiment, a length or height of the second holder stopper 1131ST2 in the vertical direction may be different with respect to the step portion 1131ST2*s*.

For example, a height (length in the third direction) on a rear end of the second holder stopper 1131ST2 may be smaller than a height on a front end thereof. Alternatively, a height of the first stopper region 1131ST2*a* of the second holder stopper 1131ST2 in the vertical direction may be greater than a height of the second stopper region 1131ST2*b*, which is spaced apart in the optical axis direction from the step portion 1131ST2*s*, in the vertical direction. With this configuration, in the camera actuator according to the embodiment, it is possible to reduce the contact between a portion having a large amount of movement and another component (a cover or a shield can) while minimizing an increase in weight due to the second holder stopper 1131ST2. In other words, a rear end (second camera actuator side) of the mover (holder and optical member) may have a greater stroke or a larger amount of movement than a front end (tilting guide unit or fastening member side) of the mover due to the tilt driving. Therefore, even in the second holder stopper 1131ST2, a step is formed on a rear end having a larger amount of movement, thereby preventing the rear end from being in contact with or interfering with the cover, the shield can, the housing, or the like thereabove.

Alternatively, an upper surface of the second stopper region 1131ST2*b* may be formed as a single surface. Therefore, the second stopper region 1131ST2*b* can prevent the optical member from being damaged due to the contact with the cover and the shield can thereabove. Therefore, the second stopper 1131ST2 may block the contact between the optical member, the housing, and the cover. Furthermore, a side surface of the boundary between the first stopper region 1131ST2*a* and the second stopper region 1131ST2*b* may have a chamfer shape.

In addition, a plurality of recesses 1131RS and the like may be present inside the seating groove 1131*kh* in the bottom surface or the face 1131*k*. Therefore, the plurality of recesses 1131RS may vertically overlap the optical member. Therefore, a weight of the holder 1131 can be reduced without affecting the change in the optical path. In this case, the plurality of recesses 1131RS may be present and formed symmetrically with respect to the vertical direction to maintain a balance in the tilt of the mover.

In addition, the holder 1131 may include a seating protrusion 1131*kp* disposed outside the face 1131*k*. The seating protrusion 1131*kp* may be disposed outside the groove 1131*kh*, and the optical member may be seated on the seating protrusion 1131*kp*.

The holder 1131 may include a plurality of outer surfaces. For example, the holder 1131 may include a first holder outer surface 1131S1, a second holder outer surface 1131S2, a third holder outer surface 1131S3, and a fourth holder outer surface 1131S4.

The first holder outer surface 1131S1 may be positioned to face the second holder outer surface 1131S2. In other words, the first holder outer surface 1131S1 may be disposed symmetrically with the second holder outer surface 1131S2 with respect to the first direction (X-axis direction).

The first holder outer surface 1131S1 may be positioned to correspond to the first housing side portion. In other words, the first holder outer surface 1131S1 may be positioned to face the first housing side portion. In addition, the second holder outer surface 1131S2 may be positioned to correspond to the second housing side portion. In other words, the second holder outer surface 1131S2 may be positioned to face the second housing side portion.

In addition, the first holder outer surface 1131S1 may include a first outer seating groove 1131S1*a*. In addition, the second holder outer surface 1131S2 may include a second outer seating groove 1131S2*a*. The first outer seating groove 1131S1*a* and the second outer seating groove 1131S2*a* may be disposed symmetrically with respect to the first direction (X-axis direction).

In addition, the first outer seating groove 1131S1*a* and the second outer seating groove 1131S2*a* may be disposed to overlap in the second direction (Y-axis direction). In addition, a first magnet 1151*a* may be disposed in the first outer seating groove 1131S1*a*, and a second magnet 1151*b* may be disposed in the second outer seating groove 1131S2*a*. The first magnet 1151*a* and the second magnet 1151*b* may also be disposed symmetrically with respect to the first direction (X-axis direction). In the specification, it should be understood that the first magnet to the third magnet may be coupled to the housing through a yoke or a bonding member.

As described above, due to the positions of the first and second grooves and the first and second magnets, electromagnetic forces generated by each magnet may be coaxially provided to the first holder outer surface 1131S1 and the second holder outer surface 1131S2. For example, a region of the first holder outer surface 1131S1 where the electromagnetic force is applied (e.g., a portion having the strongest electromagnetic force) and a region of the second holder outer surface 1132S2 where the electromagnetic force is applied (e.g., a portion having the strongest electromagnetic force) may be positioned on an axis parallel to the second direction (Y-axis direction). Therefore, the X-axis tilting can be accurately performed.

The first magnet 1151*a* may be disposed in the first outer seating groove 1131S1*a*, and the second magnet 1151*b* may be disposed in the second outer seating groove 1131S2*a*.

The third holder outer surface 1131S3 may be an outer surface that is in contact with the first holder outer surface 1131S1 and the second holder outer surface 1131S2 and extends from one side of each of the first holder outer surface 1131S1 and the second holder outer surface 1131S2 in the second direction (Y-axis direction). In addition, the third holder outer surface 1131S3 may be positioned between the first holder outer surface 1131S1 and the second holder outer surface 1131S2. The third holder outer surface 1131S3 may be the bottom surface of the holder 1131. In other words, the third holder outer surface 1131S3 may be positioned to face the third housing side portion.

In addition, the third holder outer surface 1131S3 may include a third outer seating groove 1131S3*a*. A third magnet 1151*c* may be disposed in the third outer seating groove 1131S3*a*. The third holder outer surface 1131S3 may be positioned to face the third housing side portion 1123.

In addition, the third housing hole 1123*a* may at least partially overlap the third outer seating groove 1131S3*a* in the first direction (X-axis direction). Therefore, the third magnet 1151*c* in the third outer seating groove 1131S3*a* and the third coil 1152*c* in the third housing hole 1123*a* may be positioned to face each other. In addition, the third magnet 1151*c* and the third coil 1152*c* generate an electromagnetic force so that the second camera actuator may perform the Y-axis tilt.

In addition, the X-axis tilt may be implemented by a plurality of magnets (first and second magnets 1151*a* and 1151*b*) while the Y-axis tilt may be implemented by only the third magnet 1151*c*.

In an embodiment, the third outer seating groove 1131S3*a* may have a greater width than the first outer seating groove 1131S1*a* or the second outer seating groove 1131S2*a*. With this configuration, the Y-axis tilt may be performed by current control similar to that of the X-axis tilt.

Furthermore, at least one of the first outer seating groove 1131S1*a*, the second outer seating groove 1131S2*a*, and the third outer seating groove 1131S3*a* may at least partially overlap the tilting guide unit in the first direction (X-axis direction) or the second direction (Y-axis direction) corresponding to the first magnet 1151*a*, the second magnet 1151*b*, and the third magnet 1151*c*, which will be described below. For example, the first protrusion of the tilting guide unit may overlap the first outer seating groove 1131S1*a* and the second outer seating groove 1131S2*a* in the second direction (Y-axis direction). In addition, a portion of the base of the tilting guide unit may overlap the first outer seating groove 1131S1*a* and the second outer seating groove 1131S2*a* in the second direction (Y-axis direction). In addition, at least a portion of the tilting guide unit may overlap the third outer seating groove 1131S3*a* in the first direction (X-axis direction). With this configuration, tilt driving may be performed as will be described below.

The fourth holder outer surface 1131S4 may be an outer surface that is in contact with the first holder outer surface 1131S1 and the second holder outer surface 1131S2 and extends from the first holder outer surface 1131S1 and the second holder outer surface 1131S2 in the first direction (X-axis direction). In addition, the fourth holder outer surface 1131S4 may be positioned between the first holder outer surface 1131S1 and the second holder outer surface 1131S2. In other words, the fourth holder outer surface 1131S4 may be positioned to face the fifth housing side portion.

The fourth holder outer surface 1131S4 may include a fourth outer seating groove 1131S4*a*. The tilting guide unit 1141 may be positioned in the fourth outer seating groove 1131S4*a*. In addition, the fastening member 1131*a* and the fifth housing side portion 1126 may be positioned in the fourth outer seating groove 1131S4*a*. In addition, the fourth outer seating groove 1131S4*a* may include a plurality of regions. The plurality of regions may include a first region AR1, a second region AR2, and a third region AR3.

The fastening member 1131*a* may be positioned in the first region AR1. In particular, the member base unit of the fastening member 1131*a* may be positioned in the first region AR1. In other words, the first region AR1 may overlap the fastening member 1131*a* in the first direction (X-axis direction). In this case, the first region AR1 may be positioned above the fourth holder outer surface 1131S4. In other words, the first region AR1 may correspond to a region positioned above the fourth outer seating groove 1131S4*a*. In this case, the first region AR1 may not be one region in the fourth outer seating groove 1131S4*a*.

The fifth housing side portion 1126 may be positioned in the second region AR2. In other words, the second region AR2 may overlap the fifth housing side portion 1126 in the first direction (X-axis direction).

In addition, the second region AR2 may be positioned above the fourth holder outer surface 1131S4 like the first region. In other words, the second region AR2 may correspond to the region positioned above the fourth outer seating groove 1131S4*a*.

The tilting guide unit may be positioned in the third region AR3. In particular, the base of the tilting guide unit may be positioned in the third region AR3. In other words, the third region AR3 may overlap the tilting guide unit (e.g., the base) in the first direction (X-axis direction).

In addition, the second region AR2 may be positioned between the first region AR1 and the third region AR3.

In addition, the fastening member may be disposed in the first region AR1, and the first fastening groove gr1 may be positioned in the fastening member 1131*a*. In an embodiment, the fastening member 1131*a* may include the first fastening groove gr1 formed in an inner surface 1131*aas*. In addition, the first magnetic substance may be disposed in the first fastening groove gr1 as described above. In other words, the first magnetic substance may also be positioned in the first region AR1.

In addition, as described above, the fifth housing side portion may be disposed in the second region AR2. The first fastening groove gr1 may be positioned to face the second fastening groove gr2. For example, the first fastening groove gr1 may at least partially overlap the second fastening groove gr2 in the third direction (Z-axis direction).

In addition, a repulsive force generated by the second magnetic substance may be transmitted to the fourth outer seating groove 1131S4*a* of the holder 1131 through the fastening member. Therefore, the holder may apply a force to the tilting guide unit in the same direction as the repulsive force generated by the second magnetic substance.

The fifth housing side portion may include the second fastening groove gr2 facing the first fastening groove gr1 formed in an outer surface thereof. In addition, as described above, the fifth housing side portion may include the second protrusion groove formed in an inner surface thereof. In addition, the second protrusion may be seated in the second protrusion groove.

In addition, like the second magnetic substance, the repulsive force generated by the first magnetic substance and the second magnetic substance may be applied to the fifth housing side portion. Therefore, the fifth housing side portion and the fastening member may press the tilting guide unit disposed between the fifth housing side portion and the holder 1131 through the repulsive force.

The tilting guide unit 1141 may be disposed in the third region AR3.

In addition, a first protrusion groove PH1 may be positioned in the fourth outer seating groove 1131S4*a*. In addition, the first protrusion of the tilting guide unit 1141 may be accommodated in the first protrusion groove PH1. Therefore, a first protrusion PR1 may be in contact with the first protrusion groove. A maximum diameter of the first protrusion groove PH1 may correspond to a maximum diameter of the first protrusion PR1. This may also be applied to the second protrusion groove and a second protrusion PR2 in the same manner. In other words, a maximum diameter of the second protrusion groove may correspond to a maximum diameter of the second protrusion PR2. Therefore, the second protrusion may be in contact with the second protrusion groove. With this configuration, the first axis tilt may be easily performed with respect to the first protrusion, and the second axis tilt may be easily performed with respect to the second protrusion, thereby improving a radius of the tilt.

In addition, in an embodiment, a plurality of first protrusion grooves PH1 may be present. For example, any one of the first protrusion groove PH1 and the second protrusion groove PH2 may include a 1-1 protrusion groove PH1*a* and a 1-2 protrusion groove PH1*b*. Hereinafter, it will be described that the first protrusion groove PH1 includes the 1-1 protrusion groove PH1*a* and the 1-2 protrusion groove PH1*b*. In addition, the following description may also be applied to the second protrusion groove PH2 in the same manner. For example, the second protrusion groove PH2 may include a 2-1 protrusion groove and a 2-2 protrusion groove, the description of the 1-1 protrusion groove may be applied to the 2-1 protrusion groove, and the description of the 1-2 protrusion groove may be applied to the 2-2 protrusion groove.

The 1-1 protrusion groove PH1*a* and the 1-2 protrusion groove PH1*b* may be disposed side by side in the first direction (X-axis direction). The 1-1 protrusion groove PH1*a* and the 1-2 protrusion groove PH1*b* may have the same maximum area.

The plurality of first protrusion grooves PH1 may have different numbers of inclined surfaces. For example, the first protrusion groove PH1 may include a groove bottom surface and an inclined surface. In this case, the plurality of protrusion grooves may have different numbers of inclined surfaces. In addition, the bottom surfaces of the protrusion grooves may also have different areas.

For example, the 1-1 protrusion groove PH1*a* may include a first groove bottom surface LS1 and a first inclined surface CS1. The 1-2 protrusion groove PH1*b* may include a second groove bottom surface LS2 and a second inclined surface CS2.

In this case, the first groove bottom surface LS1 and the second groove bottom surface LS2 may have different areas. The area of the first groove bottom surface LS1 may be smaller than the area of the second groove bottom surface LS2.

In addition, the number of first inclined surfaces CS1 in contact with the first groove bottom surface LS1 may be different from the number of second inclined surfaces CS2. For example, the number of first inclined surfaces CS1 may be greater than the number of second inclined surfaces CS2.

With this configuration, it is possible to easily compensate for an assembly tolerance of the first protrusion seated in the first protrusion groove PH1. For example, since the number of first inclined surfaces CS1 is greater than the number of second inclined surfaces CS2, the first protrusion may be in contact with more inclined surfaces, and thus the position of the first protrusion in the 1-1 protrusion groove PH1*a* may be more accurately maintained.

Unlike this, in the 1-2 protrusion groove PH1*b*, since the number of inclined surfaces in contact with the first protrusion is smaller than that of the 1-1 protrusion groove PH1*b*, the position of the first protrusion may be easily adjusted.

In an embodiment, the second inclined surfaces CS2 may be disposed to be spaced apart from each other in the second direction (Y-axis direction). In addition, the second groove bottom surface LS2 may extend in the first direction (X-axis direction), and the first protrusion may easily move in the first direction (X-axis direction) in a state of being in contact with the second inclined surface CS2. In other words, the position of the first protrusion may be easily adjusted in the 1-2 protrusion groove PH1*b*.

In addition, in the embodiment, the first region AR1, the second region AR2, and the third region AR3 may have different heights in the first direction (X-axis direction). In an embodiment, the first region AR1 may have a greater height than the second region AR2 and the third region AR3 in the first direction (X-axis direction). Therefore, a step may be positioned between the first region AR1 and the second region AR2.

In addition, the fastening member 1131*a* may include the first fastening groove gr1. In other words, the first coupling groove gr1 may be positioned on an inner surface of a member base unit 1131*aa*. In addition, the first magnetic substance described above may be seated in the first fastening groove gr1. In addition, a plurality of first fastening grooves gr1 may be present according to the number of first magnetic substances. In other words, the number of first fastening grooves gr1 may correspond to the number of first magnetic substances.

Furthermore, the area of the first fastening groove gr1 may be different from the area of the second groove. For example, the area of the first fastening groove gr1 may be greater than the area of the second groove. Therefore, the center of gravity may be moved adjacent to the tilting guide unit. Therefore, it is possible to reduce a difference in a driving force due to a posture difference and minimize current consumption for rotation.

In addition, the fastening member 1131*a* may include the member base unit 1131*aa*, a first extension 1131*ab*, and a second extension 1131*ac*.

The member base unit 1131*aa* may be positioned on an outermost side of the first camera actuator. The member base unit 1131*aa* may be positioned outside the fifth housing side portion. In other words, the fifth housing side portion may be positioned between the member base unit 1131*aa* and the tilting guide unit.

The first extension 1131*ab* may extend from an edge of the member base unit 1131*aa* in the third direction (Z-axis direction). Furthermore, the first extension 1131*ab* may be bent and then may extend in the second direction (Y-axis direction). For example, the first extension 1131*ab* may extend in an opposite direction toward the first fastening groove gr1. In other words, the first extension 1131*ab* may extend from the member base unit 1131*aa* toward the holder 1131. This is also the same for the second extension 1131*ac*. In addition, the second extension 1131*ac* may extend from the edge of the member base unit 1131*aa* in the third direction (Z-axis direction). In an embodiment, the first extension 1131*ab* and the second extension 1131*ac* may be positioned on the edge of the member base unit 1131*aa* in the second direction (Y-axis direction). In addition, the first extension 1131*ab* and the second extension 1131*ac* may be disposed between the upper member and the lower member.

Therefore, the fastening member 1131*a* may have a groove formed by the first extension 1131*ab* and the second extension 1131*ac*. In other words, the groove may be positioned between the first extension 1131*ab* and the second extension 1131*ac*. Therefore, the first extension 1131*ab* and the second extension 1131*ac* may be connected to each other by only the member base unit 1131*aa*. With this configuration, the fastening member 1131*a* may continuously receive the repulsive force by the first magnetic substance seated on a center of the member base unit 1131*aa*, in particular, in the first fastening groove gr1.

In addition, since the fastening member 1131*a* is coupled to the holder and moves upon the X-axis tilt and the Y-axis tilt, the stiffness of the fastening member 1131*a* may be greater than the stiffness of the fifth housing side portion.

Furthermore, as described above, the fifth housing side portion according to the embodiment may have the upper member and the lower member, thereby increasing stiffness. With this configuration, it is possible to reduce a difference in stiffness between the fastening member and the fifth housing side portion. Therefore, when the fastening member 1131*a* and the holder 1131 coupled to the fastening member 1131*a* are tilted to the X axis or the Y axis together, the fastening member 1131*a* may have a small distance adjacent to the fifth housing side portion and may be in contact with the fifth housing side portion. Therefore, as described above, since the fifth housing side portion has improved stiffness, the fifth housing side portion may be easily operated as a stopper. In other words, it is possible to improve the reliability of the camera actuator.

In addition, the first extension 1131*ab* may be spaced apart from the second extension 1131*ac* in the second direction (Y-axis direction) to form a separation space. The fifth housing side portion and the tilting guide unit may be seated in the separation space. In addition, the second magnetic substance and the first magnetic substance may be positioned in the separation space.

In addition, the first extension 1131*ab* and the second extension 1131*ac* may have the same length in the third direction (Z-axis direction). Therefore, the coupling force, the weight, and the like are formed in a balanced manner, and thus the holder may be accurately tilted without tilting to one side.

In addition, the first extension 1131*ab* and the second extension 1131*ac* may be coupled to the holder. In the specification, it should be understood that coupling may mean coupling through a bonding member other than the protrusion and groove structure described above. In an embodiment, the first extension 1131*ab* and the second extension 1131*ac* may include a coupling groove 1131L that is open to the outside. The bonding member (e.g., epoxy) may be applied through a coupling groove 1131L, and the first extension 1131*ab* and the second extension 1131*ac* may be easily coupled to the holder or the fourth holder outer surface. However, in the specification, it should be understood that the positions of the protrusion and groove structure for coupling may also be changed.

Referring to FIGS. 8F to 8L, at least a portion of the optical member 1132 may be disposed above the face 1131*k* of the holder 1131. The face 1131*k* of the holder 1131 according to the embodiment may include a first face region AS1 and a second face region AS2.

The first face region AS1 may overlap the optical member 1132 in the vertical direction (X-axis direction) inside the groove 1131*kh*. In addition, the second face region AS2 may overlap the optical member 1132 in the vertical direction (X-axis direction) outside the groove 1131*kh*.

In an embodiment, an area of the first face region AS1 may be greater than an area of the second face region AS2. With this configuration, it is possible to appropriately secure a space where the reflection and transmission of light incident on the optical member occurs.

In addition, as described above, the holder 1131 includes the seating protrusion 1131*kp* disposed outside the groove 1131*kh* above the face 1131*k*. In addition, a bonding member BM may be applied between the first holder stopper 1131ST1 and the groove 1131*kh*. Therefore, the bonding member BM may be positioned inside the first holder stopper 1131ST1 and injected into the side surface of the optical member 1132. Therefore, the bonding member BM may couple the optical member 1132 and the holder 1131. With this configuration, it is possible to suppress a phenomenon in which the optical member 1132 is separated from the holder 1131.

Furthermore, the bonding member BM may pass the second face region AS2 while moving downward along an inner side of the holder 1131 and may be positioned in the groove 1131*kh*.

In addition, an upper surface of the seating protrusion 1131*kp* may be positioned above the first face region AS1. Therefore, the first face region AS1 may be spaced apart by a predetermined distance dg from the optical member 1132. Therefore, it is possible to suppress the movement of the injected bonding member BM to an inner side of the first face region AS1. In other words, when the bonding member is positioned inside the first face region AS1, it is possible to suppress the occurrence of the scattering of light transmitted through the optical member 1132 or light reflected from the optical member 1132. Therefore, it is possible to minimize the occurrence of image errors due to light provided to the second actuator along the optical axis.

In addition, as described above, the first holder stopper 1131ST1 may at least partially overlap the housing upper surface 1124US in the vertical direction. Furthermore, the second holder stopper 1131ST2 may vertically overlap the fourth housing hole 1124*a*.

With this configuration, even when the holder 1131 and the optical member 1132 are tilted with respect to the first direction or the second direction, the first holder stopper 1131ST1 may be in contact with the housing upper surface 1124US. Therefore, even when the first holder stopper 1131ST1 positioned behind the second holder stopper 1131ST2 has a greater moving radius due to tilting than the second holder stopper 1131ST2, the tilting can be suppressed by the housing upper surface 1124US. Furthermore, the impact to the holder 1131 can be reduced by the first holder stopper 1131ST1. Therefore, it is possible to improve the reliability of the mover in the first camera actuator according to the embodiment.

Unlike this, the second holder stopper 1131ST2 may vertically overlap the fourth housing hole 1124*a*. In addition, an upper surface 1131ST2US of the second holder stopper 1131ST2 may be positioned above the optical member 1132. Therefore, even when the tilting guide unit is separated from the holder 1131 and the holder 1131 and the optical member 1132 move upward, the second holder stopper 1131ST2 can block the contact between the optical member 1132 and the cover as a stopper. Therefore, it is also possible to suppress damage to the optical member 1132 due to the impact.

Alternatively, the upper surface 1131ST2US of the second holder stopper 1131ST2 may also be positioned above the upper surface of the optical member 1132 regardless of the step portion 1131ST2*s*. For example, both of upper surfaces of the first stopper region and the second stopper region may be positioned above the upper surface of the optical member.

Alternatively, upper surfaces of portions of the first stopper region and the second stopper region may be positioned above the upper surface of the optical member. In addition, in the second stopper region, an upper surface of a region positioned on a rear end of the step portion may be positioned under the upper surface of the optical member.

In an embodiment, the optical member 1132 may include a first overlapping region OP1 and a second overlapping region OP2. The first overlapping region OP1 may vertically overlap the face 1131*k*.

The second overlapping region OP2 may be a region other than the first overlapping region OP1 and may vertically overlap the holder upper surface 1131US. In addition, an area of the first overlapping region OP1 on a YZ plane may be greater than an area of the second overlapping region OP2. Therefore, incident light may pass the optical member 1132 and may be easily provided to the second camera actuator.

In addition, the second overlapping region OP2 may be disposed outside the groove 1131*kh*. Alternatively, the first overlapping region OP1 may vertically overlap the groove 1131*kh*. In addition, as described above, the first overlapping region OP1 may vertically overlap the first face region and the second face region.

In addition, in an embodiment, the first camera actuator may include a support member SB disposed between the second overlapping region OP2 and the holder 1131. Alternatively, the holder 1131 may include the support member SB disposed under the second overlapping region OP2. For example, the support member SB may be a component formed integrally with the holder 1131 or separated from the holder 1131. In addition, the support member SB may vertically overlap at least a portion of the optical member 1132.

In an embodiment, the support member SB may be disposed above the face 1131*k* of the holder 1131 and may not vertically overlap the face 1131*k*. For example, the support member SB may be disposed to be spaced apart from the face 1131*k*.

In addition, the support member SB may extend parallel to the first holder stopper of the holder 1131 in the second direction. In addition, the support member SB may be disposed adjacent to the third groove described above. For example, the support member SB may be in contact with the third groove. Therefore, the bonding member moving along the inclined surface of the support member SB may be easily injected into the groove 1131*kh*.

Furthermore, a first inclination angle $\theta_a$ of the support member SB and a second inclination angle $\theta_b$ of the face 1131*k* of the holder 1131 may be different from each other.

The first inclination angle $\theta_a$ of the support member SB is a slope of the upper surface of the support member SB with respect to the YZ plane, and the second inclination angle $\theta_b$ of the face 1131*k* of the holder 1131 is a slope of the face 1131*k* with respect to the YZ plane.

In an embodiment, the first inclination angle $\theta_a$ of the support member SB may be smaller than the second inclination angle $\theta_b$ of the face 1131*k* of the holder 1131.

The support member SB may be positioned on the holder upper surface 1131US, and at least a portion of the support member SB may vertically overlap the optical member 1132. A distance dd2 between the face 1131*k* and the first overlapping region OP1 may be smaller than a distance dd1 between the support member SB and the second overlapping region OP2. In this case, the distance may be a maximum distance, the distance dd2 between the face 1131*k* and the first overlapping region OP1 may be a length in a direction perpendicular to the face 1131*k*, and the distance dd1 between the support member SB and the second overlapping region OP2 may be a length in a direction perpendicular to the upper surface of the support member. Therefore, the bonding member BM may move not only to the groove 1131*kh* but also between the support member SB and the overlapping region OP2. Therefore, it is possible to improve the coupling force between the holder 1131 and the optical member 1132. In addition, the support member SB may suppress a phenomenon in which the optical member 1132 is damaged or broken due to the impact caused by the tilt. In other words, the support member SB may function as a buffering material.

In addition, in order to allow the bonding member BM to easily move to or permeate into the groove 1131*kh* along the upper surface of the support member SB, a distance may be set at the inclination of the support member SB as described above.

FIG. 9A is a perspective view of a tilting guide unit of the first camera actuator according to the first embodiment, FIG. 9B is a perspective view in a direction different from that of FIG. 9A, and FIG. 9C is a cross-sectional view along line F-F' in FIG. 9A.

Referring to FIGS. 9A to 9C, the tilting guide unit 1141 according to the embodiment may include a base BS, the first protrusion PR1 protruding from the first face 1141*a* of the base BS, and the second protrusion PR2 protruding from a second face 1141*b* of the base BS. In addition, the first protrusion and the second protrusion may be formed on surfaces opposite to each other according to the structure, but the following description will be given on the basis of the drawings. In addition, it should be understood that the first protrusion PR1 and the second protrusion PR2 may be formed integrally with the base BS, and as shown in the drawings, the first protrusion PR1 and the second protrusion PR2 may have a spherical shape like a ball. For example, in the tilting guide unit 1141, the base BS may include grooves at positions corresponding to the first protrusion PR1 and the second protrusion PR2. In addition, the ball may be inserted into the groove of the base BS. In addition, the tilting guide unit 1141 may also have a structure in which the protrusion (first protrusion or second protrusion) described above, the groove of the base BS, and the ball inserted into the groove are combined in various methods.

First, the base BS may include a first face 1141*a* and a second face 1141*b* opposite to the first face 1141*a*. In other words, the first face 1141*a* may be spaced apart from the second face 1141*b* in the third direction (Z-axis direction), and the first face 1141*a* and the second face 1141*b* may be outer surfaces opposite to or facing each other in the tilting guide unit 1141. For example, the first face 1141*a* is a face adjacent to the holder, and the second face 1141*b* is a face adjacent to the fifth housing side portion.

The tilting guide unit 1141 may include the first protrusion PR1 extending to one side of the first face 1141*a*. According to the embodiment, the first protrusion PR1 may protrude from the first face 1141*a* toward the holder. The plurality of first protrusions PR1 may be present and may include a 1-1 protrusion PR1*a* and a 1-2 protrusion PR1*b*.

The 1-1 protrusion PR1*a* and the 1-2 protrusion PR1*b* may be positioned side by side in the second direction (Y-axis direction). In other words, the 1-1 protrusion PR1*a* and the 1-2 protrusion PR1*b* may overlap in the second direction (Y-axis direction). In addition, in an embodiment, the 1-1 protrusion PR1*a* and the 1-2 protrusion PR1*b* may be bisected by a virtual line VL1 or VL2 or a face extending in the first direction (X-axis direction) or the second direction (Y-axis direction).

In addition, the 1-1 protrusion PR1*a* and the 1-2 protrusion PR1*b* may have a curvature and for example, a hemispherical shape. Therefore, a center of the first protrusion PR1 may be positioned on the first face 1141*a*. Therefore, the rotation (Y-axis tilt) of the tilting guide unit may be performed with respect to the first face 1141*a*.

In addition, an alignment groove may be positioned in the first face 1141*a*. The alignment groove may be disposed on one side of the first face 1141*a* and may provide an assembled position or assembled direction of the tilting guide unit 1141 in an assembling process.

In addition, the tilting guide unit 1141 may include the second protrusion PR2 extending to one side of the second face 1141*b*. According to the embodiment, the second protrusion PR2 may protrude from the second face 1141*b* toward the housing. In addition, a plurality of second protrusions PR2 may be present and may include the 2-1 protrusion PR2*a* and the 2-2 protrusion PR2*b* in the embodiment. Likewise, since a center of the second protrusion PR2 may be present on the second face 1141*b*, and the rotation (X-axis tilt) of the tilting guide unit may be performed with respect to the second face 1141*b*.

The 2-1 protrusion PR2*a* and the 2-2 protrusion PR2*b* may be positioned side by side in the first direction (X-axis direction). In other words, the 2-1 protrusion PR2*a* and the 2-2 protrusion PR2*b* may overlap in the first direction (X-axis direction). In addition, in an embodiment, the 2-1 protrusion PR2*a* and the 2-2 protrusion PR2*b* may be bisected by a virtual line VL1' or VL2' or a face extending in the first direction (X-axis direction) or the second direction (Y-axis direction).

The 2-1 protrusion PR2*a* and the 2-2 protrusion PR2*b* may have a curvature and for example, a hemispherical shape. In addition, the 2-1 protrusion PR2*a* and the 2-2 protrusion PR2*b* may be in contact with the fastening member 1131*a* at a point spaced apart from the second face 1141*b* of the base BS.

The 1-1 protrusion PR1*a* and the 1-2 protrusion PR1*b* may be positioned in a region between the 2-1 protrusion PR2*a* and the 2-2 protrusion PR2*b* in the second direction. According to the embodiment, the 1-1 protrusion PR1*a* and the 1-2 protrusion PR1*b* may be positioned at a center of the separation space between the 2-1 protrusion PR2*a* and the 2-2 protrusion PR2*b* in the first direction. With this configuration, the actuator according to the embodiment may have an angle of the X-axis tilt in the same range with respect to the X-axis. In other words, the tilting guide unit 1141 may provide a range in which the holder may be tilted to the Y-axis (e.g., a negative/positive range) with respect to the 1-1 protrusion PR1*a* and the 1-2 protrusion PR1*b* equally with respect to the Y-axis.

In addition, the 2-1 protrusion PR2*a* and the 2-2 protrusion PR2*b* may be positioned in a region between the 1-1 protrusion PR1*a* and the 1-2 protrusion PR1*b* in the second direction. According to the embodiment, the 2-1 protrusion PR2*a* and the 2-2 protrusion PR2*b* may be positioned at a center of the separation space between the 1-1 protrusion PR1*a* and the 1-2 protrusion PR1*b* in the first direction. With this configuration, the actuator according to the embodiment may have the angle of the X-axis tilt in the same range with respect to the X-axis. In other words, the actuator may provide a range in which the tilting guide unit 1141 and the holder may be tilted to the X-axis (e.g., a negative/positive range) with respect to the 2-1 protrusion PR2*a* and the 2-2 protrusion PR2*b* equally with respect to the X-axis.

Specifically, the first face 1141*a* may include a first outer line M1, a second outer line M2, a third outer line M3, and a fourth outer line M4. The first outer line M1 and the second outer line M2 may face each other, and the third outer line M3 and the fourth outer line M4 may face each other. In addition, the third outer line M3 and the fourth outer line M4 may be positioned between the first outer line M1 and the second outer line M2. In addition, the first outer line M1 and the second outer line M2 may be perpendicular to the first direction (X-axis direction), but the third outer line M3 and the fourth outer line M4 may be parallel to the first direction (X-axis direction).

In this case, the first protrusion PR1 may be positioned on the second virtual line VL2. Here, the first virtual line VL1 is a line that bisects the first outer line M1 and the second outer line M2. Alternatively, the first and third virtual lines VL1 and VL1' are lines that bisect the base BS in the second direction (Y-axis direction). Therefore, the tilting guide unit 1141 may easily perform the Y-axis tilt through the first protrusion PR1. In addition, since the tilting guide unit 1141 performs the Y-axis tilt with respect to the second virtual line VL2, a rotational force may be uniformly applied to the tilting guide unit 1141. Therefore, it is possible to precisely perform the X-axis tilt and improve the reliability of the device.

In addition, the 1-1 protrusion PR1*a* and the 1-2 protrusion PR1*b* may be disposed symmetrically with respect to the first virtual line VL1 and the second virtual line VL2. Alternatively, the 1-1 protrusion PR1*a* and the 1-2 protrusion PR1*b* may be positioned symmetrically with respect to a first center point C1. With this configuration, upon the Y-axis tilt, a support force supported by the first protrusion PR1 may be equally applied above and under the second virtual line VL2. Therefore, it is possible to improve the reliability of the tilting guide unit. Here, the second virtual line VL2 is a line that bisects the third outer line M3 and the fourth outer line M4. Alternatively, the second and fourth virtual lines LV2 and LV2' are lines that bisect the base BS in the first direction (X-axis direction).

In addition, the first center point C1 may be an intersection of the first virtual line VL1 and the second virtual line VL2. Alternatively, the first center point C1 may be disposed at a point corresponding to (e.g., overlapping) the center of gravity in the third direction according to the shape of the tilting guide unit 1141.

In addition, the second face 1141*b* may include a fifth outer line M1', a sixth outer line M2', a seventh outer line M3', and an eighth outer line M4'. The fifth outer line M1' and the sixth outer line M2' may face each other, and the seventh outer line M3' and the eighth outer line M4' may face each other. In addition, the seventh outer line M3' and the eighth outer line M4' may be positioned between the fifth outer line M1' and the sixth outer line M2'. In addition, the fifth outer line M1' and the sixth outer line M2' may be perpendicular to the first direction (X-axis direction), but the seventh outer line M3' and the eighth outer line M4' may be parallel to the first direction (X-axis direction).

In addition, since the tilting guide unit 1141 performs the X-axis tilt with respect to the third virtual line VL1', a rotational force may be uniformly applied to the tilting guide unit 1141. Therefore, it is possible to precisely perform the X-axis tilt and improve the reliability of the device.

In addition, the 2-1 protrusion PR2*a* and the 2-2 protrusion PR2*b* may be disposed on the third virtual line VL1' symmetrically with respect to the fourth virtual line VL2'. Alternatively, the 2-1 protrusion PR2*a* and the 2-2 protrusion PR2*b* may be positioned symmetrically with respect to a second center point C1'. With this configuration, upon the X-axis tilt, a support force supported by the second protrusion PR2 may be equally applied to a left and right of the tilting guide unit with respect to the third virtual line VL1'. Therefore, it is possible to improve the reliability of the tilting guide unit. Here, the third virtual line LV1' is a line that bisects the fifth outer line M1' and the sixth outer line M2'. In addition, the second center point C1' may be an intersection of the third virtual line VL1' and the fourth virtual line VL2'. Alternatively, the second center point C1' may also be a point corresponding to the center of gravity according to the shape of the tilting guide unit 1141.

In addition, a distance between the 1-1 protrusion PR1*a* and the 1-2 protrusion PR1*b* in the second direction (Y-axis direction) may be greater than a length of the second protrusion PR2 in the second direction (Y-axis direction). Therefore, when the Y-axis tilt is performed with respect to the 1-1 protrusion PR1*a* and the 1-2 protrusion PR1*b*, it is possible to minimize resistance due to the second protrusion PR2.

Correspondingly, a distance between the 2-1 protrusion PR2*a* and the 2-2 protrusion PR2*b* in the first direction (X-axis direction) may be greater than a length of the first protrusion PR1 in the first direction (X-axis direction). Therefore, when the X-axis tilt is performed with respect to the 2-1 protrusion PR2*a* and the 2-2 protrusion PR2*b*, it is possible to minimize resistance due to the first protrusion PR1.

FIG. 10 is a view showing a first drive unit of the first camera actuator according to the embodiment.

Referring to FIG. 10, the first drive unit 1150 includes the first drive magnet 1151, the first drive coil 1152, the Hall sensor unit 1153, the first board unit 1154, and the yoke unit 1155.

In addition, as described above, the first drive magnet 1151 may include the first magnet 1151*a*, the second magnet 1151*b*, and the third magnet 1151*c* for providing a driving force by an electromagnetic force. Each of the first magnet 1151*a*, the second magnet 1151*b*, and the third magnet 1151*c* may be positioned adjacent to the outer surface of the holder 1131. For example, each of the first magnet 1151*a*, the second magnet 1151*b*, and the third magnet 1151*c* may be positioned in the groove of the outer surface of the holder 1131.

In addition, the first drive coil 1152 may include a plurality of coils. In an embodiment, the first drive coil 1152 may include at least one coil, and the at least one coil may be positioned to correspond to at least one magnet of the first drive magnet described above. For example, the first drive coil 1152 may include a first coil 1152*a*, a second coil 1152*b*, and a third coil 1152*c*.

The first coil 1152*a* may be positioned opposite to the first magnet 1151*a*. Therefore, as described above, the first coil 1152*a* may be positioned in the first housing hole 1121*a* of the first housing side portion 1121. In addition, the second coil 1152*b* may be positioned opposite to the second magnet 1151*b*. Therefore, as described above, the second coil 1152*b* may be positioned in the second housing hole 1122*a* of the second housing side portion 1122.

The second camera actuator according to the embodiment may provide the best optical characteristics by controlling the mover 1130 to rotate along the first axis (X-axis direction) or the second axis (Y-axis direction) by the electromagnetic force between the first drive magnet 1151 and the first drive coil 1152, thereby minimizing the occurrence of a de-center or tilt phenomenon when OIS is implemented.

In addition, according to the embodiment, there may be provided the ultra-slim and ultra-small camera actuator and the camera module including the same, which may implement OIS through the tilting guide unit 1141 of the rotational unit 1140 disposed between the first housing 1120 and the mover 1130, thereby eliminating the size limitation of the actuator.

The first board unit 1154 may include a first board side portion 1154*a*, a second board side portion 1154*b*, and a third board side portion 1154*c*.

The first board side portion 1154*a* and the second board side portion 1154*b* may be positioned to face each other. In addition, the third board side portion 1154*c* may be positioned between the first board side portion 1154*a* and the second board side portion 1154*b*.

In addition, the first board side portion 1154*a* may be positioned between the first housing side portion and the shield can, and the second board side portion 1154*b* may be positioned between the second housing side portion and the shield can. In addition, the third board side portion 1154*c* may be positioned between the third housing side portion and the shield can and may be a bottom surface of the first board unit 1154.

The first board side portion 1154*a* may be coupled to and electrically connected to the first coil 1152*a*. In addition, the first board side portion 1154*a* may be coupled to and electrically connected to the first Hall sensor 1153*a*.

The second board side portion 1154*b* may be coupled to and electrically connected to the second coil 1152*b*. It should be understood that the second board side portion 1154*b* may also be coupled to and electrically connected to the first Hall sensor.

The third board side portion 1154*c* may be coupled to and electrically connected to the third coil 1152*c*. In addition, the third board side portion 1154*c* may be coupled to and electrically connected to the second Hall sensor 1153*b*.

The yoke unit 1155 may include a first yoke 1155*a*, a second yoke 1155*b*, and a third yoke 1155*c*. The first yoke 1155*a* may be positioned in the first outer seating groove and coupled to the first magnet 1151*a*. In addition, the second yoke 1155*b* may be positioned in the second outer seating groove and coupled to the second magnet 1151*b*. In addition, the third yoke 1155*c* may be positioned in the third outer seating groove and coupled to the third magnet 1151*c*. The first yoke 1155*a* to the third yoke 1155*c* allow the first magnet 1151*a* to the third magnet 1151*c* to be easily seated in the first to third outer seating grooves and coupled to the housing.

FIG. 11A is a perspective view of the first camera actuator according to the first embodiment, FIG. 11B is a cross-sectional view along line P-P' in FIG. 11A, FIG. 11C is an enlarged view of portion K1 in FIG. 11B, FIG. 11D is an enlarged view of portion K2 in FIG. 11B, FIG. 11E is a cross-sectional view along line Q-Q' in FIG. 11A, FIG. 11F is a perspective view of the housing, the tilting guide unit, the holder, the optical member, and the housing in the first camera actuator, FIG. 11G is a cross-sectional view along line L-L' in FIG. 11F, and FIG. 11H is a perspective view of a tilting guide unit according to another embodiment.

Referring to FIGS. 11A to 11E, the first coil 1152*a* may be positioned on the first housing side portion 1121, and the first magnet 1151*a* may be positioned on the first holder outer surface 1131S1 of the holder 1131. Therefore, the first coil 1152*a* and the first magnet 1151*a* may be positioned opposite to each other. The first magnet 1151*a* may at least partially overlap the first coil 1152*a* in the second direction (Y-axis direction).

In addition, the second coil 1152*b* may be positioned on the second housing side portion 1122, and the second magnet 1151*b* may be positioned on the second holder outer surface 1131S2 of the holder 1131. Therefore, the second coil 1152*b* and the second magnet 1151*b* may be positioned opposite to each other. The second magnet 1151*b* may at least partially overlap the second coil 1152*b* in the second direction (Y-axis direction).

In addition, the first coil 1152*a* and the second coil 1152*b* may overlap in the second direction (Y-axis direction), and the first magnet 1151*a* and the second magnet 1151*b* may overlap in the second direction (Y-axis direction).

With this configuration, the electromagnetic forces applied to the outer surfaces of the holder (first holder outer surface and second holder outer surface) may be positioned on an axis parallel to the second direction (Y-axis direction), thereby performing the X-axis tilt accurately and precisely.

In addition, the second protrusions PR2*a* and PR2*b* of the tilting guide unit 1141 may be in contact with the fifth housing side portion 1126 of the first housing 1120. The second protrusion PR2 may be seated in the second protrusion groove PH2 formed in one side surface of the fifth housing side portion 1126. In addition, when the X-axis tilt is performed, the second protrusions PR2*a* and PR2*b* may be reference axes (or rotational axes) of the tilt. Therefore, the tilting guide unit 1141 and the mover 1130 may move in the second direction.

In addition, as described above, the first Hall sensor 1153*a* may be positioned outside for electrical connection and coupling with the first board unit 1154. However, the present invention is not limited to these positions.

In addition, the third coil 1152*c* may be positioned on the third housing side portion 1123, and the third magnet 1151*c* may be positioned on the third holder outer surface 1131S3 of the holder 1131. The third coil 1152*c* and the third magnet 1151*c* may at least partially overlap in the first direction (X-axis direction). Therefore, an intensity of the electromagnetic force between the third coil 1152*c* and the third magnet 1151*c* may be easily controlled.

As described above, the tilting guide unit 1141 may be positioned on the fourth holder outer surface 1131S4 of the holder 1131. In addition, the tilting guide unit 1141 may be seated in the fourth outer seating groove 1131S4*a* of the fourth holder outer surface. As described above, the fourth outer seating groove 1131S4*a* may include the first region, the second region, and the third region described above.

The fastening member 1131*a* may be disposed in the first region, and the fastening member 1131*a* may include the first fastening groove gr1 formed in an inner surface thereof. In addition, as described above, the first magnetic substance 1142 may be disposed in the first fastening groove gr1, and a repulsive force RF2 generated by the first magnetic substance 1142 may be transmitted to the fourth outer seating groove 1131S4*a* of the holder 1131 through the fastening member 1131*a* (RF2'). Therefore, the holder 1131 may apply a force to the tilting guide unit 1141 in the same direction as the repulsive force RF2 generated by the first magnetic substance 1142.

The fifth housing side portion 1126 may be disposed in the second region. The fifth housing side portion 1126 may include the second fastening groove gr2 facing the first fastening groove gr1. In addition, the fifth housing side portion 1126 may include the second protrusion groove PH2 disposed on a face opposite to the second fastening groove gr2. In addition, a repulsive force RF1 generated by the second magnetic substance 1143 may be applied to the fifth housing side portion 1126. Therefore, the fifth housing side portion 1126 and the fastening member 1131*a* may press the tilting guide unit 1141 disposed between the fifth housing side portion 1126 and the holder 1131 through the generated repulsive forces RF1 and RF2'. Therefore, the coupling between the holder 1131, the first housing 1120, and the tilting guide unit 1141 may be maintained even after the holder is tilted to the X-axis or the Y-axis by the current applied to the first and second coils or the third coil 1152*c*.

The tilting guide unit 1141 may be disposed in the third region. As described above, the tilting guide unit 1141 may include the first protrusion PR1 and the second protrusion PR2. In this case, the first protrusion PR1 and the second protrusion PR2 may also be respectively disposed on the second face and the first face of the base. As described above, even in other embodiments to be described below, the first protrusion PR1 and the second protrusion PR2 may be variously positioned on the facing faces of the base.

The first protrusion groove PH1 may be positioned in the fourth outer seating groove 1131S4*a*. In addition, the first protrusion PR1 of the tilting guide unit 1141 may be accommodated in the first protrusion groove PH1. Therefore, the first protrusion PR1 may be in contact with the first protrusion groove PH1. The maximum diameter of the first protrusion groove PH1 may correspond to the maximum diameter of the first protrusion PR1. This may also be applied to the second protrusion groove PH2 and the second protrusion PR2 in the same manner. In other words, the maximum diameter of the second protrusion groove PH2 may correspond to the maximum diameter of the second protrusion PR2. In addition, therefore, the second protrusion PR2 may be in contact with the second protrusion groove PH2. With this configuration, the first axis tilt may be easily performed with respect to the first protrusion PR1, and the second axis tilt may be easily performed with respect to the second protrusion PR2, thereby improving the radius of the tilt.

In addition, the tilting guide unit 1141 may be disposed side by side with the fastening member 1131*a* and the fifth housing side portion 1126 in the third direction (Z-axis direction), and thus the tilting guide unit 1141 and the optical member 1132 may partially overlap in the first direction (X-axis direction). More specifically, in an embodiment, the first protrusion PR1 may overlap the optical member 1132 in the first direction (X-axis direction). Furthermore, at least a portion of the first protrusion PR1 may overlap the third coil 1152*c* or the third magnet 1151*c* in the first direction (X-axis direction). In other words, in the camera actuator according to the embodiment, each protrusion, which is the center axis of the tilt, may be positioned adjacent to a center of gravity of the mover 1130. Therefore, the tilting guide unit may be positioned adjacent to a center of gravity of the holder. Therefore, the camera actuator according to the embodiment can minimize a moment value for tilting the holder and also minimize the consumption of the current applied to the coil unit or the like in order to tilt the holder, thereby improving power consumption and the reliability of the device.

In addition, the first magnetic substance 1142 and the second magnetic substance 1143 may not overlap the third coil 1152*c* or the optical member 1132 in the first direction (X-axis direction). In other words, in an embodiment, the first magnetic substance 1142 and the second magnetic substance 1143 may be disposed to be spaced apart from the third coil 1152*c* or the optical member 1132 in the third direction (Z-axis direction). Furthermore, the first magnetic substance 1142 and the second magnetic substance 1143 may be disposed to be spaced apart from the tilting guide unit 1141 in a direction opposite to the third direction. Therefore, the third coil 1152*c* can minimize the magnetic force received from the first magnetic substance 1142 and the second magnetic substance 1143. Therefore, the camera actuator according to the embodiment can easily perform a vertical driving (Y-axis tilt) and minimize power consumption.

Furthermore, as described above, the second Hall sensor 1153*b* positioned inside the third coil 1153*c* may detect a change in a magnetic flux, and thus perform position sensing between the third magnet 1151*c* and the second Hall sensor 1153*b*. In this case, an offset voltage of the second Hall sensor 1153*b* may be changed depending on the influence of the magnetic field formed from the first magnetic substance 1142 and the second magnetic substance 1143.

In the first camera actuator according to the embodiment, the fastening member 1131*a*, the first magnetic substance 1142, the second magnetic substance 1143, the fifth housing side portion 1126, the tilting guide unit 1141, and the holder 1131 may be sequentially disposed. However, since the first magnetic substance may be positioned on the fastening member and the second magnetic substance may be positioned on the fifth housing side portion, the fastening member, the fifth housing side portion, the tilting guide unit, and the holder may be sequentially disposed.

In addition, in an embodiment, separation distances of the first magnetic substance 1142 and the second magnetic substance 1143 from the holder 1131 (or the optical member 1132) in the third direction may be greater than separation distances from the tilting guide unit 1141. Therefore, the second Hall sensor 1153*b* under the holder 1131 may also be disposed to be spaced apart by a predetermined distance from the first magnetic substance 1142 and the second magnetic substance 1143. Therefore, it is possible to minimize the influence of the magnetic field formed by the first magnetic substance 1142 and the second magnetic substance 1143 in the second Hall sensor 1153*b*, thereby preventing a Hall voltage from being concentrated to a positive or negative value and saturated. In other words, with this configuration, a Hall electrode may have a range in which Hall calibration may be performed. Furthermore, a temperature also affects the electrode of the Hall sensor, and a resolution of the camera lens varies depending on the temperature, but in an embodiment, by preventing a case in which the Hall voltage is concentrated to the positive or negative value, it is also possible to compensate for the resolution of the lens in response thereto, thereby easily preventing a reduction in the resolution.

In addition, it is also possible to easily design a circuit for compensating for an offset of the output (i.e., the Hall voltage) of the second Hall sensor 1153*b*.

The tilting guide unit 1141 may be seated in the fourth outer seating groove 1131S4*a* with respect to the base except for the first protrusion PR1 and the second protrusion PR2. In other words, a length of the base BS in the third direction (Z-axis direction) may be smaller than a length of the fourth outer seating groove 1131S4*a* in the third direction (Z-axis direction). With this configuration, it is possible to easily realize miniaturization.

In addition, a maximum length of the tilting guide unit 1141 in the third direction (Z-axis direction) may be greater than the length of the fourth outer seating groove 1131S4*a* in the third direction (Z-axis direction). Therefore, as described above, an end of the second protrusion PR2 may be positioned between the fourth holder outer surface and the fifth housing side portion 1126. In other words, at least a portion of the second protrusion PR2 may be positioned in a direction opposite to the third direction (Z-axis direction) from the holder 1131. In other words, the holder 1131 may be spaced apart by a predetermined distance from the end of the second protrusion PR2 (the portion in contact with the second protrusion groove) in the third direction (Z-axis direction).

The fifth housing side portion 1126 may have an inward extended and bent structure. In addition, a partial region of the fastening member 1131*a* may be positioned in a groove formed by the extended and bent structure of the fifth housing side portion 1126 described above. With this configuration, the fastening member 1131*a* may be positioned inside the fifth housing side portion 1126, thereby improving space efficiency and realizing miniaturization. Furthermore, even when a driving (tilt or rotation of the mover 1130) by the electromagnetic force is performed, the fastening member 1131*a* does not protrude to the outside of the fifth housing side portion 1126, and thus can be blocked from being in contact with surrounding devices. Therefore, it is possible to improve reliability.

In addition, a predetermined separation space may be present between the first magnetic substance 1142 and the second magnetic substance 1143. In other words, the first magnetic substance 1142 and the second magnetic substance 1143 may be opposite to each other with the same polarity.

In addition, as described above, the first drive unit may rotate and drive the mover 1130 in the first housing with respect to the first direction (X-axis direction) or the second direction (Y-axis direction). In this case, in the first drive unit, the drive magnet may include at least one magnet, and the drive coil may also include at least one coil. In this case, at least a portion of at least one magnet may overlap the tilting guide unit 1141 in the first direction (X-axis direction) or the second direction (Y-axis direction). Furthermore, at least a portion of at least one coil may also overlap the tilting guide unit 1141 in the first direction (X-axis direction) or the second direction (Y-axis direction).

The first magnet 1151*a* and the second magnet 1151*b* may overlap in the second direction (Y-axis direction), and the tilting guide unit 1141 may be positioned in a region between the first magnet 1151*a* and the second magnet 1151*b* in the second direction (Y-axis direction).

A portion of the tilting guide unit 1141 may be positioned between the first magnet 1151*a* and the second magnet 1151*b* and may overlap the first magnet 1151*a* and the second magnet 1151*b* in the second direction (Y-axis direction).

For example, the first protrusion PR1 of the tilting guide unit 1141 may overlap the first magnet 1151*a* and the second magnet 1151*b* in the second direction (Y-axis direction). In this case, the first protrusion PR1 may be positioned between the mover 1130 and the base BS of the tilting guide unit 1141.

Therefore, the separation distances of the first magnet 1151*a* and the second magnet 1151*b* from the tilting guide unit 1141 in the third direction (Z-axis direction) can be reduced. In other words, the first magnet 1151*a* and the second magnet 1151*b* may be positioned adjacent to the tilting guide unit 1141. Therefore, the center of gravity of the holder 1131 on which the first magnet 1151*a* and the second magnet 1151*b* are seated or the mover 1130 including the holder 1131 may be positioned adjacent to the tilting guide unit 1141. In other words, the center of gravity of the holder 1131 or the mover 1130 including the holder 1131 may be adjacent to the tilting guide unit 1141 having a rotational axis or a rotation surface for rotation driving, and thus it is possible to reduce a change in the moment or energy (e.g., a current) consumed for tilt driving at a certain angle according to a posture of the camera actuator or the camera module. In other words, it is possible to reduce the influence due to the posture difference. Therefore, the camera actuator and the camera module according to the embodiment can perform the tilting driving more accurately. In addition, as the movement of the center of gravity described above becomes close to the rotational axis or the rotational surface, the electromagnetic force, which is a force for rotating the mover (or the holder), can be reduced. In other words, it is possible to improve energy efficiency for driving the camera actuator or camera module. In other words, the first drive unit may be positioned adjacent to the tilting guide unit 1141. In this case, the first drive unit means the first drive magnet and the first drive coil, and hereinafter, each of the first drive magnet and the first drive coil will be described.

Furthermore, the base BS of the tilting guide unit 1141 may at least partially overlap the first magnet 1151*a* and the second magnet 1151*b* in the second direction (Y-axis direction). Therefore, the first magnet 1151*a* and the second magnet 1151*b* may be disposed closer to the tilting guide unit 1141. However, when the first magnet 1151*a* and the second magnet 1151*b* are positioned in front of the rotational axis or the rotational surface, the electromagnetic force required for tilt in the second direction (Y-axis direction) increases, and thus a center of the first magnet 1151*a* and the second magnet 1151*b* (point that bisects the two magnets in the third direction) may be disposed to be spaced apart from the first protrusion PR1 in the third direction (Z-axis direction) without overlapping in the second direction (Y-axis direction). Furthermore, the center of the first magnet 1151*a* and the second magnet 1151*b* (point that bisects the two magnets in the third direction) may be positioned on a rear end of the first protrusion PR1, that is, toward the third direction (Z-axis direction).

Correspondingly, the base BS of the tilting guide unit 1141 may at least partially overlap the first coil 1152*a* and the second coil 1152*b* in the second direction (Y-axis direction). Therefore, like the first magnet and the second magnet described above, the first coil 1152*a* and the second coil 1152*b* may be disposed closer to the tilting guide unit 1141. Therefore, it is possible to reduce the electromagnetic force required for tilt and reduce the influence due to the posture difference.

In addition, the third magnet disposed on the third holder outer surface may at least partially overlap the first protrusion PR1 in the first direction (X-axis direction). Therefore, the center of gravity of the holder 1131 or the mover 1130 including the holder 1131 may further move toward the tilting guide unit 1141. Therefore, as described above, it is possible to reduce the influence due to the posture difference. Therefore, the camera actuator and the camera module according to the embodiment can perform the tilting driving more accurately. In addition, as the movement of the center of gravity described above becomes close to the rotational axis or the rotational surface, the electromagnetic force, which is a force for rotating the mover (or the holder), can be reduced. In other words, it is possible to improve energy efficiency for driving the camera actuator or camera module. The description of the third magnet may also be applied to the third coil in the same manner. In other words, the third coil may at least partially overlap the first protrusion PR1 in the first direction.

According to the embodiment, the center of gravity of the holder 1131 or the mover 1130 including the holder 1131 may be positioned to overlap the first protrusion PR1 in the third direction (Z-axis direction). Therefore, it is possible to suppress an increase in the change in the electromagnetic force according to the rotational direction or the posture difference. Therefore, the camera actuator and the camera module according to the embodiment can accurately perform tilting.

Furthermore, as described above, the mover 1130 may include the fastening member 1131*a* passing through one side portion of the housing (e.g., the fifth housing side portion) and may be coupled to the housing by the fastening member 1131*a*. Furthermore, the first fastening groove gr1 may be present in the fastening member 1131*a*, and the first magnetic substance 1142 may be positioned in the first fastening groove gr1.

In addition, the second fastening groove gr2 may be positioned on one side portion of the housing, for example, the outer surface of the fifth housing side portion. The second fastening groove gr2 may be positioned to face the first fastening groove gr1 of the fastening member 1131*a*. In addition, the second magnetic substance 1143 may be positioned in the second fastening groove gr2. Therefore, the mover 1130 and the fastening member 1131*a* coupled to the mover 1130 and integrally performing the first axis tilt and the second axis tilt are coupled to the first magnetic substance 1142, and the first magnetic substance 1142 and the second magnetic substance 1143 are positioned on the front end of the tilting guide unit 1141, and thus the centers of gravity of the mover 1130 and the fastening member 1131*a* may be positioned closer to the tilting guide unit 1141 as described above. Therefore, it is possible to reduce the change in the moment due to the posture difference and minimize the electromagnetic force required for tilt. In this case, the second magnetic substance 1143 may be positioned between the first magnetic substance 1142 and the mover 1130 in the third direction.

In addition, the fastening member 1131*a* may be a non-magnetic substance and made of metal. Furthermore, the fastening member 1131*a* may have a protrusion region 1131*aap* protruding in a direction opposite to the third direction (Z-axis direction), and thus the center of gravity described above may be positioned closer to the tilting guide unit 1141. Furthermore, the first magnetic substance 1142 and the second magnetic substance 1143 may be disposed to at least partially overlap the first protrusion PR1 in the third direction (Z-axis direction), thereby minimizing the influence due to the posture difference.

In addition, the first magnetic substance 1142 and the second magnetic substance 1143 may have different lengths in the first direction (X-axis direction) or the second direction (Y-axis direction), thereby further reducing the change in the electromagnetic force due to the posture difference.

In addition, the mover 1130 according to the embodiment may include the holder 1131 and the optical member 1132. In addition, as described above, the first drive magnet and the first drive coil may be disposed on a portion of the outer surface of the holder 1131. In this case, the holder 1131 may include a first sidewall and a second sidewall. Here, the first sidewall may be the first holder outer surface, the second holder outer surface, and the third holder outer surface where the magnet or the coil is positioned adjacent thereto. In addition, the second sidewall may be the fourth holder outer surface where the tilting guide unit 1141 is positioned.

Based on this, the first sidewall may be disposed perpendicular to the second sidewall. Furthermore, the second sidewall may include a cavity in which the tilting guide unit 1141 is disposed. In this case, the cavity may correspond to the third region AR3 and may be a region formed by the fourth outer seating groove as a space where the tilting guide unit 1141 is disposed. In addition, at least a portion of the cavity according to the embodiment may overlap at least a portion of the first drive magnet or the first drive coil in a direction perpendicular to the optical axis. For example, the cavity may overlap at least a portion of the first magnet and the second magnet of the first drive magnet in the second direction. In addition, the cavity may overlap at least a portion of the first coil and the second coil of the first drive coil in the second direction. In addition, the cavity may overlap the third magnet of the first drive magnet in the first direction. In addition, the cavity may overlap the third coil of the first drive coil in the first direction.

Referring to FIGS. 11F to 11H, in the first camera actuator, as described above, the holder 1131 may be disposed in the housing 1120, and the tilting guide unit 1141 may be positioned on the fourth holder outer surface 1131S4*a* of the holder 1131.

A guide protrusion 1131*p* may be disposed on one surface of the tilting guide unit 1141 facing the fourth holder outer surface 1131S4*a* and may extend toward the fourth holder outer surface 1131S4*a*.

In an embodiment, the guide protrusion 1131*p* may be positioned on one surface of the tilting guide unit 1141. The guide protrusion 1141*p* may extend in the optical axis direction. For example, the guide protrusion 1131*p* may be disposed on the first face of the tilting guide unit 1141.

In addition, an outer surface groove 1131S4*ah* may be disposed on the fourth holder outer surface 1131S4*a*. The outer surface groove 1131S4*ah* may be disposed adjacent to the guide protrusion 1131*p*. In an embodiment, the outer surface groove 1131S4*ah* may at least partially overlap the guide protrusion 1131*p* in the optical axis direction. For example, the outer surface groove 1131S4*ah* may be disposed to face the guide protrusion 1131*p*. In addition, at least a portion of the outer surface groove 1131S4*ah* may be disposed under the guide protrusion 1131*p*.

In addition, the tilting guide unit 1141 may include a guide groove 1141*h* disposed in the same plane as the guide protrusion 1131*p* in the base. The guide groove 1141*h* may be disposed above the guide protrusion 1131*p*.

In this case, in an embodiment, a damper member may be disposed between the tilting guide unit and the holder to connect the tilting guide unit and the holder. The damper member may be positioned above the first protrusion of the tilting guide unit, which will be described below.

Therefore, when the damper member is injected, the damper member (not shown) may move to one surface of the base along the guide groove 1141*h*. In addition, the damper member may move along the guide protrusion 1131*p* and move between the guide protrusion 1131*p* and the outer surface groove 1131S4*ah*. Therefore, the damper member may connect the guide protrusion 1131*p* and the outer surface 1131S4*a* between the guide protrusion 1131*p* and the outer surface 1131S4*a*. The damper member may be made of various materials such as gel or silicone.

Furthermore, the damper member may function as a damper between the tilting guide unit 1141 and the mover 1130, thereby securing a phase margin for the tilting of the mover 1130. In other words, it is possible to improve the responsiveness of the drive unit. In particular, the damper member can improve the response characteristics to the Y-axis tilt. In addition, it is possible to improve a suppression ratio of the camera module or the camera device including the first camera actuator.

In addition, the guide protrusion 1131*p* may at least partially overlap the first protrusion PR1. Therefore, the guide protrusion 1131*p* can suppress the coupling between the first protrusion PR1 tilting along the rotational axis and the holder or the housing connected to the protrusion.

In addition, as described above, the guide groove 1131*h* may be disposed on the same plane of the base of the tilting guide unit as the guide protrusion 1131*p*. In addition, a length of the guide groove 1131*h* in the second direction may be different from a length of the guide protrusion 1131*p* in the second direction. For example, the length of the guide groove 1131*h* in the second direction may be smaller than or equal to the length of the guide protrusion 1131*p* in the second direction. With this configuration, when the damper member is injected into the guide groove 1131*h*, the direct movement to the first protrusion thereunder or the like can be suppressed.

In addition, the guide groove 1141*h* and the guide protrusion 1131*p* may extend in the second direction and may be disposed above the protrusion spaced apart in the second direction. Therefore, it may be difficult to secure a space for forming a guide groove and a guide protrusion for the protrusion spaced apart in the first direction or in the vertical direction like the second protrusion. In other words, the guide groove 1141*h* and the guide protrusion 1131*p* may extend in the second direction and may be disposed above the protrusion spaced apart in the second direction, thereby easily miniaturizing the tilting guide unit.

In addition, the guide groove 1141*h* and the guide protrusion 1131*p* may have a shape protruding downward. For example, the guide groove 1141*h* and the guide protrusion 1131*p* may have a shape in which a central region protrudes downward or is convex downward in the second direction. With this structure, it is possible to easily suppress the overflow of the damper member injected into the guide groove 1141*h* and the guide protrusion 1131*p* toward the first protrusion.

Furthermore, the damper member may be easily applied even when the holder, the optical member, the tilting guide unit, the housing, and the drive unit are assembled by the guide groove, the guide protrusion, and the damper member described above.

In addition, the outer surface groove 1131S4*ah* can suppress the damper member from moving to the protrusion thereunder. Furthermore, the guide groove 1141*h* can suppress the damper member from moving to the other surface of the base.

FIG. 12A is a perspective view of the first camera actuator according to the first embodiment, FIG. 12B is a cross-sectional view along line S-S' in FIG. 12A, and FIG. 12C is an exemplary view of the movement of the first camera actuator shown in FIG. 12B.

Referring to FIGS. 12A to 12C, the Y-axis tilt may be performed in the first camera actuator according to the embodiment. In other words, OIS can be implemented by the rotation in the first direction (X-axis direction).

In an embodiment, the third magnet 1151*c* disposed under the holder 1131 may tilt or rotate the mover 1130 and the fastening member 1131*a* with respect to the second direction (Y-axis direction) by generating an electromagnetic force with the third coil 1152*c*.

Specifically, the repulsive force between the first magnetic substance 1142 and the second magnetic substance 1143 may be transmitted to the fastening member 1131*a* and the fifth housing side portion 1126 and finally transmitted to the tilting guide unit 1141 disposed between the fifth housing side portion 1126 and the holder 1131. Therefore, as described above, the tilting guide unit 1141 may be pressed by the mover 1130 and the first housing 1120 by the repulsive force described above.

In addition, the 1-1 protrusion PR1*a* and the 1-2 protrusion PR1*b* may be spaced apart in the second direction (Y-axis direction) and supported by the first protrusion groove PH1 formed in the fourth outer seating groove 1131S4*a* of the holder 1131. In addition, in an embodiment, the tilting guide unit 1141 may rotate or tilt about the first protrusion PR1 protruding toward the holder 1131 (e.g., in the third direction), which is a reference axis (or a rotational axis), that is, with respect to the second direction (Y-axis direction).

For example, OIS can be implemented by rotating (X1→X1*a* or X1*b*) the mover 1130 at a first angle θ1 in the X-axis direction or the direction opposite to the X-axis direction by first electromagnetic forces F1A and F1B between the third magnet 1151*c* disposed in the third outer seating groove and the third coil unit 1152*c* disposed on the third board side portion. The first angle θ1 may be in the range of ±1° to ±3°. However, the present invention is not limited thereto. Hereinafter, in the first camera actuator according to various embodiments, the electromagnetic force may move the mover by generating a force in the described direction or move the mover in the described direction even when generating a force in another direction. In other words, the described direction of the electromagnetic force means a direction of the force generated by the magnet and the coil to move the mover.

In addition, the first magnetic substance 1142 and the second magnetic substance 1143 may have different lengths in the first direction (X-axis direction).

In an embodiment, an area of the first magnetic substance 1142 coupled to the fastening member 1131*a* and tilted together with the mover 1130 may be greater than an area of the second magnetic substance 1143. For example, the length of the first magnetic substance 1142 in the first direction (X-axis direction) may be greater than the length of the second magnetic substance 1143 in the first direction (X-axis direction). In addition, the length of the first magnetic substance 1142 in the second direction (Y-axis direction) may be greater than the length of the second magnetic substance 1143 in the second direction (Y-axis direction). In addition, the second magnetic substance 1143 may be positioned between virtual straight lines extending both ends of the first magnetic substance 1142 in the third direction.

With this configuration, upon tilting or rotating, even when the magnetic substance on one side (e.g., the second magnetic substance) is tilted, it is possible to easily prevent the generation of forces other than a vertical force due to the tilt. In other words, even when the second magnetic substance is vertically tilted together with the mover 1130, the mover 1130 may not receive a force against the tilt (e.g., the repulsive force or the attractive force) from the second magnetic substance 1143. Therefore, it is possible to improve driving efficiency.

FIG. 13A is a cross-sectional view along line R-R' in FIG. 12A, and FIG. 13B is an exemplary view of the movement of the first camera actuator shown in FIG. 13A.

Referring to FIGS. 13A and 13B, the X-axis tilt may be performed. In other words, OIS can be implemented by tilting or rotating the mover 1130 in the Y-axis direction.

In an embodiment, the first magnet 1151*a* and the second magnet 1151*b* disposed on the holder 1131 may respectively tilt or rotate the tilting guide unit 1141, the mover 1130, and the fastening member 1131*a* with respect to the first direction (X-axis direction) by generating the electromagnetic forces with the first coil 1152*a* and the second coil 1152*b* in the first direction (X-axis direction).

Specifically, the repulsive force between the first magnetic substance 1142 and the second magnetic substance 1143 may be transmitted to the fifth housing side portion

1126 and the holder 1131 and finally transmitted to the tilting guide unit 1141 between the holder 1131 and the fifth housing side portion 1126. Therefore, the tilting guide unit 1141 may be pressed by the mover 1130 and the first housing 1120 by the repulsive force described above.

In addition, the second protrusion PR2 may be supported by the fifth housing side portion 1126. In this case, in an embodiment, the tilting guide unit 1141 may rotate or tilt about the second protrusion PR2 protruding toward the holder 1131, which is the reference axis (or the rotational axis), that is, with respect to the first direction (X-axis direction). In other words, the tilting guide unit 1141 may rotate or tilt about the second protrusion PR2 protruding toward the fifth housing side portion 1126, which is the reference axis (or the rotational axis), that is, in the second direction (Y-axis direction).

For example, OIS can be implemented by rotating (Y1→Y1*a* or Y1*b*) the mover 1130 at a second angle θ2 in the Y-axis direction or the direction opposite to the Y-axis direction by second electromagnetic forces F2A and F2B between the first and second magnets 1151*a* and 1151*b* disposed in the first outer seating groove and the first and second coil units 1152*a* and 1152*b* disposed on the first and second board side portions. The second angle θ2 may be in the range of ±1° and 3°. However, the present invention is not limited thereto. In addition, as described above, the electromagnetic forces by the first and second magnets 1151*a* and 1151*b* and the first and second coil units 1152*a* and 1152*b* may act in the third direction. For example, the electromagnetic force may be generated from a left portion of the mover 1130 in the third direction (Z-axis direction) and may act from a right portion of the mover 1130 in the direction opposite to the third direction (Z-axis direction). Therefore, the mover 1130 may rotate with respect to the first direction. Alternatively, the mover 1130 may move in the second direction.

As described above, the second camera actuator according to the embodiment may provide the best optical characteristics by controlling the mover 1130 to rotate in the first direction (X-axis direction) or the second direction (Y-axis direction) by the electromagnetic force between the first drive magnet in the holder and the first drive coil disposed in the first housing, thereby minimizing the occurrence of the de-center or tilt phenomenon when OIS is implemented. In addition, as described above, the "Y-axis tilt" refers to rotating or tilting in the first direction (X-axis direction), and the "X-axis tilt" refers to rotating or tilting in the second direction (Y-axis direction).

FIG. 14 is a perspective view of a first camera actuator according to a second embodiment, FIG. 15 is an exploded perspective view of the first camera actuator according to the second embodiment, and FIG. 16 is a cross-sectional view along line T-T" in FIG. 14.

The first camera actuator 2100 according to the embodiment includes a shield can 2110, a housing 2120, a mover 2130, a rotational unit 2140, and a drive unit 2150.

First, the mover 2130 includes a prism holder 2131 and an optical member 2132 seated on the prism holder 2131. The rotational unit 2140 includes a rotational plate 2141, a yoke 2142 in contact with different surfaces of the rotational plate 2141, and a coupling magnet 2143 coupled to the rotational plate 2141. In addition, the drive unit 2150 includes a drive magnet 2151, a drive coil 2152, a Hall sensor unit 2153, and a board unit 2154. In addition, in the first camera actuator 2100 according to the embodiment, the shield can 2110, the housing 2120, the mover 2130, the rotational unit 2140, and the drive unit 2150 may respectively correspond to the first housing 1120, the mover 1130, the rotational unit 1140, and the first drive unit 1150, and the above description may be applied except for the contents to be described below. In other words, all of the above descriptions of the groove, the seating protrusion support member, and the like may be applied to the embodiment.

The shield can 2110 may be positioned in one region (e.g., an outermost side) of the first camera actuator 2100 and positioned to surround the rotational unit 2140 and the drive unit 2150, which will be described below.

The shield can 2110 can block or reduce electromagnetic waves generated from the outside. Therefore, it is possible to reduce the occurrence of a malfunction of the rotational unit 2140 or the drive unit 2150.

The housing 2120 may be positioned inside the shield can 2110. In addition, the housing 2120 may be positioned inside the board unit 2154 to be described below. The housing 2120 may be fastened by being fitted into or matched with the shield can 2110.

The housing 2120 may include a first housing side portion 2121, a second housing side portion 2122, a third housing side portion 2123, and a fourth housing side portion 2124.

The first housing side portion 2121 and the second housing side portion 2122 may be disposed to face each other. In addition, the third housing side portion 2123 and the fourth housing side portion 2124 may be disposed between the first housing side portion 2121 and the second housing side portion 2122.

The third housing side portion 2123 may be in contact with the first housing side portion 2121, the second housing side portion 2122, and the fourth housing side portion 2124. In addition, the third housing side portion 2123 may be a bottom surface of the housing 2120.

The first housing side portion 2121 may include a first housing hole 2121*a*. A first coil 2152*a* to be described below may be positioned in the first housing hole 2121*a*.

In addition, the second housing side portion 2122 may include a second housing hole 2122*a*. In addition, a second coil 2152*b* to be described below may be positioned in the second housing hole 2122*a*.

The first coil 2152*a* and the second coil 2152*b* may be coupled to the board unit 2154. In an embodiment, the first coil 2152*a* and the second coil 2152*b* may be electrically connected to the board unit 2154 so that a current may flow. The current is an element of the electromagnetic force by which the first camera actuator may tilt with respect to the X-axis.

In addition, the third housing side portion 2123 may include a third housing hole 2123*a*. A third coil 2152*c* to be described below may be positioned in the third housing hole 2123*a*. The third coil 2152*c* may be coupled to the board unit 2154. In an embodiment, the third coil 2152*c* may be electrically connected to the board unit 2154 so that a current may flow. The current is an element of the electromagnetic force by which the first camera actuator may tilt with respect to the Y-axis.

The fourth housing side portion 2124 may include a first housing groove 2124*a*. The yoke 2142 to be described below may be disposed in a region facing the first housing groove 2124*a*. Therefore, the housing 2120 may be coupled to the rotational plate 2141 and the prism holder 2131 by a magnetic force or the like.

In addition, the housing 2120 may include an accommodating unit 2125 formed by the first to fourth housing side portions 2121 to 2124. The mover 2130 and the rotational unit 2140 may be positioned in the accommodating unit 2125.

In addition, as described above, the mover 2130 includes the prism holder 2131 and the optical member 2132 seated on the prism holder 2131.

The prism holder 2131 may be seated in the accommodating unit 2125 of the housing 2120. The prism holder 2131 may include a first prism outer surface to a fourth prism outer surface respectively corresponding to the first housing side portion 2121, the second housing side portion 2122, the third housing side portion 2123, and the fourth housing side portion 2124. A detailed description thereof will be given below.

The optical member 2132 may be seated on the prism holder 2131. To this end, the prism holder 2131 may have a face, and the face may be formed by the accommodating unit. The optical member 2132 may include a reflector disposed therein. However, the present invention is not limited thereto. In addition, the optical member 2132 may reflect light reflected from the outside (e.g., an object) to an inner side of the camera module. In other words, the optical member 2132 can overcome the spatial limitations of the first camera actuator and the first camera actuator by changing the path of the reflected light. As described above, it should be understood that the camera module may also provide a high range of magnification by extending the optical path while minimizing a thickness.

The rotational unit 2140 may include the rotational plate 2141, the yoke 2142 disposed between the rotational plate 2141 and the housing 2120 (fourth housing side portion), and the coupling magnet 2143 disposed between the rotational plate 2141 and the mover 2130.

The rotational plate 2141 may be coupled to the mover 2130 and the housing 2120 between the mover 2130 and the housing 2120 described above.

The rotational plate 2141 may include protrusions spaced apart from each other in the second direction (Y-axis direction). A plurality of protrusions PR1 may be present and disposed to be spaced apart from each other in the first direction (X-axis direction) or the second direction (Y-axis direction). In addition, the plurality of protrusions PR1 may be disposed side by side in the first axis direction or the second axis direction. For example, the plurality of protrusions PR1 may be positioned in parallel in the first axis direction (Y-axis direction). Alternatively, the plurality of protrusions PR1 may be positioned in parallel in the second axis direction (Y-axis direction). Therefore, the protrusion PR1 may be a rotational axis of the tilt about any one of the first axis and the second axis. In other words, the mover 2130 may rotate about any one of the first axis and the second axis. For example, the mover 2130 may perform the Y-axis tilt through the protrusion PR1. In addition, hereinafter, a description will be given on the basis of the plurality of protrusions PR1 positioned in parallel in the first axis direction (Y-axis direction). A detailed description thereof will be given below.

The yoke 2142 may be disposed between the rotational plate 2141 and the housing 2120 and coupled to the coupling magnet 2143 to be described below by a magnetic force. The yoke 2142 may be made of a metallic material having a magnetic force. In addition, the yoke 2142 may include the metallic material having the magnetic force described above therein and an outer side thereof may also be made of a non-metallic material. In an embodiment, the yoke 2142 may be formed of a magnetic substance and may have a shaft shape. A length of the yoke 2142 in the first direction may be greater than a length in the second direction. In addition, the length of the first yoke 2142 in the second direction may be smaller than a length between the first protrusion and the second protrusion, which will be described below. Therefore, the yoke 2142 may perform the X-axis tilt with the shaft shape between the first protrusion and the second protrusion.

The yoke 2142 may be positioned to face the coupling magnet 2143 to be described below with respect to the rotational plate 2141. Therefore, the yoke 2142 may at least partially overlap the coupling magnet 2143 in the third direction. Therefore, it is possible to improve the coupling force between the mover 2130 and the rotational unit 2140 through the yoke 2142 and the coupling magnet 2143. In addition, the yoke 2142 may be a rotational axis of the tilt about the other of the first axis and the second axis.

In other words, the yoke 2142 may be a rotational axis of the tilt about an axis different from or perpendicular to the protrusion PR1 of the rotational plate 2141. Therefore, the rotational plate 2141, the coupling magnet 2143, and the mover 2130 may rotate along the first axis or the second axis by a driving force of the drive unit 2150 with respect to the yoke 2142. For example, the mover 2130 may perform the X-axis tilt through the yoke 2142. Hereinafter, a description thereof will be given based on this.

In addition, the yoke 2142 may be coupled to any one of the rotational plate 2141 and the housing 2120 through an adhesive member. Therefore, the mover 2130 may rotate about the yoke 2142. In addition, the yoke 2142 may have a contact region with the other of the rotational plate 2141 and the housing 2120, and the contact region may move about the other (e.g., the second axis) of the first axis and the second axis. To this end, a lubricating member may be positioned between the yoke 2142 and the other of the rotational plate 2141 and the housing 2120.

The yoke 2142 may be positioned in housing 2120. The yoke 2142 may be seated in the first housing groove 2124*a* described above. Therefore, the yoke 2142 may be coupled to the housing 2120. As described above, the yoke 2142 may be coupled to the housing 2120 through the adhesive member. In addition, the rotational plate 2141 may be coupled by the magnetic force between the coupling magnet 2143 and the yoke 2141 and coupled to the coupling magnet 2143 and the prism holder 2131 (or the mover 2130) through the coupling member or the like. Therefore, the housing 2120, the mover 2130, and the like may be coupled to one another.

The drive unit 2150 includes the drive magnet 2151, the drive coil 2152, the Hall sensor unit 2153, and the board unit 2154.

The drive magnet 2151 may include a plurality of magnets. In an embodiment, the drive magnet 2151 may include a first magnet 2151*a*, a second magnet 2151*b*, and a third magnet 2151*c*.

Each of the first magnet 2151*a*, the second magnet 2151*b*, and the third magnet 2151*c* may be positioned on an outer surface of the prism holder 2131. In addition, the first magnet 2151*a* and the second magnet 2151*b* may be positioned to face each other. In addition, the third magnet 2151*c* may be positioned on a bottom surface of the outer surface of the prism holder 2131. A detailed description thereof will be given below.

The drive coil 2152 may include a plurality of coils. In an embodiment, the drive coil 2152 may include the first coil 2152*a*, the second coil 2152*b*, and the third coil 2152*c*.

The first coil 2152*a* may be positioned opposite to the first magnet 2151*a*. Therefore, as described above, the first coil 2152*a* may be positioned in the first housing hole 2121*a* of the first housing side portion 2121.

In addition, the second coil 2152*b* may be positioned opposite to the second magnet 2151*b*. Therefore, as described above, the second coil 2152*b* may be positioned in the second housing hole 2122*a* of the second housing side portion 2122.

The first coil 2152*a* may be positioned to face the second coil 2152*b*. In other words, the first coil 2152*a* and the second coil 2152*b* may be positioned symmetrically with respect to the first direction. This may be applied to the first magnet 2151*a* and the second magnet 2151*b* in the same manner. With this configuration, the X-axis tilt can be accurately performed without tilting to one side by the electromagnetic force between the first coil 2152*a* and the first magnet 2151*a* and the electromagnetic force between the second coil 2152*b* and the second magnet 2151*b*.

The third coil 2152*c* may be positioned opposite to the third magnet 2151*c*. Therefore, as described above, the second coil 2152*c* may be positioned in a third housing hole 2123*a* of the third housing side portion 2123. The third coil 2152*c* may perform the Y-axis tilting of the mover 2130 and the rotational unit 2140 with respect to the housing 2120 by generating the electromagnetic force with the third magnet 2151*c*.

Here, the X-axis tilting means tilting with respect to the X-axis, and the Y-axis tilting means tilting with respect to the Y-axis.

The Hall sensor unit 2153 may include a plurality of Hall sensors. In an embodiment, the Hall sensor unit 2153 may include a first Hall sensor 2153*a* and a second Hall sensor 2153*b*. The first Hall sensor 2153*a* may be positioned inside the first coil 2152*a* or the second coil 2152*b*. The first Hall sensor 2153*a* may detect a change in a magnetic flux inside the first coil 2152*a* or the second coil 2152*b*. Therefore, position sensing between the first and second magnets 2151*a* and 1251*b* and the first Hall sensor 2153*a* may be performed. Therefore, the camera actuator according to the embodiment may control the X-axis tilt.

In addition, the second Hall sensor 2153*b* may be positioned inside the third coil 2152*c*. The second Hall sensor 2153*b* may detect a change in a magnetic flux inside the third coil 2152*c*. Therefore, position sensing between the third magnet 2151*c* and the second Hall sensor 2153*b* may be performed. Therefore, the camera actuator according to the embodiment may control the Y-axis tilt.

The board unit 2154 may be positioned under the drive unit 2150. The board unit 2154 may be electrically connected to the drive coil 2152 and the Hall sensor unit 2153. For example, the board unit 2154 may be coupled to the drive coil 2152 and the Hall sensor unit 2153 through a surface mounting technology (SMT). However, the present invention is not limited to this method.

The board unit 2154 may be positioned between the shield can 2110 and the housing 2120 and coupled to the shield can 2110 and the housing 2120. The coupling method may be variously performed as described above. In addition, through the coupling described above, the drive coil 2152 and the Hall sensor unit 2153 may be positioned in the outer surface of the housing 2120.

The board unit 2154 may include a circuit board having wiring patterns that may be electrically connected, such as a rigid printed circuit board (PCB), a flexible PCB, or a rigid flexible PCB. However, the present invention is not limited to these types.

In addition, in the first camera actuator according to the embodiment, as described above, the holder 2131 may be disposed in the housing 2120, and the tilting guide unit 2141 may be positioned on the fourth holder outer surface of the holder 2131.

The guide protrusion 2131*p* may be disposed on one surface of the tilting guide unit 2141 facing the fourth holder outer surface 2131S4*a* and may extend toward the fourth holder outer surface 2131S4*a*.

In an embodiment, the guide protrusion 2131*p* may be positioned on one surface of the tilting guide unit 2141. The guide protrusion 2141*p* may extend in the optical axis direction. For example, the guide protrusion 2131*p* may be disposed on the first face of the tilting guide unit 2141.

In addition, an outer surface groove 2131S4*ah* may be disposed on the fourth holder outer surface 2131S4*a*. The outer surface groove 2131S4*ah* may be disposed adjacent to the guide protrusion 2131*p*. In an embodiment, the outer surface groove 2131S4*ah* may at least partially overlap the guide protrusion 2131*p* in the optical axis direction. For example, the outer surface groove 2131S4*ah* may be disposed to face the guide protrusion 2131*p*. In addition, at least a portion of the outer surface groove 2131S4*ah* may be disposed under the guide protrusion 2131*p*.

In addition, the tilting guide unit 2141 may include the guide groove 2141*h* disposed in the same plane as the guide protrusion 2131*p* in the base. The guide groove 2141*h* may be disposed above the guide protrusion 2131*p*.

Therefore, the damper member (not shown) may move to one surface of the base along the guide groove 2141*h*. In addition, the damper member may move along the guide protrusion 2131*p* and move between the guide protrusion 2131*p* and the outer surface groove 2131S4*ah*. Therefore, the damper member may connect the guide protrusion 2131*p* and the outer surface 2131S4*ah* between the guide protrusion 2131*p* and the outer surface 2131S4*ah*. The damper member may be made of various materials such as gel or silicone.

Furthermore, the damper member may function as a damper between the tilting guide unit 2141 and the mover 2130, thereby securing a phase margin for the tilting of the mover 2130. In other words, it is possible to improve the responsiveness of the drive unit. In particular, the damper member can improve the response characteristics to the Y-axis tilt. In addition, it is possible to improve a suppression ratio of the camera module or the camera device including the first camera actuator.

In addition, the outer surface groove 2131S4*ah* can suppress the damper member from moving to the protrusion thereunder. Furthermore, the guide groove 2141*h* can suppress the damper member from moving to the other surface of the base.

FIG. 17 is a perspective view of a first camera actuator according to a third embodiment, and FIG. 18 is an exploded perspective view of the first camera actuator according to the third embodiment.

Referring to FIGS. 17 and 18, a first camera actuator 1100A according to the embodiment includes a shield can 1110, a first housing 1120, a mover 1130, a rotational unit 1140, and a first drive unit 1150.

The mover 1130 may include a holder 1131 and an optical member 1132 seated on the holder 1131. In addition, the rotational unit 1140 includes a tilting guide unit 1141 and a first magnetic substance 1142 and a second magnetic substance 1143 disposed to be spaced apart from each other with the tilting guide unit 1141 interposed therebetween and having a coupling force. In addition, the first drive unit 1150 includes a drive magnet 1151 (e.g., a first drive magnet), a drive coil 1152 (e.g., a first drive coil), a yoke unit (not shown), a Hall sensor unit 1153, and a first board unit 1154.

The shield can 1110 may be positioned on an outermost side of the first camera actuator 1100A and positioned to surround the rotational unit 1140 and the first drive unit 1150, which will be described below.

The shield can 1110 may block or reduce electromagnetic waves generated from the outside. Therefore, it is possible to reduce the occurrence of a malfunction of the rotational unit 1140 or the first drive unit 1150.

The first housing 1120 may be positioned inside the shield can 1110. In addition, the first housing 1120 may be positioned inside the first board unit 1154 to be described below. The first housing 1120 may be fastened by being fitted into or matched with the shield can 1110.

In the specification, as described above, the third direction (Z-axis direction) may correspond to the optical axis direction, the first direction (X-axis direction) and the second direction (Y-axis direction) may be directions perpendicular to the optical axis, and the tilting may be performed by the first camera actuator.

The first housing 1120 may include a first housing side portion 1121, a second housing side portion 1122, a third housing side portion 1123, and a fourth housing side portion 1124.

The first housing side portion 1121 and the second housing side portion 1122 may be disposed to face each other. In addition, the third housing side portion 1123 and the fourth housing side portion 1124 may be disposed between the first housing side portion 1121 and the second housing side portion 1122.

The third housing side portion 1123 may be in contact with the first housing side portion 1121, the second housing side portion 1122, and the fourth housing side portion 1124. In addition, the third housing side portion 1123 may be a bottom surface of the first housing 1120.

In addition, the first housing side portion 1121 may include a first housing hole 1121*a*. A first coil 1152*a* to be described below may be positioned in the first housing hole 1121*a*.

In addition, the second housing side portion 1122 may include a second housing hole 1122*a*. In addition, a second coil 1152*b* to be described below may be positioned in the second housing hole 1122*a*.

The first coil 1152*a* and the second coil 1152*b* may be coupled to the first board unit 1154. In an embodiment, the first coil 1152*a* and the second coil 1152*b* may be electrically connected to the first board unit 1154 so that a current may flow. The current is an element of the electromagnetic force by which the first camera actuator may tilt with respect to the X-axis.

The third housing side portion 1123 may include a third housing hole 1123*a*. A third coil 1152*c* to be described below may be positioned in the third housing hole 1123*a*. The third coil 1152*c* may be coupled to the first board unit 1154. In addition, the third coil 1152*c* may be electrically connected to the first board unit 1154 so that a current may flow. The current is an element of the electromagnetic force by which the first camera actuator may tilt with respect to the Y-axis.

The fourth housing side portion 1124 may include a housing groove 1124*a*. In other words, the housing groove 1124*a* may be positioned on at least one of an outer surface or an inner surface of the fourth housing side portion 1124. In addition, the second magnetic substance 1143 may be disposed in the housing groove 1124*a*. In addition, the first magnetic substance 1142 may be positioned corresponding to the second magnetic substance 1143 with the tilting guide unit 1141 interposed therebetween. Therefore, the first housing 1120 may be coupled to the tilting guide unit 1141 and the mover 1130 by a magnetic force by the first magnetic substance 1142 and the second magnetic substance 1143.

In addition, the first housing 1120 may include an accommodating unit 1125 formed by the first housing side portion 1121 to the fourth housing side portion 1124. The mover 1130 may be positioned in the accommodating unit 1125.

The mover 1130 includes the holder 1131 and the optical member 1132 seated on the holder 1131.

The holder 1131 and the optical member 1132 may be seated in the accommodating unit 1125 of the first housing 1120. The holder 1131 may include a first holder outer surface to a fourth holder outer surface respectively corresponding to the first housing side portion 1121, the second housing side portion 1122, the third housing side portion 1123, and the fourth housing side portion 1124. In addition, the first drive coil 1152 may be positioned in a seating groove formed in the outer surface of the holder 1131. A detailed description thereof will be given below.

The optical member 1132 may be seated on the holder 1131. To this end, the holder 1131 may have a seating surface, and the seating surface may be formed by an accommodating groove. The optical member 1132 may include a reflector disposed therein. However, the present invention is not limited thereto.

In addition, the optical member 1132 may reflect light reflected from the outside (e.g., an object) into a camera module. In other words, the optical member 1132 can overcome the spatial limitations of the first camera actuator and the first camera actuator by changing the path of the reflected light. As described above, it should be understood that the camera module may also provide a high range of magnification by extending the optical path while minimizing a thickness.

The rotational unit 1140 includes the tilting guide unit 1141, the first magnetic substance 1142 having a coupling force with the tilting guide unit 1141, and the second magnetic substance 1143 positioned in the tilting guide unit 1141 or the housing (particularly, the fourth housing side portion). However, the first magnetic substance 1142 and the second magnetic substance 1143 may be positioned in the mover 1130, the tilting guide unit 1141, and the housing 1120 and may provide the coupling force between the housing 1120, the tilting guide unit 1141, and the mover 1130.

The tilting guide unit 1141 may be coupled to the mover 1130 and the first housing 1120 described above. The tilting guide unit 1141 may be disposed adjacent to the optical axis. Therefore, the actuator according to the embodiment may easily change the optical path according to a first axis tilt and a second axis tilt to be described below.

The tilting guide unit 1141 may include first protrusions disposed to be spaced apart from each other in the first direction (X-axis direction) and second protrusions disposed to be spaced apart from each other in the second direction (Y-axis direction). In addition, the first protrusion and the second protrusion may protrude in opposite directions. A detailed description thereof will be given below.

The first magnetic substance 1142 may be positioned in the outer surface of the holder 1131. In an embodiment, the first magnetic substance 1142 may be positioned on the fourth holder outer surface of the holder 1131. In addition, the second magnetic substance 1143 may be positioned in the housing groove 1124*a* of the fourth housing side portion 1124.

With this configuration, the tilting guide unit 1141 may be pressed by the holder 1131 and the housing 1120 between the holder 1131 and the housing 1120 by the magnetic force (e.g., the attractive force) between the first magnetic substance 1142 and the second magnetic substance 1143. Therefore, the tilting guide unit 1141 and the holder 1131 in the housing 1120 may be spaced apart from a bottom surface of the housing in the accommodating unit 1125. In other words, the tilting guide unit 1141 and the holder 1131 may be coupled to the housing 1120. However, as described above, the first magnetic substance 1142 and the second magnetic substance 1143 may be magnets having polarities different from or the same as each other, yokes, or the like and may be made of a material having an attractive force or a repulsive force to each other.

The first drive unit 1150 includes the drive magnet 1151, the drive coil 1152, the yoke unit (not shown), the Hall sensor unit 1153, and the first board unit 1154. The first drive unit 1150 may move, rotate, or tilt the mover 1130.

The drive magnet 1151 may include a plurality of magnets. In an embodiment, the drive magnet 1151 may include a first magnet 1151*a*, a second magnet 1151*b*, and a third magnet 1151*c*.

Each of the first magnet 1151*a*, the second magnet 1151*b*, and the third magnet 1151*c* may be positioned on the outer surfaces of the holder 1131. In addition, the first magnet 1151*a* and the second magnet 1151*b* may be positioned to face each other. The third magnet 1151*c* may be positioned on the bottom surface of the holder 1131, that is, the third holder outer surface. A detailed description thereof will be given below.

The drive coil 1152 may include a plurality of coils. In an embodiment, the drive coil 1152 may include the first coil 1152*a*, the second coil 1152*b*, and the third coil 1152*c*.

The first coil 1152*a* may be positioned to correspond to the first magnet 1151*a*. In other words, the first coil 1152*a* may be disposed to face the first magnet 1151*a*. Therefore, as described above, the first coil 1152*a* may be positioned in the first housing hole 1121*a* of the first housing side portion 1121.

In addition, the second coil 1152*b* may be positioned to correspond to the second magnet 1151*b*. In other words, the second coil 1152*b* may be disposed to face the second magnet 1151*b*. Therefore, as described above, the second coil 1152*b* may be positioned in the second housing hole 1122*a* of the second housing side portion 1122.

In addition, the first coil 1152*a* may be positioned to face the second coil 1152*b*. In other words, the first coil 1152*a* may be positioned symmetrically with the second coil 1152*b* with respect to the first direction (X-axis direction). This may also be applied to the first magnet 1151*a* and the second magnet 1151*b* in the same manner. In other words, the first magnet 1151*a* and the second magnet 1151*b* may be positioned symmetrically with respect to the first direction (X-axis direction). In addition, the first coil 1152*a*, the second coil 1152*b*, the first magnet 1151*a*, and the second magnet 1151*b* may be disposed to at least partially overlap in the second direction (Y-axis direction). With this configuration, the X-axis tilting may be accurately performed without tilting to one side by the electromagnetic force between the first coil 1152*a* and the first magnet 1151*a* and the electromagnetic force between the second coil 1152*b* and the second magnet 1151*b*.

The third coil 1152*c* may be positioned to correspond to the third magnet 1151*c*. For example, the third coil 1152*c* may be positioned in the third housing hole 1123*a* of the third housing side portion 1123. In addition, the third housing hole 1123*a* may have a different area from the first housing hole and the second housing hole. Therefore, the Y-axis tilting may be easily performed through the third coil 1152*c*.

In addition, the third coil 1152*c* may be positioned at a bisecting point between the first coil 1152*a* and the second coil 1152*b*. With this configuration, the Y-axis tilting may be performed in a balanced manner without tilting to one side by the electromagnetic force generated by the current flowing through the third coil 1152*c*.

The yoke unit (not shown) may be positioned between the drive magnet 1151 and the holder 1131. The yoke unit (not shown) is positioned on the first holder outer surface and the second holder outer surface of the holder 1131 so that the drive magnet is easily coupled to the holder 1131. For example, the yoke unit (not shown) may be disposed in the seating groove positioned in the outer surface of the holder and may have an attractive force with the drive magnet 1151. In other words, the yoke unit (not shown) can improve the coupling force between the drive magnet 1151 and the holder 1131.

The Hall sensor unit 1153 may include a plurality of Hall sensors. In an embodiment, the Hall sensor unit 1153 may include a first Hall sensor 1153*a* and a second Hall sensor 1153*b*. The first Hall sensor 1153*a* may be positioned inside or outside the first coil 1152*a* or the second coil 1152*b*. The first Hall sensor 1153*a* may detect a change in a magnetic flux inside the first coil 1152*a* or the second coil 1152*b*. Therefore, the first Hall sensor 1153*a* may perform the position sensing of the first and second magnets 1151*a* and 1251*b*. In addition, the second Hall sensor 1153*b* may be positioned inside or outside the third coil 1152*c*. The second Hall sensor 1153*b* may perform the position sensing of the third coil 1152*c*. Therefore, the first camera actuator according to the embodiment may control the X-axis or Y-axis tilt. The Hall sensor unit may also be composed of a plurality of sensors.

The first board unit 1154 may be positioned under the first drive unit 1150. The first board unit 1154 may be electrically connected to the drive coil 1152 and the Hall sensor unit 1153. For example, a current may be applied to the drive coil 1152 through the first board unit 1154, and thus the mover 1130 may be tilted to the X axis or the Y axis. For example, the first board unit 1154 may be coupled to the drive coil 1152 and the Hall sensor unit 1153 through SMT. However, the present invention is not limited to this method.

The first board unit 1154 may be positioned between the shield can 1110 and the first housing 1120 and coupled to the shield can and the first housing 1120. The coupling method may be variously performed as described above. In addition, the drive coil 1152 and the Hall sensor unit 1153 may be positioned in the outer surface of the first housing 1120 through the coupling.

The first board unit 1154 may include the circuit board having wiring patterns that may be electrically connected, such as the rigid PCB, the flexible PCB, or the rigid flexible PCB. However, the present invention is not limited to these types.

FIG. 19 is a perspective view of the first housing in the first camera actuator according to the third embodiment.

Referring to FIG. 19, the first housing 1120 may include the first housing side portion 1121, the second housing side portion 1122, the third housing side portion 1123, and the fourth housing side portion 1124.

The first housing side portion 1121 and the second housing side portion 1122 may be disposed to face each other. In addition, the third housing side portion 1123 and the fourth housing side portion 1124 may be disposed between the first housing side portion 1121 and the second housing side portion 1122.

The third housing side portion 1123 may be in contact with the first housing side portion 1121, the second housing side portion 1122, and the fourth housing side portion 1124. In addition, the third housing side portion 1123 may be a bottom surface of the first housing 1120.

In addition, the first housing side portion 1121 may include the first housing hole 1121*a*. The first coil 1152*a* to be described below may be positioned in the first housing hole 1121*a*.

In addition, the second housing side portion 1122 may include the second housing hole 1122*a*. In addition, the second coil 1152*b* to be described below may be positioned in the second housing hole 1122*a*.

Furthermore, the second housing side portion 1122 or the first housing side portion 1121 may include a control device groove 1121*b*. In an embodiment, the second housing side portion 1122 may include the control device groove 1121*b*. In addition, a driver electrically connected to the board, a control device, a processor, and the like may be positioned in the control device groove 1121*b*.

The first coil 1152*a* and the second coil 1152*b* may be coupled to the first board unit 1154. In an embodiment, the first coil 1152*a* and the second coil 1152*b* may be electrically connected to the first board unit 1154 so that a current may flow. The current is an element of the electromagnetic force by which the first camera actuator may tilt with respect to the X-axis.

In addition, the third housing side portion 1123 may be disposed between the first housing side portion 1121 and the second housing side portion 1122. The third housing side portion 1123 may be a bottom portion of the housing 1120. The third coil 1152*c* is positioned in the third housing hole 1123*a* of the third housing side portion 1123, and the current flowing through the third coil 1152*c* is an element of an electromagnetic force by which the first camera actuator may tilt with respect to the Y axis.

The fourth housing side portion 1124 may include the housing groove 1124*a*. The second magnetic substance described above may be seated in the housing groove 1124*a*. Therefore, the first housing 1120 may be coupled to the tilting guide unit and the holder by a magnetic force or the like.

In addition, the fourth housing side portion 1124 may include second protrusion grooves PH2 spaced apart from each other and disposed symmetrically with respect to the housing groove 1124*a*. A plurality of second protrusion grooves PH2 may be present, and the second protrusion of the tilting guide unit may be seated therein. In the specification, it will be described that a plurality of first protrusion grooves PH1 overlap in the first direction (X-axis direction), and a plurality of second protrusion grooves overlap in the second direction (Y-axis direction). However, when positions of the first protrusion and the second protrusion are reversed, positions of the first protrusion groove and the second protrusion groove may also be reversed corresponding to the positions of the first protrusion and the second protrusion.

In addition, the first housing 1120 may include the accommodating unit 1125 formed by the first to fourth housing side portions 1121 to 1124. The mover 1130 may be positioned in the accommodating unit 1125.

FIG. 20 is a perspective view of the optical member of the first camera actuator according to the third embodiment.

The optical member 1132 may be seated on the holder. The optical member 1132 may be a right angle prism as a reflector, but the present invention is not limited thereto. As described above, in the specification, the optical member 1132 may include all of a prism, a mirror, and the like. Hereinafter, the above description of the optical member may be applied to the optical member 1132 in the same manner.

FIG. 21 is a perspective view of the holder according to the embodiment, FIGS. 22 and 23 are side views of the holder according to the embodiment, FIG. 24 is another side view of the holder according to the embodiment, FIG. 25 is a top view of the holder according to the embodiment, and FIG. 26 is a bottom view of the holder according to the embodiment.

Referring to FIGS. 21 to 26, the holder 1131 according to the embodiment may include a seating surface 1131*k* on which the optical member is seated. The seating surface 1131*k* may be an inclined surface. In addition, the holder 1131 may include a jaw portion 1131*t* on the seating surface 1131*k*. The jaw portion 1131*t* of the holder 1131 can prevent the movement of the optical member 1132. Furthermore, the seating surface 1131*k* may include a plurality of grooves, and a bonding member may be applied to the grooves. Therefore, the optical member may be easily coupled to the seating surface 1131*k*. In addition, the holder 1131 may include a holder protrusion 1131*p* extending upward from an upper surface thereof. The holder protrusion 1131*p* may tilt in the first direction (X-axis direction) or the second direction (Y-axis direction) and also operate as a stopper.

In addition, the holder 1131 according to the embodiment may include a cavity CV. The cavity CV may be positioned between a first holder outer surface 1131S1 and a second holder outer surface 1131S2, which will be described below. In addition, the optical member may be seated in the cavity CV.

The holder 1131 may include a holder hole 1131*h* at least partially passing through the holder 1131 in the second direction (Y-axis direction). The holder hole 1131*h* may be symmetrical to the control element hole in the second direction (Y-axis direction), thereby improving heat dissipation efficiency of the heat generated from the control device. Furthermore, a weight of the holder 1131 can be reduced by the holder hole 1131*h*, thereby improving the driving efficiency for the X-axis or Y-axis tilt of the mover.

In addition, the holder 1131 may include a plurality of outer surfaces. For example, the holder 1131 may include the first holder outer surface 1131S1, the second holder outer surface 1131S2, a third holder outer surface 1131S3, and a fourth holder outer surface 1131S4.

The first holder outer surface 1131S1 may be positioned to face the second holder outer surface 1131S2. In other words, the first holder outer surface 1131S1 may be disposed symmetrically with the second holder outer surface 1131S2 with respect to the first direction (X-axis direction).

The first holder outer surface 1131S1 may be positioned to face the first housing side portion 1121. In addition, the second holder outer surface 1131S2 may be positioned to face the second housing side portion 1122.

In addition, the first holder outer surface 1131S1 may include a first seating groove 1131S1*a*. In addition, the second holder outer surface 1131S2 may include a second seating groove 1131S2*a*. The first seating groove 1131S1*a* and the second seating groove 1131S2*a* may be disposed symmetrically with respect to the first direction (X-axis direction).

In addition, the first magnet may be disposed in the first seating groove 1131S1*a*, and the second magnet may be disposed in the second seating groove 1131S2*a*. The first magnet and the second magnet may also be disposed symmetrically with respect to the first direction (X-axis direction) corresponding to the positions of the first seating groove 1131S1*a* and the second seating groove 1131S2*a*.

As described above, due to the positions of the first and second seating grooves and the first and second magnets, the electromagnetic force induced by the magnets may be provided to the first holder outer surface S1231S1 and the second holder outer surface 1131S2 on the same axis. For example, a region where the electromagnetic force is applied on the first holder outer surface S1231S1 (e.g., a portion where the electromagnetic force is strongest) and a region where the electromagnetic force is applied on the second holder outer surface S1231S2 (e.g., a portion where the electromagnetic force is strongest) may be positioned on an axis parallel to the second direction (Y-axis direction). Therefore, the X-axis tilting can be accurately performed.

The third holder outer surface 1131S3 may be an outer surface in contact with the first holder outer surface 1131S1 and the second holder outer surface 1131S2 and extending from the first holder outer surface 1131S1 and the second holder outer surface 1131S2 in the second direction. In addition, the third holder outer surface 1131S3 may be positioned between the first holder outer surface 1131S1 and the second holder outer surface 1131S2.

The third holder outer surface 1131S3 may be the bottom surface of the holder 1131. The third holder outer surface 1131S3 may be positioned to face the third housing side portion.

In addition, the third holder outer surface 1131S3 may include an extension stopper (not shown) extending downward. Therefore, the holder 1131 can set the limitation of a range in which the holder 1131 performs the Y-axis tilt, moves in the first direction (X-axis direction), or moves up and down in the housing and at the same time, prevent damage due to the movement of the holder 1131.

In addition, the third holder outer surface 1131S3 may include a third seating groove 1131S3*a*. The third magnet may be disposed in the third seating groove 1131S3*a*. For example, an area of the third seating groove 1131S3*a* may be different from areas of the first seating groove 1131S1*a* and the second seating groove 1131S2*b*. The area of the third seating groove 1131S3*a* may be greater than the areas of the first seating groove 1131S1*a* and the second seating groove 1131S2*b*. Therefore, rotation in the first direction (X-axis direction) or tilt in the second direction (Y-axis direction) may be easily performed through the third magnet disposed in the third seating groove 1131S3*a*.

The fourth holder outer surface 1131S4 may be an outer surface in contact with the first holder outer surface 1131S1 and the second holder outer surface 1131S2 and extending from the third holder outer surface 1131S3 in the first direction (X-axis direction). In addition, the fourth holder outer surface 1131S4 may be positioned between the first holder outer surface 1131S1 and the second holder outer surface 1131S2. The fourth holder outer surface 1131S4 may be disposed on the third holder outer surface 1131S3.

The fourth holder outer surface 1131S4 may include a fourth seating groove 1131S4*a*. The first magnetic substance may be seated in the fourth seating groove 1131S4*a*. The fourth seating groove 1131S4*a* may be positioned to face a first face of the tilting guide unit.

The fourth holder outer surface 1131S4 may include the first protrusion grooves PH1 disposed to be spaced apart from each other in the first direction (X-axis direction) with respect to the fourth seating groove 1131S4*a*. The first protrusion of the tilting guide unit may be seated in the first protrusion groove PH1. The holder 1131 may be tilted to the X axis with respect to the first protrusion. Furthermore, the holder 1131 may be tilted to the Y axis with respect to the second protrusion.

As described above, a plurality of first protrusion grooves PH1 may be present and may overlap in the first direction (X-axis direction). Therefore, when the mover is tilted to the X-axis or rotated in the second direction (Y-axis direction), the tilt or the rotation can be accurately performed without tilting to one side. In an embodiment, an OIS function can be performed accurately.

Furthermore, the holder 1131 according to the embodiment may further include stoppers US and LS. In addition, the stoppers may be in contact with the first holder outer surface 1131S1 and the second holder outer surface 1131S2.

These stoppers may include the upper stopper US disposed on a bottom surface of the cavity CV and the lower stopper LS disposed under the bottom surface of the cavity CV. In an embodiment, the bottom surface of the cavity CV may correspond to the seating surface 1131*k*. In other words, the cavity may be surrounded by the first holder outer surface 1131S1, the second holder outer surface 1131S2, and the seating surface 1131*k*.

In the stopper according to the embodiment, the upper stopper US and the lower stopper LS are respectively positioned on ends of the first holder outer surface 1131S1 and the second holder outer surface 1131S2 in the third direction (Z-axis direction) or the optical axis direction.

Specifically, the holder 1131 may include a first region S1 and a second region S2 bisected in the third direction (Z-axis direction) or the optical axis direction. In this case, the first region S1 and the second region S2 may be sequentially disposed in the third direction. Alternatively, the first region S1 may be positioned between the second region S2 and the rotational unit. In the optical member, an area overlapping the first region S1 in the second direction (Y-axis direction) may be smaller than an area overlapping the second region S2 in the second direction (Y-axis direction).

In addition, a cross-sectional area of the optical member or the cavity CV according to the embodiment may increase in the third direction (Z-axis direction) or the optical axis direction. This increase may correspond to a slope of the seating surface 1131*k* on a YZ plane. In addition, the cross-sectional area may be an area on an XY plane. In other words, a cross-sectional area of the holder 1131 according to the embodiment may also decrease in the third direction (Z-axis direction) or optical axis direction.

In addition, a maximum cross-sectional area of the cavity CV in the first region S1 may be smaller than a maximum cross-sectional area of the cavity CV in the second region S2. In addition, an area of the cavity CV may increase toward the end of the holder 1131. In addition, as the cross-sectional area of the cavity CV in the holder according to the embodiment increases in the third direction (Z-axis direction), deformation of the holder on the end may increase. The deformation of the holder may be deformation due to an impact occurring between the holder 1131 and the housing due to tilt. For example, the deformation refers to a length (e.g., mm or μm) bent in the second direction by a force (e.g., Newton (N)) applied in the second direction.

Therefore, the upper stopper US and the lower stopper LS may be positioned in the second region S2 having a greater cross-sectional area of the cavity CV than the first region S1. Therefore, even when an impact occurs between the housing and the holder 1131 as the holder 1131 and the optical member rotate in the first direction or the second direction, the upper stopper US and the lower stopper LS can suppress the deformation due to impact on the ends of the outer surfaces (first and second holder outer surfaces) of the holder 1131. Therefore, it is also possible to minimize an impact applied to the optical member inside the first holder outer surface 1131S1*a* and the second holder outer surface 1131S2, thereby reducing damage to the optical member. In other words, it is possible to improve the impact reliability of the mover.

The upper stopper US and the lower stopper LS may be disposed to be spaced apart from each other in the first direction (X-axis direction). In an embodiment, the first holder outer surface 1131S1 and the second holder outer surface 1131S2 may include an upper region UA and a lower region BA bisected in the first direction (X-axis direction). For example, the upper region UA may be positioned above the lower region BA. The upper stopper US may be positioned in the upper region UA. In other words, the upper stopper US may be in contact with the upper region UA and may overlap the upper region UA in the second direction (Y-axis direction). In addition, the lower stopper LS may be positioned in the lower region BA. In addition, the lower stopper LS may be in contact with the lower region BA and may overlap the lower region BA in the second direction (Y-axis direction). For example, the upper stopper US may be disposed to overlap the second region S2 and the upper region UA in the second direction (Y-axis direction). The lower stopper US may be positioned to overlap the second region S2 and the lower region BA in the second direction (Y-axis direction). Therefore, the upper stopper US may overlap the optical member in the second direction (X-axis direction).

In addition, in an embodiment, the lower stopper LS may be disposed closer to the third holder outer surface 1131S3 than the upper stopper US. For example, a distance DL2 between the third holder outer surface 1131S3 and an upper surface of the lower stopper LS may be smaller than a distance DL1 between the third holder outer surface 1131S3 and an upper surface of the upper stopper US.

In addition, an area overlapping the cavity CV or the optical member in the second direction (Y-axis direction) in the upper region UA may be greater than an area overlapping the cavity CV or the optical member in the second direction (Y-axis direction) in the lower region BA. Therefore, an amount of deformation due to an impact may be greater in the upper region UA than in the lower region BA toward the end. In other words, the amount of deformation due to impact on the end may be smaller in the lower region BA than in the upper region UA.

In an embodiment, a height H1 of the upper stopper US in the first direction (X-axis direction) may be different from or equal to a height of the lower stopper LS in the first direction (X-axis direction). In addition, a length L1 of the upper stopper US in the third direction (Z-axis direction) may be different from or equal to a length L2 of the lower stopper LS in the third direction (Z-axis direction). For example, the upper stopper US and the lower stopper LS may differ in at least one of the height or the length described above. In an embodiment, as shown in the drawings, the height H1 of the upper stopper US may be equal to the height of the lower stopper LS, and the length L1 of the upper stopper US may be smaller than the length L2 of the lower stopper LS. Therefore, an area of the upper stopper US in contact with the second region S2 (e.g., an area on XZ plane, A1) may be smaller than an area of the lower stopper LS in contact with the second region S2 (e.g., an area on ZX plane, A2). Therefore, the first holder outer surface 1131S1 and the second holder outer surface 1131S2 of the holder 1131 may have a greater contact area with the housing in the lower region BA than in the upper region UA. Therefore, when the holder 1131 is tilted with respect to the first direction (X-axis direction), the first holder outer surface 1131S1 and the second holder outer surface 1131S2 have a greater collision area through the stopper in the lower region BA than in the upper region UA. Therefore, the holder 1131 according to the embodiment may make the amount of impact transmitted through the lower stopper LS greater than the amount of impact transmitted through the upper stopper US, and thus the lower region BA having a smaller amount of deformation due to impact may receive the impact. In other words, by concentrating the impact due to tilt in the lower region BA having a smaller amount of deformation due to the impact rather than the upper region UA, it is possible to suppress the deformation due to impact in the upper region UA. Therefore, it is also possible to further reduce the damage to the optical member. Therefore, it is possible to improve the impact reliability of the holder according to the embodiment.

The upper stopper US and the lower stopper LS may extend from the ends of the first holder outer surface 1131S1 and the second holder outer surface 1131S2 in directions opposite to the third direction.

In addition, the upper stopper US and the lower stopper LS may extend inward or toward the cavity CV. With this configuration, when the holder 1131 is tilted with respect to the second direction (Y-axis direction) or tilted in the first direction, it is possible to suppress damage due to impact between the holder and the housing through the upper stopper US and the lower stopper LS.

In this case, an area of the upper stopper US on the XY plane may be smaller than an area of the lower stopper LS on the XY plane. The above description may be applied to this in the same manner. Furthermore, this configuration may be a result of the position of the optical element or the cavity CV.

In addition, the upper stopper US and the lower stopper LS according to the embodiment may be respectively disposed on the first holder outer surface 1131S1 and the second holder outer surface 1131S2. Therefore, a plurality of upper stoppers US and lower stoppers LS may be present. In addition, the upper stoppers US may be disposed symmetrically with respect to the first direction (X-axis direction) or the third direction (Z-axis direction) on the first holder outer surface 1131S1 and the second holder outer surface 1131S2. In addition, the lower stopper LS may be disposed symmetrically with respect to the first direction (X-axis direction) or the third direction (Z-axis direction) on the first holder outer surface 1131S1 and the second holder outer surface 1131S2.

In addition, the upper stopper US and the lower stopper LS may be made of a component of an elastic material. Therefore, the upper stopper US and the lower stopper LS can damper the impact with the housing by the rotation of the holder 1131. Furthermore, as described above, it is possible to improve the impact resistance of the holder 1131 by the upper stopper US and the lower stopper LS.

FIG. 27 is a perspective view of a tilting guide unit of the first camera actuator according to the third embodiment, FIG. 28 is a perspective view in a direction different from that of FIG. 27, and FIG. 29 is a cross-sectional view along line N-N' in FIG. 27.

Referring to FIGS. 27 to 29, the rotational unit 1140 according to the embodiment may include the tilting guide unit 1141, the first magnetic substance 1142, and the second magnetic substance 1143. The first magnetic substance 1142 and the second magnetic substance 1143 may be positioned to correspond to each other with respect to the tilting guide unit 1141. In addition, the above description may be applied in the same manner and thus the first magnetic substance 1142 and the second magnetic substance 1143 may provide a coupling force between the mover, the tilting guide unit 1141, and the housing.

First, the tilting guide unit 1141 may include a base BS, a first protrusion PR1 protruding from a first face 1141*a* of the base BS, and a second protrusion PR2 protruding from a second face 1141*b* of the base BS.

All of the above description of the tilting guide unit 1141 may be applied in the same manner. Furthermore, in the tilting guide unit 1141, the first face 1141*a* and the second face 1141*b* may also be formed opposite to the structure described above. For example, positions of the first protrusion PR1 and the second protrusion PR2 may be changed. Furthermore, a groove corresponding to the first protrusion PR1 or a groove corresponding to the second protrusion PR2 may also be interchanged in the mover and the housing. A description thereof may be applied to all of the tilting guide units in the specification.

FIG. 30 is a perspective view of the first camera actuator according to the third embodiment, FIG. 31 is a cross-sectional view along line M-M' in FIG. 30, FIG. 32 is a cross-sectional view along line V-V' in FIG. 30.

Referring to FIGS. 30 to 32, the first coil 1152*a* may be positioned on the first housing side portion 1121, and the first magnet 1151*a* may be positioned on the first holder outer surface 1131S1 of the holder 1131. Therefore, the first coil 1152*a* and the first magnet 1151*a* may be positioned opposite to each other. The first magnet 1151*a* may at least partially overlap the first coil 1152*a* in the second direction (Y-axis direction).

In addition, the second coil 1152*b* may be positioned on the second housing side portion 1122, and the second magnet 1151*b* may be positioned on the second holder outer surface 1131S2 of the holder 1131. Therefore, the second coil 1152*b* and the second magnet 1151*b* may be positioned opposite to each other. The second magnet 1151*b* may at least partially overlap the second coil 1152*b* in the second direction (Y-axis direction).

In addition, the first coil 1152*a* and the second coil 1152*b* may overlap in the second direction (Y-axis direction), and the first magnet 1151*a* and the second magnet 1151*b* may overlap in the second direction (Y-axis direction). With this configuration, an electromagnetic force applied to the outer surfaces of the prism holder (the first holder outer surface and the second holder outer surface) may be positioned on a parallel axis in the second direction (Y-axis direction), and thus the X-axis tilt can be performed accurately and precisely.

In addition, the second protrusions PR2*a* and PR2*b* of the tilting guide unit 1141 may be positioned in the second protrusion groove PH2 of the housing 1120 and may be in contact with the second protrusion groove PH2. In addition, when the X-axis tilt is performed, the second protrusions PR2*a* and PR2*b* may be reference axes (or rotational axes) of the tilt. Therefore, the tilting guide unit 1141 and the mover 1130 may move up and down.

In addition, according to the embodiment, the fourth housing side portion 1124 may include the housing groove 1124*a* described above. In addition, the second magnetic substance 1143 may be positioned in the housing groove 1124*a*. The housing groove 1124*a* may be positioned to correspond to the first magnetic substance 1142.

In an embodiment, the housing groove 1124*a* may be positioned on an outer surface or an inner surface of the fourth housing side portion 1124. Hereinafter, it will be described that the housing groove 1124*a* is positioned in an outer surface of the fourth housing side portion 1124. The housing groove 1124*a* may also have a shape in which one side of the inner surface of the fourth housing side portion 1124 is open. For example, the housing groove 1124*a* may have a structure that is open from one end of the inner surface of the fourth housing side portion 1124 toward the first housing side portion.

In addition, a contact point between the second protrusion PR2 and the fourth housing side portion 1124 and a center of the second protrusion groove PH2 may be positioned on an axis that overlaps in the third direction (Z-axis direction) or is parallel to the third direction. Therefore, the actuator according to the embodiment can improve the accuracy of the X-axis tilt through the second protrusion PR2.

In addition, as described above, the first Hall sensor 1153*a* may be positioned outside for electrical connection and coupling with the board unit 1154. However, the present invention is not limited to these positions.

In addition, the third coil 1152*c* may be positioned on the third housing side portion 1123, and the third magnet 1151*c* may be positioned on the third holder outer surface 1131S3 of the holder 1131. The third coil 1152*c* and the third magnet 1151*c* may at least partially overlap in the first direction (X-axis direction). Therefore, an intensity of the electromagnetic force between the third coil 1152*c* and the third magnet 1151*c* may be easily controlled.

As described above, the tilting guide unit 1141 may be positioned on the fourth holder outer surface 1131S4 of the holder 1131. The first magnetic substance 1142 may be seated in the fourth seating groove 1131S4*a*. The fourth seating groove 1131S4*a* may be positioned to at least partially overlap the housing groove 1124*a* of the fourth housing side portion 1124 in the third direction (Z-axis direction). For example, a center of the fourth seating groove 1131S4*a* and a center of the housing groove 1124*a* may overlap in the third direction (Z-axis direction) or may be positioned side by side or parallel to each other in the third direction (Z-axis direction).

FIG. 33 is a view showing a first drive unit of the first camera actuator according to the third embodiment.

Referring to FIG. 33, the drive unit 1150 includes the drive magnet 1151, the drive coil 1152, the Hall sensor unit 1153, and the board unit 1154.

In addition, as described above, the drive magnet 1151 may include the first magnet 1151*a*, the second magnet 1151*b*, and the third magnet 1151*c* for providing a driving force by an electromagnetic force. Each of the first magnet 1151*a*, the second magnet 1151*b*, and the third magnet 1151*c* may be positioned on the outer surfaces of the holder 1131.

In addition, the drive coil 1152 may include a plurality of coils. In an embodiment, the drive coil 1152 may include the first coil 1152*a*, the second coil 1152*b*, and the third coil 1152*c*.

The above description may be all applied to a description of the drive magnet 1151, the drive coil 1152, the Hall sensor unit 1153, and the board unit 1154 in the same manner.

FIG. 34 is a perspective view of the first camera actuator according to the third embodiment, FIG. 35 is a cross-sectional view along line H-H' in FIG. 34, and FIG. 36 is an exemplary view of the movement of the first camera actuator shown in FIG. 35.

Referring to FIGS. 34 to 36, the Y-axis tilt may be performed. In other words, OIS can be implemented by the rotation in the first direction (X-axis direction). In an embodiment, the third magnet 1151*c* disposed under the holder 1131 may tilt or rotate the tilting guide unit 1141 and the mover 1130 in the first direction (X-axis direction) by generating an electromagnetic force with the third coil 1152*c*.

Specifically, the tilting guide unit 1141, the housing 1120, and the mover 1130 may be coupled to each other by the first magnetic substance 1142 and the second magnetic substance 1143. In addition, a 1-1 protrusion PR1*a* and a 1-2 protrusion PR1*b* may be spaced apart in the first direction (X-axis direction) to support the mover 1130. In addition, the tilting guide unit 1141 may rotate or tilt about the second protrusion PR2 protruding toward the housing, which is a reference axis (or a rotational axis), in the first direction (X-axis direction).

For example, OIS can be implemented by rotating (X1→X1*a* or X1*b*) the mover 1130 at a first angle θ1 in the X-axis direction by first electromagnetic forces F1A and FIB between the third magnet 1151*c* disposed in the third seating groove and the third coil 1152*c* disposed on the third board side portion. The first angle θ1 may be in the range of ±1° to ±3°. However, the present invention is not limited thereto.

FIG. 37 is a perspective view of the first camera actuator according to the third embodiment, FIG. 38 is a cross-sectional view along line E-E' in FIG. 37, and FIG. 39 is an exemplary view of the movement of the first camera actuator shown in FIG. 38.

Referring to FIGS. 37 to 39, OIS can be implemented by tilting or rotating the mover 1130 in the Y-axis direction.

In an embodiment, the first magnet 1151*a* and the second magnet 1151*b* disposed on the holder 1131 may tilt or rotate the mover 1130 in the second direction (Y-axis direction) by respectively forming an electromagnetic force with the first coil 1152*a* and the second coil 1152*b*.

In the first camera actuator according to the embodiment, components that are tilted in the first direction or tilted in the second direction may be different from each other.

Specifically, the housing and the mover 1130 may be coupled to each other by the second magnetic substance 1143 in the tilting guide unit 1141. In addition, as described above, the plurality of first protrusions PR1 may be spaced apart in the first direction (X-axis direction) to support the mover 1130. In addition, the 2-1 protrusion PR2*a* and the 2-2 protrusion PR2*b* may be in contact with the housing 1120 to support the housing 1120.

In addition, the tilting guide unit 1141 may rotate or tilt about the first protrusion PR1 protruding toward the mover 1130, which is the reference axis (or the rotational axis), with respect to the first direction (X-axis direction).

For example, OIS can be implemented by rotating (Y1→Y1*a* or Y1*b*) the mover 1130 at a second angle θ2 in the Y-axis direction by second electromagnetic forces F2A and F2B between the first and second magnets 1151*a* and 1151*b* disposed in the first seating groove and the first and second coil units 1152*a* and 1152*b* disposed on the first and second board side portions. The second angle θ2 may be in the range of ±1° to ±3°. However, the present invention is not limited thereto. As described above, the first camera actuator according to the embodiment may provide the best optical characteristics, which may control the mover 1130 to rotate in the first direction (X-axis direction) or the second direction (Y-axis direction) by the electromagnetic force between the drive magnet in the prism holder and the drive coil disposed in the housing, thereby minimizing the occurrence of the de-center or tilt phenomenon when OIS is implemented. In addition, as described above, the “Y-axis tilt” refers to rotating or tilting in the first direction (X-axis direction), and the “X-axis tilt” refers to rotating or tilting in the second direction (Y-axis direction).

FIG. 40 is a perspective view of a cover according to the embodiment, FIG. 41 is a top view of the cover according to the embodiment, FIG. 42 is a cross-sectional view along line V-V' in FIG. 41, and FIG. 43 is a cross-sectional view along line W-W' in FIG. 41.

Referring to FIGS. 40 to 43, as described above, a cover CB according to the embodiment may be disposed on the outer surfaces of the first camera actuator and the second camera actuator and may surround the first camera actuator and the second camera actuator. To this end, the cover CB may have an open one side and an empty space therein. For example, a lower surface of the cover CB may be open. Therefore, the first camera actuator and the second camera actuator may be positioned inside the cover CB through a lower portion of the cover CB. Therefore, the cover CB may shield the first camera actuator and the second camera actuator.

In addition, the cover CB may include a first cover unit R1 overlapping the first camera actuator in the first direction (X-axis direction) and a second cover unit R2 overlapping the second camera actuator in the second direction (Y-axis direction). The first cover unit R1 and the second cover unit R2 may be disposed side by side in the third direction (Z-axis direction). Based on the moving path of light, the light may pass the second cover unit R2 after the first cover unit R1. Furthermore, the cover CB according to the embodiment may include an upper surface CBU and an outer surface CBS.

In addition, the upper surface CBU of the cover CB may include an opening OP. The opening OP may overlap the first camera actuator in a first direction (X-axis direction). In other words, the opening OP may overlap the optical member of the first camera actuator in the first direction (X-axis direction). Therefore, light may be provided to the optical member of the first camera actuator through the opening OP. In addition, in the specification, the first direction (X-axis direction) is used interchangeably with a “vertical direction,” the second direction (Y-axis direction) is used interchangeably with a “horizontal direction,” and the third direction (Z-axis direction) is used interchangeably with an “optical axis direction.”

In addition, a prevention unit ST may be disposed adjacent to the opening OP on the upper surface CBU of the cover CB. A plurality of prevention units ST may be present and may include a first prevention unit ST1 and a second prevention unit ST2 spaced apart from each other in the horizontal direction.

The first prevention unit ST1 and the second prevention unit ST2 may be connected to the upper surface CBU of the cover CB. For example, the first prevention unit ST1 and the second prevention unit ST2 may be portions in which a portion of the upper surface CBU of the cover CB is bent in the first direction (X-axis direction). Alternatively, in the specification, the prevention unit ST may also have a structure connected to the housing instead of the cover CB. Therefore, the prevention unit ST may be a component included in the camera module or the first camera actuator. However, hereinafter, it will be described that the prevention unit ST has a structure included in the first camera actuator and connected to the cover CB.

Furthermore, the first prevention unit ST1 and the second prevention unit ST2 may be connected to the cover CB to adjust a moving distance of the mover regardless of the collision of the mover of the first camera actuator with the housing, thereby preventing a force of an impact or the like from concentrating on the housing. Therefore, it is possible to improve the reliability of the first camera actuator.

The first prevention unit ST1 and the second prevention unit ST2 may extend downward. For example, the first prevention unit ST1 and the second prevention unit ST2 may extend in the vertical direction. In addition, the first prevention unit ST1 and the second prevention unit ST2 may overlap in a direction perpendicular to the mover, in particular, the holder of the first camera actuator, which will be described below. Furthermore, the first prevention unit ST1 and the second prevention unit ST2 may be positioned inside a holder groove of the holder and disposed to be spaced apart from an inner surface of the holder groove in the optical axis direction. The inner surface of the holder groove (e.g., a first inner surface) and the prevention unit may be disposed to be spaced apart from each other in the optical axis direction, and a separation distance may be greater than a vertical length of an overlapping region of the tilting guide unit and the mover in the vertical direction. A protrusion groove of the mover or a detailed description thereof will be described below.

The outer surface CBS of the cover CB may surround the upper surface CBU of the cover CB and form a cover groove RS therein. As described above, the first camera actuator and the second camera actuator may be positioned in the cover groove RS.

FIG. 44 is a perspective view of the first camera actuator according to the third embodiment, and FIG. 45 is an exploded perspective view of the first camera actuator according to the third embodiment.

Referring to FIGS. 44 and 45, a first camera actuator 1100B according to the embodiment includes the shield can (not shown), the first housing 1120, the mover 1130, the rotational unit 1140, and the first drive unit 1150.

The mover 1130 may include the holder 1131 and the optical member 1132 seated on the holder 1131. In addition, the rotational unit 1140 includes the tilting guide unit 1141 and the first magnetic substance 1142 and the second magnetic substance 1143 disposed to be spaced apart from each other with the tilting guide unit 1141 interposed therebetween and having a coupling force. In addition, the first drive unit 1150 includes the drive magnet 1151 (e.g., the first drive magnet), the drive coil 1152 (e.g., the first drive coil), the yoke unit (not shown), the Hall sensor unit 1153, and the first board unit 1154.

The shield can (not shown) may be positioned on an outermost side of the first camera actuator 1100B and positioned to surround the rotational unit 1140 and the first drive unit 1150, which will be described below.

The shield can (not shown) may block or reduce electromagnetic waves generated from the outside. Therefore, it is possible to reduce the occurrence of a malfunction of the rotational unit 1140 or the first drive unit 1150.

The first housing 1120 may be positioned inside the shield can (not shown). In addition, the first housing 1120 may be positioned inside the first board unit 1154 to be described below. The first housing 1120 may be fastened by being fitted into or matched with the shield can (not shown).

In the specification, as described above, the third direction (Z-axis direction) may correspond to the optical axis direction, the first direction (X-axis direction) and the second direction (Y-axis direction) may be directions perpendicular to the optical axis, and the tilting may be performed by the first camera actuator.

The first housing 1120 may include the first housing side portion 1121, the second housing side portion 1122, the third housing side portion 1123, and the fourth housing side portion 1124.

The first housing side portion 1121 and the second housing side portion 1122 may be disposed to face each other. In addition, the third housing side portion 1123 and the fourth housing side portion 1124 may be disposed between the first housing side portion 1121 and the second housing side portion 1122.

The third housing side portion 1123 may be in contact with the first housing side portion 1121, the second housing side portion 1122, and the fourth housing side portion 1124. In addition, the third housing side portion 1123 may be a bottom surface of the first housing 1120.

In addition, the first housing side portion 1121 may include the first housing hole 1121*a*. The first coil 1152*a* to be described below may be positioned in the first housing hole 1121*a*.

In addition, the second housing side portion 1122 may include the second housing hole 1122*a*. In addition, the second coil 1152*b* to be described below may be positioned in the second housing hole 1122*a*.

The first coil 1152*a* and the second coil 1152*b* may be coupled to the first board unit 1154. In an embodiment, the first coil 1152*a* and the second coil 1152*b* may be electrically connected to the first board unit 1154 so that a current may flow. The current is an element of the electromagnetic force by which the first camera actuator may tilt with respect to the X-axis.

The third housing side portion 1123 may include the third housing hole 1123*a*. The third coil 1152*c* to be described below may be positioned in the third housing hole 1123*a*. The third coil 1152*c* may be coupled to the first board unit 1154. In addition, the third coil 1152*c* may be electrically connected to the first board unit 1154 so that a current may flow. The current is an element of the electromagnetic force by which the first camera actuator may tilt with respect to the Y-axis.

The fourth housing side portion 1124 may include the housing groove 1124*a*. In other words, the housing groove 1124*a* may be positioned on at least one of the outer surface or the inner surface of the fourth housing side portion 1124. Hereinafter, it will be described that the housing groove 1124*a* is positioned in an inner surface of the fourth housing side portion 1124.

In addition, the second magnetic substance 1143 may be disposed in the housing groove 1124*a*. In addition, the first magnetic substance 1142 may be positioned corresponding to the second magnetic substance 1143 with the tilting guide unit 1141 interposed therebetween. Therefore, the first housing 1120 may be coupled to the tilting guide unit 1141 and the mover 1130 by the magnetic force by the first magnetic substance 1142 and the second magnetic substance 1143.

In addition, the first housing 1120 may include the accommodating unit 1125 formed by the first housing side portion 1121 to the fourth housing side portion 1124. The mover 1130 may be positioned in the accommodating unit 1125.

The mover 1130 includes the holder 1131 and the optical member 1132 seated on the holder 1131.

The holder 1131 and the optical member 1132 may be seated in the accommodating unit 1125 of the first housing 1120. The holder 1131 may include the first holder outer surface to the fourth holder outer surface respectively corresponding to the first housing side portion 1121, the second housing side portion 1122, the third housing side portion 1123, and the fourth housing side portion 1124. In addition, the first drive coil 1152 may be positioned in the seating groove formed in the outer surface of the holder 1131. A detailed description thereof will be given below.

The optical member 1132 may be seated on the holder 1131. To this end, the holder 1131 may have the seating surface, and the seating surface may be formed by the accommodating groove. The optical member 1132 may include the reflector disposed therein. However, the present invention is not limited thereto.

In addition, the optical member 1132 may reflect light reflected from the outside (e.g., an object) into the camera module. In other words, the optical member 1132 can overcome the spatial limitations of the first camera actuator and the first camera actuator by changing the path of the reflected light. As described above, it should be understood that the camera module may also provide a high range of magnification by extending the optical path while minimizing a thickness.

The rotational unit 1140 may include the tilting guide unit 1141, the first magnetic substance 1142 having a coupling force with the tilting guide unit 1141, and the second magnetic substance 1143 positioned in the tilting guide unit 1141 or the housing (particularly, the fourth housing side portion). However, the first magnetic substance 1142 and the second magnetic substance 1143 may be positioned in the mover 1130, the tilting guide unit 1141, and the housing 1120 and may provide the coupling force between the housing 1120, the tilting guide unit 1141, and the mover 1130.

The tilting guide unit 1141 may be coupled to the mover 1130 and the first housing 1120 described above. The tilting guide unit 1141 may be disposed adjacent to the optical axis. Therefore, the actuator according to the embodiment may easily change the optical path according to the first axis tilt and the second axis tilt to be described below.

The tilting guide unit 1141 may include the first protrusions disposed to be spaced apart from each other in the first direction (X-axis direction) and the second protrusions disposed to be spaced apart from each other in the second direction (Y-axis direction). In addition, the first protrusion and the second protrusion may protrude in opposite directions. A detailed description thereof will be given below.

The first magnetic substance 1142 may be positioned in the outer surface of the holder 1131. For example, the first magnetic substance 1142 may be positioned on the fourth holder outer surface of the holder 1131. In addition, the second magnetic substance 1143 may be positioned in the housing groove 1124*a* of the fourth housing side portion 1124. For example, the second magnetic substance 1143 may be positioned on the inner surface of the fourth housing side portion 1124. Alternatively, the second magnetic substance 1143 may also be positioned on the outer surface of the fourth housing side portion 1124.

With this configuration, the tilting guide unit 1141 may be pressed by the holder 1131 and the housing 1120 between the holder 1131 and the housing 1120 by the magnetic force (e.g., the attractive force) between the first magnetic substance 1142 and the second magnetic substance 1143. Therefore, the tilting guide unit 1141 and the holder 1131 in the housing 1120 may be spaced apart from the bottom surface of the housing in the accommodating unit 1125. In other words, the tilting guide unit 1141 and the holder 1131 may be coupled to the housing 1120. However, as described above, the first magnetic substance 1142 and the second magnetic substance 1143 may be magnets having polarities different from or the same as each other, yokes, or the like and may be made of a material having an attractive force or a repulsive force to each other.

The first drive unit 1150 includes the drive magnet 1151, the drive coil 1152, the yoke unit (not shown), the Hall sensor unit 1153, and the first board unit 1154. The first drive unit 1150 may move, rotate, or tilt the mover 1130.

The drive magnet 1151 may include a plurality of magnets. In an embodiment, the drive magnet 1151 may include the first magnet 1151*a*, the second magnet 1151*b*, and the third magnet 1151*c*.

Each of the first magnet 1151*a*, the second magnet 1151*b*, and the third magnet 1151*c* may be positioned on the outer surfaces of the holder 1131. In addition, the first magnet 1151*a* and the second magnet 1151*b* may be positioned to face each other. The third magnet 1151*c* may be positioned on the bottom surface of the holder 1131, that is, the third holder outer surface. A detailed description thereof will be given below.

The drive coil 1152 may include a plurality of coils. In an embodiment, the drive coil 1152 may include the first coil 1152*a*, the second coil 1152*b*, and the third coil 1152*c*.

The first coil 1152*a* may be positioned to correspond to the first magnet 1151*a*. In other words, the first coil 1152*a* may be disposed to face the first magnet 1151*a*. Therefore, as described above, the first coil 1152*a* may be positioned in the first housing hole 1121*a* of the first housing side portion 1121.

In addition, the second coil 1152*b* may be positioned to correspond to the second magnet 1151*b*. In other words, the second coil 1152*b* may be disposed to face the second magnet 1151*b*. Therefore, as described above, the second coil 1152*b* may be positioned in the second housing hole 1122*a* of the second housing side portion 1122.

In addition, the first coil 1152*a* may be positioned to face the second coil 1152*b*. In other words, the first coil 1152*a* may be positioned symmetrically with the second coil 1152*b* with respect to the first direction (X-axis direction). This may also be applied to the first magnet 1151*a* and the second magnet 1151*b* in the same manner. In other words, the first magnet 1151*a* and the second magnet 1151*b* may be positioned symmetrically with respect to the first direction (X-axis direction). In addition, the first coil 1152*a*, the second coil 1152*b*, the first magnet 1151*a*, and the second magnet 1151*b* may be disposed to at least partially overlap in the second direction (Y-axis direction). With this configuration, the X-axis tilting may be accurately performed without tilting to one side by the electromagnetic force between the first coil 1152*a* and the first magnet 1151*a* and the electromagnetic force between the second coil 1152*b* and the second magnet 1151*b*.

The third coil 1152*c* may be positioned to correspond to the third magnet 1151*c*. For example, the third coil 1152*c* may be positioned in the third housing hole 1123*a* of the third housing side portion 1123. In addition, the third housing hole 1123*a* may have a different area from the first housing hole and the second housing hole. Therefore, the Y-axis tilting may be easily performed through the third coil 1152*c*.

In addition, the third coil 1152*c* may be positioned at a bisecting point between the first coil 1152*a* and the second coil 1152*b*. With this configuration, the Y-axis tilting may be performed in a balanced manner without tilting to one side by the electromagnetic force generated by the current flowing through the third coil 1152*c*.

The yoke unit (not shown) may be positioned between the drive magnet 1151 and the holder 1131. The yoke unit (not shown) is positioned on the first holder outer surface and the second holder outer surface of the holder 1131 so that the drive magnet is easily coupled to the holder 1131. For example, the yoke unit (not shown) may be disposed in the seating groove positioned in the outer surface of the holder and may have an attractive force with the drive magnet 1151. In other words, the yoke unit (not shown) can improve the coupling force between the drive magnet 1151 and the holder 1131.

The Hall sensor unit 1153 may include a plurality of Hall sensors. In an embodiment, the Hall sensor unit 1153 may include the first Hall sensor 1153*a* and the second Hall sensor 1153*b*. The first Hall sensor 1153*a* may be positioned inside or outside the first coil 1152*a* or the second coil 1152*b*. The first Hall sensor 1153*a* may detect a change in a magnetic flux inside the first coil 1152*a* or the second coil 1152*b*. Therefore, the first Hall sensor 1153*a* may perform the position sensing of the first and second magnets 1151*a* and 1151*b*. In addition, the second Hall sensor 1153*b* may be positioned inside or outside the third coil 1152*c*. The second Hall sensor 1153*b* may perform the position sensing of the third coil 1152*c*. Therefore, the first camera actuator according to the embodiment may control the X-axis or Y-axis tilt. The Hall sensor unit or the Hall sensor may also be composed of a plurality of sensors.

The first board unit 1154 may be positioned under the first drive unit 1150. The first board unit 1154 may be electrically connected to the drive coil 1152 and the Hall sensor unit 1153. For example, a current may be applied to the drive coil 1152 through the first board unit 1154, and thus the mover 1130 may be tilted to the X axis or the Y axis. For example, the first board unit 1154 may be coupled to the drive coil 1152 and the Hall sensor unit 1153 through SMT. However, the present invention is not limited to this method.

The first board unit 1154 may be positioned between the shield (not shown) and the first housing 1120 and coupled to the shield can and the first housing 1120. The coupling method may be variously performed as described above. In addition, the drive coil 1152 and the Hall sensor unit 1153 may be positioned in the outer surface of the first housing 1120 through the coupling.

The first board unit 1154 may include the circuit board having wiring patterns that may be electrically connected, such as the rigid PCB, the flexible PCB, or the rigid flexible PCB. However, the present invention is not limited to these types.

FIG. 46 is a perspective view of the first housing in the first camera actuator according to the third embodiment.

Referring to FIG. 46, the first housing 1120 may include the first housing side portion 1121, the second housing side portion 1122, the third housing side portion 1123, and the fourth housing side portion 1124.

The first housing side portion 1121 and the second housing side portion 1122 may be disposed to face each other. In addition, the third housing side portion 1123 and the fourth housing side portion 1124 may be disposed between the first housing side portion 1121 and the second housing side portion 1122.

The third housing side portion 1123 may be in contact with the first housing side portion 1121, the second housing side portion 1122, and the fourth housing side portion 1124. In addition, the third housing side portion 1123 may be a bottom surface of the first housing 1120.

In addition, the first housing side portion 1121 may include the first housing hole 1121*a*. The first coil 1152*a* to be described below may be positioned in the first housing hole 1121*a*.

In addition, the second housing side portion 1122 may include the second housing hole 1122*a*. In addition, the second coil 1152*b* to be described below may be positioned in the second housing hole 1122*a*.

Furthermore, the second housing side portion 1122 or the first housing side portion 1121 may include the control device groove 1121*b*. In an embodiment, the second housing side portion 1122 may include the control device groove 1121*b*. In addition, a driver electrically connected to the board, a control device, a processor, and the like may be positioned in the control device groove 1121*b*.

The first coil 1152*a* and the second coil 1152*b* may be coupled to the first board unit 1154. In an embodiment, the first coil 1152*a* and the second coil 1152*b* may be electrically connected to the first board unit 1154 so that a current may flow. The current is an element of the electromagnetic force by which the first camera actuator may tilt with respect to the X-axis.

In addition, the third housing side portion 1123 may be disposed between the first housing side portion 1121 and the second housing side portion 1122. The third housing side portion 1123 may be a bottom portion of the housing 1120. The third coil 1152*c* is positioned in the third housing hole 1123*a* of the third housing side portion 1123, and a current flowing through the third coil 1152*c* is an element of the electromagnetic force by which the first camera actuator may tilt with respect to the Y-axis.

The fourth housing side portion 1124 may include the housing groove 1124*a*. The second magnetic substance described above may be seated in the housing groove 1124*a*. Therefore, the first housing 1120 may be coupled to the tilting guide unit and the holder by a magnetic force or the like.

In addition, the fourth housing side portion 1124 may include second protrusion grooves PH2 spaced apart from each other and disposed symmetrically with respect to the housing groove 1124*a*. A plurality of second protrusion grooves PH2 may be present, and the second protrusion of the tilting guide unit may be seated therein. In the specification, it will be described that a plurality of first protrusion grooves PH1 are present and overlap in the second direction (Y-axis direction), and a plurality of second protrusion grooves are present and overlap in the first direction (X-axis direction). However, when the positions of the first protrusion and the second protrusion are reversed, the positions of the first protrusion groove and the second protrusion groove may also be reversed corresponding to the positions of the first protrusion and the second protrusion. Therefore, each of the housing and the holder of the first camera actuator according to the embodiment may include a different one of the first protrusion groove in which the first protrusion is seated and the second protrusion groove in which the second protrusion is seated.

In addition, the first housing 1120 may include the accommodating unit 1125 formed by the first to fourth housing side portions 1121 to 1124. The mover 1130 may be positioned in the accommodating unit 1125.

FIG. 47 is a perspective view of the optical member of the first camera actuator according to the third embodiment.

The optical member 1132 may be seated on the holder. The optical member 1132 may be a right angle prism as a reflector, but the present invention is not limited thereto. Alternatively, the optical member 1132 may also be formed as a mirror. The above description may be applied to a description thereof in the same manner.

FIG. 48 is a perspective view of the holder according to the embodiment, FIG. 49 is one side view of the holder according to the embodiment, FIG. 50 is another side view of the holder according to the embodiment, FIG. 51 is a top view of the holder according to the embodiment, FIG. 52 is a bottom view of the holder according to the embodiment, and FIG. 53 is still another side view of the holder according to the embodiment.

Referring to FIGS. 48 to 53, the holder 1131 according to the embodiment may include the seating surface 1131*k* on which the optical member is seated. The seating surface 1131*k* may be an inclined surface. In addition, the holder 1131 may include the jaw portion (not shown) above the seating surface 1131*k*. The jaw portion (not shown) of the holder 1131 can prevent the movement of the optical member 1132. Furthermore, the seating surface 1131*k* may include a plurality of grooves, and a bonding member may be applied to the grooves. Therefore, the optical member may be easily coupled to the seating surface 1131*k*. In addition, the holder 1131 according to the embodiment may include the cavity CV. The cavity CV may be positioned between the first holder outer surface 1131S1 and the second holder outer surface 1131S2, which will be described below. In addition, the optical member may be seated in the cavity CV.

The holder 1131 may include the holder hole 1131*h* at least partially passing through the holder 1131 in the second direction (Y-axis direction). The holder hole 1131*h* may be symmetrical to the control element hole in the second direction (Y-axis direction), thereby improving heat dissipation efficiency of the heat generated from the control device. Furthermore, the weight of the holder 1131 can be reduced by the holder hole 1131*h*, thereby improving the driving efficiency of the mover for the X-axis or Y-axis tilt.

In addition, the holder 1131 may include a plurality of outer surfaces. For example, the holder 1131 may include the first holder outer surface 1131S1, the second holder outer surface 1131S2, the third holder outer surface 1131S3, and the fourth holder outer surface 1131S4.

The first holder outer surface 1131S1 may be positioned to face the second holder outer surface 1131S2. In other words, the first holder outer surface 1131S1 may be disposed symmetrically with the second holder outer surface 1131S2 with respect to the first direction (X-axis direction).

The first holder outer surface 1131S1 may be positioned to face the first housing side portion 1121. In addition, the second holder outer surface 1131S2 may be positioned to face the second housing side portion 1122.

In addition, the first holder outer surface 1131S1 may include the first seating groove 1131S1*a*. In addition, the second holder outer surface 1131S2 may include the second seating groove 1131S2*a*. The first seating groove 1131S1*a* and the second seating groove 1131S2*a* may be disposed symmetrically with respect to the first direction (X-axis direction).

In addition, the first magnet may be disposed in the first seating groove 1131S1*a*, and the second magnet may be disposed in the second seating groove 1131S2*a*. The first magnet and the second magnet may also be disposed symmetrically with respect to the first direction (X-axis direction) corresponding to the positions of the first seating groove 1131S1*a* and the second seating groove 1131S2*a*.

As described above, due to the positions of the first and second seating grooves and the first and second magnets, the electromagnetic force induced by the magnets may be provided to the first holder outer surface S1231S1 and the second holder outer surface 1131S2 on the same axis. For example, a region where the electromagnetic force is applied on the first holder outer surface S1231S1 (e.g., a portion where the electromagnetic force is strongest) and a region where the electromagnetic force is applied on the second holder outer surface S1231S2 (e.g., a portion where the electromagnetic force is strongest) may be positioned on an axis parallel to the second direction (Y-axis direction). Therefore, the X-axis tilting can be accurately performed.

The third holder outer surface 1131S3 may be an outer surface in contact with the first holder outer surface 1131S1 and the second holder outer surface 1131S2 and extending from the first holder outer surface 1131S1 and the second holder outer surface 1131S2 in the second direction (Y-axis direction). In addition, the third holder outer surface 1131S3 may be positioned between the first holder outer surface 1131S1 and the second holder outer surface 1131S2.

The third holder outer surface 1131S3 may be the bottom surface of the holder 1131. The third holder outer surface 1131S3 may be positioned to face the third housing side portion.

In addition, the third holder outer surface 1131S3 may include the extension stopper (not shown) extending downward. Therefore, the holder 1131 can set the limitation of a range in which the holder 1131 performs the Y-axis tilt, moves in the first direction (X-axis direction), or moves up and down in the housing and at the same time, prevent damage due to the movement of the holder 1131.

In addition, the third holder outer surface 1131S3 may include the third seating groove 1131S3*a*. The third magnet may be disposed in the third seating groove 1131S3*a*. For example, an area of the third seating groove 1131S3*a* may be different from areas of the first seating groove 1131S1*a* and the second seating groove 1131S2*b*. The area of the third seating groove 1131S3*a* may be greater than the areas of the first seating groove 1131S1*a* and the second seating groove 1131S2*b*. Therefore, rotation in the first direction (X-axis direction) or tilt in the second direction (Y-axis direction) may be easily performed through the third magnet disposed in the third seating groove 1131S3*a*.

The fourth holder outer surface 1131S4 may be an outer surface in contact with the first holder outer surface 1131S1 and the second holder outer surface 1131S2 and extending from the third holder outer surface 1131S3 in the first direction (X-axis direction). In addition, the fourth holder outer surface 1131S4 may be positioned between the first holder outer surface 1131S1 and the second holder outer surface 1131S2. The fourth holder outer surface 1131S4 may be disposed on the third holder outer surface 1131S3.

The fourth holder outer surface 1131S4 may include the fourth seating groove 1131S4*a*. The first magnetic substance may be seated in the fourth seating groove 1131S4*a*. The fourth seating groove 1131S4*a* may be positioned to face the first face of the tilting guide unit.

The fourth holder outer surface 1131S4 may include the first protrusion grooves PH1 disposed to be spaced apart from each other in the first direction (X-axis direction) with respect to the fourth seating groove 1131S4*a*. The first protrusion of the tilting guide unit may be seated in the first protrusion groove PH1. The holder 1131 may be rotated in the X-axis direction or tilted to the Y-axis with respect to the first protrusion. Furthermore, the holder 1131 may be rotated in the Y-axis direction or tilted to the X-axis with respect to the second protrusion.

As described above, the plurality of first protrusion grooves PH1 may be present and may overlap in the second direction (Y-axis direction). Therefore, when the mover performs the Y-axis tilt or rotates the first direction (X-axis direction), the rotation or the tilt can be performed accurately without tilting to one side. In an embodiment, an OIS function can be performed accurately.

In addition, the fourth holder outer surface 1131S4 may further include outer surface grooves disposed to be spaced apart from each other with respect to the fourth seating groove 1131S4*a* in the first direction (X-axis direction). The outer surface grooves may include a first outer surface groove 1131S4*g*1 and a second outer surface groove 1131S4*g*2.

The first outer surface groove 1131S4*g*1 may be disposed above the fourth seating groove 1131S4*a*, and the second outer surface groove 1131S4*g*2 may be disposed under the fourth seating groove 1131S4*a*. In other words, the first outer surface groove 1131S4*g*1 may be disposed above the second outer surface groove 1131S4*g*2.

The first outer surface groove 1131S4*g*1 and the second outer surface groove 1131S4*g*2 may be disposed on ends of the fourth holder outer surface 1131S4 in the vertical direction. With this configuration, the first outer surface groove 1131S4*g*1 and the second outer surface groove 1131S4*g*2 can avoid an impact between the housing and the holder due to the tilt of two axes of the holder 1131. Therefore, it is possible to improve the reliability of the holder 1131.

In addition, in the holder 1131 according to the embodiment, an area of the first outer surface groove 1131S4*g*1 may be different from an area of the second outer surface groove 1131S4*g*2. For example, the area of the first outer surface groove 1131S4*g*1 on the XY plane may be smaller than the area of the second outer surface groove 1131S4*g*2 on the XY plane. Therefore, since a cross-sectional area of the holder 1131 on the XY plane may be reduced toward the optical axis direction with respect to the seating surface 1131*k* and a cross-sectional area of the cavity CV on the XY plane increases toward the optical axis direction, the stiffness, durability, and the like of the holder 1131 according to the area of the outer surface grooves 1131S4*g*1 and 1131S4*g*2 of the fourth holder outer surface 1131S4 may be maintained.

Furthermore, the holder 1131 according to the embodiment may further include the stoppers VS and LS. In addition, the stoppers may be in contact with the first holder outer surface 1131S1 and the second holder outer surface 1131S2.

These stoppers may include the upper stopper VS disposed on the bottom surface of the cavity CV and the lower stopper LS disposed under the bottom surface of the cavity CV. In an embodiment, the bottom surface of the cavity CV may correspond to the seating surface 1131*k*. In other words, the cavity may be surrounded by the first holder outer surface 1131S1, the second holder outer surface 1131S2, and the seating surface 1131*k*.

In the stopper according to the embodiment, the upper stopper VS and the lower stopper LS are respectively positioned on ends of the first holder outer surface 1131S1 and the second holder outer surface 1131S2 in the third direction (Z-axis direction) or the optical axis direction. Furthermore, the upper stopper VS and the lower stopper LS may have a cross-sectional area or a volume, which is the same as or different from each other on the XZ plane.

In an embodiment, the upper stopper VS and the lower stopper LS may be disposed to be spaced apart from each other in the first direction (X-axis direction). In an embodiment, the first holder outer surface 1131S1 and the second holder outer surface 1131S2 may include the upper region UA and the lower region BA bisected in the first direction (X-axis direction). For example, the upper region UA may be positioned above the lower region BA. The upper stopper VS may be positioned in the upper region UA. In other words, the upper stopper VS may be in contact with the upper region UA and may overlap the upper region UA in the second direction (Y-axis direction). In addition, the lower stopper LS may be positioned in the lower region BA. In addition, the lower stopper LS may be in contact with the lower region BA and may overlap the lower region BA in the second direction (Y-axis direction). For example, the upper stopper VS may be disposed to overlap the second region S2 and the upper region UA in the second direction (Y-axis direction). The lower stopper VS may be positioned to overlap the second region S2 and the lower region BA in the second direction (Y-axis direction). Therefore, the upper stopper VS may overlap the optical member in the second direction (X-axis direction).

In addition, in an embodiment, the lower stopper LS may be disposed closer to the third holder outer surface 1131S3 than the upper stopper VS. In addition, an area overlapping the cavity CV or the optical member in the second direction (Y-axis direction) in the upper region UA may be greater than an area overlapping the cavity CV or the optical member in the second direction (Y-axis direction) in the lower region BA. Therefore, the amount of deformation due to an impact may be greater in the upper region UA than in the lower region BA toward the end. In other words, the amount of deformation due to impact on the end may be smaller in the lower region BA than in the upper region UA.

The upper stopper VS and the lower stopper LS may also extend from the ends of the first holder outer surface 1131S1 and the second holder outer surface 1131S2 in a direction opposite to the third direction.

In addition, the upper stopper VS and the lower stopper LS may extend inward or toward the cavity CV. With this configuration, when the holder 1131 is tilted with respect to the second direction (Y-axis direction) or tilted in the first direction, it is possible to suppress damage due to impact between the holder and the housing through the upper stopper VS and the lower stopper LS.

The holder 1131 may include a plurality of groove inner surfaces. For example, the holder 1131 may include a first holder inner surface 1131I1 and a second holder inner surface 1131I2, which are in contact with the cavity CV or the seating surface 1131*k*.

The first holder inner surface 1131I1 and the second holder inner surface 1131I2 may be disposed opposite to each other in the second direction (Y-axis direction). For example, the first holder inner surface 1131I1 and the second holder inner surface 1131I2 may be disposed opposite to each other without the optical member or in the holder 1131. In addition, the cavity CV may be positioned between the first holder inner surface 1131I1 and the second holder inner surface 1131I2.

Furthermore, the holder 1131 according to the embodiment may include a holder groove 1131SG. A plurality of holder grooves 1131SG may be present, and the prevention unit may be seated therein. In addition, the holder groove 1131SG may be disposed in at least one of the first holder inner surface 1131I1 and the second holder inner surface 1131I2. For example, the holder groove 1131SG may include a first holder groove 1131SG1 and a second holder groove 1131SG2. The first holder groove 1131SG1 may be disposed on the first holder inner surface 1131I1, and the second holder groove 1131SG2 may be disposed on the second holder inner surface 1131I2.

In addition, the first holder groove 1131SG1 and the second holder groove 1131SG2 may overlap in the second direction (Y-axis direction). In addition, the first holder groove 1131SG1 and the second holder groove 1131SG2 may be disposed symmetrically with respect to the optical member or the first direction (X-axis direction).

Therefore, when at least a portion of the prevention unit is positioned in the first holder groove 1131SG1 and the second holder groove 1131SG2, the prevention unit can prevent the tilting guide unit from being detached or separated from the housing and the mover.

The first holder groove 1131SG1 and the second holder groove 1131SG2 may be disposed in the upper region UA. Therefore, the prevention unit of the cover may be easily positioned in the first holder groove 1131SG1 and the second holder groove 1131SG2.

In addition, the holder according to the embodiment may include the holder groove 1131SG and bonding grooves 1131CG1 and 1131CG2 adjacent thereto. The bonding grooves 1131CG1 and 1131CG2 may be disposed adjacent to the holder groove 1131SG in the optical axis direction. For example, the bonding grooves 1131CG1 and 1131CG2 may at least partially overlap the holder groove 1131SG in the optical axis direction.

A plurality of bonding grooves according to the embodiment may be present and may include the first bonding groove 1131CG1 and the second bonding groove 1131CG2. A plurality of first bonding grooves 1131CG1 and second bonding grooves 1131CG2 may be present. For example, the first bonding groove 1131CG1 and the second bonding groove 1131CG2 may be disposed symmetrically with respect to the vertical direction or the optical member.

In addition, the first bonding groove 1131CG1 and the second bonding groove 1131CG2 may be disposed in the first holder inner surface 1131I1 and the second holder inner surface 1131I2. In addition, the first bonding groove 1131CG1 and the second bonding groove 1131CG2 may be disposed in the upper region UA like the holder groove 1131SG.

The first bonding groove 1131CG1 and the second bonding groove 1131CG2 may be disposed to be spaced apart from each other in the optical axis direction, and the holder groove 1131SG may be disposed between the first bonding groove 1131CG1 and the second bonding groove 1131CG2.

In addition, a bonding member may be applied to the first bonding groove 1131CG1 and the second bonding groove 1131CG2. Therefore, even when the prevention unit is in contact with the inner surface of the holder groove 1131SG in the holder groove 1131SG and an impact is applied to the holder, the coupling between the holder and the optical member may be maintained through the bonding member in the first and second bonding grooves adjacent to the holder groove 1131SG1. Therefore, it is possible to prevent the separation between the holder and the optical member.

Furthermore, in the first camera actuator according to the embodiment, the holder 1131 may include the holder protrusion 1131*p* extending upward from the upper surface thereof.

The holder protrusion 1131*p* may be disposed adjacent to the first bonding groove 1131CG1 and the second bonding groove 1131CG2. For example, the holder protrusion 1131*p* may be disposed along edges of the first bonding groove 1131CG1 and the second bonding groove 1131CG2. Therefore, in the holder protrusion 1131*p*, the bonding member applied to the first bonding groove 1131CG1 and the second bonding groove 1131CG2 may not overflow from the first bonding groove 1131CG1 and the second bonding groove 1131CG2.

Furthermore, the holder protrusion 1131*p* may also operate as a stopper in tilting in the first direction (X-axis direction) or the second direction (Y-axis direction).

In addition, the holder groove 1131SG may include groove inner surfaces IS1 to IS3, which are inner surfaces, and a groove bottom surface SS, which is a bottom surface. According to the embodiment, the groove inner surface of the holder groove 1131SG may be disposed to be spaced apart from the prevention unit in the optical axis direction.

In an embodiment, the groove inner surface of the holder groove 1131SG may include the first groove inner surface IS1 spaced apart from the prevention unit in the direction opposite to the optical axis, the first groove inner surface IS2 adjacent to the prevention unit in the horizontal direction, and the third groove inner surface IS3 spaced apart from the prevention unit in the optical axis direction.

The first groove inner surface IS1 in the groove inner surface of the holder groove 1131SG is an inner surface positioned in a direction toward the tilting guide unit or the fourth holder outer surface. In addition, the second groove inner surface IS2 in the groove inner surface of the holder groove 1131SG is an inner surface positioned in a direction toward the first holder outer surface 1131S1 and the second holder outer surface 1131S2 opposite to each other. In addition, the third groove inner surface IS3 in the groove inner surface of the holder groove 1131SG is an inner surface toward the second camera actuator or positioned in the optical axis direction.

In addition, the groove bottom surface SS may be disposed to be spaced apart from the prevention unit in the vertical direction. A detailed description thereof will be given below.

FIG. 54 is a perspective view of the tilting guide unit of the first camera actuator according to the third embodiment, FIG. 55 is a perspective view in a direction different from that of FIG. 54, and FIG. 56 is a cross-sectional view along line G-G' in FIG. 54.

Referring to FIGS. 54 to 56, the rotational unit 1140 according to the embodiment may include the tilting guide unit 1141, the first magnetic substance 1142, and the second magnetic substance 1143. The first magnetic substance 1142 and the second magnetic substance 1143 may be positioned to correspond to each other with respect to the tilting guide unit 1141. In addition, the above description may be applied in the same manner and thus the first magnetic substance 1142 and the second magnetic substance 1143 may provide a coupling force between the mover, the tilting guide unit 1141, and the housing.

First, the tilting guide unit 1141 may include the base BS, the first protrusion PR1 protruding from the first face 1141*a* of the base BS, and the second protrusion PR2 protruding from the second face 1141*b* of the base BS. In addition, the first protrusion and the second protrusion may be formed on surfaces opposite to each other. In addition, the above description may be applied to a description of the rotational unit 1140 in the same manner.

FIG. 57 is a perspective view of the first camera actuator according to the embodiment, FIG. 58 is a cross-sectional view along line X-X' in FIG. 57, and FIG. 59 is a cross-sectional view along line Y-Y' in FIG. 57.

Referring to FIGS. 57 to 59, the first coil 1152*a* may be positioned on the first housing side portion 1121, and the first magnet 1151*a* may be positioned on the first holder outer surface 1131S1 of the holder 1131. Therefore, the first coil 1152*a* and the first magnet 1151*a* may be positioned opposite to each other. The first magnet 1151*a* may at least partially overlap the first coil 1152*a* in the second direction (Y-axis direction).

In addition, the second coil 1152*b* may be positioned on the second housing side portion 1122, and the second magnet 1151*b* may be positioned on the second holder outer surface 1131S2 of the holder 1131. Therefore, the second coil 1152*b* and the second magnet 1151*b* may be positioned opposite to each other. The second magnet 1151*b* may at least partially overlap the second coil 1152*b* in the second direction (Y-axis direction).

In addition, the first coil 1152*a* and the second coil 1152*b* may overlap in the second direction (Y-axis direction), and the first magnet 1151*a* and the second magnet 1151*b* may overlap in the second direction (Y-axis direction). With this configuration, an electromagnetic force applied to the outer surfaces of the prism holder (the first holder outer surface and the second holder outer surface) may be positioned on a parallel axis in the second direction (Y-axis direction), and thus the X-axis tilt can be performed accurately and precisely.

In addition, the second protrusions PR2*a* and PR2*b* of the tilting guide unit 1141 may be positioned in the second protrusion groove PH2 of the housing 1120 and may be in contact with the second protrusion groove PH2. In addition, when the X-axis tilt is performed, the second protrusions PR2*a* and PR2*b* may be reference axes (or rotational axes) of the tilt. Therefore, the titling guide unit 1141 and the mover 1130 may move in a left-right direction.

In addition, according to the embodiment, the fourth housing side portion 1124 may include the housing groove 1124*a* described above. In addition, the second magnetic substance 1143 may be positioned in the housing groove 1124*a*. The housing groove 1124*a* may be positioned to correspond to the first magnetic substance 1142.

In an embodiment, the housing groove 1124*a* may be positioned on an outer surface or an inner surface of the fourth housing side portion 1124. The housing groove 1124*a* may also have a shape in which one side of the inner surface of the fourth housing side portion 1124 is open. For example, the housing groove 1124*a* may have a structure that is open from one end of the inner surface of the fourth housing side portion 1124 toward the first housing side portion.

In addition, a contact point between the second protrusion PR2 and the fourth housing side portion 1124 and the center of the second protrusion groove PH2 may be positioned on an axis that overlaps in the third direction (Z-axis direction) or is parallel to the third direction. Therefore, the actuator according to the embodiment can improve the accuracy of the X-axis tilt through the second protrusion PR2.

In addition, as described above, the first Hall sensor 1153*a* may be positioned outside for electrical connection and coupling with the board unit 1154. However, the present invention is not limited to these positions.

In addition, the third coil 1152*c* may be positioned on the third housing side portion 1123, and the third magnet 1151*c* may be positioned on the third holder outer surface 1131S3 of the holder 1131. The third coil 1152*c* and the third magnet 1151*c* may at least partially overlap in the first direction (X-axis direction). Therefore, the intensity of the electromagnetic force between the third coil 1152*c* and the third magnet 1151*c* may be easily controlled.

As described above, the tilting guide unit 1141 may be positioned on the fourth holder outer surface 1131S4 of the holder 1131. The first magnetic substance 1142 may be seated in the fourth seating groove 1131S4*a*. The fourth seating groove 1131S4*a* may be positioned to at least partially overlap the housing groove 1124*a* of the fourth housing side portion 1124 in the third direction (Z-axis direction). For example, the center of the fourth seating groove 1131S4*a* and the center of the housing groove 1124*a* may overlap in the third direction (Z-axis direction) or may be positioned side by side or parallel to each other in the third direction (Z-axis direction).

FIG. 60 is a view showing a first drive unit of the first camera actuator according to the third embodiment.

Referring to FIG. 60, the first drive unit 1150 includes the drive magnet 1151, the drive coil 1152, the Hall sensor unit 1153, and the board unit 1154.

All of the above descriptions of the first drive unit may be applied to a description of the first drive unit 1150 in the same manner.

Figure 61:
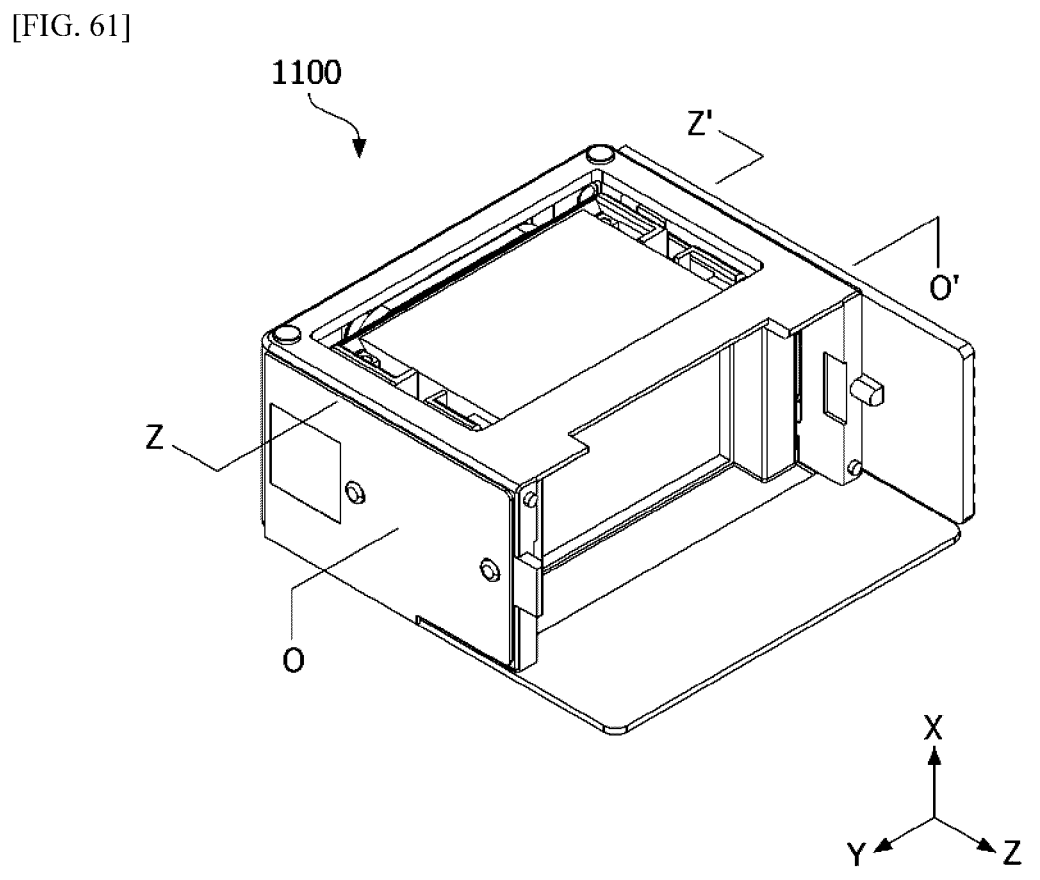

FIG. 61 is a perspective view of the first camera actuator according to the third embodiment, FIG. 62 is a cross-sectional view along line Z-Z' in FIG. 61, FIG. 63 is a view of a first camera actuator according to another embodiment, FIG. 64 is a view of a first camera actuator according to still another embodiment, FIGS. 65 and 66 are views for describing a function of a prevention unit when a mover tilts with respect to a first direction, and FIG. 67 is a cross-sectional view along line O-O' in FIG. 61.

Referring to FIGS. 61 to 67, the inner surface of the holder groove 1131SG according to the embodiment may be disposed to be spaced apart from the prevention unit ST.

For example, the first groove inner surface IS1 may be disposed to be spaced apart by a first distance d1 from the prevention unit ST in the optical axis direction. In addition, the second groove inner surface IS2 may be disposed to be spaced apart by a second distance d2 from the prevention unit ST in the horizontal direction. In addition, the third groove inner surface IS3 may be disposed to be spaced apart by a third distance d3 from the prevention unit ST in the optical axis direction. In addition, the groove bottom surface SS may be disposed to be spaced apart by a fourth distance d4 from the prevention unit ST in the vertical direction.

The prevention unit ST is spaced apart by a predetermined distance from the groove side surface and the groove bottom surface of the holder groove 1131SG, and thus the mover may be tilted to the X axis or the Y axis. For example, the mover may easily rotate at a positive or negative angle in the X-axis direction or rotate at a positive or negative angle in the Y-axis direction.

In an embodiment, the first distance d1 may be greater than a length of a portion (e.g., the first protrusion groove) where the holder and the tilting guide unit vertically overlap in the optical axis direction. In addition, the first distance d1 may be greater than a length of a portion (e.g., the second protrusion groove) where the holder and the fourth housing side portion vertically overlap in the optical axis direction. For example, a height of the first protrusion groove PH1 or a height of the second protrusion groove PH2 may be different from the first distance d1. For example, the height of the first protrusion groove PH1 or the height of the second protrusion groove PH2 may be greater than the first distance d1. With this configuration, the first protrusion PR1 or the second protrusion PR2 may not be detached or separated from the first protrusion groove PH1 or the second protrusion groove PH1 in which the first protrusion PR1 and the second protrusion PR2 is respectively seated. In other words, a space between the mover and the housing, in particular, between the fourth holder outer surface and the fourth housing side portion may be maintained to a predetermined distance or less in the optical axis direction by the prevention unit ST limiting a range in which the mover 1130 may move in the optical axis direction. Therefore, each of the first protrusion PR1 and the second protrusion PR2 of the tilting guide unit 1141 positioned between the fourth holder outer surface and the fourth housing side portion may not be detached or separated from each of the first protrusion groove PH1 and the second protrusion groove PH2.

Furthermore, the lengths of the first protrusion PR1 and the second protrusion PR2 in the optical axis direction may be greater than the heights H1 and H2 of the first protrusion groove PH1 and the second protrusion groove PH2 in the optical axis direction. Therefore, the first protrusion PR1 and the second protrusion PR2 may not be detached or separated from the first protrusion groove PH1 and the second protrusion groove PH2 even by the abrasion of the first protrusion PR1 and the second protrusion PR2 or the like. Therefore, it is possible to improve the reliability of the first camera actuator according to the embodiment.

The second groove inner surface IS2 may be spaced apart by the second distance d2 from the prevention unit ST in the horizontal direction. In addition, the second distance d2 may be greater than a separation distance W1 between the holder 1131 and the housing 1120 in the horizontal direction. Therefore, after the holder 1131 is tilted to the X-axis at predetermined angles $\theta_a$ and $\theta_b$ and the holder 1131 is in contact with the housing 1120, the prevention unit ST can prevent additional rotation. In other words, the prevention unit ST may function as an additional stopper for the X-axis tilt. Therefore, the first camera actuator according to the embodiment can be prevented from being damaged due to a collision.

Furthermore, the third groove inner surface IS3 may be spaced apart by the third distance d3 from the prevention unit ST in the optical axis direction. Therefore, after the holder 1131 performs the X-axis tilt within a design range and at the same time, as described above, the holder 1131 is tilted to the X-axis at the predetermined angles $\theta_a$ and $\theta_b$ and the holder 1131 is in contact with the housing 1120, it is possible to suppress the additional rotation of the holder 1131. Therefore, the prevention unit ST may perform a stopper function, thereby improving the reliability of the first camera actuator.

In addition, the groove bottom surface SS may be spaced apart by the fourth distance d4 from the prevention unit ST in the vertical direction. The fourth distance d4 may be greater than a separation distance W2 between the mover 1130 and the housing 1120 in the vertical direction. Therefore, after the prevention unit ST performs the Y-axis tilt within the design range and at the same time, the holder 1131 is tilted to the Y-axis at a predetermined angle and the holder 1131 is in contact with the housing 1120, it is possible to suppress the additional rotation of the holder 1131. Therefore, the prevention unit ST may perform a stopper function, thereby improving the reliability of the first camera actuator.

Furthermore, the prevention unit ST according to the embodiment may overlap the mover 1130 in the vertical direction. Furthermore, at least a portion of the prevention unit ST may overlap the mover 1130 in the horizontal direction. Therefore, as the prevention units ST are all disposed to be spaced apart from each other in the horizontal, vertical, and optical axis directions, it is possible to improve the reliability of the mover 1130, the housing 1120, and the tilting guide unit 1141.

In addition, in a first camera actuator according to another embodiment, the above description may be applied to the prevention unit ST in the same manner except for the contents to be described below.

The prevention units ST may be disposed to be spaced apart by a predetermined distance from each other from the groove inner surface and the groove bottom surface SS of the holder groove 1131SG in the optical axis direction, the horizontal direction, and the vertical direction.

As described above, the first groove inner surface IS1 may be disposed to be spaced apart by the first distance d1 from the prevention unit ST in the optical axis direction. In addition, the second groove inner surface IS2 may be disposed to be spaced apart by the second distance d2 from the prevention unit ST in the horizontal direction. In addition, the third groove inner surface IS3 may be disposed to be spaced apart by the third distance d3 from the prevention unit ST in the optical axis direction. In addition, the groove bottom surface SS may be disposed to be spaced apart by the fourth distance d4 from the prevention unit ST in the vertical direction.

In this case, the prevention unit ST may be disposed adjacent to the tilting guide unit 1141 in the holder groove 1131SG. For example, the prevention unit ST may be positioned toward the tilting guide unit 1131 from a bisector KK of the holder groove 1131SG in the optical axis direction. In other words, the center of the prevention unit ST may be mismatched with the bisector KK and positioned adjacent to the first groove inner surface IS1.

In addition, as described above, the height of the first protrusion groove PH1 or the height of the second protrusion groove PH2 may be different from the first distance d1. For example, the height of the first protrusion groove PH1 or the height of the second protrusion groove PH2 may be greater than the first distance d1. With this configuration, the first protrusion PR1 or the second protrusion PR2 may not be detached or separated from the first protrusion groove PH1 or the second protrusion groove PH1 in which the first protrusion PR1 and the second protrusion PR2 is respectively seated. In other words, a space between the mover and the housing, in particular, between the fourth holder outer surface and the fourth housing side portion may be maintained to a predetermined distance or less in the optical axis direction by the prevention unit ST limiting a range in which the mover 1130 may move in the optical axis direction. Therefore, each of the first protrusion PR1 and the second protrusion PR2 of the tilting guide unit 1141 positioned between the fourth holder outer surface and the fourth housing side portion may not be detached or separated from each of the first protrusion groove PH1 and the second protrusion groove PH2.

Furthermore, in the embodiment, since the distance between the prevention unit ST and the first groove inner surface IS1 is close by the position of the prevention unit ST, it is possible to easily suppress the first and second protrusion PR1 and PR2 from being separated from the first and second protrusion grooves PH1 and PH2. Therefore, it is possible to improve the reliability of the first camera actuator.

In addition, when the mover 1130 is tilted (in particular, the X-axis tilt), the prevention unit ST may be in contact with the holder groove 1131SG in response to a collision between the mover 1130 and the housing 1120. Therefore, the prevention unit ST may damper the impact between the mover 1130 and the housing 1120 and function as a stopper.

In addition, in a first camera actuator according to still another embodiment, the above description may be applied to the prevention unit ST in the same manner except for the contents to be described below.

The prevention units ST may be disposed to be spaced apart by a predetermined distance from each other from the groove inner surface and the groove bottom surface SS of the holder groove 1131SG in the optical axis direction, the horizontal direction, and the vertical direction.

As described above, the first groove inner surface IS1 may be disposed to be spaced apart by the first distance d1 from the prevention unit ST in the optical axis direction. In addition, the second groove inner surface IS2 may be disposed to be spaced apart by the second distance d2 from the prevention unit ST in the horizontal direction. In addition, the third groove inner surface IS3 may be disposed to be spaced apart by the third distance d3 from the prevention unit ST in the optical axis direction. In addition, the groove bottom surface SS may be disposed to be spaced apart by the fourth distance d4 from the prevention unit ST in the vertical direction.

In this case, the prevention unit ST may be disposed adjacent to the tilting guide unit 1141 in the holder groove 1131SG. For example, the prevention unit ST may be positioned toward the second camera actuator or the optical axis direction from the bisector KK of the holder groove 1131SG in the optical axis direction. In other words, the center of the prevention unit ST may be mismatched with the bisector KK and positioned adjacent to the third groove inner surface IS3.

In addition, as described above, the height of the first protrusion groove PH1 or the height of the second protrusion groove PH2 may be different from the first distance d1. For example, the height of the first protrusion groove PH1 or the height of the second protrusion groove PH2 may be greater than the first distance d1. With this configuration, the first protrusion PR1 or the second protrusion PR2 may not be detached or separated from the first protrusion groove PH1 or the second protrusion groove PH1 in which the first protrusion PR1 and the second protrusion PR2 is respectively seated. In other words, a space between the mover and the housing, in particular, between the fourth holder outer surface and the fourth housing side portion may be maintained to a predetermined distance or less in the optical axis direction by the prevention unit ST limiting a range in which the mover 1130 may move in the optical axis direction. Therefore, each of the first protrusion PR1 and the second protrusion PR2 of the tilting guide unit 1141 positioned between the fourth holder outer surface and the fourth housing side portion may not be detached or separated from each of the first protrusion groove PH1 and the second protrusion groove PH2.

Furthermore, in the embodiment, even when the distance between the prevention unit ST and the third groove inner surface IS3 is increased by the position of the prevention unit ST, it is possible to easily suppress the first and second protrusions PR1 and PR2 from being separated from the first and second protrusion grooves PH1 and PH2. In addition, the prevention unit ST can prevent a phenomenon in which a tilt radius upon tilting of the mover 1130 (particularly, the X-axis tilt) is suppressed by the prevention unit ST. Therefore, it is possible to improve a degree of freedom of rotation of the mover 1131.

FIG. 68 is a perspective view of the first camera actuator according to the third embodiment, and FIG. 69 is a cross-sectional view along line D-D' in FIG. 68.

Referring to FIGS. 68 and 69, the Y-axis tilt may be performed. In other words, OIS can be implemented by the rotation in the first direction (X-axis direction). In an embodiment, the third magnet 1151*c* disposed under the holder 1131 may tilt or rotate the mover 1130 in the first direction (X-axis direction) by generating the electromagnetic force with the third coil 1152*c*.

Specifically, the tilting guide unit 1141, the housing 1120, and the mover 1130 may be coupled to each other by the first magnetic substance 1142 and the second magnetic substance 1143. In addition, a plurality of first protrusions PR1 may be present and spaced apart from each other in the second direction (Y-axis direction) to support the mover 1130. In addition, the tilting guide unit 1141 may rotate or perform the Y-axis tilt about the first protrusion PR1 protruding toward the holder (in particular, the fourth holder outer surface), which is the reference axis (or the rotational axis), in the first direction (X-axis direction).

For example, OIS can be implemented by rotating (X1→X1*a* or X1*b*) the mover 1130 at the first angle θ1 in the X-axis direction by the first electromagnetic forces F1A and F1B between the third magnet 1151*c* disposed in the third seating groove and the third coil 1152*c* disposed on the third board side portion. The first angle θ1 may be in the range of ±1° to ±3°. However, the present invention is not limited thereto.

FIG. 70 is a perspective view of the first camera actuator according to the third embodiment, and FIG. 71 is a cross-sectional view along line E-E' in FIG. 70.

Referring to FIGS. 70 and 71, OIS can be implemented by tilting or rotating the mover 1130 in the Y-axis direction.

In an embodiment, the first magnet 1151*a* and the second magnet 1151*b* disposed on the holder 1131 may tilt or rotate the tilting guide unit and the mover 1130 in the second direction (Y-axis direction) by respectively forming the electromagnetic force with the first coil 1152*a* and the second coil 1152*b*.

In the first camera actuator according to the embodiment, components that are tilted in the first direction or tilted in the second direction may be different from each other.

Specifically, the housing and the mover 1130 may be coupled to each other by the second magnetic substance 1143 in the tilting guide unit 1141. In addition, as described above, the plurality of second protrusions PR2 may be spaced apart from each other in the first direction (X-axis direction) to support the tilting guide unit and the mover 1130. In addition, the 2-1 protrusion and the 2-2 protrusion may be in contact with the housing 1120 and may be supported by the housing 1120.

In addition, the tilting guide unit 1141 may rotate or tilt about the second protrusion PR2 protruding toward the housing 1120, which is the reference axis (or the rotational axis), with respect to the first direction (X-axis direction).

For example, OIS can be implemented by rotating (Y1→Y1*a* or Y1*b*) the mover 1130 at the second angle θ2 in the Y-axis direction by the second electromagnetic forces F2A and F2B between the first and second magnets 1151*a* and 1151*b* disposed in the first seating groove and the first and second coil units 1152*a* and 1152*b* disposed on the first and second board side portions. The second angle θ2 may be in the range of ±1° to ±3°. However, the present invention is not limited thereto.

As described above, the first camera actuator according to the embodiment may provide the best optical characteristics, which may control the mover 1130 to rotate in the first direction (X-axis direction) or the second direction (Y-axis direction) by the electromagnetic force between the drive magnet in the prism holder and the drive coil disposed in the housing, thereby minimizing the occurrence of the de-center or tilt phenomenon when OIS is implemented. In addition, as described above, the "Y-axis tilt" refers to rotating or tilting in the first direction (X-axis direction), and the "X-axis tilt" refers to rotating or tilting in the second direction (Y-axis direction).

FIG. 72 is a perspective view of a first camera actuator according to a fourth embodiment, and FIG. 73 is an exploded perspective view of the first camera actuator shown in FIG. 72. A first camera actuator 1100*c* may be an OIS actuator. The first camera actuator 1100*c* may change a path of light incident on a camera module 1000.

In addition, before describing the embodiment of the invention, the first direction may refer to the X-axis direction shown in the drawings, and the second direction may be a different from the first direction. For example, the second direction may refer to the Y-axis direction shown in the drawings as a direction perpendicular to the first direction. In addition, the third direction may be a direction different from the first and second directions. For example, the third direction may refer to a Z-axis direction shown in the drawings as a direction perpendicular to the first and second directions. Here, the third direction may refer to the optical axis direction.

Hereinafter, a configuration of the camera module according to the embodiment will be described with reference to the drawings.

Referring to FIGS. 72 and 73, the first camera actuator 1100*c* may include a housing 100, image shake control units 200 and 300 disposed on the housing 100, and a prism unit 400 disposed on the image shake control units 200 and 300.

In addition, the first camera actuator 1100*c* may further include a cover member (not shown). The cover member (not shown) may include an accommodating space therein and at least one side surface thereof may be open. For example, the cover member may be disposed to surround an outer surface of the housing. Preferably, a portion of the image shake control units 200 and 300 may be disposed on the outer surface of the housing 100. In addition, the cover member may be disposed to surround the portion of the image shake control units 200 and 300 disposed on the outer surface of the housing 100. Therefore, the cover member can protect the image shake control units 200 and 300, the housing 100, and the prism unit 400. The cover member may have a structure in which a plurality of side surfaces connected to each other are open. Specifically, the cover member may have a structure in which a front surface on which light is incident from the outside, a lower surface corresponding to the first camera actuator 1100*c*, and an open rear surface opposite to the front surface and provide an optical movement path of the prism unit 400 to be described below.

The cover member may include a rigid material. For example, the cover member may include a material such as resin or metal and support the housing 100 disposed in the accommodating space. For example, the cover member may be disposed to surround the housing 100, the image shake control units 200 and 300, the prism unit 400, and the like and may support the components. The above description of the first housing or the housing may be applied to the housing 100 in the same manner except for the contents to be described below.

Specifically, the prism unit 400 to be described below may be moved by the image shake control units 200 and 300 in the first direction and/or the second direction. At this time, the cover member may fix the housing 100 and the image shake control units 200 and 300 to set positions, thereby providing a more accurate the optical movement path. In addition, the cover member can prevent the housing 100 from being separated to the outside of the first camera actuator 1100*c* while allowing the prism unit 400 to be stably supported to the housing 100 by a pressing unit 600. The cover member may be omitted depending on the arrangement of the housing 100, the image shake control units 200 and 300, and the prism unit 400. A portion of the above description of the rotational unit may be applied to a description of the pressing unit 600. Furthermore, the description of the tilting guide unit may be applied to a moving plate 500 in the same manner except for the contents to be described below.

Meanwhile, the image shake control units 200 and 300 may include a board 200 and a drive unit 300. The drive unit 300 may include a coil unit 310, a magnet unit 320, a yoke unit 330, and a position sensor unit 340. In addition, the above description of the first drive unit may be applied to the drive unit 300 in the same manner except for the contents to be described below.

In addition, the first camera actuator 1100*c* may include the moving plate 500 disposed between the housing 100 and the prism unit 400. The moving plate 500 allows the prism unit 400 to be tilted in a first axis direction and a second axis direction perpendicular to the first axis with respect to the housing 100.

In addition, the first camera actuator 1100*c* may include the pressing unit 600. The pressing unit 600 may include a first pulling member 610 and a second pulling member 620. The first pulling member 610 may be disposed on the prism unit 400. The second pulling member 620 may be disposed on the housing 100. Specifically, the second pulling member 620 may be disposed on the board 200 of the image shake control units 200 and 300. The first pulling member 610 and the second pulling member 620 may press the prism unit 400 to the housing 100. For example, an attractive force may be generated between the first pulling member 610 and the second pulling member 620. In addition, the prism unit 400 may be supported by the attractive force in a state of being pressed by the housing 100.

Hereinafter, each component of the first camera actuator 1100*c* according to the embodiment will be described in detail.

FIGS. 74 to 86 are perspective views of each component of the first camera actuator according to the embodiment.

The first camera actuator 1100*c* according to the embodiment may include the housing 100, the image shake control units 200 and 300, the prism unit 400, the moving plate 500, and the pressing unit 600.

Specifically, the image shake control units 200 and 300 may include the board 200, the coil unit 310, the magnet unit 320, the yoke unit 330, and the position sensor unit 340.

In addition, the prism unit 400 may include a prism 400*b* and a prism mover 400*a*. In addition, the above description of the mover may be applied to the prism unit 400 in the same manner except for the contents to be described below. In addition, the above description of the optical member may be applied to the prism 400*b* in the same manner except for the contents to be described below. In addition, the above description of the holder may be applied to the prism mover 400*a* in the same manner except for the contents to be described below.

In addition, the pressing unit 600 may include the first pulling member 610 and the second pulling member 620. An attractive force may be generated between the first pulling member 610 and the second pulling member 620, and the prism unit 400 may be supported in a state of being pressed to the first housing 100. For example, the first pulling member 610 and the second pulling member 620 may correspond to the yoke or the first and second magnetic substances described above.

According to the embodiment, there are the technical effects capable of providing an ultra-slim and ultra-small camera actuator and a camera module including the same by having the image shake control units 200 and 300 disposed on the housing 100.

In addition, according to the embodiment, there is a technical effect, which can eliminate the size limitation of a lens in a lens assembly of an optical system when OIS is implemented by arranging the image shake control units 200 and 300 under the prism unit 400, thereby securing the sufficient amount of light.

In addition, according to the embodiment, there is the technical effect capable of providing the best optical characteristics by including the image shake control units 200 and 300 stably disposed on the housing 100 and controlling the prism unit 400 to be tilted to the first axis or the second axis, thereby minimizing the occurrence of a de-center or tilt phenomenon when OIS is implemented.

In addition, according to the embodiment, there is the technical effect capable of implementing OIS with low power consumption by implementing OIS by including the image shake control units 200 and 300 unlike conventionally moving a plurality of solid lenses and controlling the prism unit 400 to be tilted to the first axis or the second axis.

Hereinafter, each component of the first camera actuator 1100*c* will be described in detail with reference to the drawings.

<Image Shake Control Unit>

FIG. 74 is a perspective view of some components of an image shake control unit of the first camera actuator, FIG. 75 is a perspective view of a board unit of the first camera actuator viewed from the first direction, FIG. 76 is a perspective view of the board unit of the first camera actuator in the second direction, FIG. 77 is a view for describing a pressing unit disposed on the board unit of the first camera actuator, and FIG. 78 is an exploded perspective view of the board unit and the drive unit of the first camera actuator.

Referring to FIGS. 74 to 78, the image shake control units 200 and 300 may include the board 200 and the drive unit 300.

In addition, the drive unit 300 may include the coil unit 310, the magnet unit 320, the yoke unit 330, and the position sensor unit 340. Some components of the drive unit 300 may be disposed on the board 200. In addition, the remaining components of the drive unit 300 may be disposed on an outer surface of the prism unit 400 facing the inner surface of the board 200. For example, the coil unit 310 and the position sensor unit 340 of the drive unit 300 may be disposed on the inner surface of the board 200. In addition, the magnet unit 320 and the yoke unit 330 of the drive unit 300 may be disposed on the prism unit 400. Specifically, the magnet unit 320 and the yoke unit 330 of the drive unit 300 may be disposed on the prism mover 400*a* of the prism unit 400.

The board 200 may be connected to a predetermined power supply unit (not shown) to apply power to the coil unit 310 disposed on the board 200.

The board 200 may include the circuit board having wiring patterns that may be electrically connected, such as the rigid PCB, the flexible PCB, or the rigid flexible PCB.

For example, the board 200 may include a rigid region and a flexible region. For example, a gyro sensor 270 or a driver IC 280 may be mounted on the board 200. In addition, the board 200 may have a region where the gyro sensor 270 or the driver IC 280 is mounted as the rigid region. In addition, the board 200 may include a region where the coil unit 310, the position sensor unit 340, and the second pulling member 620 are disposed. In addition, the board 200 may have a region where the coil unit 310, the position sensor unit 340, and the second pulling member 620 are disposed as the flexible region. The flexible region of the board 200 may be bent to correspond to a shape or curve of the outer surface of the housing 100 and thus may be stably disposed on the housing 100.

The coil unit 310 of the drive unit 300 may be disposed on the board 200. The coil unit 310 may be electrically connected to the board 200. The coil unit 310 may include one coil unit or a plurality of coil units.

The coil unit 310 may include a first coil unit 311, a second coil unit 312, and a third coil unit 313.

The first to third coil units 311, 312, and 313 may be spaced apart from each other. For example, the region where the first to third coil units 311, 312, and 313 are disposed among the entire region of the board 200 may have a "C" shape.

Specifically, the board 200 may include a first board region 210, a second board region 220, a third board region 230, and a fourth board region 240.

The first coil unit 311 of the plurality of coil units 310 may be disposed in the first board region 210. The first board region 210 may be a first side region of the board 200. For example, the first board region 210 may be a left region of the board 200. The first board region 210 may correspond to a first side portion 110 of the housing 100 to be described below. For example, the first board region 210 may be a region facing the first side portion 110 of the housing 100. For example, the first board region 210 may be a region disposed outside the first side portion 110 of the housing 100.

The second coil unit 312 among the plurality of coil units 310 may be disposed in the second board region 220. The first board region 210 may be a second side region of the board 200. For example, the second board region 220 may be a right region of the board 200. The second board region 220 may correspond to a second side portion 120 of the housing 100 to be described below. For example, the second board region 220 may be a region facing the second side portion 120 of the housing 100. For example, the second board region 220 may be a region disposed outside the second side portion 120 of the housing 100.

The second pulling member 620 of the pressing unit 600 may be disposed in the third board region 230. The third board region 230 may be a third side region of the board 200. For example, the third board region 230 may be a rear surface region of the board 200. The third board region 230 may correspond to a third side portion 130 of the housing 100 to be described below. For example, the third board region 230 may be a region facing the third side portion 130 of the housing 100. For example, the third board region 230 may be a region disposed outside the third side portion 130 of the housing 100. In this case, the board 200 in the camera actuator in a comparative example includes only the first board region 210, the second board region 220, and the fourth board region 240.

In this case, the board 200 of the first camera actuator 1100*c* in the embodiment may further include the third board region 230 connecting the first board region 210 and the second board region 220. The third board region 230 is not directly connected to the first board region 210 and the second board region 220. In other words, the board 200 in the embodiment may have a structure in which the first board region 210, the second board region 220, and the fourth board region 240 are separated from each other with respect to the fourth board region 240. For example, the board 200 includes the first board region 210 extending upward from a first side end of the fourth board region 240 constituting a bottom portion. In addition, the board 200 includes the second board region 220 extending upward from a second side end of the fourth board region 240 facing the first side end. In addition, the board 200 includes the third board region 230 extending upward from a third side end of the fourth board region 240 between the first side end and the second side end. The third board region 230 may be spaced apart from the first board region 210 and the second board region 220. In other words, the first board region 210, the second board region 220, and the third board region 230 may be connected to each other through the fourth board region 240, but are not directly connected to each other.

The third board region 230 among the plurality of coil units 310 may be disposed in the fourth board region 240. The fourth board region 240 may be a lower region of the board 200. For example, the fourth board region 240 may be the bottom portion of the board 200. The fourth board region 240 may be a region facing the fourth side portion 140 of the housing 100 to be described below. For example, the fourth board region 240 may be a region disposed outside the fourth side portion 140 of the housing 100.

Meanwhile, the first board region 210, the third board region 230, and the fourth board region 240 of the board 200 may be the flexible regions. In addition, the second board region 220 of the board 200 may be the rigid region.

Therefore, the gyro sensor 270 and the driver IC 280 may be disposed in the second board region 220 of the board 200. The driver IC 280 may receive detection information acquired from the gyro sensor 270 and recognize a hand shaking state using the received detection information. In addition, the driver IC 280 may control the magnitude of a current or a voltage applied to the coil unit 310 based on the recognized hand shaking state.

The gyro sensor 270 may be disposed on an outer surface of the second board region 220. Therefore, the gyro sensor 270 may be exposed to the outside from the first camera actuator 1100*c*. The driver IC 280 may be disposed on an inner surface of the second board region 220. The outer surface and inner surface of the second board region 220 may refer to opposite surfaces of the second board region 220. In addition, a second electronic component 260 may be disposed in the second board region 220. The second electronic component 260 may be a capacitor, but the present invention is not limited thereto. For example, the second electronic component 260 may be a memory in which control information for controlling the magnitude of the current or voltage supplied to the coil unit 310 based on a hand shake state is stored. In addition, a terminal 250 may be disposed in the second board region 220 of the board 200. The terminal 250 may be a terminal for electrically connecting a main board (not shown) of the camera module and the board 200 of the first camera actuator 1100*c*.

Meanwhile, in the embodiment, the gyro sensor 270 and the driver IC 280 are disposed in the second board region 220 of the board 200, but the present invention is not limited thereto. For example, the gyro sensor 270 and the driver IC 280 may also be disposed in the first board region 210 facing the second board region 220.

In addition, the first coil unit 311 and the second coil unit 312 may be respectively disposed in the first board region 210 and the second board region 220 of the board 200 facing each other. In addition, the third coil unit 313 may be disposed in the fourth board region 240, which is a connecting region connecting the first board region 210 and the second board region 220 of the board 200.

In addition, the drive unit 300 may include the magnet unit 320 opposite to the coil unit 310. The magnet unit 320 may include a first magnet 321, a second magnet 322, and a third magnet 323 disposed in the regions corresponding to the plurality of coil units 310. The magnet unit 320 may be disposed to correspond to the coil unit 310. Specifically, the magnet unit 320 may be disposed in a region corresponding to each coil unit on the side portion of the prism mover 400*a* of the prism unit 400.

For example, the prism mover 400*a* may include a first side portion 410 corresponding to the first coil unit 311. In addition, the first magnet 321 may be disposed on the first side portion 410 of the prism mover 400*a*. The prism mover 400*a* may include a second side portion 420 corresponding to the second coil unit 312. In addition, the second magnet 322 may be disposed on the second side portion 420 of the prism mover 400*a*. The prism mover 400*a* may include a fourth side portion 440 corresponding to the third coil unit 313. In addition, the third magnet 323 may be disposed on the fourth side portion 440 of the prism mover 400*a*.

In addition, the drive unit 300 in the embodiment may include the yoke unit 330. The yoke unit 330 may stably fix the magnet unit 320. The yoke unit 330 may be disposed to correspond to the magnet unit 320. For example, a plurality of yoke units 330 may be configured to have a one-to-one correspondence with the magnet unit 320.

For example, the yoke unit 330 may include a first yoke 331 disposed to correspond to the first magnet 321 on the first side portion 410 of the prism mover 400*a*. For example, the yoke unit 330 may include a second yoke 332 disposed to correspond to the second magnet 322 on the second side portion 420 of the prism mover 400*a*. For example, the yoke unit 330 may include a third yoke 333 disposed to correspond to the third magnet 323 on the fourth side portion 440 of the prism mover 400*a*.

In addition, the drive unit 300 may include the position sensor unit 340. The position sensor unit 340 may be disposed in an inner region of the coil unit 310.

The position sensor unit 340 may be connected to the driver IC 280 and may transmit position detection information to the driver IC 280. The position sensor unit 340 may be a magnetic sensor capable of detecting a change in a magnetic force. The position sensor unit 340 may detect a change in a magnetic force according to the tilt of the prism unit 400. The position sensor unit 340 may obtain position information of the prism unit 400 by detecting a change in a magnetic flux according to the movement of the magnet unit 320.

The position sensor unit 340 may be, for example, a Hall sensor, but the present invention is not limited thereto.

The position sensor unit 340 may be disposed on each board 200. Preferably, the position sensor unit 340 may be disposed adjacent to the coil unit 310 on the board 200. A plurality of position sensor units 340 may be configured.

The position sensor unit 340 may include a first position sensor 341 disposed adjacent to the first coil unit 311 in the first board region 210 of the board 200. In addition, the position sensor unit 340 may include a second position sensor 342 disposed adjacent to the second coil unit 312 in the second board region 220 of the board 200. In addition, the position sensor unit 340 may include a third position sensor 343 and a fourth position sensor 344 disposed adjacent to the third coil unit 313 in the fourth board region 240 of the board 200.

Meanwhile, the board 200 includes the third board region 230. The third board region 230 of the board 200 may be a region disposed on an outer surface of the third side portion 130 of the housing 100. In other words, the third board region 230 of the board 200 may be a region corresponding to the third side portion 130 of the housing 100. One component of the pressing unit 600 may be disposed in the third board region 230 of the board 200. For example, the second pulling member 620 may be disposed in the third board region 230 of the board 200. In this case, the second pulling member 620 may be electrically connected to the board 200. The second pulling member 620 may be an electronic component. Specifically, the second pulling member 620 may be a magnetic electronic component electrically connected to the board 200. For example, the second pulling member 620 may be a capacitor. A plurality of capacitors corresponding to the second pulling member 620 may be disposed at regular intervals in the third board region 230 of the board 200.

Preferably, the first pulling member 610 of the pressing unit 600 may be disposed in the prism unit 400. As will be described below, the first pulling member 610 of the pressing unit 600 may be disposed on a third side portion 530 of the prism mover 400*a*. The third side portion 530 of the prism mover 400*a* may correspond to the third side portion 130 of the housing 100. In addition, the third side portion 530 of the prism mover 400*a* may correspond to the third board region 230 of the board 200. Therefore, the first pulling member 610 and the second pulling member 620 of the pressing unit 600 may be disposed to correspond to each other on the prism mover 400*a* and the third board region 230 of the board 200. In other words, the first pulling member 610 and the second pulling member 620 may be disposed to face each other on the prism mover 400*a* and the third board region 230 with the third side portion 130 of the housing 100 and the moving plate 500 to be described below interposed therebetween. This will be described in more detail below.

Meanwhile, a hole may be formed in each board region of the board 200.

Specifically, a plurality of 1-1 holes 211 may be formed in the first board region 210 of the board 200. In addition, a plurality of 1-2 holes 221 may be formed in the second board region 220 of the board 200. In addition, a plurality of 1-3 holes 231 may be formed in the third board region 230 of the board 200. In addition, a plurality of 1-4 holes 241 may be formed in the fourth board region 240 of the board 200. The 1-1 hole 211, the 1-2 hole 221, the 1-3 hole 231, and the 1-4 hole 241 may be coupling holes for coupling the board 200 to the housing 100. For example, protrusions (to be described below) corresponding to the plurality of holes may be formed in the housing 100. In addition, the 1-1 hole 211, the 1-2 hole 221, the 1-3 hole 231, and the 1-4 hole 241 of the board 200 may be inserted into protrusions formed in the housing 100. Therefore, a position of the board 200 may be fixed to the housing 100.

Meanwhile, the image shake control units 200 and 300 may further include a lower plate 200*a*. The lower plate 200*a* may be a lower cover of the camera actuator. The lower plate 200*a* may function to secure the stiffness of the board 200. The lower plate 200*a* is not an essential component and may be selectively omitted.

<Housing>

FIGS. 79 to 81 are perspective views of a housing of the camera actuator according to the fourth embodiment.

Referring to FIGS. 79 to 81, the housing 100 may include an accommodating space for accommodating the prism unit 400. The housing 100 may include a plurality of side portions. For example, the housing 100 may include the first side portion 110 corresponding to the first board region 210 of the board 200, the second side portion 120 corresponding to the second board region 220 of the board 200, the third side portion 130 corresponding to the third board region 230 of the board 200, and the fourth side portion 140 corresponding to the fourth board region 240 of the board 200.

Specifically, the housing 100 may include the first side portion 110 corresponding to the first coil unit 311, the second side portion 120 corresponding to the second coil unit 312, the third side portion 130 corresponding to the second pulling member 620, and the fourth side portion 140 corresponding to the third coil unit 313. The housing 100 may have a hexahedral shape, but the present invention is not limited thereto. However, the housing 100 may have a plurality of side portions, and at least two open regions (not shown) may be formed between the plurality of side portions. One of the two open regions may be a region corresponding to a light inlet for providing light to the prism unit 400. In addition, the other of the two open regions may be a region corresponding to a light outlet for providing light reflected from the prism unit 400 to a lens unit (to be described below) of the second camera actuator.

The housing 100 may include a plurality of housing holes. The housing hole may be a through hole passing through inner surfaces and outer surfaces of each side portion of the housing 100. The plurality of housing holes may include first to fourth housing holes.

The housing 100 may include a first housing hole 111. The first housing hole 111 may be a hole passing through an inner surface and outer surface of the first side portion 110 of the housing 100.

The housing 100 may include second housing holes 121 and 122. The second housing holes 121 and 122 may be holes passing through an inner surface and outer surface of the second side portion 120 of the housing 100. The second housing hole may include the 2-1 housing hole 121 and the 2-2 housing hole 122 spaced apart from each other.

The housing 100 may include a third housing hole 134. The third housing hole 134 may be a hole passing through an inner surface and outer surface of the third side portion 130 of the housing 100.

The housing 100 may include a fourth housing hole 141. The fourth housing hole 141 may be a hole passing through an inner surface and outer surface of the fourth side portion 140 of the housing 100.

Some of the plurality of housing holes may be formed in a region corresponding to the coil unit 310. In addition, some of the plurality of housing holes may be formed in a region corresponding to the driver IC 280. In addition, the others of the plurality of housing holes may be formed in a region corresponding to the second pulling member 620 of the pressing unit 600.

The first housing hole 111 may be formed in a region corresponding to the first coil unit 311. The first housing hole 111 may have a size and shape corresponding to those of the first coil unit 311. Therefore, the first coil unit 311 may be disposed to be partially or entirely inserted into the first housing hole 111.

The 2-1 housing hole 121 may be formed in a region corresponding to the second coil unit 312. The 2-1 housing hole 121 may have a size and shape corresponding to those of the second coil unit 312. Therefore, the second coil unit 312 may be disposed to be partially or entirely inserted into the 2-1 housing hole 121.

The 2-2 housing hole 122 may be formed in the region corresponding to the driver IC 280. The 2-2 housing hole 122 may have a size and shape corresponding to those of the driver IC 280. Therefore, the driver IC 280 may be disposed to be partially or entirely inserted into the 2-2 housing hole 122.

The third housing hole 134 may be formed in the region corresponding to the second pulling member 620. The third housing hole 134 may have a size and shape corresponding to those of the second pulling member 620. Therefore, the second pulling member 620 may be disposed to be partially or entirely inserted into the third housing hole 134.

The fourth housing hole 141 may be formed in a region corresponding to the third coil unit 313. The fourth housing hole 141 may have a size and shape corresponding to those of the third coil unit 313. Therefore, the third coil unit 313 may be disposed to be partially or entirely inserted into the fourth housing hole 141.

The housing 100 may include a seating groove 135.

The seating groove 135 may be formed in a region corresponding to the third board region 230 of the board 200. In other words, the seating groove 135 may be formed on an outer surface of the third side portion 130 of the housing 100. The seating groove 135 may be a seating portion on which the third board region 230 is seated. The seating groove 135 can reduce a separation distance between the first pulling member 610 and the second pulling member 620 constituting the pressing unit 600, thereby increasing an attractive force generated therebetween.

In other words, each side portion of the housing 100 has a certain thickness. In this case, the housing 100 may be formed by injection. In addition, for the ease of the injection, each side portion may have the same thickness.

In this case, the second pulling member 620 is an electronic component electrically connected to the board 200. For example, the second pulling member 620 is a capacitor electrically connected to the board 200. In this case, the capacitor has a specification according to the product and a certain height accordingly. Here, when a magnetic substance such as a general yoke is used as the second pulling member, the magnetic substance may be used by manufacturing a thickness of the yoke to match a thickness of the housing 100. Unlike this, the second pulling member 620 in the embodiment is an electronic component such as a capacitor, and thus it is difficult to design a thickness or height of the second pulling member 620 to match a thickness of the side portion of the housing 100. Therefore, in the embodiment, the seating groove 135 on which the third board region 230 of the board 200 is disposed is formed on the outer surface of the third side portion 130 of the housing 100 on which the second pulling member 620 is disposed. Therefore, in the embodiment, a distance between the first pulling member 610 and the second pulling member 620 may be reduced by a depth of the seating groove 135, and an attractive force may be increased by a corresponding amount.

Meanwhile, a plurality of protrusions may be formed on the outer surface of each side portion of the housing 100. The plurality of protrusions may correspond to holes formed in each board region of the board 200.

In other words, a first protrusion (not shown) may be formed on the outer surface of the first side portion 110 of the housing 100. The first protrusion may correspond to the plurality of 1-1 holes 211 formed in the first board region 210 of the board 200.

In addition, a second protrusion 123 may be formed on the outer surface of the second side portion 120 of the housing 100. The second protrusions 123 may correspond to the plurality of 1-2 holes 221 formed in the second board region 220 of the board 200.

In addition, a third protrusion 136 may be formed on the outer surface of the third side portion 130 of the housing 100. The third protrusion 136 may be formed on an outer surface of the seating groove 135 of the outer surface of the third side portion 130. The third protrusions 136 may correspond to the plurality of 1-3 holes 231 formed in the third board region 230 of the board 200.

In addition, a fourth protrusion (not shown) may be formed on the outer surface of the fourth side portion 140 of the housing 100. The fourth protrusions may correspond to the plurality of 1-4 holes 241 formed in the fourth board region 240 of the board 200.

The first to fourth protrusions may be coupling protrusions for stably coupling the board 200 to the outer surface of the housing 100. When the board 200 is coupled to the housing 100, the first to fourth protrusions may be inserted into the holes formed in each board region of the board 200.

The housing 100 may include at least one recess.

For example, a first recess 131 may be formed in at least one inner surface of the housing 100. The first recess 131 may be formed on the inner surface of the third side portion 130 of the housing 100. Preferably, the first recess 131 may be formed in the third board region 230 where the first pulling member 610 and the second pulling member 620 are disposed and the region corresponding to a third side portion 430 of the prism mover 400*a*.

The third side portion 430 of the prism mover 400*a* may be a region where the moving plate 500 corresponding to the rotational axis for tilting the prism unit 400 in the first axis and second axis directions is disposed.

The first recess 131 may have a concave groove shape in a direction from the inner surface toward the outer surface of the third side portion 130 of the housing 100. The first recess 131 may have a concave shape in a direction from the inner surface of the third side portion 130 of the housing 100 toward the outer surface (Z-axis direction) of the third side portion 130.

The first recess 131 may be a seating portion on which the moving plate 500 is seated. The first recess 131 may provide a space where a second moving protrusion (to be described below) disposed on a second face of the moving plate 500 is seated or inserted.

The first recesses 131 may be disposed to be spaced apart from each other in the first direction (x-axis direction) with respect to the center of the inner surface of the third side portion 130. In other words, the first recess 131 may include a first sub-first recess 132 disposed to be spaced apart to a −X axis and a second sub-first recess 133 disposed to be spaced apart to a +X axis with respect to the center of the inner surface of the third side portion 130. In this case, a center of the third housing hole 134 may be positioned on a virtual straight line connecting centers of the first sub-first recess 132 and the second sub-first recess 133.

In other words, the first recess 131 may include a plurality of sub-recesses disposed to be spaced apart from each other in the first direction with respect to a center region of the third side portion 130 of the housing 100. Here, the third housing hole 134 may be formed in the center region of the third side portion 130. Therefore, the first recesses 131 may be disposed to be spaced apart from each other in the first direction with respect to the third housing hole 134.

Meanwhile, the second board region 220 of the board 200 may include a 2-1 area 220*a* facing the second side portion 120 of the housing 100 and a 2-2 region 220*b* other than the 2-1 region 220*a*.

In addition, as described above, the second electronic component 260 may be disposed in the second board region 220 of the board 200. In this case, the second electronic component 260 may be a memory as described above, but may also be a capacitor.

In other words, the first actuator in the embodiment may include a plurality of capacitors for an OIS operation. In this case, a portion of the capacitor is used as the second pulling member 620 constituting the pressing unit 600 in the embodiment. In addition, it may be difficult to use all of the plurality of capacitors provided for the OIS operation as the second pulling member 620. In other words, this is because the space where the second pulling member 620 is disposed is limited, and thus it may be difficult to dispose all of the plurality of capacitors in the limited space. Therefore, the capacitor among the electronic components in the embodiment may be classified into a first electronic component used as the second pulling member 620 and the second electronic component 260 other than the second pulling member 620.

In addition, the second electronic component 260 may be disposed in the 2-2 region 220*b* of the second board region 220. In other words, when the second electronic component 260 is the capacitor, the capacitor is magnetic, and thus an external force may be generated between the magnet unit 320 and the first pulling member 610 of the pressing unit 600. Therefore, in the embodiment, the second electronic component 260 may be disposed in the 2-2 region 220*b* of the second board region 220 of the board 200, thereby removing the external force that may be generated the magnet unit 320 and the first pulling member 610 constituting the pressing unit 600.

In addition, a center of the hole 530 of the moving plate 500 may be included in a region connecting centers of the plurality of first moving protrusions 511 disposed on a first face 510 in the first direction and centers of a second moving protrusions 521 disposed on a second face 520 in the second direction perpendicular to the first direction.

Specifically, a virtual first straight line connecting the centers of the plurality of first moving protrusions 511 and a virtual second straight line connecting the centers of the plurality of second moving protrusions 521 are orthogonal to each other.

In addition, the first straight line and the second straight line may cross each other. In addition, the center of the hole 530 of the moving plate 500 may be positioned in a region where the first straight line and the second straight line cross each other.

<Prism Unit>

FIGS. 82 to 84 are views of the prism unit 400 of the first camera actuator 1000*c*.

Referring to FIGS. 82 to 84, the prism unit 400 may be disposed in the housing 100. Specifically, the prism unit 400 may be disposed in the accommodating space of the housing 100.

The prism unit 400 may include the prism 400*b* and the prism mover 400*a* disposed on the prism 400*b*.

The prism 400*b* may be a right angle prism. The prism 400*b* may reflect a direction of light incident from the outside. In other words, the prism 400*b* may change a path of light incident on the first camera actuator 1100*c* from the outside toward the second camera actuator 1200.

The prism mover 400*a* may be disposed on the prism 400*b*. The prism mover 400*a* may be disposed to surround the prism 400*b*. At least one side portion of the prism mover 400*a* may be open and may include an accommodating space therein. Specifically, the prism mover 400*a* may have a structure in which a plurality of side portions connected to each other are open. For example, the prism mover 400*a* may have a structure in which a side portion corresponding to the prism 400*b* is open and include an accommodating space defined as a first space 450 therein.

The prism mover 400*a* may include an inner surface 451. The inner surface 451 may be an inner surface constituting the first space 450. The first space 450 may have a shape corresponding to the prism 400*b*. The inner surface 451 of the first space 450 may be in direct contact with the prism 400*b*.

The prism mover 400*a* may include a step 452. The step 452 may be disposed in the first space 450. The step 452 may function to guide the prism 400*b* and/or function as a seating portion of the prism 400*b*. Specifically, a protrusion corresponding to the step 452 may be formed on an outer side of the prism 400*b*, but the present invention is not limited thereto.

The protrusion or one end of the prism 400*b* may be guided to the step 452 of the prism mover 400*a* and disposed in the first space 450. Therefore, the prism mover 400*a* can effectively support the prism 400*b*. In addition, the prism 400*b* may be seated at a set position and may have improved alignment characteristics in the prism mover 400*a*.

The prism unit 400 may include a plurality of side portions. For example, the prism mover 400*a* of the prism unit 400 may include the plurality of side portions. The prism mover 400*a* may include the first side portion 410 corresponding to the first side portion 110 of the housing 100. In addition, the prism mover 400*a* may include the second side portion 420 corresponding to the second side portion 120 of the housing 100. In addition, the prism mover 400*a* may include the third side portion 430 corresponding to the third side portion 130 of the housing 100. In addition, the prism mover 400*a* may include the fourth side portion 440 corresponding to the fourth side portion 140 of the housing 100.

The prism mover 400*a* may include a plurality of recesses.

Preferably, the prism mover 400*a* may include a second recess 434 and a third recess 431.

The second recess 434 may be formed in the third side portion 430 of the prism mover 400*a*. Preferably, the second recess 434 may be formed in the outer surface of the third side portion 430 of the prism mover 400*a*. The second recess 434 may have a shape that is concave inward from the outer surface of the third side portion 430 of the prism mover 400*a*. The second recess 434 may be formed in the center region of the outer surface of the third side portion 430 of the prism mover 400*a*. Preferably, the second recess 434 may be matched with the third housing hole 134 formed in the housing 100 in the Z-axis direction. The second recess 434 may be formed to face the third housing hole 134 formed in the housing 100. Preferably, a center of the second recess 434 may be formed in a region overlapping the center of the third housing hole 134 of the housing 100 in the Z-axis direction. The second recess 434 may provide a space where one component of the pressing unit 600 is disposed. Preferably, the first pulling member 610, which is one component of the pressing unit 600, may be disposed in the second recess 434. The first pulling member 610 may be a magnet.

Therefore, the second recess 434 may be disposed facing the third housing hole 134 disposed in the housing 100. In other words, the second recess 434 may overlap the third housing hole 134 in the Z-axis direction.

In this case, an adhesive member (not shown) may be applied to the second recess 434. In addition, the first pulling member 610 may be fixedly disposed in the second recess 434 by the adhesive member.

A plurality of third recesses 431 may be formed in the outer surface of the side portion of the prism mover 400*a*. For example, the plurality of third recesses 431 may be formed in the outer surface of the third side portion 430 of the prism unit 400. Preferably, the third recess 431 may be provided in the same size as the first recess 131 or provided in a different size. The third recess 431 may be disposed to be spaced apart from the second recess 434 at a position adjacent to the second recess 434. Preferably, the third recess 431 may be disposed to be spaced apart from the second recess 434. In this case, a depth of the third recess 431 may be different from a depth of the second recess 434. In addition, the depth of the third recess 431 may be the same as the depth of the second recess 434.

The third recess 431 may be disposed to be spaced apart from the second recess 434 in the second direction.

For example, the third recess 431 may include a first sub-third recess 432 and a second sub-third recess 433 spaced apart from the second recess 434 in the second direction (Y-axis direction). In this case, the center of the second recess 434 may be positioned on a virtual straight line connecting centers of the first sub-third recess 432 and the second sub-third recess 433.

The third recess 431 may provide a space where the plurality of first moving protrusions of the moving plate 500 disposed on one surface of the moving plate 500 are inserted or/and seated. In this case, the third recess 431 may not overlap the first recess 131 of the housing in the Z-axis direction.

The prism mover 400*a* may further include a plurality of recesses. The recess may be a groove having a shape that is concave from the outer surface of the side portion of the prism mover 400*a* toward the first space 450.

The plurality of recesses may include a fourth recess 411, a fifth recess 421, and a sixth recess 441.

For example, the fourth recess 411 may be formed on the outer surface of the first side portion 410 of the prism mover 400*a*. The fourth recess 411 may be formed in a region corresponding to the first housing hole 111 of the housing 100. The fourth recess 411 may be formed in the region corresponding to the first coil unit 311.

The fifth recess 421 may be formed on the outer surface of the second side portion 420 of the prism mover 400*a*. The fifth recess 421 may be formed in a region corresponding to the 2-1 housing hole 121 of the housing 100. The fifth recess 421 may be formed in the region corresponding to the second coil unit 312.

The sixth recess 441 may be formed on an outer surface of the fourth side portion 440 of the prism mover 400*a*. The sixth recess 441 may be formed in a region corresponding to the fourth housing hole 141 of the housing 100. The sixth recess 441 may be formed in the region corresponding to the third coil unit 313.

The fourth recess 411, the fifth recess 421, and the sixth recess 441 may be seating portions on which the magnet unit 320 is seated. The fourth recess 411, the fifth recess 421, and the sixth recess 441 may be seating portions on which the yoke unit 330 is seated.

For example, the first yoke 331 and the first magnet 321 may be disposed in the fourth recess 411 from an inner side of the fourth recess 411. In addition, the second yoke 332 and the second magnet 322 may be disposed in the fifth recess 421 from an inner side of the fifth recess 421. In addition, the third yoke 333 and the third magnet 323 may be disposed in the sixth recess 441 from an inner side of the sixth recess 441. In addition, the third yoke 333 and the third magnet 323 may be spaced apart from each other.

As described above, the prism mover 400*a* may include the second recess 434 in which the first pulling member 610 is disposed on the outer surface thereof and the plurality of third recesses 431 disposed to be spaced apart from the second recess 434 in the Y-axis direction.

<Moving Plate>

FIG. 85 is a front perspective view of a moving plate constituting the first camera actuator, and FIG. 86 is a rear perspective view of the moving plate constituting the first camera actuator.

Referring to FIGS. 85 and 86, the moving plate 500 may include the first face 510 and the second face 520.

A plurality of moving protrusions for providing a rotational axis for rotating or tilting the prism unit 400 in the first direction (e.g., the left-right direction or the X-axis direction) may be provided on one surface of the moving plate 500. The plurality of moving protrusions for providing the rotational axis for rotating or tilting the prism unit 400 in the second direction (e.g., the vertical direction or the Y-axis direction) may be provided on the other surface of the moving plate 500.

As described above, in the embodiment, the rotation of the prism unit 400 in the first direction is performed by the plurality of moving protrusions disposed on the one surface of the moving plate 500, and the rotation of the prism unit 400 in the second direction is performed by the plurality of moving protrusions disposed on the other surface of the moving plate 500.

In this case, the moving plate 500 may be disposed between the housing 100 and the prism unit 400.

The moving plate 500 may be disposed between the housing 100 and the prism unit 400 and pressed by the pressing unit 600 to be pressed and supported to the housing 100 together with the prism unit 400.

Here, the moving plate 500 includes a plurality of protrusions on both surfaces thereof.

In this case, the moving plate 500 may provide a rotational axis for a moving direction of the prism unit 400 moved by an external driving force, for example, the coil unit 310 and the magnet unit 320.

The moving plate 500 may include the first face 510.

The first face 510 may be a face facing the third side portion 430 of the prism mover 400*a*.

The first moving protrusion 511 and a first moving recess 514 may be disposed on the first face 510 of the moving plate 500. The first moving protrusion 511 functions as a rotational axis about which the prism unit 400 rotates in the first direction. The first moving recess 514 may be a concave groove formed on the first face 510 as the second moving protrusion 521 is formed on the second face 520 of the moving plate 500.

In other words, the moving plate 500 may be a flat plate-shaped member, and the first and second moving protrusions 511 and 521 are formed on both surfaces of the moving plate 500, respectively. In addition, as the first and second moving protrusions 511 and 521 are formed, first and second moving recesses 514 and 524 corresponding thereto may be formed on opposite surfaces thereof.

The first moving protrusions 511 may be spaced apart from each other in the second direction (Y-axis direction) with respect to a center region of the first face 510 of the moving plate 500. Here, the center region of the first face 510 may be a region facing the first pulling member 610 fixedly disposed on the prism unit 400. Preferably, the center region of the first face 510 may be a region overlapping the first pulling member 610 fixedly disposed on the prism unit 400 in the Z-axis direction. Therefore, the hole 530 may be formed in a center region of the moving plate 500. The hole 530 of the moving plate 500 may be a hole passing through the first face 510 and the second face 520 of the moving plate

500 in the center region of the moving plate 500. The hole 530 may be formed in a region corresponding to the second recess 434 formed in the prism mover 400*a*. In addition, the hole 530 may be formed in a region corresponding to the third housing hole 134 of the housing 100. Preferably, the hole 530 of the moving plate 500 may overlap the second recess 434 and the third housing hole 134 in the Z-axis direction. Therefore, the first pulling member 610 disposed in the second recess 434 and the second pulling member 620 disposed in the third housing hole 134 are formed to directly face each other through the hole 530 of the moving plate 500.

In addition, the first moving protrusions 511 are disposed to be spaced apart from each other in the Y-axis direction of the center region. In other words, the first moving protrusion 511 may include a first sub-first moving protrusion 512 disposed to be spaced apart in a +Y-axis direction with respect to the center region and a second sub-first moving protrusion 513 disposed to be spaced apart in a −Y-axis direction with respect to the center region.

The first sub-first moving protrusion 512 may correspond to the first sub-third recess 432. In other words, at least a portion of the first sub-first moving protrusion 512 may be disposed in the first sub-third recess 432. In other words, at least a portion of the first sub-first moving protrusion 512 may be inserted into the first sub-third recess 432. In this case, a height of the first sub-first moving protrusion 512 may be greater than a depth of the first sub-third recess 432. Therefore, only a portion of the first sub-first moving protrusion 512 may be inserted into the first sub-third recess 432. Therefore, in a state in which at least a portion of the first sub-first moving protrusion 512 is inserted into the first sub-third recess 432, the first face 510 of the moving plate 500 may be spaced apart from the outer surface of the third side portion 430 of the prism mover 400*a*.

The second sub-first moving protrusion 513 may correspond to the second sub-third recess 433. In other words, at least a portion of the second sub-first moving protrusion 513 may be disposed in the second sub-third recess 433. In other words, at least a portion of the second sub-first moving protrusion 513 may be inserted into the second sub-third recess 433. In this case, a height of the second sub-first moving protrusion 513 may be greater than a depth of the second sub-third recess 433. Therefore, only a portion of the second sub-first moving protrusion 513 may be inserted into the second sub-third recess 433. Therefore, in a state in which at least a portion of the second sub-first moving protrusion 513 is inserted into the second sub-third recess 433, the first face 510 of the moving plate 500 may be spaced apart from the outer surface of the third side portion 430 of the prism mover 400*a*.

In addition, the first sub-first moving protrusion 512 and the second sub-first moving protrusion 513 are arranged in the Y-axis direction with respect to the center of the moving plate 500, and thus provides the rotational axis about which the prism unit 400 rotates in the first direction (X-axis direction). In other words, the prism unit 400 may be provided to perform a rotational motion in the first direction (left-right direction) about a virtual first line, which is a reference axis, formed by the first sub-first moving protrusion 512 and the second sub-first moving protrusion 513.

The first moving recesses 514 may be disposed to be spaced apart from each other in the first direction (X-axis direction) with respect to the center region of the first face 510 of the moving plate 500.

In addition, the first moving recesses 514 are disposed to be spaced apart from each other in the X-axis direction of the center region. In other words, the first moving recess 514 may include a first sub-first moving recess 515 disposed to be spaced apart in the −X-axis direction with respect to the center region and a second sub-first moving recess 516 disposed to be spaced apart in the +X-axis direction with respect to the center region.

The first sub-first moving recess 515 and the second sub-first moving recess 516 may correspond to the second moving protrusion 521 formed on the second face 520 of the moving plate 500.

In addition, the moving plate 500 may include the second surface 520.

The second face 520 may be a face facing the inner surface of the third side portion 130 of the housing 100.

The second moving protrusion 521 and the second moving recess 524 may be disposed on the second face 520 of the moving plate 500. The second moving protrusion 521 functions as a rotational axis about which the prism unit 400 rotates in the second direction.

The second moving protrusions 521 may be disposed to be spaced apart from each other in the first direction (X-axis direction) with respect to a center region of the second face 520 of the moving plate 500. Here, the center region of the second face 520 may be a region where the hole 530 is formed.

In addition, the second moving protrusions 521 are disposed to be spaced apart from each other in the X-axis direction of the center region. In other words, the second moving protrusion 521 may include a first sub-second moving protrusion 522 disposed to be spaced apart in the −X-axis direction with respect to the center region and a second sub-second moving protrusion 523 disposed to be spaced apart in the +X-axis direction with respect to the center region.

The first sub-second moving protrusion 522 and the second sub-second moving protrusion 523 may correspond to the first sub-first recess 132 and the second sub-first recess 133 of the housing 100.

In other words, the first sub-second moving protrusion 522 and the second sub-second moving protrusion 523 may be inserted into the first sub-first recess 132 and the second sub-first recess 133.

In addition, the first sub-second moving protrusion 522 and the second sub-second moving protrusion 523 are arranged in the X-axis direction with respect to the center of the moving plate 500, and thus provides the rotational axis about which the prism unit 400 rotates in the second direction. In other words, the prism unit 400 may be provided to perform a rotational motion in the second direction (vertical direction) about a virtual second line, which is a reference axis, formed by the first sub-second moving protrusion 522 and the second sub-second moving protrusion 523.

The second moving recesses 524 may be disposed to be spaced apart from each other in the second direction (Y-axis direction) with respect to the center region of the second face 520 of the moving plate 500.

In addition, the second moving recesses 524 are disposed to be spaced apart from each other in the Y-axis direction of the center region. In other words, the second moving recess 524 may include a first sub-second moving recess 525 disposed to be spaced apart in the +Y-axis direction with respect to the center region and a second sub-second moving recess 526 disposed to be spaced apart in the −Y-axis direction with respect to the center region.

FIGS. 87 to 89 are views of a coupling relationship of the housing, the prism unit, the pressing unit, and the moving plate in the first camera actuator.

Referring to FIGS. 87 to 89, the first camera actuator according to the embodiment may include the moving plate 500. In addition, the pressing unit 600 for generating an attractive force may be disposed on surfaces facing each other between the housing 100 and the prism unit 400. In other words, the first pulling member 610 may be disposed on one surface of the prism unit 400 (more specifically, the prism mover). In addition, the second pulling member 620 may be disposed on one surface of the housing 100 facing the one surface of the prism unit 400. In this case, the first pulling member 610 may be a magnet. In addition, the second pulling member 620 may be an electronic component. For example, the second pulling member 620 may be a magnetic electronic component. For example, the second pulling member 620 may be an electronic component electrically connected to the board 200. For example, the second pulling member 620 may be a capacitor disposed on the board 200.

The prism unit 400 may be pressed to the housing 100 in a state in which the moving plate 500 is inserted between the prism unit 400 and the housing 100 by the pressing unit 600. Therefore, the prism unit 400 and the moving plate 500 may be supported by the housing 100.

The centers of the first pulling member 610, the moving plate 500, and the second pulling member 620 may overlap each other in the Z-axis direction.

In this case, the first moving protrusion 511 of the moving plate 500 may be inserted into the third recess 431 of the prism unit 400.

The first sub-first moving protrusion 512 may be inserted into the first sub-third recess 432, and the second sub-first moving protrusion 513 may be inserted into the second sub-third recess 433.

In addition, the first sub-second moving protrusion 522 and the second sub-second moving protrusion 523 may be inserted into the first sub-first recess 132 and the second sub-first recess 133 of the housing 100.

In addition, the first sub-second moving protrusion 522 and the second sub-second moving protrusion 523 are arranged in the X-axis direction with respect to the center of the moving plate 500, and thus provide the rotational axis about which the prism unit 400 rotates in the second direction. In other words, the prism unit 400 may be provided to perform a rotational motion in the second direction (vertical direction) about a virtual second line, which is a reference axis, formed by the first sub-second moving protrusion 522 and the second sub-second moving protrusion 523.

Therefore, the first moving protrusions disposed on one surface of the moving plate 500 function as the rotational axes about which the prism unit 400 rotates in the first direction corresponding to the X axis, and the second moving protrusions disposed on the other surface of the moving plate 500 function as the rotational axes about which the prism unit 400 rotates in the second direction corresponding to the Y axis.

In addition, in the embodiment, there is a technical effect capable of providing the best optical characteristics by controlling the prism unit 400 to be tilted to the first axis or the second axis by the electromagnetic forces between the first to third magnets 321, 322, and 323 disposed on the prism mover **400*a* and the first to third coils 311, 312, and 313**, thereby minimizing the occurrence of a de-center or tilt phenomenon when OIS is implemented.

For example, in the embodiment, there is the technical effect capable of providing the best optical characteristics and implementing the ultra-slim and ultra-small camera actuator by controlling the prism unit 400 to be tilted to the first axis or the second axis by the driving forces of the image shake control units 200 and 300 in a state in which the moving plate 500 is disposed between the housing 100 and the prism unit 400, thereby minimizing the occurrence of the de-center or tilt phenomenon when OIS is implemented.

In addition, in the embodiment, an electronic component disposed on the board 200 is used as one component of the pressing unit 600 for pressing the prism unit 400 to the housing 100. Specifically, in the embodiment, a magnetic electronic component disposed on the board 200 is used as the second pulling member 620 constituting the pressing unit 600. Specifically, in the embodiment, a magnetic capacitor disposed on the board 200 is used as the second pulling member 620 constituting the pressing unit 600. Therefore, in the embodiment, it is possible to omit a separate magnet or yoke constituting the second pulling member 620, thereby reducing the manufacturing cost. In addition, in the embodiment, when the capacitor disposed on the board 200 is not used as the pressing unit, an external force is generated by the attractive force generated between the magnet constituting the pressing unit 600 and the capacitor, resulting in a problem in the OIS operational reliability. Unlike this, in the embodiments, as the capacitor is used as the pulling member, it is possible to remove the external force generated by the capacitor, thereby improving the OIS operational reliability.

FIGS. 90 and 91 are exemplary views showing an operation of the first camera actuator according to the embodiment.

Referring to FIGS. 90 and 91, the prism unit 400 according to the embodiment may be controlled to be tilted to the first axis or the second axis by the driving forces of the image shake control units 200 and 300.

First, referring to FIG. 90, the prism unit 400 may be provided to perform the rotation motion in the first direction about a virtual first line L1 formed by the first moving protrusion 511 of the moving plate 500 that is the reference axis. Specifically, the image shake control units 200 and 300 may rotate the prism unit 400 in the left-right direction.

For example, a repulsive force may be generated between the first coil unit of the first coil 311 adjacent to the moving plate 500 and the first magnet unit of the first magnet 321 corresponding thereto. An attractive force may be generated between the second coil unit of the first coil 311 far from the moving plate 500 and the second magnet unit of the first magnet 321 corresponding thereto.

In addition, an attractive force may be generated between the third coil unit of the second coil 312 adjacent to the moving plate 500 and the third magnet unit of the second magnet 322 corresponding thereto. A repulsive force may be generated between a fourth coil unit of the second coil 312 far from the moving plate 500 and a fourth magnet unit of the second magnet 322.

Therefore, the prism unit 400 may be tilted in the left-right direction with respect to the first line L1 that is the reference axis. In other words, the prism unit 400 may be tilted at a predetermined angle in the left-right direction with respect to the first line L1. Therefore, the movement path of the light incident on the prism unit 400 may be controlled.

In addition, referring to FIG. 91, the prism unit 400 may be provided to perform the rotational motion in the second direction about a virtual second line L2 formed by the second moving protrusion 521 of the moving plate 500, which is the reference axis. Specifically, the image shake control units 200 and 300 may rotate the prism unit 400 in the left-right direction.

For example, a repulsive force may be generated between a fifth coil unit of the third coil 313 adjacent to the moving plate 500 and a fifth magnet unit of the third magnet 323 adjacent to the moving plate 500. In addition, an attractive force may be generated between a sixth coil unit of the third coil 313 far from the moving plate 500 and a sixth magnet unit of the third magnet 323 far from the moving plate 500.

Therefore, the prism unit 400 may be tilted downward with respect to the second line L2 that is the reference axis. In other words, the prism unit 400 may be tilted at a predetermined angle in the vertical direction with respect to the second line L2. Therefore, the movement path of the light incident on the prism unit 400 may be controlled.

FIG. 92 is a perspective view of a camera module according to an embodiment, and FIG. 93 is a perspective view in which some components of the camera module according to the embodiment are omitted.

Referring to FIGS. 92 and 93, the camera module 1000 according to the embodiment may include one camera actuator or a plurality of camera actuators.

For example, the camera module 1000 may include the first camera actuator 1100*c* and the second camera actuator 1200 described above, and include a cover case 15 for protecting the first camera actuator 1100*c* and the second camera actuator 1200.

The first camera actuator 1100*c* may be an OIS actuator. In this case, light incident on the camera module 1000 from the outside may first be incident on the first camera actuator 1100*c*. In addition, the optical path of the light incident on the first camera actuator 1100*c* may be changed and incident on the second camera actuator 1200. Subsequently, the light passing through the second camera actuator 1200 may be incident on an image sensor 2900.

The second camera actuator 1200 may be a zoom and/or auto focus actuator. The second camera actuator 1200 may include a plurality of lenses. The second camera actuator 1200 may perform the zoom or auto focus function by moving at least one lens in the optical axis direction by a control signal from a control unit. The second camera actuator 1200 will be described in more detail through the drawings to be described below.

<Second Camera Actuator>

FIG. 94 is an exploded perspective view of a second camera actuator according to the embodiment, and FIG. 95 is a cross-sectional view of the second camera actuator according to the embodiment. In addition, FIG. 96 is a front view of the second camera actuator according to the embodiment, and FIG. 97 is a perspective view showing third and fourth drive units disposed in a housing of the second camera actuator according to the embodiment. In addition, FIGS. 98 and 99 are exploded perspective views of first and second drive units of the second camera actuator according to the embodiment, and FIG. 100 is a perspective view of some components of the second camera actuator according to the embodiment.

Referring to FIGS. 94 to 100, the second camera actuator 1200 according to the embodiment may include a second housing 2100, a first lens unit 2105, a first lens barrel 2200, a third drive unit 2300, a second lens barrel 2400, and a fourth drive unit 2500. However, in the camera device (or the camera module) described above, the first camera actuator and the second camera actuator may be replaced with different first and second camera actuators to be described below.

The second housing 2100 may form an exterior of the second camera actuator 1200. The second housing 2100 may have partially open upper and lower regions and may have a hexahedral shape.

The second housing 2100 may include an accommodating space therein. The first lens barrel 2200, the third drive unit 2300, the second lens barrel 2400, and the fourth drive unit 2500 may be accommodated in the accommodating space of the second housing 2100.

The second housing 2100 may include a first sub-housing 2110 and a second sub-housing 2120.

The first sub-housing 2110 may include a first hole 2111. The first hole 2111 may be formed in one surface of the first sub-housing 2110. The first hole 2111 is a hollow hole and may be a hole passing through an outer side and inner side of the first sub-housing 2110.

The first sub-housing 2110 may further include a second hole 2112 and a third hole 2113. The second hole 2112 and the third hole 2113 may be disposed on one surface of the first sub-housing 2110. The second hole 2112 and the third hole 2113 are hollow holes and may be holes passing through the outer side and inner side of the first sub-housing 2110. The second hole 2112 and the third hole 2113 may be spaced apart from the first hole 2111. Specifically, the first hole 2111 may be disposed between the second hole 2112 and the third hole 2113. The first hole 2111 may be disposed at equal distances from the second hole 2112 and the third hole 2113.

The second hole 2112 may include a plurality of protrusions protruding from an inner circumferential surface of the second hole 2112 toward the center of the second hole 2112. For example, the plurality of protrusions may include a first protrusion 2112*a* disposed in an upper end of the second hole 2112 and a second protrusion 2112*b* disposed in a lower end of the second hole 2112 with respect to the optical axis direction.

Specifically, the first protrusion 2112*a* may include a plurality of first sub-protrusions (not shown) spaced apart from each other. The plurality of first sub-protrusions may be disposed at equal distances along a concentric circumference from the center of the second hole 2112. In addition, the second protrusion 2112*b* may be spaced apart from the first protrusion 2112*a* in the optical axis direction. The second protrusion 2112*b* may be disposed under the first protrusion 2112*a*. The second protrusion 2112*b* may include a plurality of second sub-protrusions (not shown) spaced apart from each other. The plurality of second sub-protrusions may be disposed at equal distances along the concentric circumference from the center of the second hole 2112. The first protrusion 2112*a* and the second protrusion 2112*b* may provide a space where a portion of the third drive unit 2300, for example, a first buffer member 2321 to be described below is disposed.

The third hole 2113 may include a plurality of protrusions protruding from an inner circumferential surface of the third hole 2113 toward the center of the third hole 2113. The plurality of protrusions may include a third protrusion 2113*a* disposed in an upper end of the third hole 2113 and a fourth protrusion 2113*b* disposed in a lower end of the second hole 2112 in the optical axis direction.

The third protrusion 2113*a* may include a plurality of third sub-protrusions (not shown) spaced apart from each other. The plurality of third sub-protrusions may be disposed at equal distances along a concentric circumference from the center of the third hole 2113. In addition, the fourth protrusion 2113*b* may be spaced apart from the third protrusion 2113*a* in the optical axis direction. The fourth protrusion

2113*b* may include a plurality of fourth sub-protrusions (not shown) spaced apart from each other. The plurality of fourth sub-protrusions may be disposed at equal distances along the concentric circumference from the center of the third hole 2113. The third protrusion 2113*a* and the fourth protrusion 2113*b* may provide a space where a portion of the fourth drive unit 2500, for example, a third buffer member 2521 to be described below is disposed.

The second sub-housing 2120 may be disposed under the first sub-housing 2110. Specifically, the second sub-housing 2120 may be disposed under the first sub-housing 2110 in the third direction (Z-axis direction or optical axis direction). The second sub-housing 2120 may be disposed closer to the image sensor 2900 to be described below than the first sub-housing 2110. The first lens barrel 2200, the third drive unit 2300, the second lens barrel 2400, and the fourth drive unit 2500 may be disposed in the second sub-housing 2120.

The second sub-housing 2120 may be coupled to the first sub-housing 2110. For example, the first sub-housing 2110 and the second sub-housing 2120 may be coupled by a separate fastening member (not shown) such as a screw. In addition, the first sub-housing 2110 and the second sub-housing 2120 may be coupled to each other by the physical coupling of coupling jaws and coupling grooves respectively formed therein.

The first lens unit 2105 may be disposed in the second housing 2100 and may include at least one lens. For example, the first lens unit 2105 may be disposed in the first sub-housing 2110. Specifically, the first lens unit 2105 may be disposed in the first hole 2111 of the first sub-housing 2110. For example, the first lens unit 2105 may be coupled to the first sub-housing 2110 by a thread formed on an inner circumferential surface of the first hole 2111.

The first lens barrel 2200 may be disposed in the second housing 2100. The first lens barrel 2200 may be disposed in the second sub-housing 2120. The first lens barrel 2200 may be disposed under the first lens unit 2105. For example, the first lens barrel 2200 may be disposed under the first lens unit 2105 with respect to the optical axis direction and may be closer to the image sensor 2900 than the first lens unit 2105. The first lens barrel 2200 may be coupled to the third drive unit 2300. The first lens barrel 2200 may be moved in the second housing 2100 by the third drive unit 2300. Specifically, the first lens barrel 2200 may be moved in the optical axis direction by the third drive unit 2300.

The first lens barrel 2200 may include a first barrel unit 2210, a second lens unit 2205, a first guide unit 2220, and a first elastic unit 2230.

The first barrel unit 2210 may be disposed in a region overlapping the optical axis and may have a shape in which one surface and the other surface are open. For example, the first barrel unit 2210 may have a cylindrical shape in which one surface and the other surface are open.

The first barrel unit 2210 may include a first through hole 2211. The first through hole 2211 may be a through hole passing through the one surface and the other surface of the first barrel unit 2210. Here, the one surface of the first barrel unit 2210 may be a surface facing the first lens unit 2105, and the other surface thereof is a surface opposite to the one surface and may be a surface facing the image sensor 2900.

The second lens unit 2205 may be disposed on the first barrel unit 2210. Specifically, the second lens unit 2205 may be disposed in the first through hole 2211. For example, a thread may be formed on an inner circumferential surface of the first through hole 2211, and the second lens unit 2205 may be coupled to the first barrel unit 2210 by the thread.

The second lens unit 2205 may include at least one lens. The second lens unit 2205 may perform a zoom function. The second lens unit 2205 may move in the optical axis direction. Specifically, the second lens unit 2205 may move in the optical axis direction with respect to the first lens unit 2105.

The first guide unit 2220 may extend outward from the first barrel unit 2210. For example, the first guide unit 2220 may extend from the first barrel unit 2210 in a direction perpendicular to the optical axis, for example, the first direction (X-axis direction).

The first guide unit 2220 may include a first upper surface 2221, a first side surface 2222, and a first lower surface 2223.

The first upper surface 2221 may face an inner upper surface of the second housing 2100. The first upper surface 2221 may face the inner upper surface of the second housing 2100 in the second direction (Y-axis direction). The first upper surface 2221 may include a plurality of sub-upper surfaces. Specifically, the first upper surface 2221 may include a first sub-upper surface 2221*a* and a second sub-upper surface 2221*b* disposed under the first sub-upper surface 2221*a* with respect to the second direction (Y-axis direction). In other words, the second sub-upper surface 2221*b* may be disposed closer to a first lower surface 2223 than the first sub-upper surface 2221*a*. At least one first fastening protrusion (not shown) may be disposed on the second sub-upper surface 2221*b*. The first fastening protrusion may have a shape protruding upward from the second sub-upper surface 2221*b*. The first fastening protrusion may be inserted into a first fixing groove (not shown) formed in the first elastic unit 2230 to be described below.

In addition, the first upper surface 2221 may include a first step surface 2225 disposed between the first sub-upper surface 2221*a* and the second sub-upper surface 2221*b*. The first step surface 2225 may be connected to ends of the first sub-upper surface 2221*a* and the second sub-upper surface 2221*b*. The first step surface 2225 may be defined as the first step portion 2225. In other words, the first upper surface 2221 may include the first sub-upper surface 2221*a*, the second sub-upper surface 2221*b*, and the first step portion 2225 and have a step structure.

The first lower surface 2223 may face an inner lower surface of the second housing 2100 to be described below. A first groove 2223*h*1 may be disposed in the first lower surface 2223. The first groove 2223*h*1 may have a shape that is concave from the first lower surface 2223 to the first upper surface 2221. A first magnetic scaler 2610 to be described below may be disposed in the first groove 2223*h*1.

In addition, a second groove 2223*h*2 may be disposed in the first lower surface 2223. The second groove 2223*h*2 may be spaced apart from the first groove 2223*h*1. The second groove 2223*h*2 may be disposed in an edge region of the first lower surface 2223. The second groove 2223*h*2 may provide a region where a portion of the first elastic unit 2230 to be described below is disposed. Specifically, the second groove 2223*h*2 may provide a region where the first elastic unit 2230 is mounted and fixed.

The first side surface 2222 may be disposed between the first upper surface 2221 and the first lower surface 2223. Specifically, the first side surface 2222 may be a surface connecting the first upper surface 2221 and the first lower surface 2223. More specifically, the first side surface 2222 may be a surface connecting the second sub-upper surface 2221*b* and the first lower surface 2223. The first side surface 2222 may face a second inner surface of the second sub-housing 2120 to be described below.

A first recess 2222*h* may be disposed in the first side surface 2222. The first recess 2222*h* may have a shape that is concave from the first side surface 2222 toward the first barrel unit 2210. In addition, the first recess 2222*h* may have a groove shape extending in the optical axis direction (Z-axis direction). The first recess 2222*h* may have a V shape when viewed from the front.

The first guide unit 2220 may include a first insertion hole 2220*h*1. The first insertion hole 2220*h*1 may be a hole passing through one surface and the other surface of the first guide unit 2220. Here, the one surface of the first guide unit 2220 may be a surface facing the first lens unit 2105, and the other surface thereof is a surface opposite to the one surface and may be a surface facing the image sensor 2900.

A first pin 2250 may be disposed in the first insertion hole 2220*h*1. The first pin 2250 may be disposed to pass through the first insertion hole 2220*h*1. The first pin 2250 may have a shape extending in the optical axis direction (Z-axis direction) and have a longer length in the optical axis direction than the first lens barrel 2200. The first pin 2250 may be coupled to at least one of the first sub-housing 2110 and the second sub-housing 2120. The first lens barrel 2200 may move in the optical axis direction using the first pin 2250 as a moving axis. Therefore, the second lens unit 2205 disposed in the first lens barrel 2200 may perform a zoom function and/or an auto focus function.

The first elastic unit 2230 may be disposed on the first guide unit 2220. For example, the first elastic unit 2230 may be disposed on the first upper surface 2221, the first lower surface 2223, and the first side surface 2222 of the first guide unit 2220. The first elastic unit 2230 may be coupled to the first guide unit 2220.

The first elastic unit 2230 may include a first elastic member 2231 and a second elastic member 2232.

The first elastic member 2231 may be coupled to the first guide unit 2220. The first elastic member 2231 may be disposed at a set position on the first side surface 2222.

The first elastic member 2231 may have a shape corresponding to that of the first side surface 2222. For example, the first elastic member 2231 may include a first region 2231*a*, a second region 2231*b*, and a third region 2231*c*.

The first region 2231*a* and the second region 2231*b* may be disposed on the first side surface 2222 of the first guide unit 2220 and spaced apart from each other. The first region 2231*a* and the second region 2231*b* may be disposed in a region of the first side surface 2222 where the first recess 2222*h* is not disposed.

The third region 2231*c* may be disposed between the first region 2231*a* and the second region 2231*b* to connect the two regions 2231*a* and 2231*b*. The third region 2231*c* may be disposed in a region corresponding to the first recess 2222*h*. The third region 2231*c* may have a V-shape corresponding to the first recess 2222*h*.

The second elastic member 2232 may be disposed on the first guide unit 2220. The second elastic member 2232 may be coupled to the first guide unit 2220.

The second elastic member 2232 may include a fourth region 2232*a*, a fifth region 2232*b*, and a sixth region 2232*c*.

The fourth region 2232*a* may be disposed on the first upper surface 2221 of the first guide unit 2220. Specifically, the fourth region 2232*a* may be disposed on the second sub-upper surface 2221*b* of the first guide unit 2220. The fourth region may include a first fixing groove (not shown). The first fixing groove may be disposed in a region corresponding to the first fastening protrusion and may have a shape corresponding to that of the first fastening protrusion.

The fifth region 2232*b* may be connected to the fourth region 2232*a*. For example, the fifth region 2232*b* may be bent on one end of the fourth region 2232*a* and disposed on the first side surface 2222 of the first guide unit 2220. The fifth region 2232*b* may be disposed on the first elastic member 2231. The fifth region 2232*b* may be parallel to the first region 2231*a* and the second region 2231*b*. The fifth region 2232*b* may be disposed to cover the first elastic member 2231.

The sixth region 2232*c* may be connected to the fifth region 2232*b*. For example, the sixth region 2232*c* may be bent on one end of the fifth region 2232*b* and disposed on the first lower surface 2223 of the first guide unit 2220. A portion of the sixth region 2232*c* may be disposed to be inserted into the second groove 2223*h*2 disposed on the first lower surface 2223.

In other words, in the second elastic member 2232, the first fixing groove formed in the fourth region 2232*a* may be coupled to the first fastening protrusion, and the sixth region 2232*c* may be inserted into the second groove 2223*h*2 and physically coupled to the first guide unit 2220. Therefore, the first elastic unit 2230 may maintain a state of being firmly coupled to the first guide unit 2220.

In addition, the first lens barrel 2200 may further include a first guide groove 2210*h*1. The first guide groove 2210*h*1 may be disposed in a region extending outward from the first barrel unit 2210. The first guide groove 2210*h*1 may be disposed in a region corresponding to a second pin 2450 to be described below. The first guide groove 2210*h*1 may provide a space where the second pin 2450 is inserted. The first lens barrel 2200 may move in the optical axis direction by the first pin 2250 and the second pin 2450. In this case, the first guide groove 2210*h*1 may have a shape having an open one side. For example, the first guide groove 2210*h*1 may have a shape having an open one side facing the first inner surface of the second housing 2100. Therefore, it is possible to minimize the friction and vibration generated when the first lens barrel 2200 is moved by the third drive unit 2300.

The second camera actuator 1200 may include the third drive unit 2300. The third drive unit 2300 may be disposed in the second housing 2100. The third drive unit 2300 may be coupled to the first lens barrel 2200. The third drive unit 2300 may move the first lens barrel 2200 in the optical axis direction (Z-axis direction).

The third drive unit 2300 may include a first piezoelectric device 2310, a first extension bar 2320, a first buffer member 2321, and a second buffer member 2322.

The first piezoelectric device 2310 may include a piezoelectric device. For example, the first piezoelectric device 2310 may include a material that causes mechanical deformation by applied power. The first piezoelectric device 2310 may contract or expand by the applied power and cause mechanical deformation in a set direction. For example, the first piezoelectric device 2310 may cause mechanical deformation in the optical axis direction (Z-axis direction) by the applied power and generate vibration.

The first piezoelectric device 2310 may include a first disk 2311 and a first protrusion 2512. The first disk 2311 may have a plate shape and may be disposed in the second hole 2112. For example, the first disk 2311 may be disposed on the first protrusion 2112*a* of the second hole 2112. Specifically, the first disk 2311 may be disposed on the plurality of first sub-protrusions. The first protrusion 2112*a* may support the first disk 2311.

The first protrusion 2512 may be disposed under the first disk 2311. Specifically, the first protrusion 2512 may be disposed under the first disk 2311 with respect to the third direction (Z-axis direction) and connected to the first disk 2311. A partial region of the first protrusion 2512 may be disposed in the second hole 2112. The first protrusion 2512 may have a shape protruding toward the image sensor 2900. A width (X-axis and Y-axis directions) of the first protrusion 2512 may vary in the optical axis direction. For example, the width of the first protrusion 2512 may reduce toward the image sensor 2900.

The first extension bar 2320 may extend in the optical axis direction. The first extension bar 2320 may be disposed parallel to the optical axis and connected to the first piezoelectric device 2310. For example, an upper end of the first extension bar 2320 may be connected to the first protrusion 2512. In addition, a lower end of the first extension bar 2320 may be inserted into a fourth hole (not shown) formed in a lower end of the second housing 2100, for example, a lower end of the second sub-housing 2120.

In addition, one region of the first extension bar 2320 may be connected to the first lens barrel 2200. For example, the first extension bar 2320 may be connected to the first lens barrel 2200 by the first elastic unit 2230. Specifically, the first extension bar 2320 may be disposed between the first elastic member 2231 and the second elastic member 2232. More specifically, the first extension bar 2320 may be disposed between the third region 2231*c* of the first elastic member 2231 and the fifth region 2232*b* of the second elastic member 2232. The first extension bar 2320 may be fixed by elastic forces of the first elastic member 2231 and the second elastic member 2232.

The first extension bar 2320 may transmit the vibration generated from the first piezoelectric device 2310 to the first lens barrel 2200. The first lens barrel 2200 may move upward or downward (Z-axis direction or optical axis direction) according to a vibration direction of the first extension bar 2320. Therefore, the second lens unit 2205 in the first lens barrel 2200 may move and perform a zoom function of zooming up or zooming out.

The first buffer member 2321 may be disposed on the first extension bar 2320. The first buffer member 2321 may be disposed on an upper region of the first extension bar 2320. The first buffer member 2321 may be disposed in the second hole 2112 of the second housing 2100. For example, the first buffer member 2321 may be disposed between the first protrusion 2112*a* and the second protrusion 2112*b* of the second hole 2112. The first buffer member 2321 may be fixed to a position set by the first protrusion 2112*a* and the second protrusion 2112*b*. In addition, the first buffer member 2321 may include a through hole into which the first extension bar 2320 is inserted.

The second buffer member 2322 may be disposed on the first extension bar 2320. The second buffer member 2322 may be disposed in a lower region of the first extension bar 2320. The second buffer member 2322 may be spaced apart from the first buffer member 2321 in the optical axis direction. The second buffer member 2322 may be disposed in the fourth hole (not shown) of the second housing 2100. The second buffer member 2322 may be disposed to be inserted into the fourth hole. The second buffer member 2322 may include a through hole into which the first extension bar 2320 is inserted.

The first buffer member 2321 and the second buffer member 2322 can prevent noise caused by the vibration of the first extension bar 2320. In addition, the first buffer member 2321 and the second buffer member 2322 can prevent the first extension bar 2320 from being deformed or damaged by an external impact.

The second lens barrel 2400 may be disposed in the second housing 2100. The second lens barrel 2400 may be disposed in the second sub-housing 2120. The second lens barrel 2400 may be disposed under the first lens barrel 2200. For example, the second lens barrel 2400 may be disposed under the first lens barrel 2200 with respect to the optical axis direction and may be closer to the image sensor 2900 than the first lens barrel 2200. The second lens barrel 2400 may be coupled to the fourth drive unit 2500. The second lens barrel 2400 may move in the second housing 2100 by the fourth drive unit 2500. Specifically, the second lens barrel 2400 may move in the optical axis direction by the fourth drive unit 2500.

The second lens barrel 2400 may include a second barrel unit 2410, a third lens unit 2405, a second guide unit 2420, and a second elastic unit 2430.

The second barrel unit 2410 may be disposed in a region overlapping the optical axis and may have a shape in which one surface and the other surface are open. For example, the second barrel unit 2410 may have a cylindrical shape in which the one surface and the other surface are open.

The second barrel unit 2410 may include a second through hole 2411. The second through hole 2411 may be a through hole passing through the one surface and the other surface of the second barrel unit 2410. Here, the one surface of the second barrel unit 2410 may be a surface facing the first lens barrel 2200, and the other surface thereof is a surface opposite to the first surface and may be a surface facing the image sensor 2900.

The third lens unit 2405 may be disposed on the second barrel unit 2410. Specifically, the third lens unit 2405 may be disposed in the second through hole 2411. For example, a thread may be formed on an inner circumferential surface of the second through hole 2411, and the third lens unit 2405 may be coupled to the second barrel unit 2410 by the thread.

The third lens unit 2405 may include at least one lens. The third lens unit 2405 may perform an auto focus function. The third lens unit 2405 may move in the optical axis direction. Specifically, the third lens unit 2405 may move in the optical axis direction with respect to the first lens unit 2105. The third lens unit 2405 may move independently of the second lens unit 2205. In addition, a movable distance of the third lens unit 2405 in the optical axis direction may be the same as or different from that of the second lens unit 2205.

The second guide unit 2420 may extend outward from the second barrel unit 2410. For example, the second guide unit 2420 may extend from the second barrel unit 2410 in the direction perpendicular to the optical axis, for example, in the first direction (X-axis direction). In this case, the second guide unit 2420 may extend in a direction opposite to that of the first guide unit 2220. For example, the first guide unit 2220 may extend from the first barrel unit 2210 in the +X-axis direction, and the second guide unit 2420 may extend from the second barrel unit 2410 in the −X-axis direction.

The second guide unit 2420 may include a second lower surface 2421, a second side surface 2422, and a second upper surface 2423.

The second upper surface 2423 may face the inner upper surface of the second housing 2100. The second upper surface 2423 may face the inner upper surface of the second housing 2100 in the second direction (Y-axis direction). A third groove 2423*h*1 may be disposed in the second upper surface 2423. The third groove 2423*h*1 may have a shape that is concave from the second upper surface 2423 to the second lower surface 2421. A second magnetic scaler 2620 to be described below may be disposed in the third groove **2423*h*1**.

In addition, a fourth groove **2423*h*2 may be disposed in the second upper surface 2423. The fourth groove 2423*h*2 may be spaced apart from the third groove 2423*h*1. The fourth groove 2423*h*2 may be disposed in an edge region of the second upper surface 2423. The fourth groove 2423*h*2 may provide a region where a portion of the second elastic unit 2430 to be described below is disposed. Specifically, the fourth groove 2423*h*2 may provide a region where the second elastic unit 2430** is mounted and fixed.

The second lower surface 2421 may face the inner lower surface of the second housing 2100. The second lower surface 2421 may face the inner lower surface of the second housing 2100 in the second direction (Y-axis direction). The second lower surface 2421 may include a plurality of sub-lower surfaces. Specifically, the second lower surface 2421 may include a first sub-lower surface **2421*a* and a second sub-lower surface 2421*b* disposed above the first sub-lower surface 2421*a* with respect to the second direction (Y-axis direction). In other words, the second sub-lower surface 2421*b* may be disposed closer to the second upper surface 2423 than the first sub-lower surface 2421*a*. At least one second fastening protrusion (not shown) may be disposed on the second sub-lower surface 2421*b*. The second fastening protrusion may have a shape protruding downward from the second sub-lower surface 2421*b*. The second fastening protrusion may be inserted into a second fixing groove (not shown) formed in the second elastic unit 2430** to be described below.

In addition, the second lower surface 2421 may include a second step surface 2425 disposed between the first sub-lower surface **2421*a* and the second sub-lower surface 2421*b*. The second step surface 2425 may be connected to ends of the first sub-lower surface 2421*a* and the second sub-lower surface 2421*b*. The second step surface 2425 may be defined as the second step portion 2425. In other words, the second lower surface 2421 may include the first sub-lower surface 2421*a*, the second sub-lower surface 2421*b*, and the second step portion 2425 and have a step structure. The second side surface 2422 may be disposed between the second upper surface 2423 and the second lower surface 2421. Specifically, the second side surface 2422 may be a surface connecting the second upper surface 2423 and the second lower surface 2421. More specifically, the second side surface 2422 may be a surface connecting the second sub-lower surface 2421*b* and the second upper surface 2423. The second side surface 2422 may face a first inner surface of the second sub-housing 2120** to be described below.

A second recess **2422*h* may be disposed in the second side surface 2422. The second recess 2422*h* may have a shape that is concave from the second side surface 2422 toward the second barrel unit 2410. In addition, the second recess 2422*h* may have a groove shape extending in the optical axis direction (Z-axis direction). The second recess 2422*h*** may have a V shape when viewed from the front.

The second guide unit 2420 may include a second insertion hole **2420*h*1. The second insertion hole 2420*h*1 may be a hole passing through one surface and the other surface of the second guide unit 2420. Here, the one surface of the second guide unit 2420 may be a surface facing the first lens barrel 2200, and the other surface thereof is a surface opposite to the first surface and may be a surface facing the image sensor 2900**.

A second pin 2450 may be disposed in the second insertion hole **2420*h*1. The second pin 2450 may be disposed to pass through the second insertion hole 2420*h*1. The second pin 2450 may have a shape extending in the optical axis direction (Z-axis direction). The second pin 2450 may be spaced apart from the first pin 2250 and parallel to the first pin 2250. The second pin 2450 may have a longer length in the optical axis direction than the second lens barrel 2400. The second pin 2450 may be coupled to at least one of the first sub-housing 2110 and the second sub-housing 2120. The second lens barrel 2400 may move in the optical axis direction using the second pin 2450 as a moving axis. Therefore, the third lens unit 2405 disposed in the second lens barrel 2400** may perform a zoom function and/or an auto focus function.

The second elastic unit 2430 may be disposed on the second guide unit 2420. For example, the second elastic unit 2430 may be disposed on the second upper surface 2423, the second lower surface 2421, and the second side surface 2422 of the second guide unit 2420. The second elastic unit 2430 may be coupled to the second guide unit 2420.

The second elastic unit 2430 may include a third elastic member 2431 and a fourth elastic member 2432.

The third elastic member 2431 may be coupled to the second guide unit 2420. The third elastic member 2431 may be disposed at a set position on the second side surface 2422.

The third elastic member 2431 may have a shape corresponding to that of the second side surface 2422. For example, the third elastic member 2431 may include a seventh region **2431*a*, an eighth region 2431*b*, and a ninth region 2431*c***.

The seventh region **2431*a* and the eighth region 2431*b* may be disposed on the second side surface 2422 of the second guide unit 2420 and spaced apart from each other. The seventh region 2431*a* and the eighth region 2431*b* may be disposed in a region of the second side surface 2422 where the second recess 2422*h*** is not disposed.

The ninth region **2431*c* may be disposed between the first region 2231*a* and the second region 2231*b* to connect the two regions 2431*a* and 2431*b*. The ninth region 2431*c* may be disposed in a region corresponding to the second recess 2422*h*. The ninth region 2431*c* may have a V shape corresponding to that of the second recess 2422*h***.

The fourth elastic member 2432 may be disposed on the second guide unit 2420. The fourth elastic member 2432 may be coupled to the second guide unit 2420.

The fourth elastic member 2432 may include a tenth region **2432*a*, an eleventh region 2432*b*, and a twelfth region 2432*c***.

The tenth region **2432*a* may be disposed on the second lower surface 2421 of the second guide unit 2420. Specifically, the tenth region 2432*a* may be disposed on the second sub-lower surface 2421*b* of the second guide unit 2420. The tenth region 2431*a*** may include the second fixing groove (not shown). The second fixing groove may be disposed in a region corresponding to the second fastening protrusion and may have a shape corresponding to that of the second fastening protrusion.

The eleventh region **2432*b* may be connected to the tenth region 2432*a*. For example, the eleventh region 2432*b* may be bent on one end of the tenth region 2432*a* and disposed on the second side surface 2422 of the second guide unit 2420. The eleventh region 2432*b* may be disposed on the third elastic member 2431. The eleventh region 2432*b* may be parallel to the seventh region 2431*a* and the eighth region 2431*b*. The eleventh region 2432*b* may be disposed to cover the third elastic member 2431**.

The twelfth region **2432*c* may be connected to the eleventh region 2432*b*. For example, the twelfth region 2432*c*** may be bent on the one end of the eleventh region 2432*b* and disposed on the second upper surface 2423 of the second guide unit 2420. A portion of the twelfth region 2432*c* may be disposed to be inserted into the fourth groove 2423*h*2 disposed on the second upper surface 2423.

In other words, in the fourth elastic member 2432, the second fixing groove formed in the seventh region 2431*a* may be coupled to the second fastening protrusion, and the twelfth region 2432*c* may be inserted into the fourth groove 2423*h*2 and physically coupled to the second guide unit 2420. Therefore, the second elastic unit 2430 may maintain a state of being firmly coupled to the second guide unit 2420.

In addition, the second lens barrel 2400 may further include a second guide groove 2410*h*1. The second guide groove 2410*h*1 may be disposed in a region extending outward from the second barrel unit 2410. The second guide groove 2410*h*1 may be disposed in a region corresponding to the first pin 2250. The second guide groove 2410*h*1 may provide a space into which the first pin 2250 is inserted. The second lens barrel 2400 may move in the optical axis direction by the first pin 2250 and the second pin 2450. In this case, the second guide groove 2410*h*1 may have a shape having an open one side. For example, the second guide groove 2410*h*1 may have a shape having an open one side facing the second inner surface of the second housing 2100. Therefore, it is possible to minimize the friction and vibration generated when the second lens barrel 2400 is moved by the fourth drive unit 2500.

The second camera actuator 1200 may include the fourth drive unit 2500. The fourth drive unit 2500 may be disposed in the second housing 2100. The fourth drive unit 2500 may be coupled to the second lens barrel 2400. The fourth drive unit 2500 may move the second lens barrel 2400 in the optical axis direction (Z-axis direction).

The fourth drive unit 2500 may include a second piezoelectric device 2510, a second extension 2520, a third buffer member 2521, and a fourth buffer member 2522.

The second piezoelectric device 2510 may include a piezoelectric device. For example, the second piezoelectric device 2510 may include a material that causes mechanical deformation by applied power. The second piezoelectric device 2510 may contract or expand by the applied power and cause mechanical deformation in a set direction. For example, the second piezoelectric device 2510 may cause the mechanical deformation in the optical axis direction (Z-axis direction) by applied power and generate vibration.

The second piezoelectric device 2510 may include a second disk 2511 and a second protrusion 2512. The second disk 2511 may have a plate shape and may be disposed in the third hole 2113. For example, the second disk 2511 may be disposed on the third protrusion 2113*a* of the third hole 2113. Specifically, the second disk 2511 may be disposed on the plurality of third sub-protrusions. The third protrusion 2113*a* may support the second disk 2511.

The second protrusion 2512 may be disposed under the second disk 2511. Specifically, the second protrusion 2512 may be disposed under the second disk 2511 with respect to the third direction (Z-axis direction) and connected to the second disk 2511. A partial region of the first protrusion 2512 may be disposed in the third hole 2113. The second protrusion 2512 may have a shape protruding toward the image sensor 2900. A width (X-axis direction or Y-axis direction) of the second protrusion 2512 may vary in the optical axis direction. For example, the width of the second protrusion 2512 may reduce toward the image sensor 2900.

The second extension 2520 may extend in the optical axis direction. The second extension 2520 may be disposed parallel to the optical axis and connected to the second piezoelectric device 2510. For example, an upper end of the second extension 2520 may be connected to the second protrusion 2512. In addition, a lower end of the second extension 2520 may be inserted into a fifth hole (not shown) formed in the lower end of the second housing 2100, for example, the lower end of the second sub-housing 2120.

In addition, one region of the second extension 2520 may be connected to the second lens barrel 2400. For example, the second extension 2520 may be connected to the second lens barrel 2400 by the second elastic unit 2430. Specifically, the second extension 2520 may be disposed between the third elastic member 2431 and the fourth elastic member 2432. More specifically, the second extension 2520 may be disposed between the ninth region 2431*c* of the third elastic member 2431 and the eleventh region 2432*b* of the fourth elastic member 2432. The second extension 2520 may be fixed by elastic forces of the third elastic member 2431 and the fourth elastic member 2432.

The second extension 2520 may transmit the vibration generated from the second piezoelectric device 2510 to the second lens barrel 2400. The second lens barrel 2400 may move upward or downward (Z-axis direction or optical axis direction) according to a vibration direction of the second extension 2520. Therefore, the third lens unit 2405 in the second lens barrel 2400 may move and perform a zoom function of zooming up or zooming out.

The third buffer member 2521 may be disposed on the second extension 2520. The third buffer member 2521 may be disposed in an upper region of the second extension 2520. The third buffer member 2521 may be disposed in the third hole 2113 of the second housing 2100. For example, the third buffer member 2521 may be disposed between the third protrusion 2113*a* and the fourth protrusion 2113*b* of the third hole 2113. The third buffer member 2521 may be fixed to a position set by the third protrusion 2113*a* and the fourth protrusion 2113*b*. In addition, the third buffer member 2521 may include a through hole into which the second extension 2520 is inserted.

The fourth buffer member 2522 may be disposed on the second extension 2520. The fourth buffer member 2522 may be disposed in a lower region of the second extension 2520. The fourth buffer member 2522 may be spaced apart from the third buffer member 2521 in the optical axis direction. The fourth buffer member 2522 may be disposed in the fifth hole (not shown) of the second housing 2100. The fourth buffer member 2522 may be disposed to be inserted into the fifth hole. The second buffer member 2322 may include a through hole into which the second extension 2520 is inserted.

The third buffer member 2521 and the fourth buffer member 2522 can prevent noise caused by the vibration of the second extension 2520. In addition, the third buffer member 2521 and the fourth buffer member 2522 can prevent the second extension 2520 from being deformed or damaged by an external impact.

The second camera actuator 1200 may include the first magnetic scaler 2610, a first detection unit (not shown), the second magnetic scaler 2620, and a second detection unit (not shown).

The first magnetic scaler 2610 may be disposed on the first lens barrel 2200. For example, the first magnetic scaler 2610 may be disposed on the first lower surface 2223. Specifically, the first magnetic scaler 2610 may be disposed in the first groove 223*h*1 of the first lens barrel 2200. The first magnetic scaler 2610 may move in the optical axis direction together with the first lens barrel 2200.

The first magnetic scaler 2610 may include a plurality of magnets. For example, an N pole and S pole may be alternately disposed in the first magnetic scaler 2610 in the optical axis direction.

The first detection unit may be disposed adjacent to the first magnetic scaler 2610. For example, the first detection unit may be disposed to face the first magnetic scaler 2610 in the first direction (X-axis direction) or the second direction (Y-axis direction). The first detection unit may detect a position of the first magnetic scaler 2610. Therefore, the first detection unit may detect the position and movement of the first lens barrel 2200 moving together with the first magnetic scaler 2610.

The second magnetic scaler 2620 may be disposed on the second lens barrel 2400. For example, the second magnetic scaler 2620 may be disposed on the second upper surface 2423. Specifically, the second magnetic scaler 2620 may be disposed in the third groove 2423*h*1 of the second lens barrel 2400. The second magnetic scaler 2620 may move in the optical axis direction together with the second lens barrel 2400.

The second magnetic scaler 2620 may include a plurality of magnets. For example, an N pole and an S pole may be alternately disposed in the second magnetic scaler 2620 in the optical axis direction.

In addition, the second detection unit may be disposed adjacent to the second magnetic scaler 2620. For example, the second detection unit may be disposed to face the second magnetic scaler 2620 in the first direction (X-axis direction) or the second direction (Y-axis direction). The second detection unit may detect a position of the second magnetic scaler 2620. Therefore, the second detection unit may detect the position and movement of the second lens barrel 2400 moving together with the second magnetic scaler 2620.

In addition, although not shown in the drawings, the second camera actuator 1200 according to the embodiment may further include a gyro sensor (not shown). The gyro sensor may be disposed in the second housing 2100. The gyro sensor may detect the movement of a user who uses the camera actuator.

The second camera actuator 1200 according to the embodiment may include a second board 2800. The second board 2800 may be disposed in the second housing 2100. The second board 2800 may be disposed to surround a partial region of the second housing 2100. For example, the second board 2800 may be disposed to surround a portion of an outer side of the second sub-housing 2120. The second board 2800 may provide power or a current to components disposed in the second housing 2100. In other words, the second board 2800 may be a circuit board and may include a circuit board having wiring patterns that may be electrically connected, such as a rigid PCB, a flexible PCB, or a rigid flexible PCB. The second board 2800 may be electrically connected to the first circuit board 310 described above.

The second board 2800 may include a first end 2810. The first end 2810 may be disposed on the first piezoelectric device 2310 of the third drive unit 2300. For example, the first end 2810 may be disposed on the first disk 2311 of the first piezoelectric device 2310. Specifically, the first end 2810 may be disposed on one surface of the first disk 2311. In addition, the first end 2810 may be disposed on the second piezoelectric device 2510 of the fourth drive unit 2500. For example, a second end 2820 may be disposed on the second disk 2511 of the second piezoelectric device 2510. Specifically, the first end 2810 may be disposed on one surface of the second disk 2511.

The second board 2800 may include the second end 2820. The second end 2820 may be spaced apart from the first end 2810. In addition, the second end 2820 may be disposed in a region not overlapping the first end 2810 with respect to the optical axis direction.

The second end 2820 may be disposed on the first piezoelectric device 2310 of the third drive unit 2300. For example, the second end 2820 may be disposed on the first disk 2311 of the first piezoelectric device 2310. Specifically, the first end 2810 may be disposed on the other surface opposite to one surface of the first disk 2311. In addition, the second end 2820 may be disposed on the second piezoelectric device 2510 of the fourth drive unit 2500. For example, the second end 2820 may be disposed on the second disk 2511 of the second piezoelectric device 2510. Specifically, the second end 2820 may be disposed on the other surface opposite to one surface of the second disk 2511.

In other words, the second board 2800 may supply power to the first piezoelectric device 2310 and the second piezoelectric device 2510. Therefore, the third drive unit 2300 and the fourth drive unit 2500 may respectively drive the first lens barrel 2200 and the second lens barrel 2400 by applied power.

As described above, the second camera actuator 1200 according to the embodiment may include the third drive unit 2300 and the fourth drive unit 2500 including the piezoelectric device, and the first and second lens barrels 2200 and 2400 may move in the optical axis direction by the third and fourth drive units 2300 and 2500. However, the embodiment is not limited thereto, and the third and fourth drive units 2300 and 2500 may include a voice coil motor (VCM), a shape memory alloy, or the like. In this case, the third and fourth drive units 2300 and 2500 may move the first and second lens barrels 2200 and 2400 using an electromagnetic force of the VCM or a physical change of the shape memory alloy.

The second camera actuator 1200 according to the embodiment may include the image sensor 2900. The image sensor 2900 may collect light sequentially passing the first lens unit 2105, the second lens unit 2205, and the third lens unit 2405 and convert the collected light into an image. The image sensor 2900 may be disposed so that the optical axis matches the lenses of the lens units 105, 205, and 405. The optical axis of the image sensor 2900 and the optical axis of the lens may be aligned.

Figure 101:
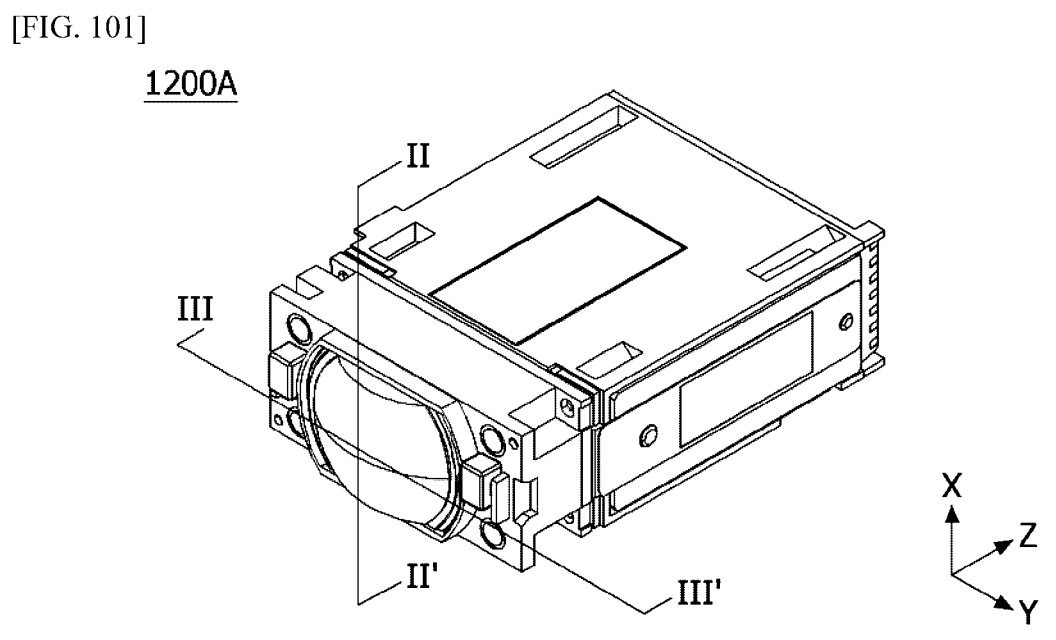

FIG. 101 is a perspective view of a second camera actuator according to another embodiment, FIG. 102 is an exploded perspective view of the second camera actuator according to another embodiment, FIG. 103 is a cross-sectional view along line II-II' in FIG. 101, and FIG. 104 is a cross-sectional view along line in FIG. 101.

Referring to FIGS. 101 to 104, a second camera actuator 1200A according to the embodiment may include a lens unit 1220, a second housing 1230, a second drive unit 1250, a base unit (not shown), and a second board unit 1270. Furthermore, the second camera actuator 1200A may further include a second shield can (not shown), an elastic unit (not shown), and a bonding member (not shown). Furthermore, the second camera actuator 1200A according to the embodiment may further include an image sensor IS.

The second shield can (not shown) may be positioned in one region (e.g., an outermost side) of the second camera actuator 1200A and positioned to surround components (the lens unit 1220, the second housing 1230, the elastic unit (not shown), the second drive unit 1250, the base unit (not shown), the second board unit 1270, and the image sensor (IS)) to be described below.

The second shield can (not shown) may block or reduce electromagnetic waves generated from the outside. Therefore, it is possible to reduce the occurrence of a malfunction of the second drive unit 1250.

The lens unit 1220 may be positioned in the second shield can (not shown). The lens unit 1220 may move in the third direction (Z-axis direction). Therefore, the AF function described above may be performed.

Specifically, the lens unit 1220 may include a lens assembly 1221 and a bobbin 1222.

The lens assembly 1221 may include one or more lenses. In addition, a plurality of lens assemblies 1221 may be present, but the following description will be given on the basis of one lens assembly.

The lens assembly 1221 may be coupled to the bobbin 1222 and may move in the third direction (Z-axis direction) by electromagnetic forces generated from a fourth magnet 1252*a* and a second magnet 1252*b* coupled to the bobbin 1222.

The bobbin 1222 may include an opening region surrounding the lens assembly 1221. In addition, the bobbin 1222 may be coupled to the lens assembly 1221 by various methods. In addition, the bobbin 1222 may include a bobbin groove in a side surface thereof and may be coupled to the fourth magnet 1252*a* and the second magnet 1252*b* through the bobbin groove. A bonding member or the like may be applied to the bobbin groove.

In addition, the bobbin 1222 may be coupled to the elastic units (not shown) on upper and rear ends thereof. Therefore, the bobbin 1222 may be supported by the elastic unit (not shown) while moving in the third direction (Z-axis direction). In other words, as the position of the bobbin 1222 is maintained, the bobbin 1222 may be maintained in the third direction (Z-axis direction). The elastic unit (not shown) may be formed as a leaf spring.

The second housing 1230 may be disposed between the lens unit 1220 and the second shield can (not shown). In addition, the second housing 1230 may be disposed to surround the lens unit 1220.

A hole may be formed in a side portion of the second housing 1230. A fourth coil 1251*a* and a fifth coil 1251*b* may be disposed in the hole. The hole may be positioned to correspond to the bobbin groove of the bobbin 1222 described above.

The fourth magnet 1252*a* may be positioned to face the fourth coil 1251*a*. In addition, the second magnet 1252*b* may be positioned to face the fifth coil 1251*b*.

The elastic unit (not shown) may include a first elastic member (not shown) and a second elastic member (not shown). The first elastic member (not shown) may be coupled to an upper surface of the bobbin 1222. The second elastic member (not shown) may be coupled to a lower surface of the bobbin 1222. In addition, the first elastic member (not shown) and the second elastic member (not shown) may be formed as the leaf spring as described above. In addition, the first elastic member (not shown) and the second elastic member (not shown) may provide elasticity for the movement of the bobbin 1222.

The second drive unit 1250 may provide driving forces F3 and F4 for moving the lens unit 1220 in the third direction (Z-axis direction). The second drive unit 1250 may include a second drive coil 1251 and a second drive magnet 1252.

The lens unit 1220 may move in the third direction (Z-axis direction) by an electromagnetic force formed between the second drive coil 1251 and the second drive magnet 1252.

The second drive coil 1251 may include the fourth coil 1251*a* and the fifth coil 1251*b*. The fourth coil 1251*a* and the fifth coil 1251*b* may be disposed in the hole formed on the side portion of the second housing 1230. In addition, the fourth coil 1251*a* and the fifth coil 1251*b* may be electrically connected to the second board unit 1270. Therefore, the fourth coil 1251*a* and the fifth coil 1251*b* may receive a current or the like through the second board unit 1270.

The second drive magnet 1252 may include the fourth magnet 1252*a* and the fifth magnet 1252*b*. The fourth magnet 1252*a* and the fifth magnet 1252*b* may be disposed in the bobbin groove of the bobbin 1222 described above and positioned to correspond to the fourth coil 1251*a* and the fifth coil 1251*b*.

The base unit (not shown) may be positioned between the lens unit 1220 and the image sensor IS. A component such as a filter may be fixed to the base unit (not shown). In addition, the base unit (not shown) may be disposed to surround the image sensor IS. With this configuration, the image sensor IS can be free from foreign substances or the like, thereby improving the reliability of the device.

In addition, the second camera actuator may be a zoom actuator or an AF actuator. For example, the second camera actuator may support one lens or a plurality of lenses and perform an auto focusing function or a zoom function by moving the lens according to a control signal from a predetermined control unit.

In addition, the second camera actuator may be a fixed zoom or a continuous zoom. For example, the second camera actuator may provide the movement of the lens assembly 1221.

In addition, the second camera actuator may include a plurality of lens assemblies. For example, at least one of a first lens assembly (not shown), a second lens assembly (not shown), a third lens assembly (not shown), and a guide pin (not shown) may be disposed in the second camera actuator. The above description may be applied to a description thereof. Therefore, the second camera actuator may perform a high-magnification zoom function through the drive unit. For example, the first lens assembly (not shown) and the second lens assembly (not shown) may be moving lenses that move through the drive unit and the guide pin (not shown), and the third lens assembly (not shown) may be a fixed lens, but the present invention is not limited thereto. For example, the third lens assembly (not shown) may perform a function of a focator by which light forms an image at a specific position, and the first lens assembly (not shown) may perform a function of a variator for re-forming an image formed by the third lens assembly (not shown), which is the focator, at another position. Meanwhile, the first lens assembly (not shown) may be in a state in which a magnification change is large because a distance to a subject or an image distance is greatly changed, and the first lens assembly (not shown), which is the variator, may play an important role in a focal length or magnification change of the optical system. Meanwhile, imaging points of an image formed by the first lens assembly (not shown), which is the variator, may be slightly different depending on a position. Therefore, the second lens assembly (not shown) may perform a position compensation function for the image formed by the variator. For example, the second lens assembly (not shown) may perform a function of a compensator for accurately forming an image at an actual position of the image sensor using the imaging points of the image formed by the first lens assembly (not shown) which is the variator.

The image sensor IS may be positioned on an inner side or outer side of the second camera actuator. In an embodiment, as shown, the image sensor IS may be positioned on the inner side of the second camera actuator. The image sensor IS may receive light and convert the received light into an electrical signal. In addition, the image sensor IS may include a plurality of pixels in an array form. In addition, the image sensor IS may be positioned on the optical axis.

FIG. 105 is a perspective view of a mobile terminal to which the camera module according to the embodiment is applied.

As shown in FIG. 105, a mobile terminal 1500 of the embodiment may include a camera module 1000, a flash module 1530, and an auto focus device 1510, which are provided on a rear surface thereof.

The camera module 1000 may include an image capturing function and an AF function. For example, the camera module 1000 may include the AF function using an image.

The camera module 1000 processes an image frame of a still image or a moving image obtained by an image sensor in a capturing mode or a video call mode.

The processed image frame may be displayed on a predetermined display unit and stored in a memory. A camera (not shown) may also be disposed on a front surface of a body of the mobile terminal.

For example, the camera module 1000 may include a first camera module 1000A and a second camera module 1000B, and the first camera module 1000A may implement OIS along with an AF or zoom function. In addition, the AF, zoom, and OIS functions may be performed by the second camera module 1000*b*. In this case, since the first camera module 1000A includes both of the first camera actuator and the second camera actuator described above, the camera device or the camera module can be easily miniaturized by changing an optical path.

The flash module 1530 may include a light emitting device for emitting light therein. The flash module 1530 may be operated by an operation of a camera of the mobile terminal or a user's control.

The auto focus device 1510 may include one of the packages of a surface light emitting laser device as a light emitting unit.

The auto focus device 1510 may include the AF function using a laser. The auto focus device 1510 may be mainly used in a condition in which the AF function using the image of the camera module 1000 is degraded, for example, a proximity of 10 m or less or a dark environment.

The auto focus device 1510 may include a light emitting unit including a vertical cavity surface emitting laser (VCSEL) semiconductor device and a light receiving unit, such as a photodiode, for converting light energy into electrical energy.

FIG. 106 is a perspective view of a vehicle to which the camera module according to the embodiment is applied.

For example, FIG. 106 is an external view of a vehicle equipped with a vehicle driver assistance system to which the camera module 1000 according to the embodiment is applied.

Referring to FIG. 106, a vehicle 700 in the embodiment may include wheels 13FL and 13FR rotated by a power source and a predetermined sensor. The sensor may be a camera sensor 2000, but the present disclosure is not limited thereto.

The camera sensor 2000 may be a camera sensor to which the camera module 1000 according to the embodiment is applied. The vehicle 700 in the embodiment may acquire image information through the camera sensor 2000 for capturing a front image or a surrounding image, determine a situation in which a lane line is not identified using the image information, and generate a virtual lane line when the lane line is not identified.

For example, the camera sensor 2000 may acquire a front image by capturing a view in front of the vehicle 700, and a processor (not shown) may acquire image information by analyzing an object included in the front image.

For example, when objects, such as a median, a curb, or a street tree corresponding to a lane line, an adjacent vehicle, a traveling obstacle, and an indirect road mark, are captured in the image captured by the camera sensor 2000, the processor may detect the object and include the detected object in the image information. At this time, the processor may further supplement the image information by acquiring distance information to the object detected through the camera sensor 2000.

The image information may be information on the object captured in the image. The camera sensor 2000 may include an image sensor and an image processing module.

The camera sensor 2000 may process a still image or a moving image obtained by the image sensor (e.g., a complementary metal-oxide semiconductor (CMOS) or a charge-coupled device (CCD)).

The image processing module may process the still image or moving image acquired through the image sensor to extract necessary information, and transmit the extracted information to the processor.

At this time, the camera sensor 2000 may include a stereo camera for improving the measurement accuracy of the object and further securing information such as a distance between the vehicle 700 and the object, but the present disclosure is not limited thereto.

Although embodiments have been mainly described above, these are only illustrative and do not limit the present disclosure, and those skilled in the art to which the present disclosure pertains will understand that various modifications and applications not exemplified above are possible without departing from the essential characteristics of the embodiments. For example, each component specifically shown in the embodiments may be implemented by modification. In addition, differences related to these modifications and applications should be construed as being included in the scope of the present disclosure defined in the appended claims.

The invention claimed is:

1. A camera actuator comprising:

a housing;

a mover disposed in the housing and including an optical member and a holder including an accommodating groove in which the optical member is disposed;

a tilting guide unit configured to guide a tilting of the mover;

a drive unit disposed in the housing and configured to drive the mover;

a groove formed in a bottom surface of the accommodating groove and disposed along a first side and a second side of the bottom surface; and a bonding member disposed in the groove, the bonding member being disposed in the groove in the bottom surface of the accommodating groove and configured to couple the optical member and the holder, wherein the optical member is configured to reflect light incident from a vertical direction into a direction along an optical axis, and wherein the mover includes a step disposed at an outer peripheral side of the optical member, the step is configured to guide the optical member and extends toward the accommodating groove of the holder.

2. The camera actuator of claim 1, wherein the bottom surface includes a first face region overlapping the optical member inside the groove in a vertical axis and a second face region overlapping the optical member outside the groove in the vertical axis, and wherein an area of the first face region is greater than an area of the second face region.

3. The camera actuator of claim 2, wherein the holder further includes a seating protrusion disposed on the bottom surface outside the groove.

4. The camera actuator of claim 2, wherein the first face region is spaced apart by a predetermined distance from the optical member.

5. The camera actuator of claim 2, wherein the holder includes a first holder stopper and a second holder stopper extending upward from an upper surface of the holder.

6. The camera actuator of claim 5, wherein the first holder stopper is disposed to be spaced apart from the second holder stopper along the optical axis.

7. The camera actuator of claim 5, wherein the second holder stopper is disposed closer to the tilting guide unit than the first holder stopper.

8. The camera actuator of claim 5, wherein the housing includes a housing side portion disposed on an upper portion of the holder and including a housing hole.

9. The camera actuator of claim 8, wherein the first holder stopper at least partially overlaps an upper surface of the housing in a vertical direction.

10. The camera actuator of claim 8, wherein the second holder stopper overlaps the housing hole in the vertical axis.

11. The camera actuator of claim 5, wherein the bonding member is disposed between the first holder stopper and the groove.

12. The camera actuator of claim 5, wherein an upper surface of the second holder stopper is positioned above the optical member.

13. The camera actuator of claim 1, wherein at least a portion of the optical member is disposed above the bottom surface.

14. The camera actuator of claim 5, wherein the optical member includes a first overlapping region overlapping the bottom surface in the vertical axis and a second overlapping region overlapping the upper surface of the holder.

15. The camera actuator of claim 14, further comprising a support member disposed between the second overlapping region and the holder.

16. The camera actuator of claim 15, wherein the support member is disposed above the bottom surface.

17. The camera actuator of claim 14, wherein the groove overlaps the first overlapping region in the vertical axis.

18. The camera actuator of claim 5, wherein the second holder stopper includes a first stopper region extending in a direction perpendicular to the optical axis and a second stopper region extending along the optical axis.

19. The camera actuator of claim 1, wherein the groove vertically overlaps the optical member.

20. The camera actuator of claim 1, further comprising a recess formed inside the groove in the bottom surface.

* * * * *